(12) United States Patent
Adler et al.

(10) Patent No.: US 12,346,707 B2
(45) Date of Patent: Jul. 1, 2025

(54) SYSTEM-INDEPENDENT USER INTERFACE FRAMEWORK

(71) Applicant: Open Workspace, LLC, Highland Park, IL (US)

(72) Inventors: David Adler, Highland Park, IL (US); Brandon Winsor, Duluth, GA (US)

(73) Assignee: Open Workspace, LLC, Highland Park, IL (US)

( * ) Notice: Subject to any disclaimer, the term of this patent is extended or adjusted under 35 U.S.C. 154(b) by 808 days.

(21) Appl. No.: 17/548,832

(22) Filed: Dec. 13, 2021

(65) Prior Publication Data

US 2022/0197675 A1 Jun. 23, 2022

Related U.S. Application Data

(60) Provisional application No. 63/235,896, filed on Aug. 23, 2021, provisional application No. 63/196,835, (Continued)

(51) Int. Cl.
 *G06F 9/451* (2018.01)
 *G06F 3/04845* (2022.01)
 *G06F 3/0486* (2013.01)

(52) U.S. Cl.
 CPC .......... *G06F 9/451* (2018.02); *G06F 3/04845* (2013.01); *G06F 3/0486* (2013.01); *G06F 2203/04806* (2013.01)

(58) Field of Classification Search
 CPC .... G06F 9/451; G06F 3/04845; G06F 3/0486; G06F 2203/04806

(Continued)

(56) References Cited

U.S. PATENT DOCUMENTS 570,313 A 10/1896 Lake
611,438 A 9/1898 Philips
(Continued)

FOREIGN PATENT DOCUMENTS

| CN | 303466754 | 11/2015 |
|----|-----------|---------|
| CN | 306078672 | 9/2020 |
| JP | 1686110 S | 5/2021 |

OTHER PUBLICATIONS

"Tiling window manager", Wikipedia, https://en.wikipedia.org/wiki/Tiling_window_manager, downloaded Oct. 29, 2021, 8 pages.
(Continued)

*Primary Examiner* — Daniel Samwel
(74) *Attorney, Agent, or Firm* — McDonnell Boehnen Hulbert & Berghoff LLP

(57) ABSTRACT

An embodiment may involve: generating, for display upon a graphical user interface, a workspace that includes a background arrangement and a virtual panel arrangement, wherein the virtual panel arrangement is embedded within the workspace and non-overlapping with the background arrangement; generating, for display within the background arrangement, representations of resources, wherein the resources include a window; generating, for display within the virtual panel arrangement, one or more tiled virtual panels, wherein the tiled virtual panels respectively contain further windows; and displaying, on the graphical user interface, the background arrangement and the virtual panel arrangement, wherein the window from the background arrangement is moveable to the one or more tiled virtual panels, and wherein the further windows from the one or more tiled virtual panels are movable to the background arrangement.

20 Claims, 72 Drawing Sheets

Related U.S. Application Data filed on Jun. 4, 2021, provisional application No. 63/126,650, filed on Dec. 17, 2020.

(58) Field of Classification Search
USPC .................................................. 715/700–866
See application file for complete search history.

(56) References Cited

U.S. PATENT DOCUMENTS

| | | | |
|---|---|---|---|
| 620,463 A | 2/1899 | Latimer et al. | |
| 659,660 A | 10/1900 | Gehre | |
| 736,166 A | 8/1903 | Stimpson | |
| 741,320 A | 10/1903 | Fletcher | |
| 769,206 A | 9/1904 | Bickel | |
| 771,821 A | 10/1904 | Gleazen | |
| 784,541 A | 3/1905 | Feldkamp | |
| 792,362 A | 6/1905 | Stothard | |
| 796,462 A | 8/1905 | Simonin | |
| 801,968 A | 10/1905 | Clark | |
| 875,696 A | 1/1908 | Deverell | |
| 723,173 A | 3/1908 | Marthis | |
| 887,929 A | 5/1908 | Efaw | |
| 888,677 A | 5/1908 | Whitcomb | |
| 908,122 A | 12/1908 | O'Connor | |
| 909,368 A | 1/1909 | Connor | |
| 944,751 A | 12/1909 | Ursbruck | |
| 944,796 A | 12/1909 | Lemcke | |
| 981,974 A | 1/1911 | Brown et al. | |
| 5,233,687 A * | 8/1993 | Henderson, Jr. | G06F 3/0481 715/788 |
| 5,841,435 A | 11/1998 | Dauerer et al. | |
| 5,936,613 A | 8/1999 | Jaeger et al. | |
| 6,268,845 B1 | 7/2001 | Pariza et al. | |
| 6,289,466 B1 | 9/2001 | Bayramoglu et al. | |
| D570,313 S | 6/2008 | Shih | |
| 7,386,801 B1 * | 6/2008 | Horvitz | G06F 3/0481 715/767 |
| D611,438 S | 3/2010 | Kubota | |
| D620,463 S | 7/2010 | Li | |
| D659,660 S | 5/2012 | Kumano | |
| D723,173 S | 2/2015 | Kim | |
| 8,994,678 B2 | 3/2015 | Sawhney et al. | |
| D736,166 S | 8/2015 | Kuh | |
| D741,320 S | 10/2015 | Heck | |
| 9,423,938 B1 | 8/2016 | Morris | |
| D769,206 S | 10/2016 | Seo | |
| D771,821 S | 11/2016 | Hilbig | |
| D784,541 S | 4/2017 | Hilbig | |
| D792,362 S | 7/2017 | Maxwell | |
| D796,462 S | 9/2017 | Bang | |
| D801,968 S | 11/2017 | Johnson | |
| 10,133,461 B1 * | 11/2018 | Roberts | H04M 3/5191 |
| D875,696 S | 2/2020 | Lin | |
| D887,929 S | 6/2020 | Piaskowski | |
| D888,677 S | 6/2020 | Ryu | |
| 10,852,853 B2 | 12/2020 | Knoppert et al. | |
| D908,122 S | 1/2021 | Luo | |
| D909,368 S | 2/2021 | Seo | |
| D944,751 S | 3/2022 | Zhang | |
| D944,796 S | 3/2022 | Kim | |
| 11,487,406 B1 * | 11/2022 | Song | G06F 3/0486 |
| D981,974 S | 3/2023 | Kuang | |
| 2003/0189597 A1 | 10/2003 | Anderson et al. | |
| 2004/0066414 A1 * | 4/2004 | Czerwinski | G06F 3/0481 715/781 |
| 2007/0064388 A1 | 3/2007 | Uchizono | |
| 2007/0260995 A1 * | 11/2007 | Stienhans | G06Q 10/06 715/779 |
| 2013/0139061 A1 * | 5/2013 | Strode | G06F 3/165 715/727 |
| 2014/0109001 A1 | 4/2014 | Louch et al. | |
| 2014/0351722 A1 | 11/2014 | Frederickson et al. | |
| 2016/0086577 A1 | 3/2016 | Broadbent | |
| 2019/0012003 A1 | 1/2019 | Grant et al. | |
| 2022/0006548 A1 | 1/2022 | Xu | |

OTHER PUBLICATIONS

Brinkmann, Martin, "The perils of running Windows 10 on a 4K monitor", https://www.ghacks.net/2020/01/02/the-perils-of-running-windows-10-on-a-4k-monitor/, Jan. 2, 2020, 23 pages.

"Samsung QN55Q7C 55" curved Smart QLED 4K Ultra HD TV with HDR (2017 model)", Downloaded from CRUTCHFIELD Website, 6 pages.

Coppock, Mark, "How to adjust high-DPI scaling in Windows 10", https://www.digitaltrends.com/computing/how-to-adjust-highi-dpi-scaling-in-windows-10/, Mar. 29, 2021, 36 pages.

"54.6" Samsung QN55Q7C—Specifications", Downloaded from https://www.displayspecifications.com/en/model/e3d9a61, Dec. 17, 2021, 9 pages.

International Search Report mailed May 19, 2022, in connection with International Application No. PCT/US2021/063520, 4 pages.

Bell et al., "Dynamic Space Management for User Interfaces", ACM Symp. on User Interface Software and Technology, San Diego, CA, Nov. 5-8, 2000, 238-248.

Henderson et al., "Rooms: The Use of Multiple Virtual Workspaces to Reduce Space Contention in a Window-Based Graphical User Interface", ACM Transactions on Graphics, vol. 5, No. 3, Jul. 1986, pp. 211-243.

Czerwinski et al., "The Contribution of Thumbnail Image, Mouse-over Text and Spatial Location Memory to Web Page Retrieval in 3D", Interact, 1999, 8 pages.

Card et al., "A Multiple, Virtual-Workspace Interface to Support User Task Switching", ACM, 1987, 53-59.

Baudisch et al., "Focus Plus Context Screens: Combining Display Technology with Visualization Techniques", ACM, 2001, 10 pages.

Robertson et al., "Scalable Fabric: A Flexible Representation for Task Management", Advanced Visual Interfaces, 2004, 11 pages.

Feltham, "Project Cambria: Everything We Know About Meta's Next Headset", 2022, 11 pages, https://uploadvr.com.

Binary Fortress Software, "Multiple Monitors Made Easy," DisplayFusion, https://www.displayfusion.com, printed from the World Wide Web Jul. 20, 2022.

"The Task Gallery: A 3D Window Manager," YouTube, https://www.youtube.com/watch?v=3-mhqYBm7Xo, printed from the World Wide Web Jul. 20, 2022.

A Movable Knob Puts a Tactile Twist on the Modern Touch Screen Car Dashboard, posted Mar. 20, 2022, [retrieved Sep. 1, 2023]. Retrieved from internet, https://www.yankodesign.com/2022/03/20/a-movable-knob-puts-a-tactile-twist-on-the-modern-touch-screen-car-dashboard/ (Year: 2022).

Dell's Canvas is like a Surface Studio without the PC, posted Jan. 5, 2017 [online], [retrieved Sep. 1, 2023]. Retrieved from internet, https://www.theverge.com/2017/1/5/14128434/dells-canvas-touchscreen-display-announced-ces-2017 (Year: 2017).

Ideapro Monitor Light Bar E-Reading LED Desk Lamp, posted Oct. 1, 2021 [online], [retrieved Sep. 1, 2023]. Retrieved from internet, https://www.amazon.ca/Ideapro-Desk-Lamp/dp/B09CYN88JC (Year: 2021).

Nest Thermostat E review, posted Jul. 12, 2021 [online], [retrieved Sep. 1, 2023]. Retrieved from internet, https://www.techradar.com/reviews/nest-thermostat-e (Year: 2021).

* cited by examiner

SYSTEM-INDEPENDENT USER INTERFACE FRAMEWORK

CROSS-REFERENCE TO RELATED APPLICATIONS

This application claims priority to U.S. provisional patent application No. 63/126,650, filed Dec. 17, 2020, U.S. provisional patent application No. 63/196,835, filed Jun. 4, 2021, and U.S. provisional patent application No. 63/235,896, filed Aug. 23, 2021, all of which are hereby incorporated by reference herein in their entirety.

BACKGROUND

Modern graphical user interfaces (GUIs) have not changed in any fundamental way for over 25 years. While useable, they exhibit a number of disadvantages, limitations, and drawbacks that prevent users from accomplishing tasks in an efficient fashion. Users of such a GUI are subjected to a plethora of information coming from email, websites, social media, workplace applications, collaboration tools, audio, and video, just to name a few sources. As a consequence, these individuals often suffer from usability-related problems, such as excessive operational overhead, undue cognitive load, and/or information overload. Further, the application-centric nature of modern GUIs does not line up with or facilitate today's volume and disparity of information, or the complex tasks that users are expected to perform across numerous disparate applications

SUMMARY

Systems, methods, and processes for displaying, arranging, and controlling application windows and content on displays are presented herein. Particularly, three inter-related aspects are described: (i) a system-independent user interface framework, (ii) systems and methods for programmatically rendering application windows and views/layouts of application windows based on predefined events, and (iii) a platform-agnostic hardware controller, for rendering window layouts and views of content across various display mediums and experiences.

The embodiments herein overcome technical problems with modern computing systems by introducing a TAP-centric GUI framework (Tasks, Activities, and Processes). The TAP-centric GUI includes one or more workspace configurations that are arrangements of resources (e.g., application icons, browser windows containing specific remote resources or links to remote resources, local files and application windows or their particular configurations, or shortcuts to these resources represented in the form of thumbnail images) that assist the user in focusing on a subset of information, resources, and/or functions available by way of the GUI. Users configure workspaces by intentionally sizing, positioning, arranging, and configuring windows so that they can be saved and indexed as workspace configurations to be restored at some later point in time. Typically, only one workspace is displayed at a time, and the displayed workspace encompasses the totality—or at least a large portion—of the user's display. Workspaces are meant to facilitate extended periods of focused work, modes of work, the execution of complex processes, or even activities, like webinars or virtual meetings, for example.

Each workspace may include a virtual panel arrangement of one or more virtual panels, each encompassing sections of the workspace. A workspace also may include a desktop section of the workspace (sometimes referred to as a "background" or "background arrangement") that is not within the bounds of any virtual panel. The virtual panels may be tiled in some fashion so that they are non-overlapping. Each virtual panel may serve as a container for docking and dynamically resizing one or more resources and may be individually resized. Resources may be moved (e.g., dragged and dropped) between panels, from a virtual panel to the desktop, or from the desktop to a virtual panel.

The TAP-centric GUI also may include "tasks", represented on layers that may be overlaid atop of a defocused workspace. A task may represent a specific configuration of one or more associated resources, grouped together in a tiled or cascaded arrangement. When a task is in place, the rest of the workspace (the portion of the workspace that is not displaying the task) may be blurred, dimmed, shaded, or otherwise defocused. Tasks are meant to facilitate smaller, bite-sized pieces of work that may come in the form of routine operations (such as booking a meeting, reporting expenses, or viewing a weekly report, for example) or interruptions to focal/extended work (such as, responding to an email, looking something up for a coworker, or checking news, scores, or one or more social media feeds).

Advantageously, the arrangement of virtual panels and a background within a workspace, the grouping of resources into tasks, and the overlaying of the task layer atop the workspace, enable the user to coalesce a particular group of resources representing some task, activity, or process, within a construct that allows the resources to be hierarchized. Such an arrangement of resources can be expressed at a holistic level (by using workspaces for focused work and tasks for interruptive work), at a lower level (by docking focal resources within a workspace's virtual panel arrangement and keeping contextual or secondary resources nearby in the background arrangement) or at an even lower level (by docking focal resources to specific virtual panels within a workspace in order to distinguish or categorize them). These are just a few examples of features that allow workspaces to be designed for specific purposes. For instance, at the highest level, a user may have one workspace for their day-to-day work (e.g., displaying communication, productivity, and web browser resources), another workspace for their education (displaying an electronic textbook, video, and web browser resources), and another workspace for evening work (displaying a video representing a news or sports broadcast alongside a certain application in use, or certain web browser resources). Despite workspaces being prearranged with certain combinations of resources, these resources can be added to or removed from workspaces, virtual panels, and tasks, as needed.

Further, the framework provided herein may use metadata to define the user's saved configuration of each workspace, virtual panel, task, and configuration of general system settings (referred to herein as "system facts"). This metadata may be stored locally and/or on a remote server, and then restored as needed. In this fashion, a user's custom workspaces can be ported between multiple devices (e.g., one or more desktop computers, laptop computers, tablets, smartphones, etc.), between multiple users, or between disparate operating systems. As the display sizes of these various devices may be different, the framework allows for workspaces to automatically adapt to various display sizes and resolutions, preserving the relative position and size of resources and virtual panels within the confines of the native display device's total screen space.

Integration with scheduling or calendar applications (built into the framework or integrated with third-party applications) might also facilitate the automatic timer-driven or event-driven display of tasks, background arrangements, or panel arrangements, respectively. For example, a user might configure a particular workspace, panel arrangement, background arrangement, or task to be displayed based on certain timer-driven events (e.g., the starting time of a calendar event, or the completion of a task by a coworker). In general, any event might cause the launching, surfacing, or modification of an entire workspace or some subset thereof, or further might cause an audio notification to be played or some visual notification (e.g., a notification badge or a border highlight) to be displayed on some section of a workspace, calling the user to action.

Moreover, a physical hardware controller may be used as a convenient interface through which to browse workspaces, launch workspaces, or switch between them. Alternatively, the physical controller may be used to control visual elements of the TAP-centric GUI (such as dimming or defocusing the background view), or to control general system settings of the computer (such as muting or adjusting volume), or to snooze or clear a view rendered by an automatic timer-driven event. The controller may be docked to a display's housing for purposes of charging and/or communication but may also communicate wirelessly with the display when not docked.

Accordingly, a first example embodiment may involve generating, for display upon a graphical user interface, a workspace that includes a background arrangement and a virtual panel arrangement, wherein the virtual panel arrangement is embedded within the workspace and non-overlapping with the background arrangement. The first example embodiment may also involve generating, for display within the background arrangement, representations of resources, wherein the resources include a window. The first example embodiment may also involve generating, for display within the virtual panel arrangement, one or more tiled virtual panels, wherein the tiled virtual panels respectively contain further windows. The first example embodiment may also involve displaying, on the graphical user interface, the background arrangement and the virtual panel arrangement, wherein the window from the background arrangement is moveable to the one or more tiled virtual panels, and wherein the further windows from the one or more tiled virtual panels are movable to the background arrangement.

A second example embodiment may involve receiving and storing, by a window management server device and from a client device executing window management software, a request for notifications for an event relating to a third-party application, wherein the third-party application is accessible by way of a third-party server device. The second example embodiment may also involve registering, by the window management server device and by way of the third-party server device, for the notifications. The second example embodiment may also involve receiving, by the window management server device, an indication that the event has occurred. The second example embodiment may also involve transmitting, by the window management server device and to the client device, the indication that the event has occurred, wherein reception of the indication causes the window management software to render a layout of resources appearing on a display of the client device.

A third example embodiment may involve transmitting, by window management software of a client device and to a window management server, a request for notifications for an event relating to an application, wherein the application is either hosted on the client device or is a third-party application accessible by way of a third-party server. The third example embodiment may also involve receiving, by the window management software, confirmation that the window management server has registered for the notifications. The third example embodiment may also involve receiving, by the window management software, an indication that the event has occurred. The third example embodiment may also involve, possibly in response to receiving the indication, rendering, by the window management software, a layout of resources appearing on a display.

A fourth example embodiment may involve a hardware controller comprising: a wireless network interface; a chargeable battery; a display interface configured to dock to an external display and charge the chargeable battery; an LCD screen configured to show information relating to the external display; a rotatable dial configured to receive manual input; a processor; and memory containing program instructions executable by the processor, wherein the program instructions: (i) cause the manual input received from the rotatable dial or a rotary position of the rotatable dial to control the external display, and (ii) cause data received from the wireless network interface or information received from the external display to be displayed on the LCD screen.

In further variations, the fourth example embodiment may involve a hardware controller comprising: a wireless network interface; a LCD screen configured to show icons or logos representing viewable content accessible by the controlled display device or its sources; a chargeable battery; a display interface configured to dock to an external display and charge the chargeable battery; and a processor configured to receive manual input and execute program instructions. Additional embodiments may involve a hardware controller, attachable to a display device, comprising: a rotatable dial offering tactile feedback and configured to receive manual input; and a LCD screen configured to show icons or logos representing viewable content accessible by the attached display.

In a fifth example embodiment, an article of manufacture may include a non-transitory computer-readable medium, having stored thereon program instructions that, upon execution by a computing system, cause the computing system to perform operations in accordance with the first, second, third, or fourth example embodiment.

In a sixth example embodiment, a computing system may include at least one processor, as well as memory and program instructions. The program instructions may be stored in the memory, and upon execution by the at least one processor, cause the computing system to perform operations in accordance with the first, second, third, or fourth example embodiment.

In a seventh example embodiment, a system may include various means for carrying out each of the operations of the first, second, third, or fourth example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, numerous variations are possible. For instance, structural elements and process steps may be rearranged, combined, distributed, eliminated, or otherwise changed, while remaining within the scope of the embodiments as claimed.

DETAILED DESCRIPTION

Example methods, devices, and systems are described herein. It should be understood that the words "example"

and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized, and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

The term "embodiment" as used herein is intended to be non-limiting, and may refer to a possible arrangement, implementation, or example of one or more features or sub-features involving or related to the invention as claimed.

I. Example Computing Devices and Cloud-Based Computing Environments

Figure 1:
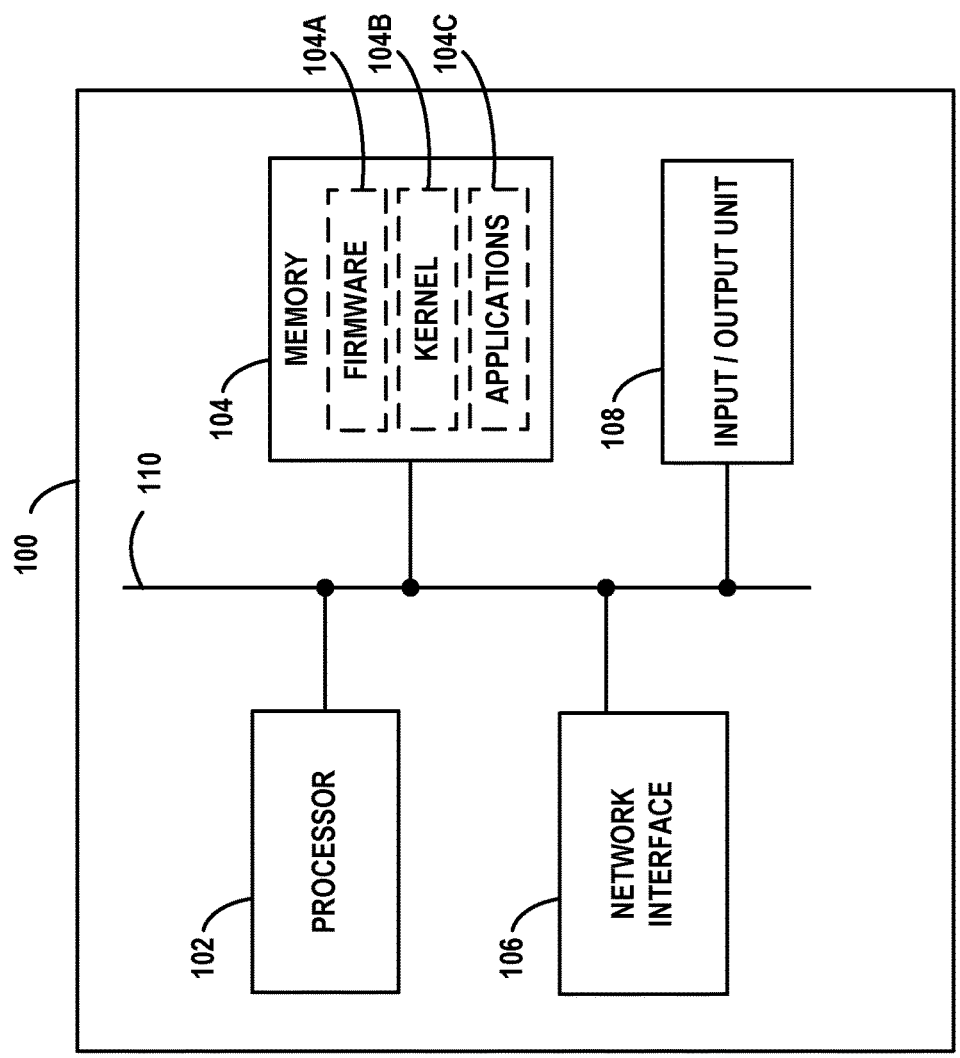
FIG. 1 illustrates a schematic drawing of a computing device, in accordance with example embodiments.

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling, and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), Bluetooth, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, Bluetooth, and Wifi interfaces.

Input/output unit 108 may facilitate user and peripheral device interaction with computing device 100. Input/output unit 108 may include one or more types of input devices, such as a keyboard, a mouse, a touch screen, a dial controller, and so on. Similarly, input/output unit 108 may include one or more types of output devices, such as a screen, monitor, projector, head-mounted display, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an architecture for storing and retrieving workspace configurations, as well as other information. The exact physical location, connectivity, and configuration of these computing devices may be unknown and/or unimportant to client devices. Accordingly, the computing devices may be referred to as "cloud-based" devices that may be housed at various remote data center locations.

Figure 2:
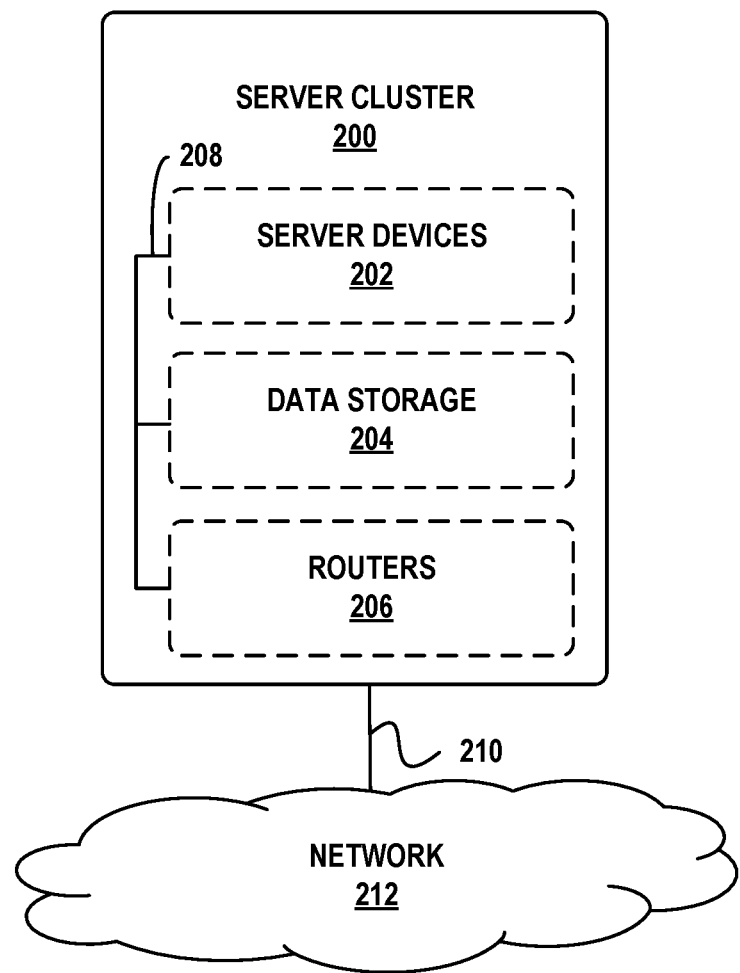
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid-state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

II. Systemic Usability Constraints of Computing Devices

Users of computers routinely experience a number of usability-related problems that contribute to operational overhead, cognitive load, and information overload. These three factors negatively impact productivity, ability to retain knowledge, and the overall computing experience, all while causing undue fatigue.

A. Operational Overhead

Operational overhead, in the context of client-side computing, refers to the routine commands carried out with our pointing devices (e.g., a mouse, stylus, or touch), keyboards, and/or other peripheral devices, in order to provide input to the computer and manage windows (specifically to source, surface, manipulate, configure, and/or arrange information within view on a display). Window management (e.g., the practice of bringing windows or tabs into view, resizing or reconfiguring them, and arranging them in the construct of a desktop), is a primary contributor to operational overhead, as is any other manually intensive or repetitive operation that is routinely carried out as part of working on a computer or a general computing experience. Further, the responsibility of window management on modern operating systems is largely assigned to the user (as opposed to the system carrying out window management on behalf of the user), as modern systems still require the user to manually pull resources into view in a single-threaded fashion, (rather than having resources pushing into an expansive, contextually rich view in a multi-threaded fashion by the system—a benefit of the systems and TAP-centric GUI described herein).

B. Cognitive Load

Cognitive load refers to overuse of a user's working memory. Using a computer requires a certain amount of the user's working memory to process or recall information concerning tasks or work on which the user is focused (as well as any information contextual or related to the tasks or work), along with any other exogenous stimuli to which the user is exposed (e.g., visuals and/or audio). Cognitive load compounds as users routinely carry out the cognitively intense responsibility of locating, surfacing, arranging and switching between resources needed to carry out one of many work tasks, activities, or processes inherent in modern day-to-day work. Thus, users can very quickly become overwhelmed by the amount of information needed to be remembered in order to interact with the computer throughout a given workday or even some shorter-term session of work Various research (not limited to Baddeley and Hitch's model of working memory and that related to the Information Processing Model) has shown that a primary reason that humans tend not to be proficient at multitasking is that it puts excessive strain on working (short term) memory. To illustrate this point, the Information Processing Model (a widely accepted cognitive framework explaining how the human mind takes in information and organizes and stores it for future retrieval) states that the human mind has limited capacity to keep information in working memory (specifically 7-9 chunks of information) and has just 5-15 seconds to encode those chunks into long-term memory for retrieval at some later point in time. Despite this, the sheer amount of information and its disparity across sources has grown exponentially since just 2007 (when the modern construct of the mobile phone GUI was conceived) and more so since 1985 (when the modern construct of the desktop GUI was conceived). In the last 10 years alone, as the web, cloud, and mobile computing proliferated during the same period, the number of live websites grew 10-fold, the number of desktop apps and progressive web apps grew by 10,000%, and we gained 5 million mobile apps. During this time, our brain anatomy has for the most part remained the same. Thus, the navigational and window management constructs characteristic of modern client-side operating systems (specifically, the frequent context-switching that their application-centric information architecture demands of the user, and the operational overhead taken on by the user pulling windows into view) are no longer conducive to the modern information landscape, and further, are not sustainable for the human mind.

C. Information Overload

Information overload, in the context of computing, refers to the imbalance between the amount of information that a user is presented with and that user's ability or capacity to process and/or encode the information. This phenomenon is sometimes referred to as "information anxiety" since it often leads to difficulty in comprehension and decision making.

For example, suppose that a user begins a task that requires open windows from four different applications. The user has to (i) determine the location of the resources (ii) launch the applications from a system utility (like a taskbar or menu), (iii) arrange and resize each of the windows so that their overlap is minimal, (iv) configure each application to display the information desired—all before work on the task can begin. During this work, the user may minimize windows to system taskbars or stack them in tabs in order to minimize the occurrence of overlapping windows, however, working in this construct disadvantageously requires the user to frequently scan labels and their text descriptors of resources (e.g., those on program buttons held in the taskbar, or on tabs). This requires the user to read text labels on resources in order to identify resources needed throughout the workday. However, as the aforementioned research by Baddeley, et al. establishes, the human brain's process of encoding/retrieving information into/from long term memory is equally dependent on identifying resources visually (e.g., by employing the visuospatial sketchpad, where scenes and their parts are encoded by registering iconic representations of them into long term memory), than it is on identifying resources by reading and mentally rehearsing text (e.g., by employing the phonological loop).

D. Application-Centric GUIs

Figure 3:
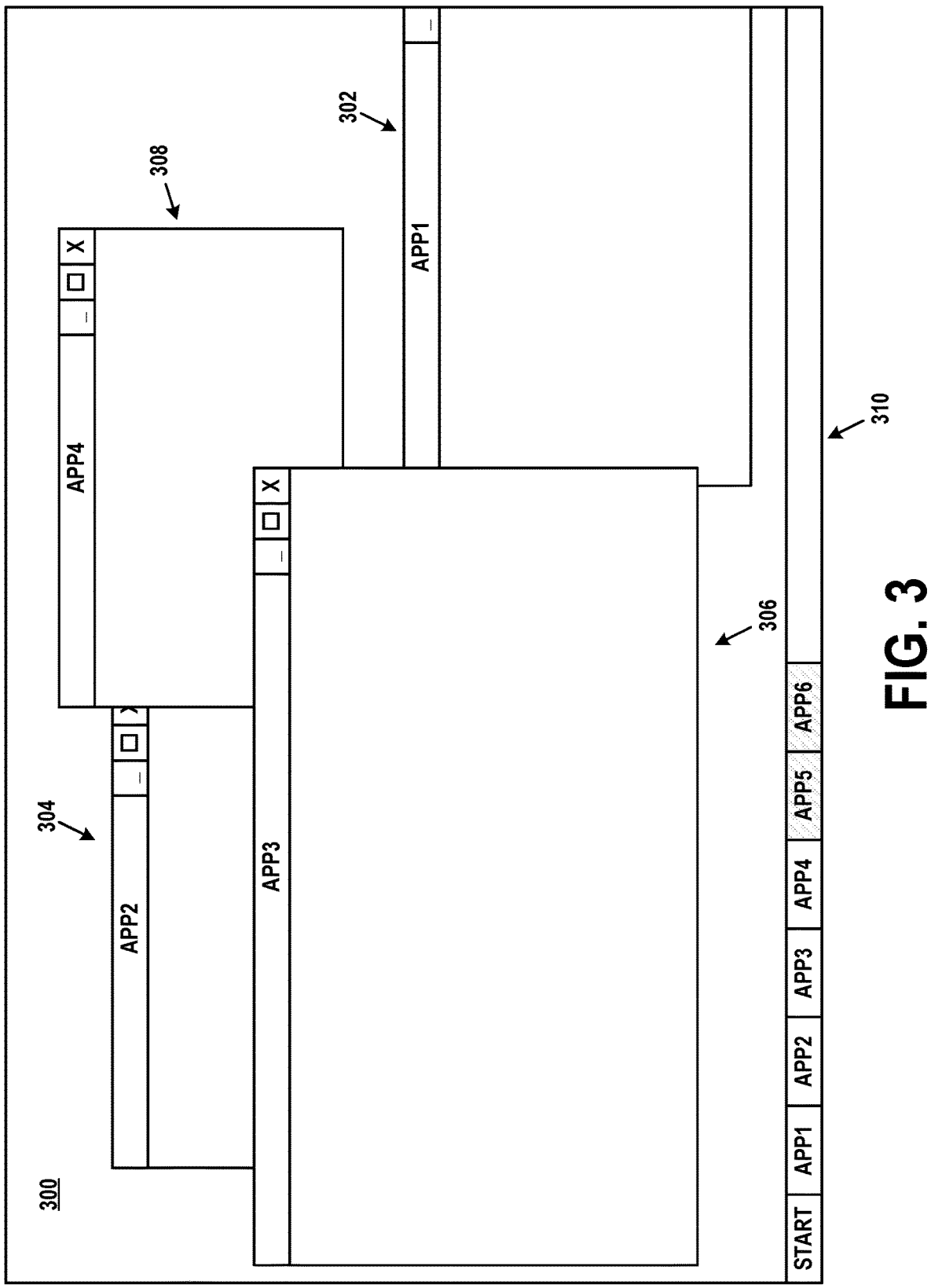
FIG. 3 depicts an application-centric GUI, in accordance with example embodiments.

FIG. 3 provides an example of a typical application-centric GUI 300. GUI 300 represents the extent of the usable portion of a computer's display or screen (herein, the terms "display" and "screen" will be used interchangeably unless context suggests otherwise). Presented upon GUI 300 are four windows, 302, 304, 306, and 308, as well as task bar 310.

Each of windows 302, 304, 306, and 308 contain a top portion with a title bar. Each top portion includes text representing the name of the associated application contained within the window (app1, app2, app3, and app4, respectively) as well as widgets for minimization, maximization, and closing of the window. Task bar 310 includes a start button, as well as launch buttons for each of app1, app2, app3, and app4. Task bar 310 also includes launch button for app5 and app6, windows for which are not shown in FIG. 3. The start button can be actuated to cause a menu of applications and/or settings to appear on GUI 300. Each launch button can be actuated begin execution of its associated application if the application is not already executing, and thereby cause a new window containing this application to appear on GUI 300. Alternatively, if the application is already executing, such actuation may cause its window to be minimized or restored.

FIG. 3 depicts a common arrangement of windows that exemplifies some of the drawbacks of modern GUIs, generally characterized as a desktop. Notably, window 302 is partially unviewable due to being slightly "off screen". Further, window 306 is atop windows 302, 304, and 308, thereby obscuring the content of these windows. Likewise, window 308 is atop window 304, creating a similar problem. Moreover, modern GUI window management often gives the user little control over the placement and dimensions of windows upon application launch, after rebooting, after switching between displays (e.g., from a built-in display to an external display), or after restoring a computer from sleep or hibernate modes. Thus, the user has to frequently resize and arrange these windows manually in order to place them in a fashion that allows the user to efficiently perform a task.

The user's susceptibility to operational overhead, cognitive load, and information overload within client-side computing can be explained as a function of four systemic and root constraints pervasive across the ecosystem of client-side operating systems (and in particular, the GUI frameworks offered by these operating systems).

These constraints have been present since the infancy of personal computing and have yet to be solved or even much improved upon at the general level, despite numerous advancements in chip, memory, and display technology. Innovation and resources in the realm of computer technology have largely focused on mobile environments and cloud computing over the course of the past decade, thus many desktop and laptop usability problems remain largely unaddressed, despite the general expansion of capabilities indirectly introduced by widely adopted operating systems through the application of third-party solutions built upon them (such as those accessible through web browsers or enabled by cloud computing).

1. Application-centric Computing

As discussed above, modern operating systems are inherently application-centric, in that their information architecture assumes that our primary computing goal or objective as users is to access some specific application (or file, service, etc.). In practice, though, our computing goals as users (particularly as knowledge workers or as enterprise users within a professional context), tend to be centered on accomplishing some task, activity, or process. Composing emails, managing projects, following up with clients, creating reports, attending a webinar or virtual meeting, paying bills, and carrying out online coursework are just a few examples of this TAP-centric work.

Each of these activities requires a unique set of digital resources—applications, services, files, and/or or tools. Furthermore, work involving more than one project, client, report, meeting, course, portfolio, case, etc., often requires a unique set of resources (or views within resources), each specific to a certain project, client, report, etc.

Performing this type of work within application-centric constructs can be operationally and cognitively expensive, as the various resources and sets of resources need to be found and surfaced from disparate locations across the local computing device, one or more server devices, and/or the web. Locating resources within application-centric constructs contributes to cognitive load, since users access their memory in order to recall the locations of the resources and possibly the methods for accessing or configuring the resources. Once a resource is located, surfacing it on a GUI can be operationally intensive, requiring mouse clicks and keystrokes to navigate to and from some centralized location or launch point (e.g., traversing desktops, home screens, menu bars, file explorers and/or browser windows and tabs) where the resources are disposed. Users may then use various input modalities to manipulate windows or arrange views of information.

Configuring resources for a specific project, client, report, meeting, course, etc. can require even further operation. Once this is done and work on a task is completed (or when other duty calls, or interruptions occur during focused work), users often transition to some other task requiring a whole new set and configuration of resources. The proportion of time spent merely setting up work can be substantial, making information management a job in and of itself. In turn, work output and productivity can largely hinge on the ability to manage and maneuver among resources effectively. Research conducted by McKinsey in 2012 identified that workers at that time were spending a little over 1 hour per workday searching and gathering information. This figure has presumably increased since then based on how the information landscape has evolved in the time since as cloud computing, mobile computing, and the web proliferated.

2. Lack of Contextualization

Once a user has recalled the locations of one or more resources, brought them into view on a GUI, and configured them for the subject matter at hand, the user may visually scan the resources for information. This routine scanning is a key part of the information synthesis employed during the performance of tasks. One of the ways that users can more efficiently synthesize information, and be more productive in general, is by referencing or juxtaposing information from disparate sources so that they can evaluate contextual information or related stimuli alongside focal stimuli. For example, a user might reference notes, files, or content displayed on web pages as contextual when composing an email). Users also might compare and contrast text-based information or visual information represented by images, designs, etc.

Arranging resources so that users can make comparisons or view contextual information alongside focal work is operationally intensive as it often requires window manipulation, resizing, and rearrangement. Once the user has set up windows and arranged information accordingly, more cognitive load is taken on as information is contextualized or otherwise prioritized in line with the task at hand. Existing solutions do not provide users with easy ways to arrange or evaluate contextual information in conjunction with what they are focusing on, or even ways to easily compare and contrast focal stimuli. As a result, users tend to pay a heavy price—both operationally and cognitively—whenever disparate information needs to be displayed in the user's visual periphery (e.g., when comparing/contrasting documents or images, or referencing disparate information in composing an email). Assuming that there is available screen real estate to juxtapose multiple resources upon a GUI, users tend to forego the opportunity to do so on account of the relatively high cost of surfacing and arranging windows. Ultimately, the work product suffers as users carry out their tasks with limited context relative to what may actually be available.

3. Confinement to a Limited Display Space

A key constraint of window-based graphical user interfaces is that the screens of some commonly used display devices are generally very small, relative to the ever-growing number of resources and information required by certain tasks. Tabs and navigation menus exist within application or browser windows to address this limitation and to save time and effort in determining which information consumes screen real estate.

Limitations in display size make work more operationally and cognitively intensive as users are required to work in a stacked construct, where windows and tabs are shuffled on a single z axis in order to bring focal resources into view atop the stack. This problem has been compounded upon as it has driven the design philosophy largely followed by modern application design, which assumes the user will be interacting with the application on a single smaller screen size. This assumption in turn heavily impacts design considerations for the application being designed (e.g., decisions such as using a side navigation or sub-menu to drive the user's navigation within a single application window, as opposed to designing a multi-window application that can tile out subsets of the application across a more expansive view that might be afforded by a larger, higher-resolution display). Extensive research conducted on multiple-monitor usage and trends has supported the widespread user demand for more screen real estate, presumably due to users wanting to leverage what Baddeley described as the visuospatial sketchpad, or perhaps due to user interest in leveraging our innate visual spatial processing ability (the part of our brain that identifies context about resources based on their position in view). Research by Jon Peddie, for example, showed that as far back as 2017, 90% of users were using multiple monitors for everyday work spanning industries, ranging from creative work to knowledge work to medical work to software development. Peddie and others have further found that users of multiple monitors have an expected productivity increase of between 42%-56% from use of multiple monitors (based on estimates from users, and despite their being unaware of other research supporting this).

Take, for example, the sales executive's flow through a lead generation process requiring use of an email application, a customer relations management tool, a spreadsheet utility, and a chat application. Consider, for example, how that user's operational overhead and cognitive load might differ in carrying out the process on a 14-inch laptop screen versus using a larger display that could show all these resources within the same view and allow the user to interact with each resource without having to revert back to the taskbar in order to navigate between them and frequently switch between which resource occupies the entire screen.

Nonetheless, even if larger displays were always available, they would not fully address the underlying problem, as operating systems are still application-centric (rather than task/activity/process-centric) and are not designed to effectively manage a plethora of screen real estate. In fact, coupling modern operating systems with a large format display in order to replace multiple monitors, tends to have an inverse effect, in that it enables yet more disorganization in the form of overlapping windows, causing more information overload. A common user-defined display setting across these systems further highlights the lack of an existing solution for managing ultra-high-resolution (e.g., 4K or 3840×2160 pixels) computer monitors that are commonly smaller in size. This system feature automatically zooms in on the larger available screen space of the 4K monitor to the tune of 150%, 200%, and in some cases 300%. This feature solves two inherent problems for the system (but not the user): (i) it reduces the available screen real estate to that available on a lower-resolution monitor, in turn making the high resolution display more manageable by the system's window manager or by other common/generally available window managers (characteristically defined by their ability to split a screen into two halves, 2×2 rectangles, or into some other gridded arrangement that encompasses a monitor's total available real estate), (ii) it makes text legible where it otherwise would be too small if a 4K monitor with common physical dimensions were to utilize its full 3840×2160 pixels of screen real estate with no zoom in place. The solution to both these problems is notably missing from the commercial display market: a large format (e.g., relatively larger in physical dimensions) display with at least 3840×2160 (4K) of screen real estate, and with a 4:3 aspect ratio (to afford a more vertical and expansive background view) that's size and dimensions more closely resemble a traditional work desk than a common computer monitor. This display might provide more space to dock resources for easy access (e.g., to pull into virtual panels as needed) or for a richer contextual view—whether using a desktop display that closely resembles a large, curved TV, or using augmented reality smart glasses to lay a desktop/background view over an actual scene like a coffee shop, where the user may be working on a laptop. The notable absence of this solution from the computer monitor market speaks to the elusiveness of the limited display space problem and to its unsolved nature.

4. Too Much Information

With access to tens of thousands of desktop and web applications and nearly 200 million active websites, today's computer user is tasked with managing an ever-increasing amount of information from an ever-growing number of sources. As the user continually surfaces information and resources, windows tend to pile up and tabs accumulate within windows, which users typically and intentionally keep open or within reach. In an ideal world, users would close or clear from view the resources that are no longer needed for their current task. However, doing so on existing systems is cost-prohibitive (operationally and cognitively) due to the amount of effort and thought required to locate, configure, or arrange a given resource the next time it's needed. Consequently, users end up working on backdrops consisting of piles of windows, or alternatively working in a single window cluttered with tabs. This results in a GUI displaying exponentially more visual stimuli and information than what a given task might require (whether information is displayed in the form of a pile of windows scattered over the desktop or on top of a neatly stacked, high pile of tabs—where resources tend to be buried and difficult to find). Users are faced with this problem throughout the modern work day as part of the routine operation of manually sourcing and surfacing the various resources needed for a given task, process or activity. The above-stated problems (application-centric systems, lack of contextualization, limited display space, and too much information, are not unique to specific operating systems. In fact, these problems persist across operating systems and nearly every use case for them. Whether executing a simple task or completing some activity or process more complex in nature, the user endures the same constraints and friction points in locating, surfacing, configuring, and/or arranging resources, scanning and processing the information within them, and ultimately acting on that information by contributing input to the computer.

III. TAP-Centric Computing Framework

The embodiments herein introduce a TAP-centric computing framework for GUIs. It is recognized that users benefit from the grouping and/or logical arrangement of various task-related resources on a GUI. More general terms for this notion include "task-centric computing", "activity-centric computing", and "process-centric computing". Regardless of terminology, the embodiments herein include a software architecture that allows TAP-centric GUIs to be defined, modified, saved, stored, adapted, and retrieved.

This software architecture includes a window management sub-system that provides users with a platform-independent construct for TAP-centric computing and a framework for managing and visually collecting information. Implementations of this software architecture can be deployed on computers using WINDOWS®, MACOS®, LINUX®, and other operating systems.

The framework may contain mechanisms to capture, store, index, recall, and share the configuration state of a GUI and resources displayable thereon, as well as mechanisms for managing, directing, and normalizing user experience and user attention within the GUI. In doing so, these embodiments solve several usability problems across generally available client-side operating systems, and ultimately streamline the user experience for knowledge workers, creative professionals, students, and leisure users—all while preserving the unique interactions and appearance of the native operating system's GUI and the application windows contained therein.

In TAP-centric computing, instead of navigational points or menus presenting the user with a choice of applications to launch or manipulate, menus or launch points might contain choices that represent specific tasks or objectives. Navigation menus in TAP-centric computing might be organized by activities or processes (e.g., work-related finances), or might further be broken down to show the tasks or objectives that make up the larger activity (e.g., "401k contributions" or "expense reporting". In short, a "task", "activity", or "process" may all be considered to be a particular grouping of resources that are related in some fashion (e.g., that contribute to a common function or goal).

This construct allows the user to specify some imminent goal or objective so that the computer can then source, configure and arrange the collection of resources needed to carry out the associated task, activity, or process. In pre-computing times, such a capability would have been nearly impossible, particularly for the general worker. The fact that this capability an now be realized in software, as a function of our tools and resources being nearly entirely digital, is remarkable in and of itself.

The embodiments herein address these and other limitations by providing window management software that introduces workspaces as constructs for practicing TAP-centric computing, as well as virtual panels, backgrounds (sometimes referred to as desktops), and tasks that can be layered atop these workspaces.

A. Workspaces

Workspaces define displayable resources and configuration information across some or all of the screen space afforded by the user's display(s), thereby encompassing the user's peripheral vision across the immediate computing environment. Workspaces might typically be mutually exclusive and may intend to represent or comprise the resources and configuration for an entire end-to-end work activity or process. Thus, a workspace may be considered to be a container that includes instructions for sourcing, configuring and arranging a desktop, an one or more virtual panels, one or more tasks, and the resources contained therein, as well as configurations of system settings or system facts (two terms that are used interchangeably throughout this disclosure to denote settings native to the client-side operating system). Further data may include session information or audit trails.

Workspaces may be represented as encoded and/or serialized metadata. Thus, workspaces may be pre-defined, user defined, or retrieved from local storage or a remote server. Workspaces may also be modified and saved to local storage or a remote server. Launching or switching to a new workspace may clear from view the content contained within the previous workspace and present the user with the new workspace. Similarly, launching or switching a subset of a workspace (such as a desktop view or a panel arrangement view) may clear from the workspace all content contained within the previous desktop view or panel arrangement view, respectively.

Resources might be intentionally arranged within a workspace and possibly in tiled layouts, provided screen space allows. Traditionally, tiled window layouts have been common in industries where worker response time is critical or where information changes frequently or in real time (e.g., in financial markets, live production, IT operations/network monitoring, and software development). That said, in today's information landscape, tiled window layouts can be particularly useful for modern day knowledge workers, students, independent owners, or anyone tasked with managing an ever-growing number of digital resources. A key benefit provided by tiled layouts is that they enable users to leverage their visual spatial processing in order to more quickly and easily locate the resources and information they need for the task at hand. The aforementioned research has shown that when recalling verbal information from memory, people look at spatial locations that have been associated with visual stimuli present during the encoding process. Workspaces enable users to leverage their visual spatial processing by providing the user with a means to position a given resource or type of resource within a certain location in the peripheral view. Users may then associate that particular location with a given resource or even a type of resource, thereby enabling the user to quickly and effortlessly pinpoint and access the resource. Resources or types of resources common to more than one workspace may be intentionally placed in the same location in each saved workspace, or they may be intentionally placed in different locations, to enable the user to more quickly contextualize the encompassing activity the workspace represents, by identifying the unique position of the common resource.

Figure 4A:
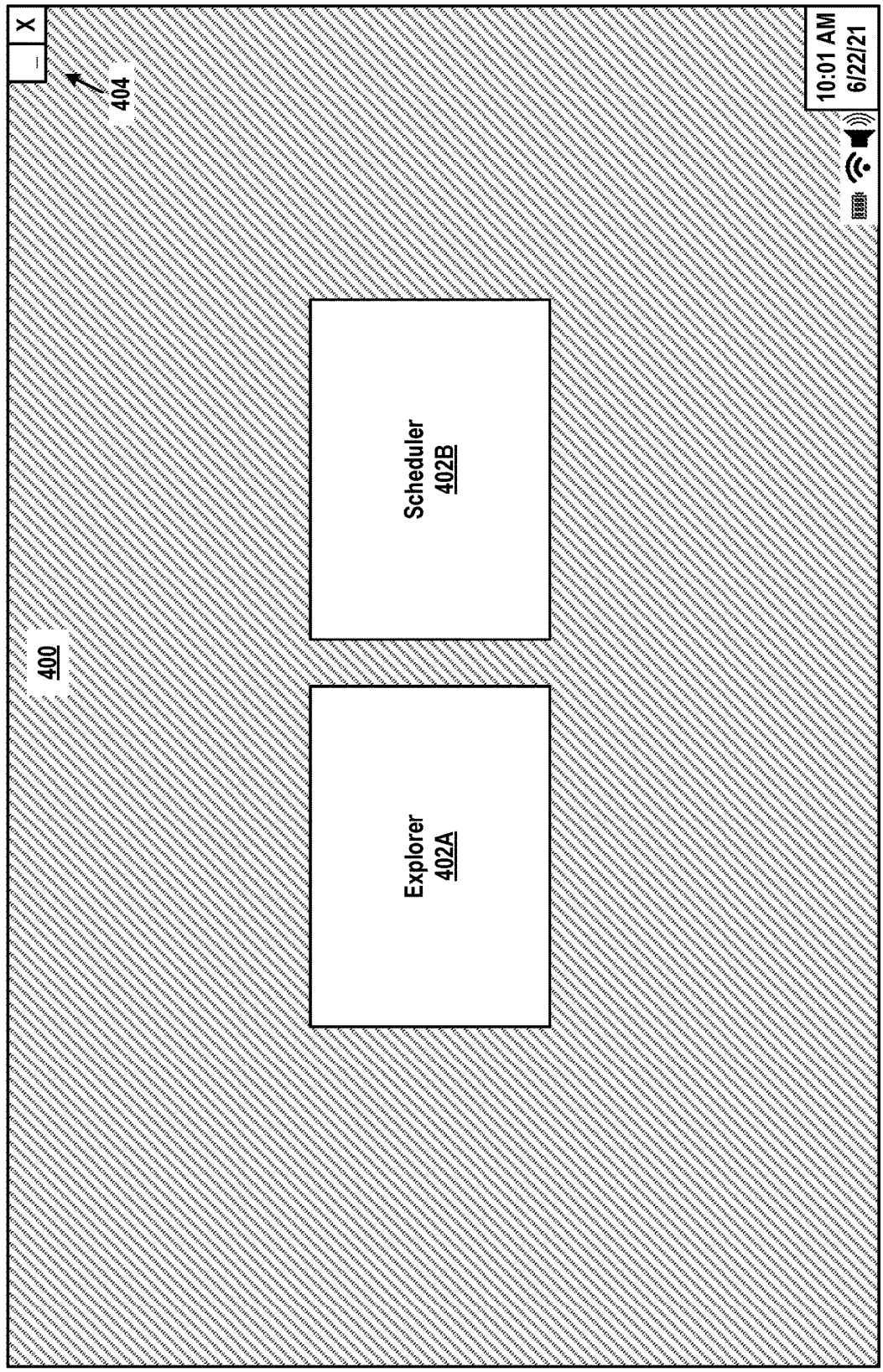
FIG. 4A depicts a home screen of the TAP-centric GUI, in accordance with example embodiments.

To launch a workspace, a home screen may be displayed atop the user's screen. FIG. 4A depicts such a home screen 400 that includes one or more application launchers (e.g., launcher 402A for an Explorer application that might be used to access workspaces, tasks, preset panel arrangements, or settings, and launcher 402B for a Scheduler application that might be used to schedule the generation of workspaces based on pre-defined events). The home screen may also include one or more "title bar" controls 404 to minimize the home screen to the workspace tray. The home screen may also include one or more system controls 406, such as a battery indicator, a networking control, an audio control, and system time and date. Other controls may be possible, and any controls may appear in different locations of home screen 400.

Figure 4B:
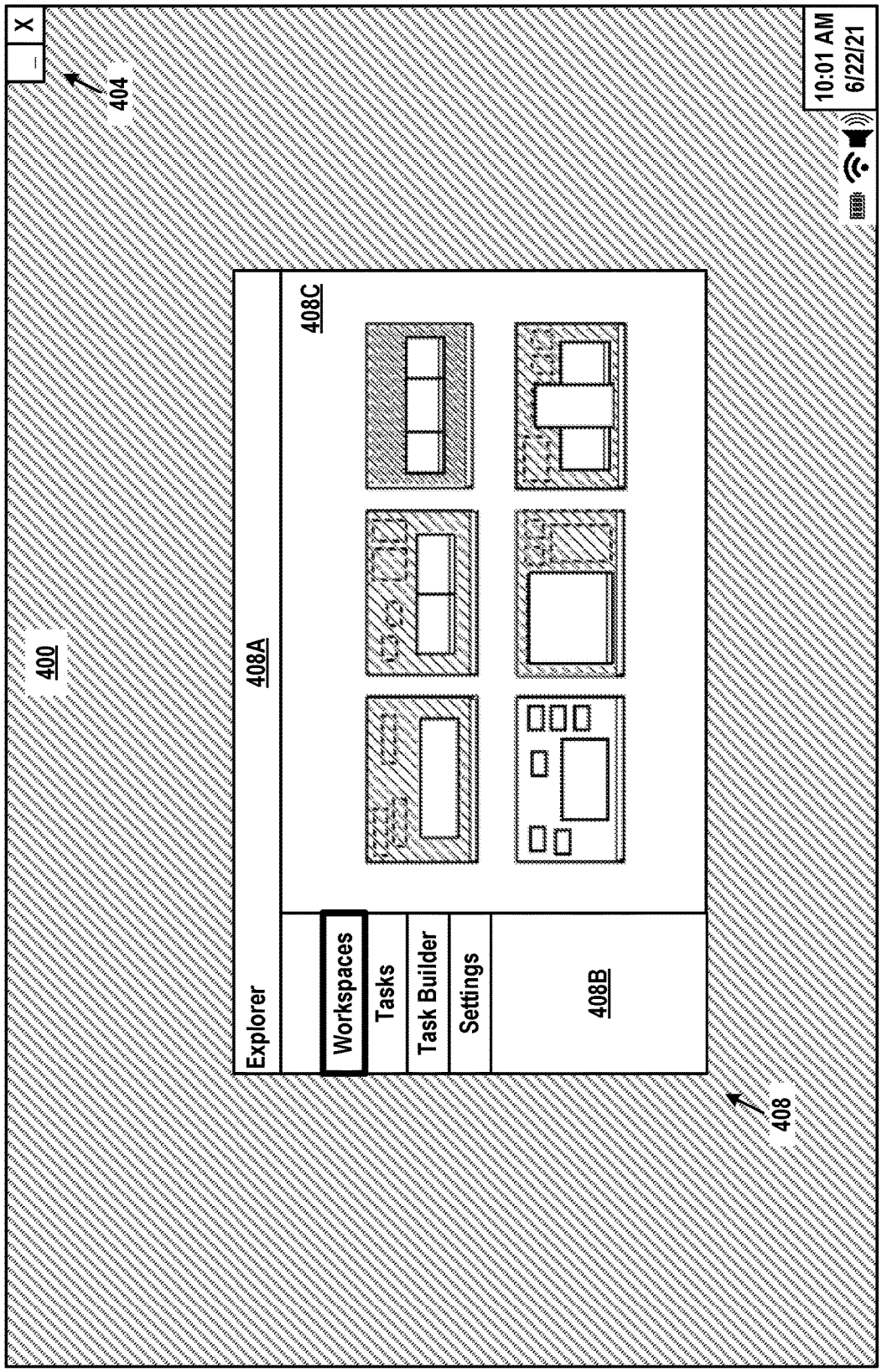
FIG. 4B depicts an explorer window showing preview images of workspaces for browsing and selection purposes, in accordance with example embodiments.

Actuation of Explorer 402A may cause the Explorer application to be launched or displayed, as shown in FIG. 4B. Particularly, Explorer window 408 includes title section 408A, menu section 408B, and display section 408C. In FIG. 4B, the "Workspaces" option of menu section 408B is selected, causing various thumbnail images of workspaces to be shown in display section 408C. Selection of one of these thumbnail images may clear the active workspace and launch the workspace represented by the selected thumbnail image.

Figure 4C:
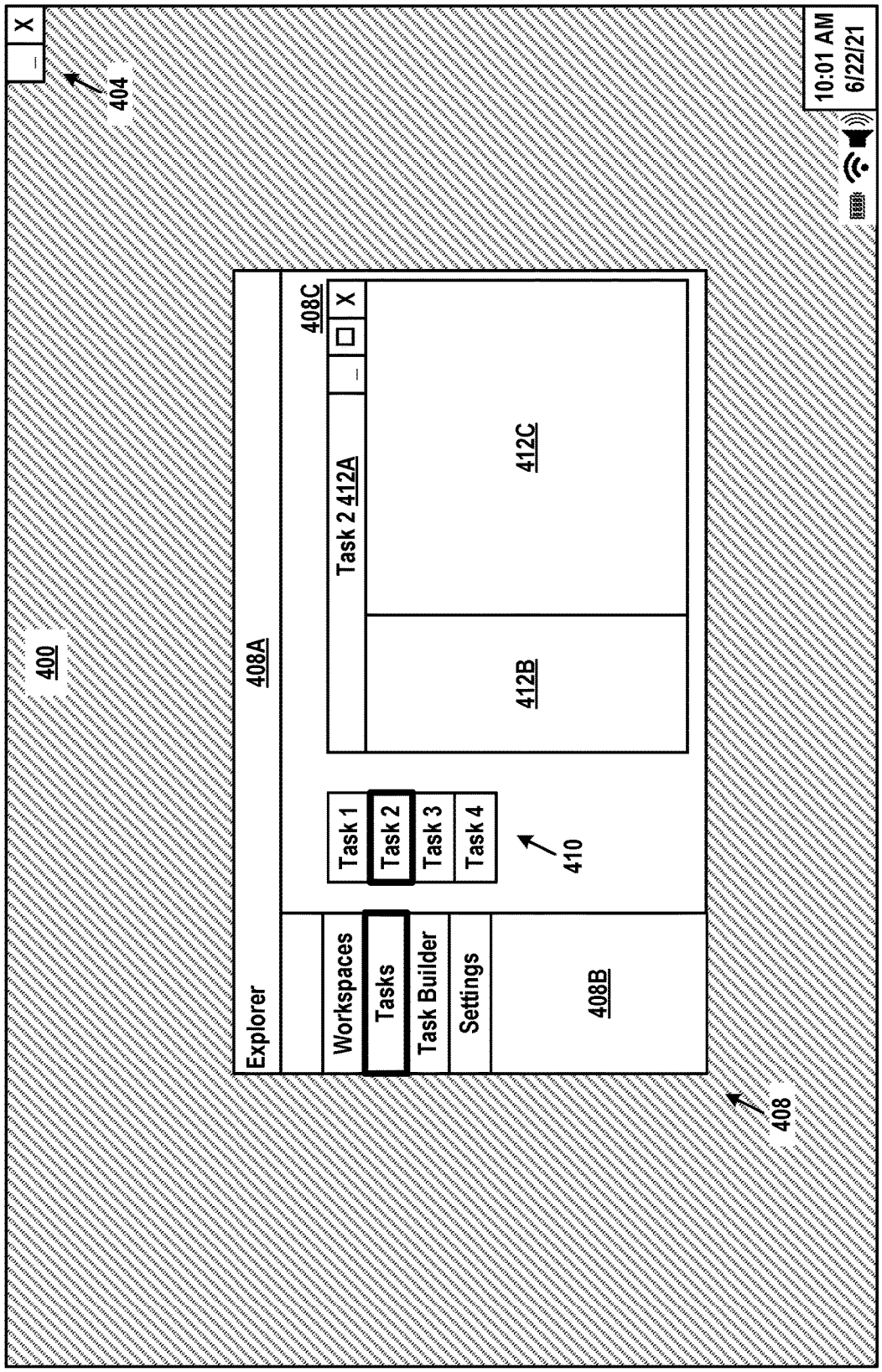
FIG. 4C depicts an explorer window showing preview images of tasks for browsing and selection purposes, in accordance with example embodiments.

In FIG. 4C, the "Tasks" option of menu section 408B is selected, causing task menu 410 to be displayed. Selection of a task from task menu 410 may cause the active workspace to be blurred and the representation of the resources making up the selected task to be displayed atop the blurred workspace. As an example, FIG. 4C depicts Task 2 as selected from task menu 410. Task 2 takes the form of a title bar 412A spanning all resources of the task, as well as representations of resources 412B and 412C. These resources may be windows and/or applications (described in more detail below). Task menu 410 may be searchable.

Menu section 408B also includes "Task Builder" and "Settings" options. Selection of the former may guide the user through a process to configure a new task or to modify the configuration of an existing task. Selection of the latter may surface certain operating system settings that may be particularly relevant for the user.

Not shown in FIG. 4B or 4C is a further control that may allow navigation back to the home screen. This control may take the form of an actuatable button or back-arrow for example.

By intentionally configuring and arranging a collection of resources and capturing the state and arrangement of the resources in the form of a workspace configuration, the user may revert to that exact workspace configuration on-demand, whenever that unique collection and arrangement of resources is needed. This might relieve the user of a tremendous amount of operational overhead and of the cognitive load that would otherwise be incurred from carrying out this process manually. Beginning a task or work activity might be as simple as mentally recalling a single descriptor for the associated task, rather than mentally recalling each individual resource needed for the task, its size, and position in view, and its configuration specific to the task.

Benefits to the user might include boosts in productivity from the reduction of context switching, an ability to multitask more effectively, and the ability to more quickly achieve deep focus and remain in it for a more extended period of time—not to mention the mitigation of information overload. Due to the ease and low cost of recalling resources and information, users might create as many (or as few) workspace configurations as needed to serve their work, school, or leisure activities. Some users may opt to create numerous context-rich workspaces to be used for relatively smaller pieces of work, switching between them frequently throughout the workday, while others may switch between just two or three workspaces representing typical morning, afternoon, or evening work sessions.

For organizational leadership, or for those directly responsible for managing, directing, or overseeing the work, attention, or general computing experience of others, workspaces might enable the centralized configuration and arrangement of resources commonly used or common to certain activities or tasks. This in turn might enable greater control and uniformity of work processes and of the ways in which workers interact with resources during human touchpoints of processes spanning across organizational functions or involving multiple team members. For example, users might be called to action at specific times or when some task is ready for their attention.

Organizational management might choose to locate certain types of resources (e.g., email applications, chat applications, note-taking applications, documents/document types, etc.) in particular locations within the user's display (e.g., centrally, right side/left side, upper left/right corner, in panels, centered along the bottom of the display, etc.), so that user experiences during certain activities, or while carrying out certain common tasks, can be standardized across the organization. Applying virtual panels and the defocusing elements of a workspace might further direct a user's spatial attention to specific resources or subject matter, or might call the user to focus on a specific resource at a particular point in time during these activities or tasks.

Arranging resources for a user or directing a user's attention in this manner is more difficult to achieve and less effective in an application-centric construct, where resources might be centrally permissioned or provisioned but where their configuration and arrangement is left to the user's discretion. In these environments, the user's attentive focus is likely to be constricted or interrupted by operational constraints or frequent context switching. With workspaces, organizational leadership might more effectively propagate best practices for various tasks, and those tasks might subsequently be executed in much better accordance with organizational best practices, leading to greater efficiency. As workers within the organization access and use like workspaces for work relating to specific activities tasks, they might begin to adopt the same work process and speak the same language when communicating in the construct of a given activity or task.

Workspaces might contain a layer of specific GUI controls, widgets, and/or buttons capable of being docked to and/or flown out from an inside edge of the physical display, presented in a floating or transparent menu, or flown out from (or docked to) an outside edge of a virtual panel. These workspace controls might provide the user with easy access to a workspace's most commonly accessed functions, such as saving or overwriting the active workspace, launching a new workspace or task, navigating backward and forward between workspaces, or defocusing the background view within a workspace.

Desktop operating systems typically display a menu bar (otherwise known as a task bar or dock) that spans across the bottom or top inside edge of the user's primary display and is meant to serve as a navigation point from which to launch applications. Traditionally, this menu bar holds some or all of the user's minimized resources. In workspaces, the construct of the menu bar might be referred to as the "workspace tray", because it might span across the entire width or height of the workspace, and because it might hold only those resources that are not contained in the workspace's virtual panel(s), whereas those windows contained in virtual panels may be held in secondary menu bars, referred to as "panel trays". Panel trays may further contain widgets, program buttons (pinned or not), and/or program icons (pinned or not).

Workspaces, views, tasks, or even modules or sets of them may be constructed by organizational leadership, or more generally, by industry thought leaders, and distributed to team members or followers, respectively (note that in some of the cross-referenced provisional applications, the term module was used as a descriptor for an entirely different concept—here, "modules" or "sets" refer to intentionally constructed sets of workspaces, virtual panel arrangements, desktop views or tasks).

The described systems may provide the user with a utility that employs artificial intelligence or machine learning to construct workspaces, views, tasks, or sets of them on behalf of the user. The smart workspace builder may create workspaces, views, or tasks that are particularly relevant to (or useful to) workers in particular industries, particular functions, or particular roles, by employing one of the following methods. Other methods may be possible.

The first method may involve an artificially intelligent solution employing machine learning. Algorithms may be trained on collections or samples of workspace configurations across an organization, across followers, across communities, or more broadly across the system's user base.

Similar to the above method, artificially intelligent method might be trained on a machine learning algorithm trained on a dataset derived from a particular input to the computer (e.g., generated commands from peripheral devices like mice, keyboards, or remote controllers), that user's particular use of a particular common application, or more broadly, on that user's navigation and flow through the system or through workspaces or tasks. This method may provide a comprehensive view of a user's various workflows, ways of working with resources, and transitions between uses of resources, throughout a given task, activity, or process.

B. Virtual Panels and Desktops

Arrangements of virtual panels may appear along with a desktop as a cutout section of a workspace. The virtual panels may be sized and arranged for user productivity and focus, typically in a non-overlapping fashion. The desktop represents the area of the workspace surrounding the virtual panel(s).

Each virtual panel might contain zero or one or more windows (displayed as minimized or shown) as well as an optional panel tray that might be used to minimize or select a window for display within the virtual panel. Each virtual panel in a virtual panel arrangement may also be resized independently of the others and may have an independent zoom setting from the neighboring virtual panels or from the area surrounding the virtual panel arrangement.

The definition of the desktop may include specification of one or more windows displayed thereon, which may take the form of full-sized windows, static thumbnails (small, fixed images serving as shortcuts and respectively representing windows), or live thumbnails (small dynamically updated images representing windows). Other displayable resources include a background image/wallpaper, program icons, and a workspace tray that may be used to minimize or select a window for display within the desktop, or alternatively, a task for display atop the workspace. Desktop configurations may also include zoom and audio settings to be applied across all resources held in the desktop region, a background audio track, as well as indications of whether the desktop is subject to dimming, blurring, shading, or other types of defocusing.

With separate audio settings, the desktop may play audio content from resources held within the desktop at a particular volume, and a virtual panel arrangement may play audio content from any of its hosted resources at another volume. In addition to playing audio simultaneously in the two regions, switching (fading) the audio from desktop to virtual panels and vice versa may be supported. Further, visual and audio notifications may be configured differently for these two regions.

Minimizing a window within a virtual panel may hide the window within the panel and represent it in the form of a button displayed in the panel tray. Actuation of that panel tray button may maximize the window to fill the panel area again. Maximizing a window docked to a virtual panel (either by actuating the window's title bar or by way of the maximize button in the window's upper-right corner) may expand the window to consume the full screen of the physical display as it does across generally available operating systems.

Selecting an application window on the application launch event and snapping the window to a virtual panel, as well as dynamically sizing windows to virtual panels as the user drags a window over/around a workspace may involve the following steps: (i) adding an operating system hook to capture top-level window creation events, and (ii) selecting an appropriate display mode when the hook fires. The said display mode may be determined as follows: (i) determining if the window overlaps a virtual panel, then docking it there or (ii) otherwise docking it on the desktop view, and (iii) determining if the window overlaps multiple virtual panels, then docking it to a designated primary virtual panel, or elsewhere (e.g., the on the desktop view or on a particular task.

Figure 5A:
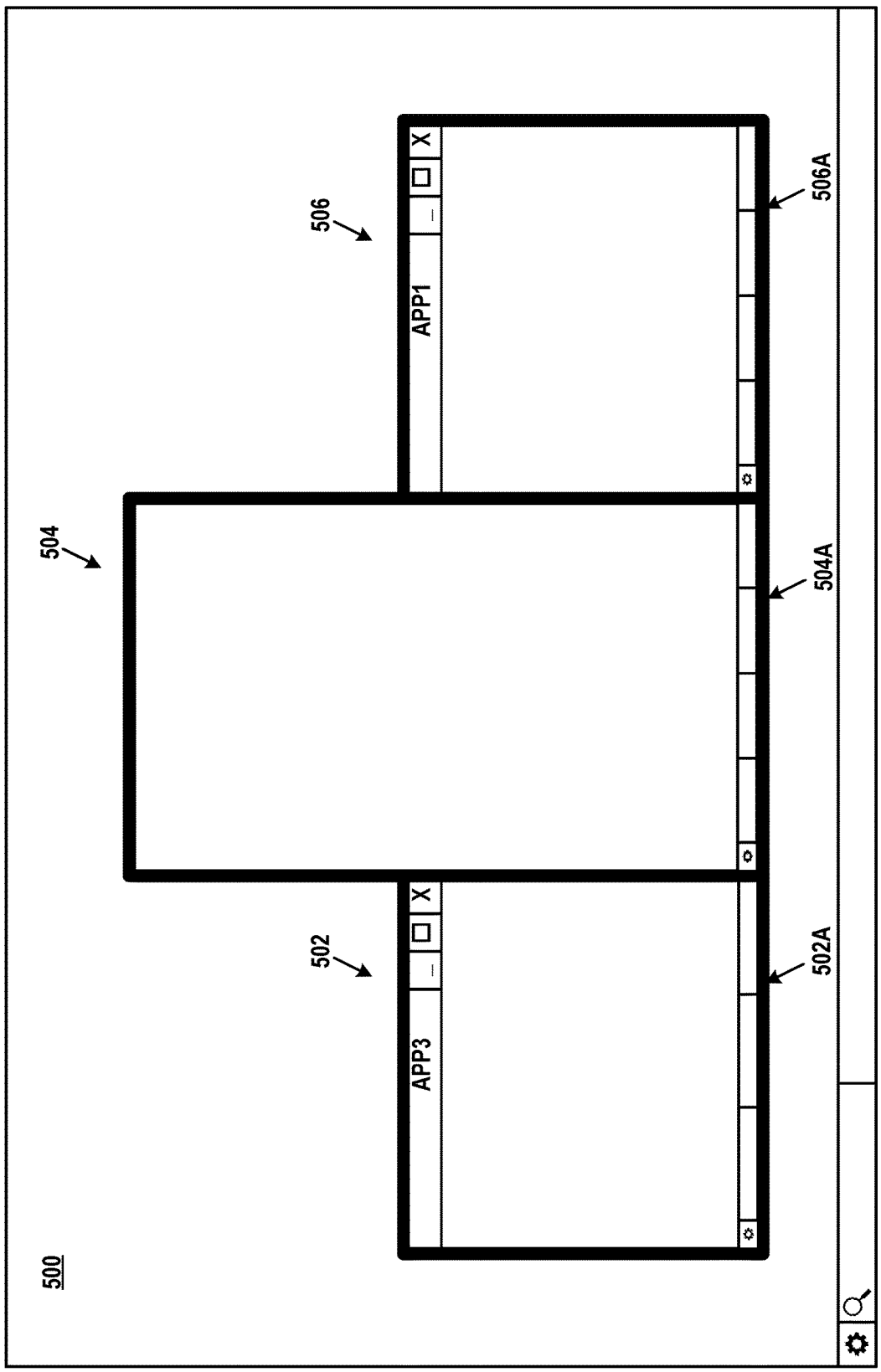
FIG. 5A depicts a virtual panel arrangement of a TAP-centric GUI, in accordance with example embodiments.

FIG. 5A depicts an example virtual panel and desktop arrangement. This is just one possible arrangement. Other arrangements may be possible (see below).

Desktop 500 does not contain any visible resources aside from workspace tray 500A. Desktop 500 may be configurable to display a background image, for example. Desktop 500 may also contain thumbnail image shortcuts and program icons, as well as other types of widgets. Workspace tray 500A may include various program or task icons or controls, such as the configuration (gear) and search (magnifying glass) controls shown. Other possible controls may be related to power management, wireless networking, audio, and so on.

Virtual panels 502, 504, and 506 are arranged so that the central virtual panel (virtual panel 504) is larger than the left or right virtual panels (virtual panel 502 and virtual panel 506, respectively). Each virtual panel is depicted with thick lines to represent the edges of the virtual panel and to differentiate between these edges and the edges of windows appearing within the virtual panels.

Each virtual panel may contain a panel tray and zero or more resources. Typically, these resources are windows that are sized to fill the entire virtual panel. For example, virtual panel 502 contains three windows and panel tray 502A, with one of the windows (app3) displayed. Virtual panel 504 contains four windows and panel tray 504A, with none of the windows displayed. Virtual panel 506 contains four windows and panel tray 506A, with one of the windows (app1) displayed.

Windows displayed in a virtual panel may be minimized, shown, or closed by way of icons on their respective title bars or by way of their representative buttons held in the panel tray. The displayed window may be swapped with another window by selecting the replacement window's representation in the panel tray. As an operational example, one of the window resources of virtual panel 504 may be shown or minimized within this panel by clicking on that window's representation in panel tray 504A.

Figure 5B:
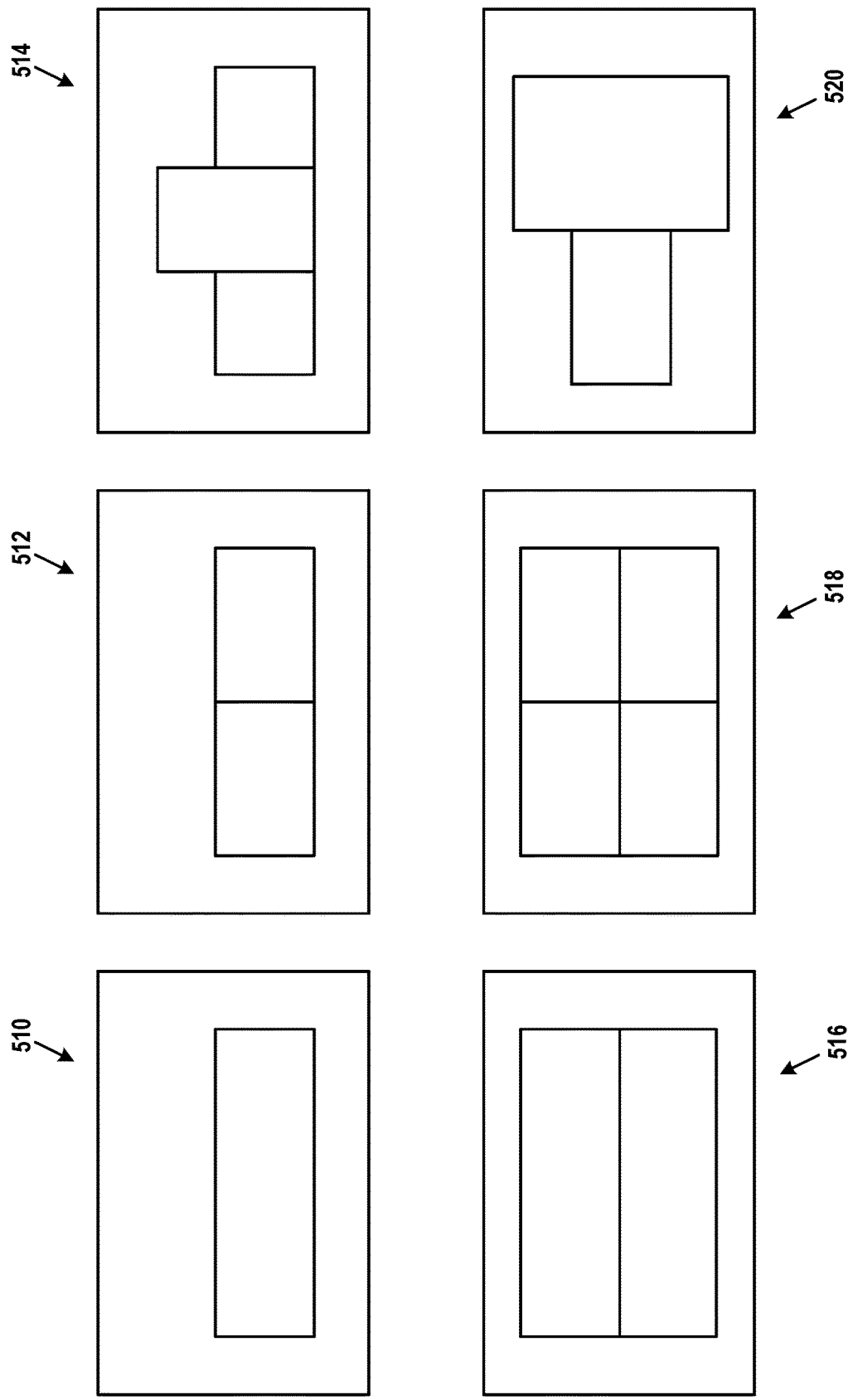
FIG. 5B depicts alternative arrangements of virtual panels, in accordance with example embodiments.

FIG. 5B depicts alternative virtual panel arrangements that may be selectable as presets. These include arrangement 510 (one wide virtual panel), arrangement 512 (two side-by-side virtual panels), arrangement 514 (the three virtual panels of FIG. 5A), arrangement 516 (two stacked wide virtual panels), arrangement 518 (four virtual panels organized in a square), and arrangement 520 (two side-by-side virtual panels of different sizes). Other possibilities exist. As noted, the user might manually resize virtual panels, add virtual panels to a workspace, and remove virtual panels from a workspace. Also, as depicted in FIG. 4B, virtual panel arrangements may be selected from a visual menu of an Explorer application.

Turning back to FIG. 5A, users may move a window between any two virtual panels by dragging and dropping the window from one virtual panel to another. In a similar fashion, users may move a window from a virtual panel to the desktop of the workspace. In some configurations, the window may be automatically positioned in a location of the desktop that can fit the window, or the window may be automatically resized to fit into available space on the desktop.

In other configurations, a window dropped onto the desktop may be represented by a thumbnail version of the window. This thumbnail may be a static image of the window that does not change, or a live representation of the window that updates with changes to the information that the window displays.

Creating a thumbnail image on the event of dragging a window out of a panel (and subsequently converting that thumbnail image back to a live window and docking it to its previous virtual panel) may involve the following steps: (i) adding a mouse down/touch-down event handler to capture low-level mouse or touch input on a window's draggable region (e.g., its 'title bar' (ii) observing mouse/touch messages to detect the mouse-down or touch-start event, and possibly when the user starts dragging a window, and (iii) when a drag action starts: (a) capturing an image snapshot of the contents shown on the display device and cropping the image to the dragging window, (b) overriding operating system window drag behavior and following drop targets (e.g., if dropped on a virtual panel, docking it there, or if dropped onto the desktop view, creating a thumbnail image object on the desktop to represent the window), and (c) when the user invokes a thumbnail (e.g., by double clicking), restoring the original window to its last known virtual panel.

Figure 5C:
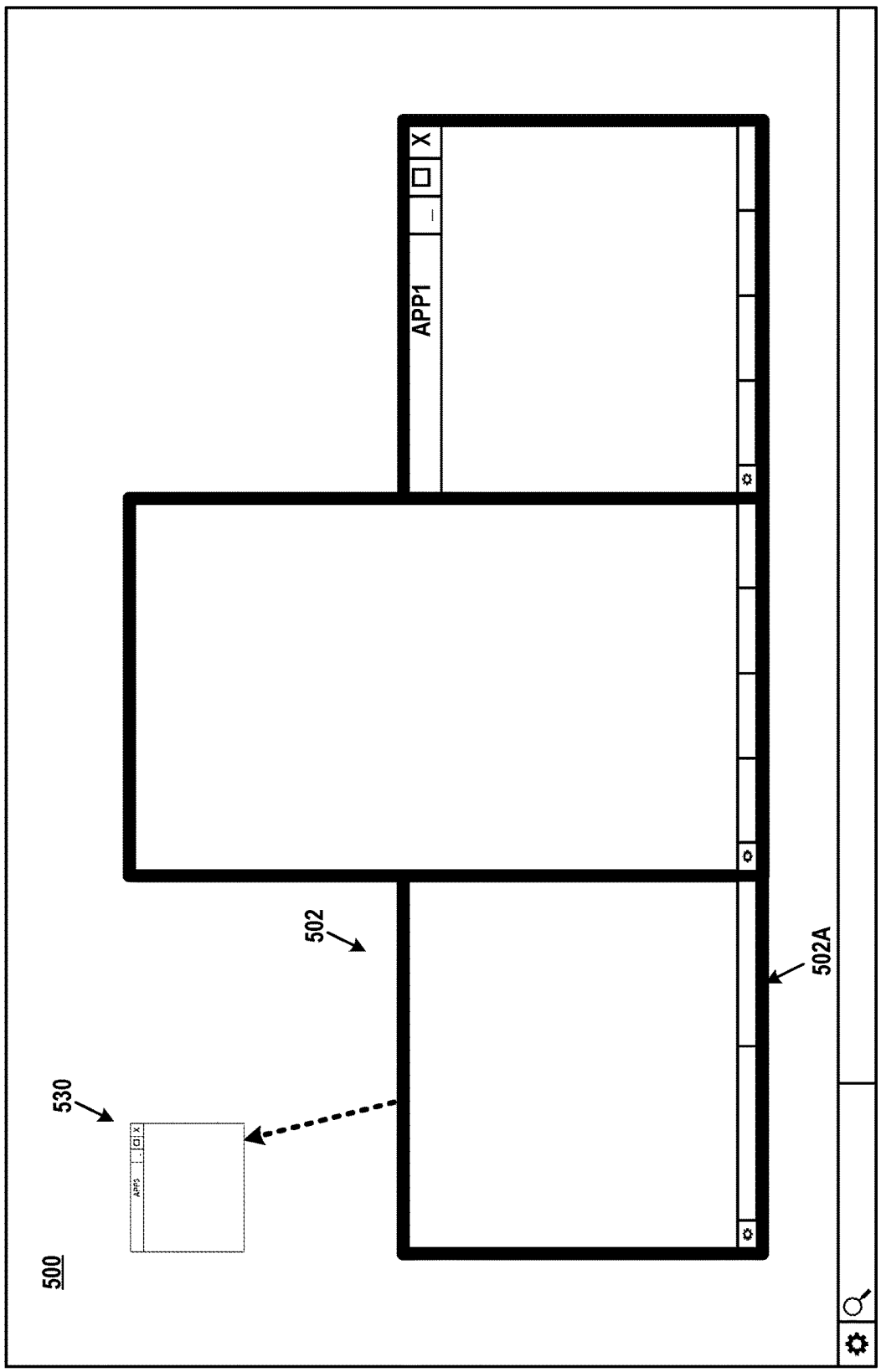
FIG. 5C depicts a resource being dragged from a virtual panel to a desktop, in accordance with example embodiments.

FIG. 5C depicts such a window 530 being dragged from virtual panel 502 to desktop 500 (as indicated by the dotted arrow). On desktop 500, window 530 is represented as a thumbnail—a shrunken version of window 530. Also, panel tray 502A updates to indicate the removal of window 530 from virtual panel 502. Conversely, if window 530 is dragged and dropped into virtual panel 502, it can be automatically transformed from a thumbnail to a full-sized and fully functional window in virtual panel 502, and panel tray 502A may be updated accordingly.

While represented as a thumbnail, window 530 may not support all standard windowing functions (e.g., the thumbnail may be an image of window 530). However, double-clicking or otherwise actuating the thumbnail could restore the thumbnail to a full-sized and fully functional window on desktop 500. Any number of resources can be represented on desktop 500 as static thumbnails, live thumbnails, or full windows.

Various configurations of a workspace may support stacked or stackless modes within a virtual panel. Stacked mode causes resources (e.g., windows) dragged from desktop 500 or another virtual panel to be added to the resources in the target virtual panel. Thus, stacked mode causes an actuatable representation of this resource to be added to the panel tray of the target virtual panel as well. To the contrary, stackless mode may limit virtual panels to accommodating only a single window, causing resources dragged from desktop 500 or another virtual panel to occupy the target virtual panel while relocating any displayed resource in the target virtual panel to desktop 500 or to the virtual panel the dropped window came from. Stacked mode may be configured to allow no more than a fixed number of resources per virtual panel (e.g., 1, 2, 3 . . . , etc.), and may operate similarly to stackless mode when this number of resources is exceeded (e.g., moving the oldest or least recently used resource to the desktop).

Figure 5D:
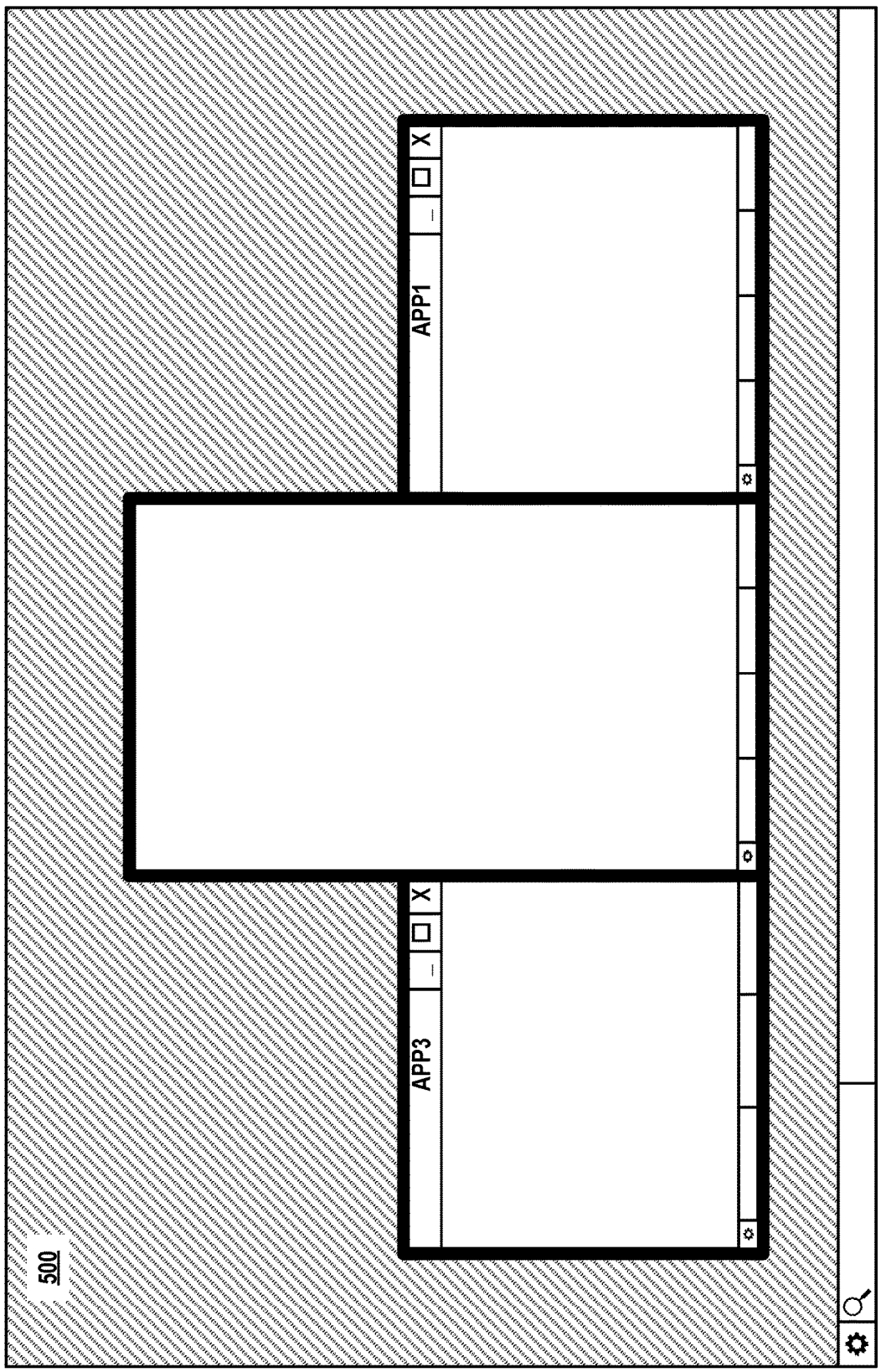
FIG. 5D depicts a desktop being dimmed, shaded, or blurred, in accordance with example embodiments.

Additionally, the user may turn on or off blurring, shading, and/or dimming of the desktop (i.e., the area of the workspace surrounding the virtual panel view). This is represented in FIG. 5D, with desktop 500 dimmed, shaded, or blurred to increase the user's focus on the content displayed on the virtual panels.

Figure 5E:
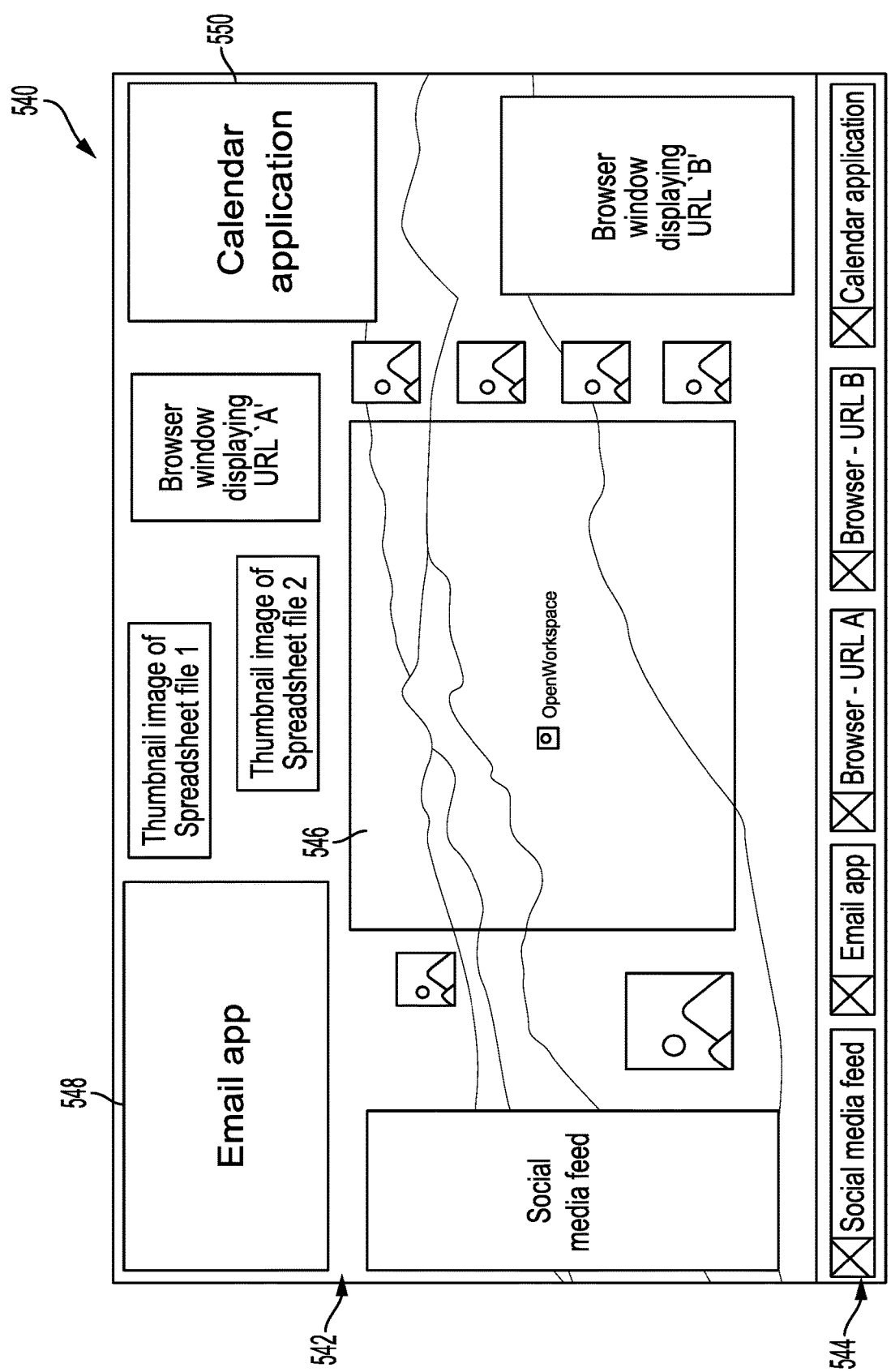
FIGS. 5E, 5F, 5G, and 5H depict stackless operation of a virtual panel, in accordance with example embodiments.

A mock-up of an operation performed with a stackless virtual panel is shown in FIGS. 5E, 5F, 5G, and 5H. FIG. 5E depicts workspace 540 containing dimmed desktop 542, workspace tray 544, and virtual panel 546. Workspace tray 544 contains representations of resources on desktop 542 aside from any contained by virtual panel 546. Virtual panel 546 is in stackless mode and is shown as empty in FIG. 5E. Workspace 542 also includes email application 548 and calendar application 550 among other resources.

Figure 5F:
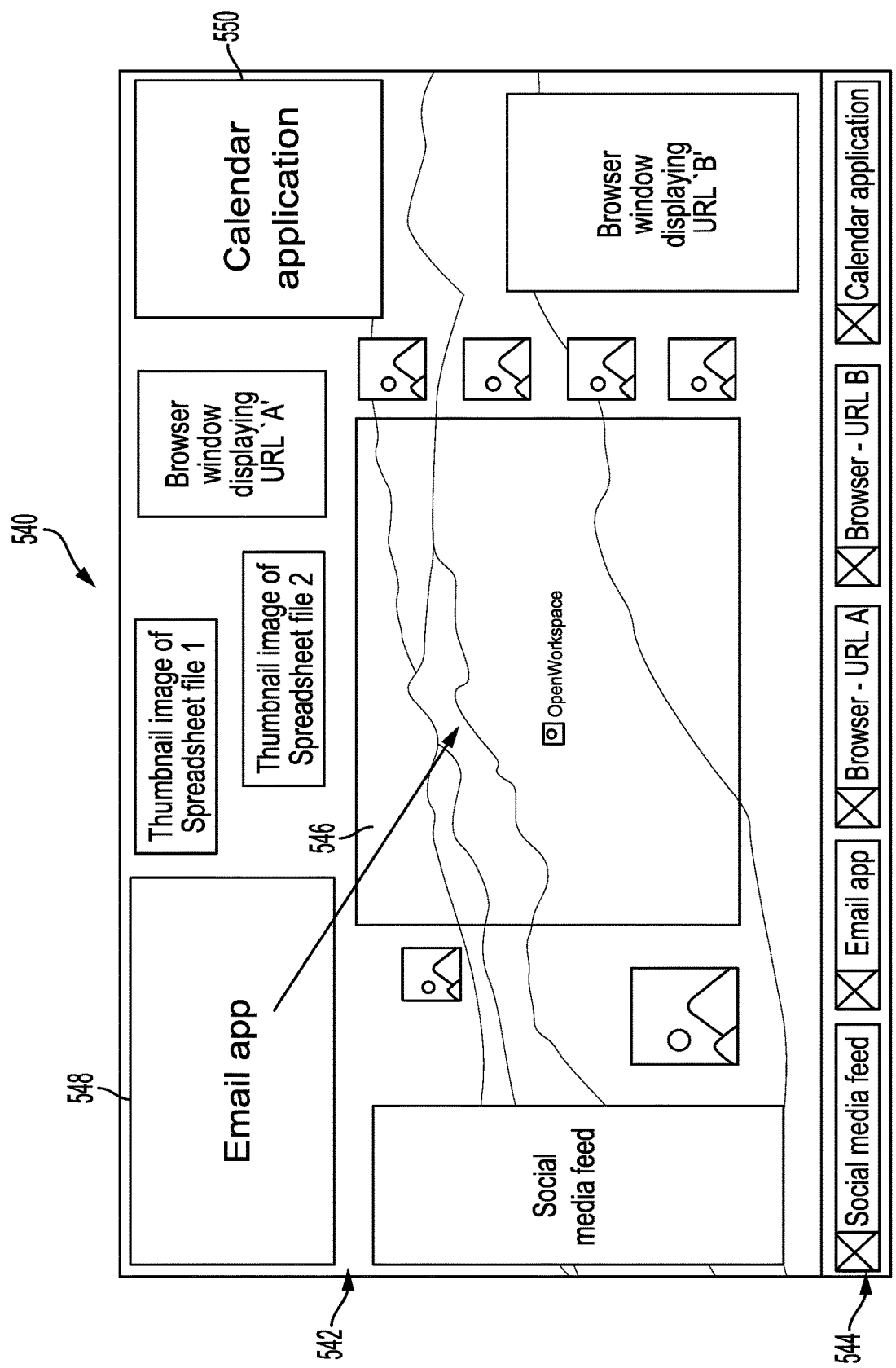
Figure 5G:
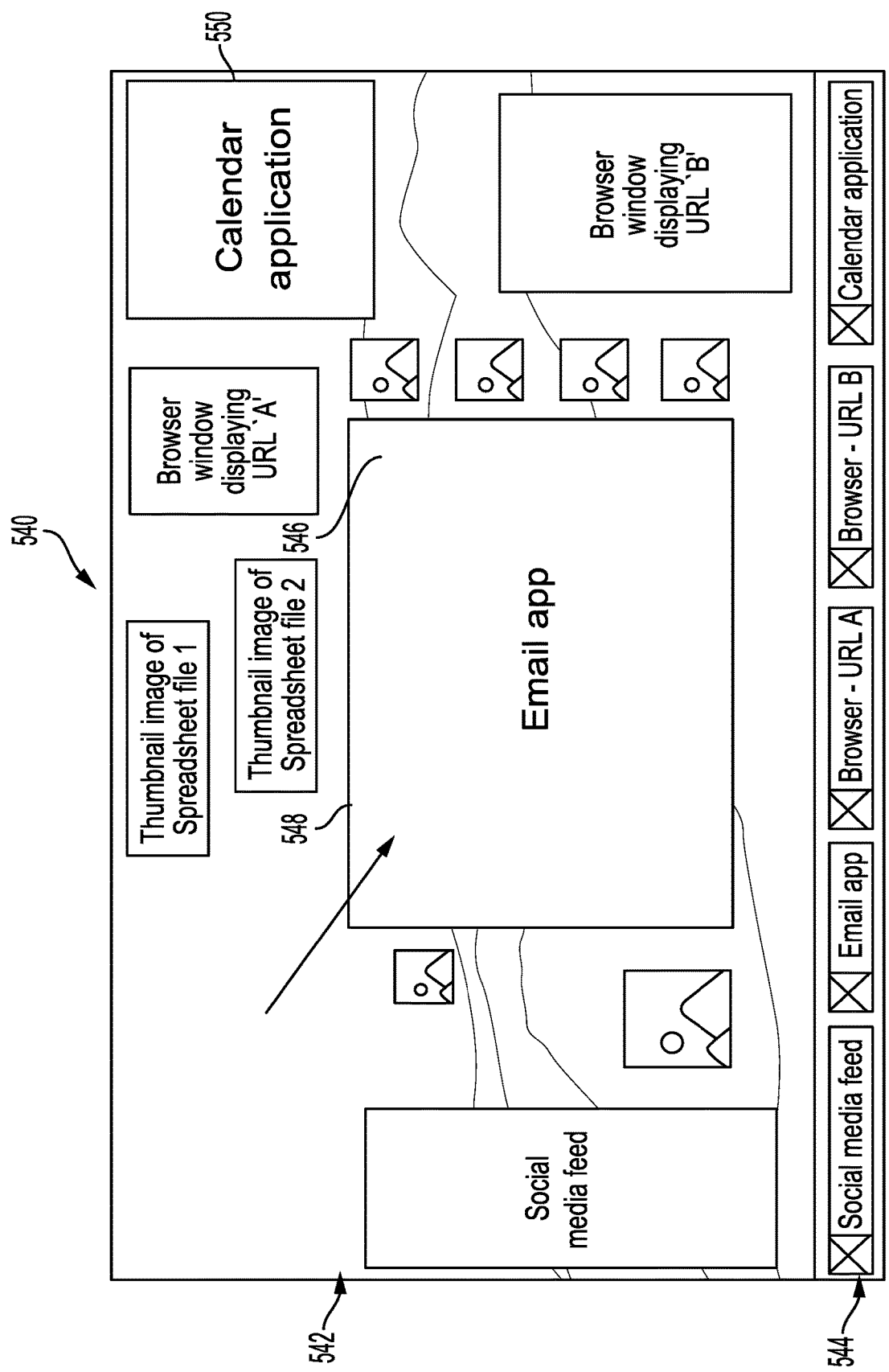
Figure 5H:
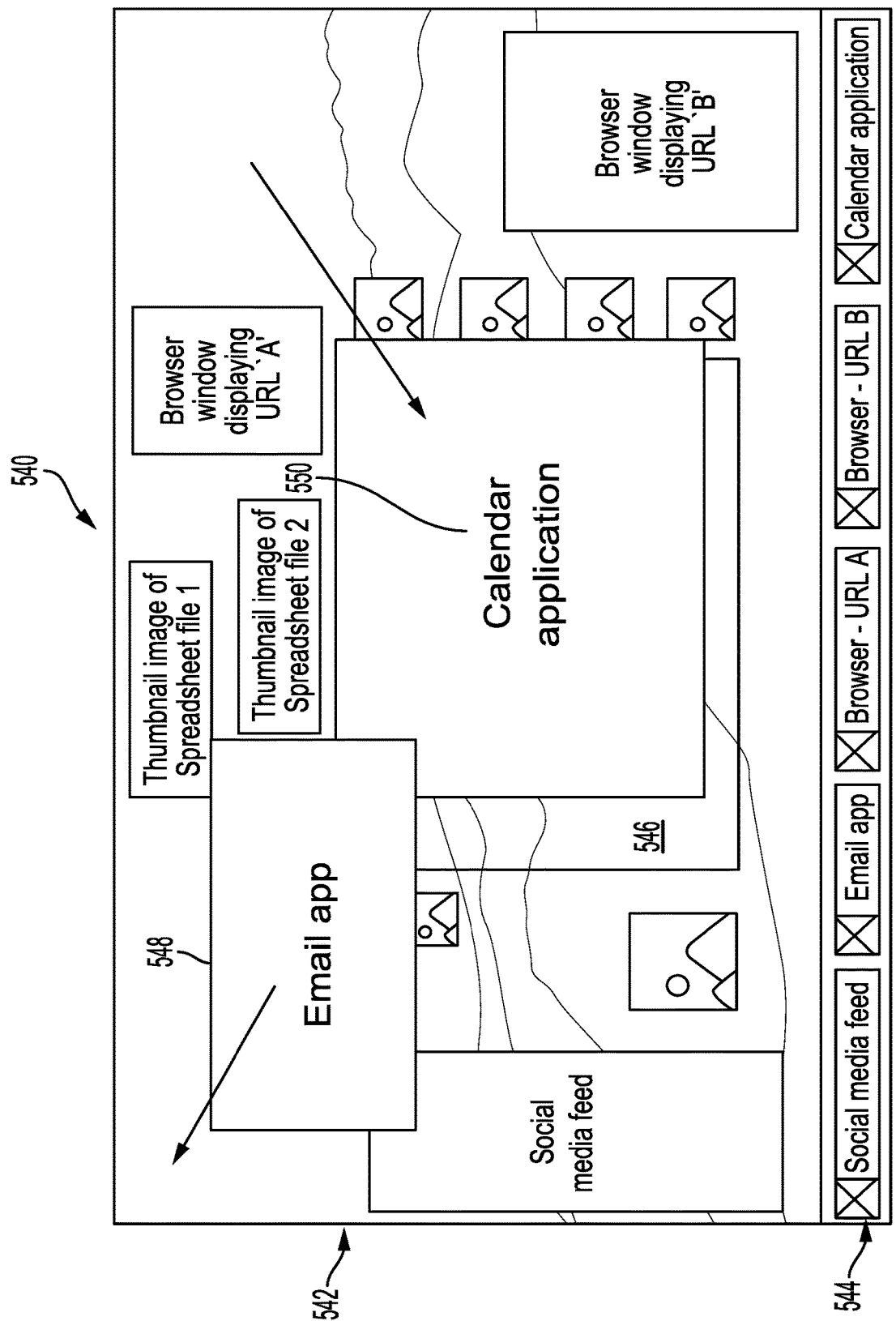

FIG. 5F depicts email application 548 being moved (e.g., dragged or swiped by the user) to virtual panel 546. FIG. 5G depicts email application 548 being placed in virtual panel 546 (e.g., optionally resized to the dimensions of virtual panel 546) and thus removed from desktop 542. Since virtual panel 546 is empty, there is nothing to remove from virtual panel 546. FIG. 5H depicts calendar application 550 being moved (e.g., dragged by the user) to virtual panel 546. Since virtual panel 546 contains email application 548, this causes email application 548 to be automatically moved to desktop 542 (e.g., back to its previous location and resized to its previous dimensions). As calendar application 550 is placed in virtual panel 546, calendar application 550 may be optionally resized to the dimensions of virtual panel 546.

Virtual panels, due to their containment of resources and the accompanying panel tray, can emulate physical monitors in that the system's native user commands (such as maximize and minimize) can be employed within the construct of the virtual panel. Virtual panels might be described as cutouts, or as superimposed on or added to workspaces. Virtual panels float within the user's larger physical display, wall on which the display is projected, or scene that the display is augmenting, inherently partitioning the total displayable area into two regions. The region within a virtual panel, inside the virtual panel's edges, is intended to host focal information or oft-used resources (e.g., application windows or files) that are visible when maximized within the virtual panel and hidden when minimized within the virtual panel. The desktop region surrounding all virtual panels, or outside the edges of the virtual panels, is intended to host resources contextual to the activity or secondary to those held within the virtual panels.

Virtual panels allow the user (or organizational management) to create (on behalf of the user) an organized, visual hierarchy for the resources displayed within a workspace. By laying out resources logically and intentionally within the workspace, a user can use virtual panels to visually separate out the resources within their workspace that should be a point of focal attention from the rest of the workspace content. Applying dimming or some other method of defocusing (e.g., blurring or shading) to the background view may further emphasize the distinction between the user's focal (virtual panel) view and contextual (background) view.

Dimming may be implemented by: (i) creating an operating system region object that covers the entire desktop, (ii) subtracting rectangles representing the virtual panels from the region, (iii) creating a window at the top of the z-order, (iv) selecting a region within the new window as a clipping boundary, and (v) assigning a color (e.g., black) and opacity value to the window.

Virtual panels and their arrangements representing the most common single monitor and multi-monitor configurations can be loaded into a workspace as presets. These presets can be accessed via workspace controls, menus accessible via workspace controls, or by user interaction with tactile (peripheral) controls (such as a programmable dial, keyboard, or mouse), or by user swipe interactions or gesturing. Any of the above may render a virtual panel preset menu or render a virtual panel directly. Users may add virtual panel configurations to the virtual panel preset menu when in a mode designated for workspace or panel view creation. Alternatively users may simply resize, rescale, or reposition a virtual panel within a given workspace and then override the prior virtual panel configuration within the saved workspace, or alternatively designate it as a virtual panel preset applicable to any workspace.

Virtual panels can exist independently of workspaces or can be contained as part of a workspace. As such, any virtual panel displayed as part of a workspace (along with any content docked to it or minimized within its tray), can be launched in conjunction with that workspace when the workspace is launched. Virtual panels can also be removed from workspaces.

As noted, virtual panel sound (e.g., the audio playing from any resource associated with a virtual panel) can be represented separately in the system's audio mix from desktop audio (e.g., audio playing from resources displayed in the desktop view or minimized in the workspace tray). As such, audio from virtual panels and their resources can be individually or collectively muted or set at different volumes than audio from resources held in the desktop view.

Various methods may dock or resize resources (e.g., windows, icons, or other representations of applications or data) to fit virtual panels such that these resources are automatically maximized in the bounds of the virtual panel. Methods for such docking/maximizing include: the user launching the resource by clicking on the resource's icon (if accessible from the panel tray), the user launching the resource by searching for it via the native operating system's search utility, the user dragging and dropping the resource into the virtual panel from the desktop area such that it overlaps the virtual panel's bounds to some extent. Additionally, programs may be launched into virtual panels in accordance with a workspace configuration or some predefined condition or event utilizing similar methods as utilized for generally docking windows to virtual panels, as described above.

A virtual panel arrangement, in general, allows emulation of features that greatly contributed to the widespread adoption of multi-monitor usage, within a single, bezel-less viewing area (such as snapping/resizing windows to fit the physical screen size, the ability to have a tray/taskbar/dock on each monitor and therefor hierarchize/group resources into more than a single grouping). There is further utility in having the ability to bring a given application up in a virtual panel that's been intentionally sized for that specific application or view. To cite just a few examples, tall, narrow virtual panel may be designated for messaging applications or social media applications and their characteristically vertical feeds, or a wide rectangular virtual panel in landscape position may be designated for working with spreadsheet applications, or a large, square-shaped virtual panel may be designated for working with a flowcharting or diagramming tool, or two 8.5×11-shaped rectangles arranged side by side in portrait mode may be used for reviewing documents).

Further, one of the challenges with high-resolution monitors (e.g., 4K) is that some applications displayed by such a monitor may appear very small, and as described in more detail above, modern desktops contain only a single zoom setting (to apply to the age-old construct of the desktop). As such, when tiling multiple windows out on the desktop, it's not possible to zoom in on a particular region of the display containing a subset of the total body of windows within view, however certain use cases may greatly benefit from this missing feature (e.g., one in which a user is evaluating and focusing in on numerous creative designs). The system described herein may allow an independent zoom percent to be set for a particular virtual panel, virtual panel arrangement, or for a particular desktop view. This might enable users to uniformly set text sizes displayed across virtual panels within certain workspaces, or even to distinguish between zoom percent within the virtual panel arrangements itself, by setting a central virtual panel at a different zoom percent than its flanking virtual panels. These zoom percent configurations may be preserved and quickly restored by way of workspace configurations.

Where the user's display size or resolution is limited, thumbnail image shortcuts provide the user with a means to quickly identify and access resources much in the same way as a traditional tiled window layout spread across a large display area, reserving the 4K resolution's (dpi) outside of the virtual panels while zooming in on windows held in virtual. As mentioned above, due to the one-dimensionality of the age-old desktop construct currently in place across desktop operating systems, the zoom percent setting is not easily accessible as it's set infrequently (mostly by the system upon a new display being connected, and sometimes by the user).

Figure 5I:
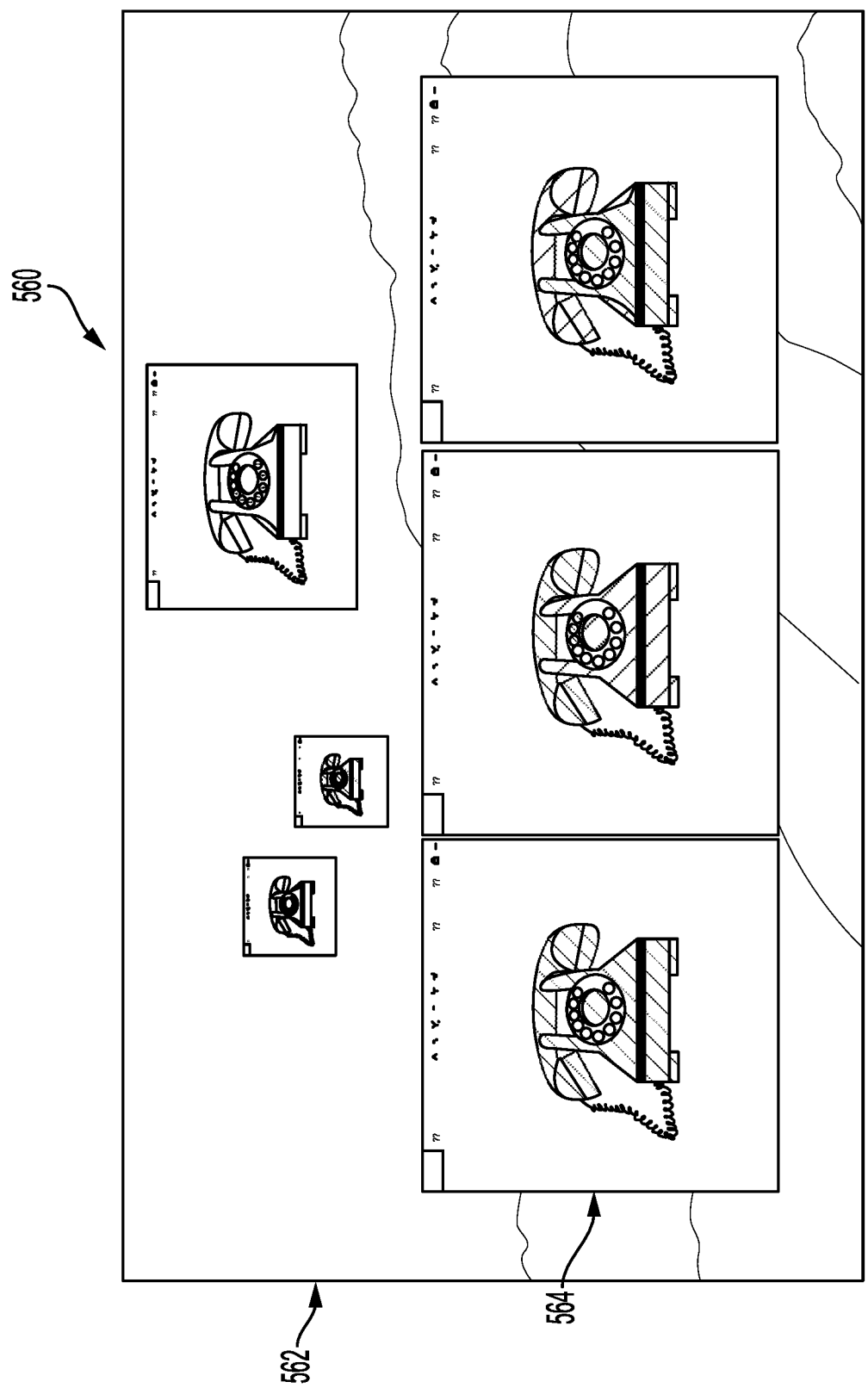
FIGS. 5I and 5J depict independent desktop and virtual panel zoom settings, in accordance with example embodiments.
Figure 5J:
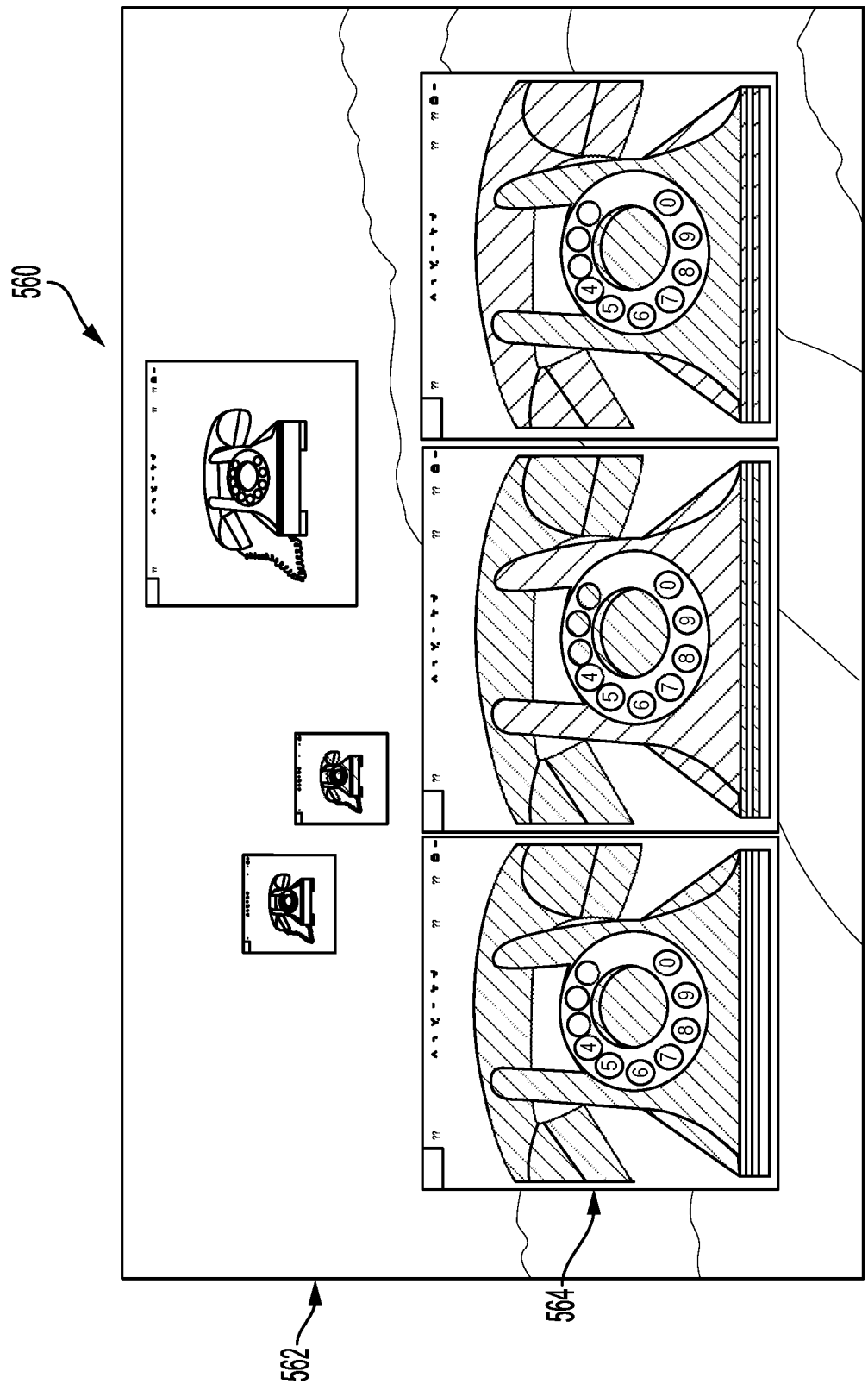

An example using different desktop and virtual panel zoom settings (the degree of zoom applied to the virtual panel, in percentage terms) is shown in FIGS. 5I and 5J. FIG. 5I depicts workspace 560 containing desktop 562 and virtual panels 564. Notably, the zoom percentage of both desktop 562 and virtual panels 564 are the same (i.e., 100%). FIG. 5J depicts zoom percentage of virtual panels 564 set to 285%, while the zoom percent of desktop 562 remains at 100%. As mentioned above, this ability to use different zoom settings in different parts of a workspace may be used for more closely examining the resources contained in virtual panels 564.

C. Tasks

Tasks are sets of one or more grouped resources that can be dynamically invoked to appear on a task layer of a workspace GUI, atop the virtual panel arrangement and desktop. When a task is displayed, other aspects of the workspace, such as the virtual panel arrangement and desktop, may be blurred, dimmed, shaded, or otherwise defocused to emphasis the task.

The task layer may be brought into view automatically (based on some pre-defined event or condition) or manually, by selecting the task configurator or a running task from the workspace tray, a hotkey or hotkey combination, or by way of a menu, for example. Each task can be represented as a cluster of windows (e.g., one for each of the grouped applications), a single user-defined title bar, and a single set of task controls that may allow the task to be moved onto the desktop view or into a virtual panel. Independent task layer controls may be placed in various locations of the task layer.

A task can be minimized to an icon or other representation on the workspace tray. Such minimization can cause the task layer to be removed from view. Similarly, a minimized task may be launched from the workspace tray, causing the task layer to be placed atop the virtual panel arrangement and desktop. In some embodiments, tasks can also be minimized to the desktop as thumbnails.

Tasks may be named, preconfigured, saved, and loaded on demand. Thus, tasks may be invoked across sessions in a consistent and predictable fashion. As noted above, tasks may be invoked from the home screen (see FIG. 4C).

Figure 6A:
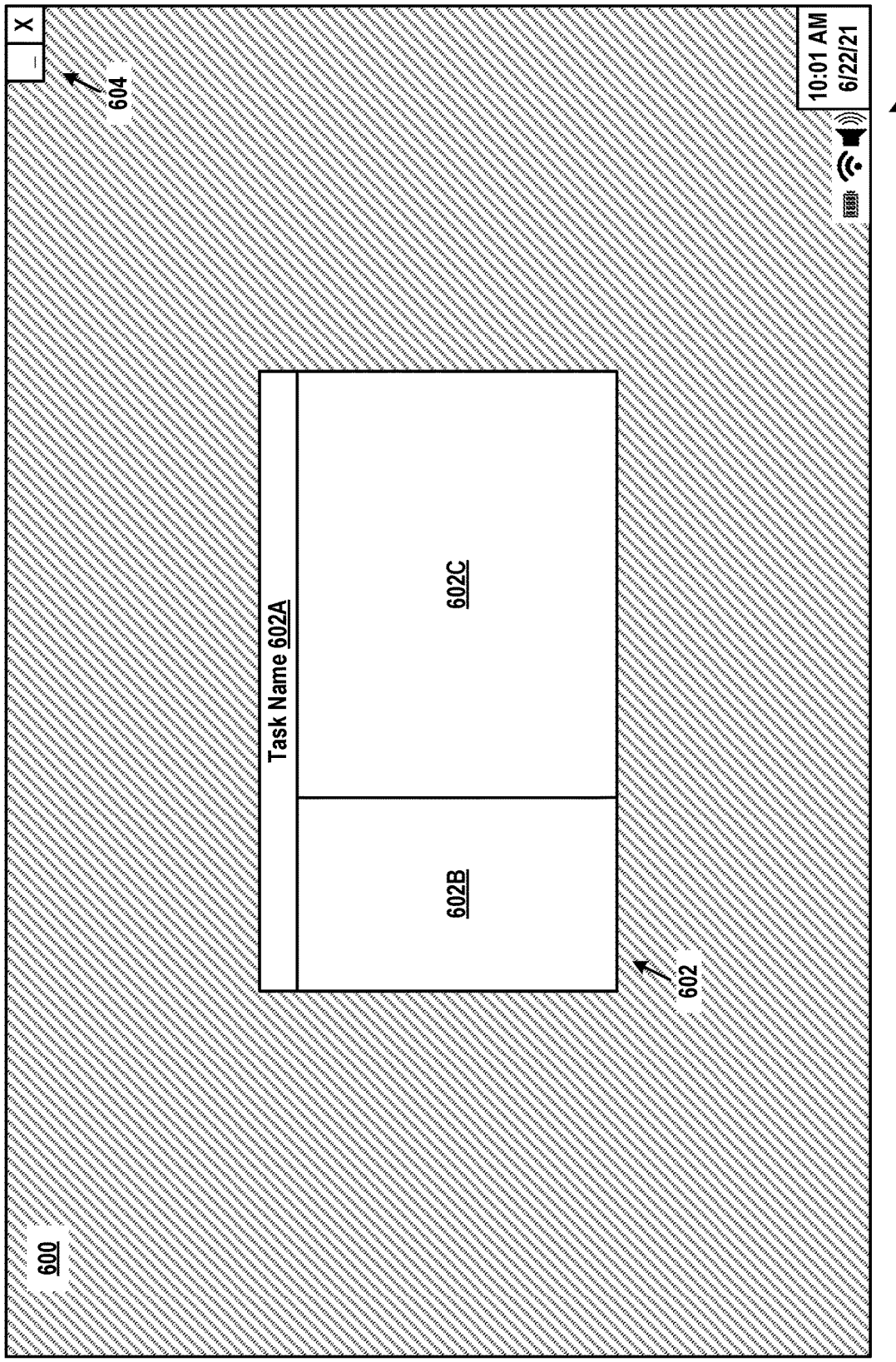
FIG. 6A depicts a task, in accordance with example embodiments.

As an example, FIG. 6A depicts task layer 600 displaying task 602. Task layer 600 causes blurring of the underlying workspace (e.g., one or more virtual panels and/or a desktop not shown). Task layer 600 also uses common title bar 602A for task 602 to combine windows 602B and 602C in a tiled fashion. In general, it is beneficial to be able to tile tasks in order to make the information in each window readily accessible, but tasks may also be able to stack or overlap windows in some manner (such as in a cascaded view).

Common title bar 602A may contain the task name and be of a distinct color. Each of windows 602B and 602C may contain a different application related to the activities, processes, or goal of task 602. For example, window 602B may contain a video conferencing application and window 602C may contain calendar application, among other possibilities.

Other task-related controls may be present on task layer 600. For instance, controls 604 may be actuated to minimize task layer 600 to the underlying workspace try or to close task layer 600, respectively. Task layer 600 may also include one or more system controls 606, such as a power control, a networking control, an audio control, and system time and date.

Other controls may be possible, and any controls may appear in different locations of task layer 600. For example, indicators may be shown around task 600 to specify the task's compatibility with a mobile device, its ability to be shown on a mobile device, or its ability to be controlled by a mobile device or wireless controller (for example, that which could show, hide, or minimize the task on the user's primary display). Alternatively, or additionally, controls 604 may be expanded to include (i) those that capture the current representation of the task 602 as a thumbnail image and place the thumbnail image onto the desktop area surrounding the virtual panel(s) in the workspace, (ii) those that dock application windows of task 602 into the workspace's virtual panel(s), (iii) those that indicate current task status, and/or those that clear task 602 from view, or put task 602 in a sleep mode.

Figure 6B:
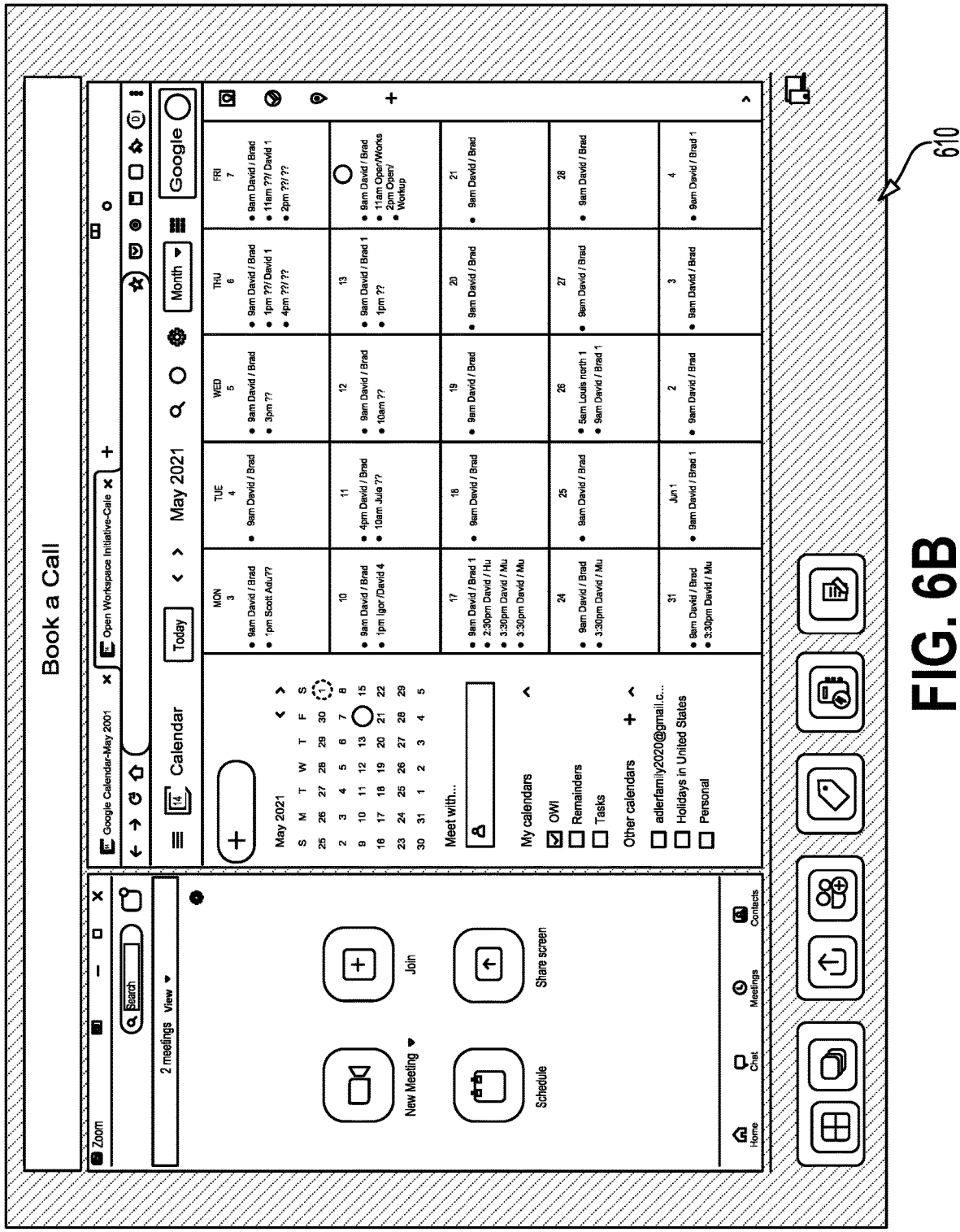
FIG. 6B depicts a specific task for videoconference scheduling, in accordance with example embodiments.

As a more specific example, FIG. 6B depicts task 610, consisting of a common title bar above two windows. The title bar describes the general purpose of the task, to book a call. The left window displays a video conferencing application, and the right window displays a web browser application with a tab open to a user's calendar. While both applications are shown in their typical sizes and aspect ratios, these applications could be resized to take up less than the full space of a window.

Figure 6C:
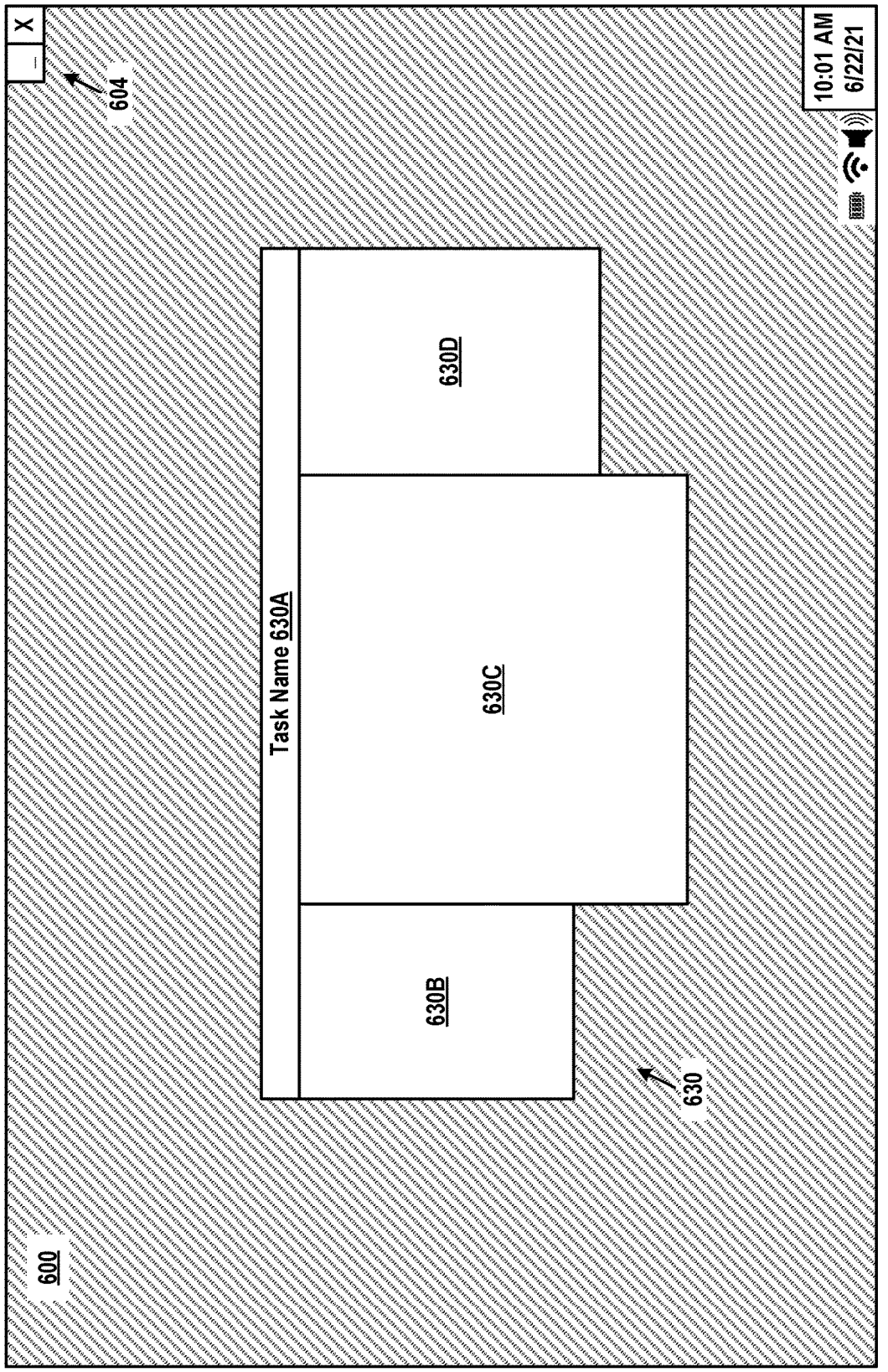
FIG. 6C depicts another task, in accordance with example embodiments.

Another example of a task is shown in FIG. 6C. In this example, task layer 600 includes task 630, consisting of common title bar 630A, window 630B, window 630C, and window 630D. Each of these windows is of different dimensions and can display different applications related to task 630.

Figure 6D:
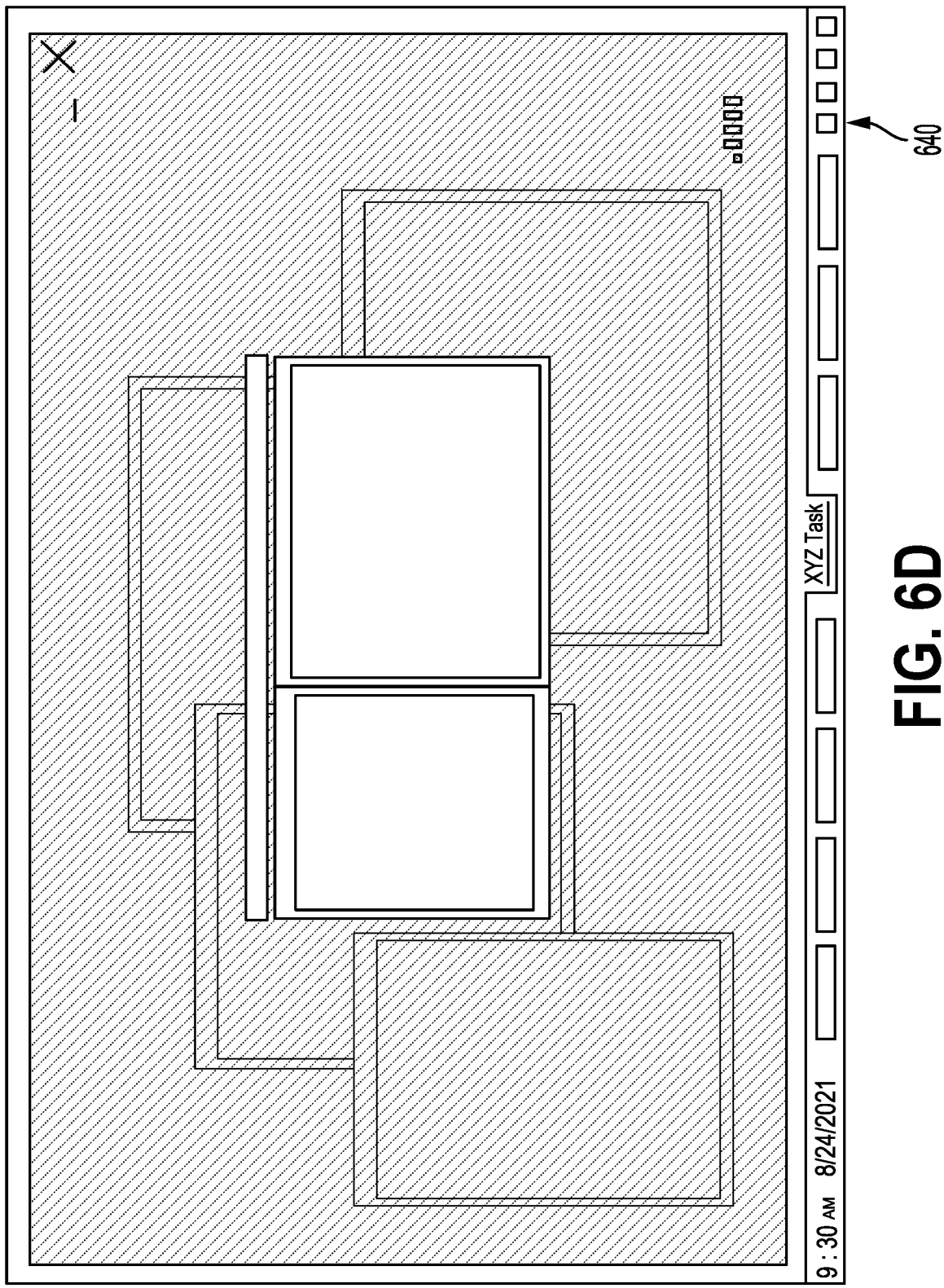
FIG. 6D depicts a task integrated with a workspace by the workspace tray, in accordance with example embodiments.

Another example of a task is shown in FIG. 6D. In this example, task layer 640 covers (appears visually above) a set of windows existing on a traditional construct of the desktop, where windows are more susceptible to overlapping than in a workspace, as described herein. This figure demonstrates utility of the task virtually overlaying any embodiment of a desktop, in the traditional sense of the word. As such, tasks, and more generally the defocused layer on which they are presented, may enable users to quickly handle smaller bite-sized pieces of work without further cluttering the desktop. Further, the relatively small pieces of work embodied in the form of tasks may represent interruptions or even routine activities (such as checking email or viewing a calendar).

Moreover, any arrangements of resources (e.g., windows) that make up a task can be resized, moved, or snapped together (docked) so that their edges join or are adjacent. Thus, the arrangement of windows shown herein are for purposes of example, and various other arrangements are possible.

Among other patterns of use, the task layer and tasks allow a user to interrupt one activity to carry out a high priority task, then resume that activity. For instance, the user may be drafting a document one or more virtual panels. Then the user may remember that they need to schedule a videoconference meeting with a coworker. The user may then invoke the task layer to select the task shown in FIG. 6B, for instance. Once the videoconference meeting is scheduled, the user may minimize or close the task layer and return to drafting the document in the virtual panel(s).

In general, some users may be working with multiple clients and/or projects, and thus the need exists for the user to context switch between conversations and projects inside their workspace. Each project or client may have its own set of independent application windows required for carrying out work for that client or project (e.g., productivity tools, office software suites, messaging and conferencing applications, and various web sites related to the subject matter for the project or the client's industry).

With the embodiments herein, users may restore entire layouts (workspaces) containing all the resources the user might need for a given client or project (pre-arranged and saved as a workspace) by hooking to mouse events inside of other applications. This may enable users to select a conversation in their messaging feed in order for the system described herein to populate the user's view of windows surrounding the messaging application, for instance. In this scenario, selecting a conversation in the messaging application might restore all the resources and context needed to engage quickly in a chat conversation with a client or regarding certain subject matter. This functionality may be further enriched and/or enabled by the way the embodiments herein distinguish between a virtual panel as a focal point and a desktop to provide additional context, as the user may keep the virtual panel windows static and merely switch out contextual/desktop views based on click events or other events inside a browser window, document, etc.

Thus, the functionalities of the embodiments herein include capturing a collection of disparate application windows and their positions as they appear on a display of a user who authored/arranged the windows and transmitting this window configuration (specifically, the arrangement and position of the application windows within the authoring user's native screen resolution) to a remote server. Then, the authoring user or other users may download the configuration from the remote server and adapt it to a different display resolution (using the described methods or employing the described systems), to a different computing device and/or operating system. The result of the above would in turn render the authored window layout on the receiving device, preserving the windows' sizes and positions relative to other windows in the layout and relative to the available screen resolution of a display connected to the receiving device. The following use cases illustrate this functionality.

User A creates a window layout on a local computing device running operating system 1 and stores the configuration of the window layout on a remote server. The window layout is accessed and/or downloaded by User B, who is on system 2, where system 1 and 2 are different desktop operating systems. The layout adapts to the screen real estate of system 2 by scaling window sizes in a proportional manner, for example.

User C creates a window layout on a local machine running operating system 1 and stores the configuration on a remote server. The window layout is accessed and/or downloaded by User C and User D, both of whom are using on system 3, a mobile operating system. The layout adapts to the screen real estate of system 3 using most of all of the screen for the focal windows (e.g., a virtual panel to task), resizing them and rescaling them, and suppressing at least some buttons, icons, and trays as needed.

User D creates a window layout on system 3, a mobile operating system. The window layout is accessed and/or downloaded by User D on a laptop (running operating system 1) and his desktop computer (running operating system 2). The layout adapts to the screen real estate of system 1 and system 2 by scaling window sizes in a proportional manner and showing virtual panels, tasks, buttons, icons, and trays at full configured sizes, for example.

IV. Example Data Architecture and Data Representations

Figure 7:
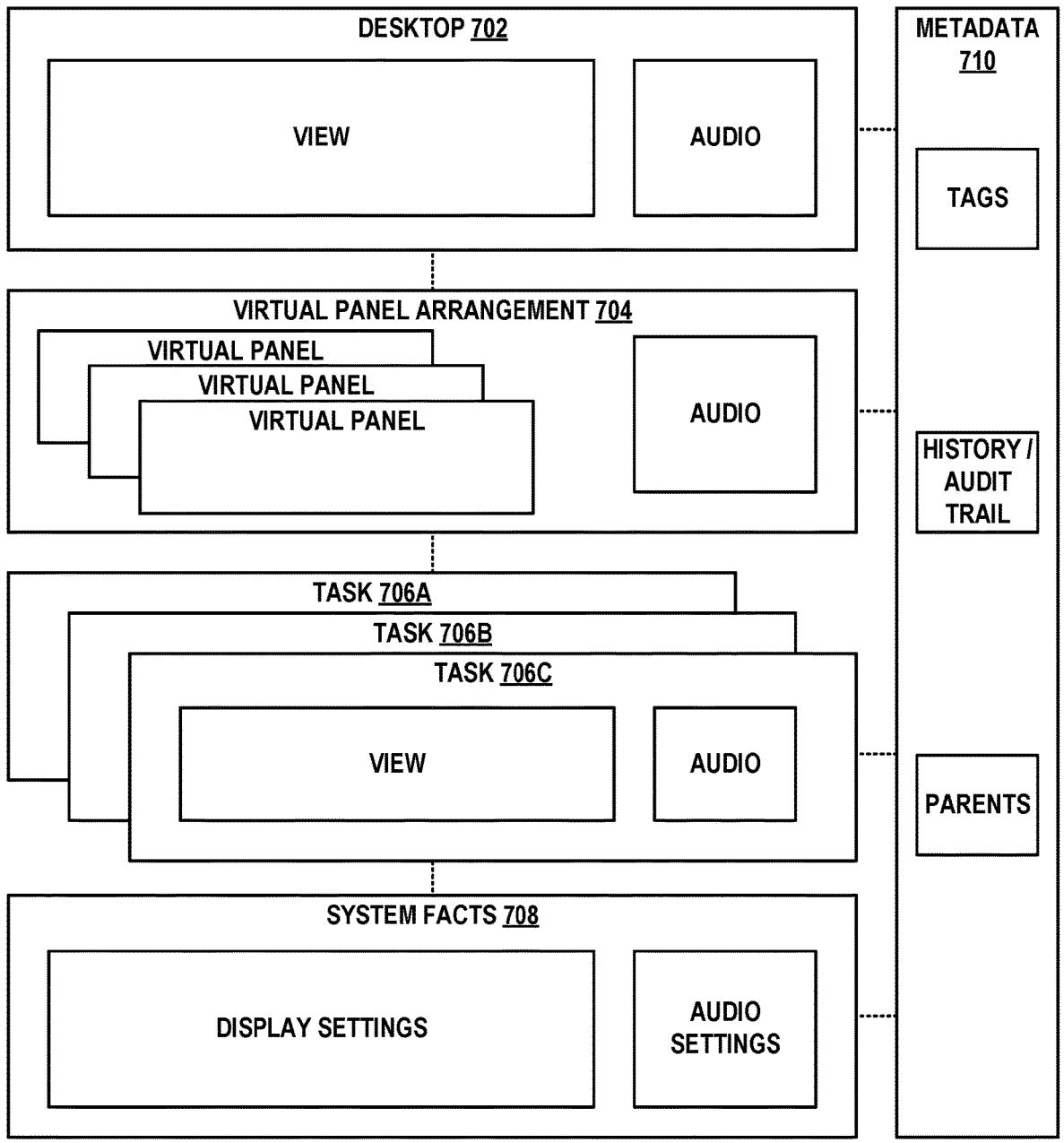
FIG. 7 depicts a data architecture, in accordance with example embodiments.

FIG. 7 depicts a data architecture 700 that defines the types of data that can be associated with a workspace and its components. Particularly, data architecture 700 for the workspace includes desktop data 702, virtual panel arrangement data 704, task data 706A, 706B, and 706C, system facts data 708, and metadata 710.

Desktop data 702 includes specifications of view and audio data for a desktop. Other types of data may be possible.

The desktop view data includes web-browser and native windows associated with the desktop (wherein a native window is a non-browser window for an application that is not part of a virtual panel or a task), a listing of static and live thumbnails associated with the desktop, and various icons (e.g., for programs and tasks) associated with the desktop. The desktop view data may also include a desktop zoom percent, the workspace tray configuration (e.g., display options, pinned program icons or buttons, colors, styling, etc.), the degree to which the desktop is subject to dimming, blurring, shading, or other types of defocusing, and any desktop background or wallpaper images. Here, being "associated with the desktop" indicates that the web-browser windows, native windows, thumbnails, and icons may be displayed on the desktop (background) view or configured to be displayable within the desktop view (e.g., minimized to the workspace tray).

The desktop audio data may include overall audio volume, notification chime settings, notification volume settings, and/or specific background audio content. Each of these may be independent of one another—e.g., the overall audio volume, notification volume, and/or background audio volume may take on different values.

Virtual panel arrangement data 704 includes specifications of one or more virtual panels and audio data for a virtual panel arrangement. Other types of data may be possible.

Each virtual panel may be represented with a list of displayed and minimized windows (along with their respective dimensions and locations), a panel mode (e.g., stacked or stackless), a panel tray configuration (e.g., pinned apps, styling, display options, etc.), and a zoom percent.

The virtual panel audio data may include overall audio volume to be applied to every resource held in the virtual panel, notification chime settings, and/or notification volume settings for the virtual panel arrangement. Each of these may be independent of one another—e.g., the overall audio volume and the notification volume may take on different values.

Each of task data 706A, 706B, and 706C includes specifications of one or more task views and audio data for a task. Other types of data may be possible.

The task view data may include one or more windows, their independent configurations, and a list of controls associated with the task. The configuration of any given window in a task may relate to the window's content, the dimensions and locations of the window as shown on the task layer, the name of the window (e.g., as it appears on the title bar), the color of the task's title bar and borders, etc.

The task audio data may include overall audio volume, notification chime settings, and/or notification volume settings for the task. Each of these may be independent of one another—e.g., the overall audio volume and the notification volume may take on different values.

System facts data 708 includes specifications of system-level display settings and audio settings. Other types of data may be possible. The system facts display settings may specify lock screen, screensaver, high-dynamic range, and data related to the application of graphics effects commonly applied to displays, such as blue lighting, for example. The system facts display settings may also include a display resolution, zoom percent, and display orientation for each physical monitor in a multi-monitor setup. The system facts audio settings may specify audio output device, volume, and spatial settings, audio input device settings, and system sounds configuration, for example.

Metadata 710 may include definitions of additional information relevant to the workspace. These may include one or more tags applied by users or automatically, that associate the workspace or view with something else (e.g., an activity, a process, a day of the week, an individual, a client, a project—to name a few). Metadata may also include historical logs (e.g., event logs, change logs, audit trails, and/or audio logs) related to the creation, editing, deletion, or use of various aspects of the workspace or some subset thereof. Metadata 710 may also include representation of a session (e.g., a period of time during which the user traversed workspaces, tasks, views, or other attributes of the systems described) in the form of metadata specifying which workspaces or tasks were engaged, and when, for example). Metadata 710 may further allow definitions of workspaces in a hierarchical manner, with child workspaces inheriting some of the characteristics of parent workspaces, such as a workspace, task, desktop view, or the view of a particular virtual panel arrangement that are part of a set or module, as described above.

FIGS. 8A-8D provide example hierarchical data representation 800 that can be used to define a workspace and its contents. Data representation 800, which is broken up across four figures due to its size, can be used to characterize a possible structure and set of fields for data architecture 700. But other data representations may be used. Data representation 800 may be encoded in a structured data format, such as XML or JSON, though other formats, textual or binary, could be used. Thus, each field shown in data representation 800 could be a numeric or textual value, or a container for a set of numeric or textual values.

Figure 8A:
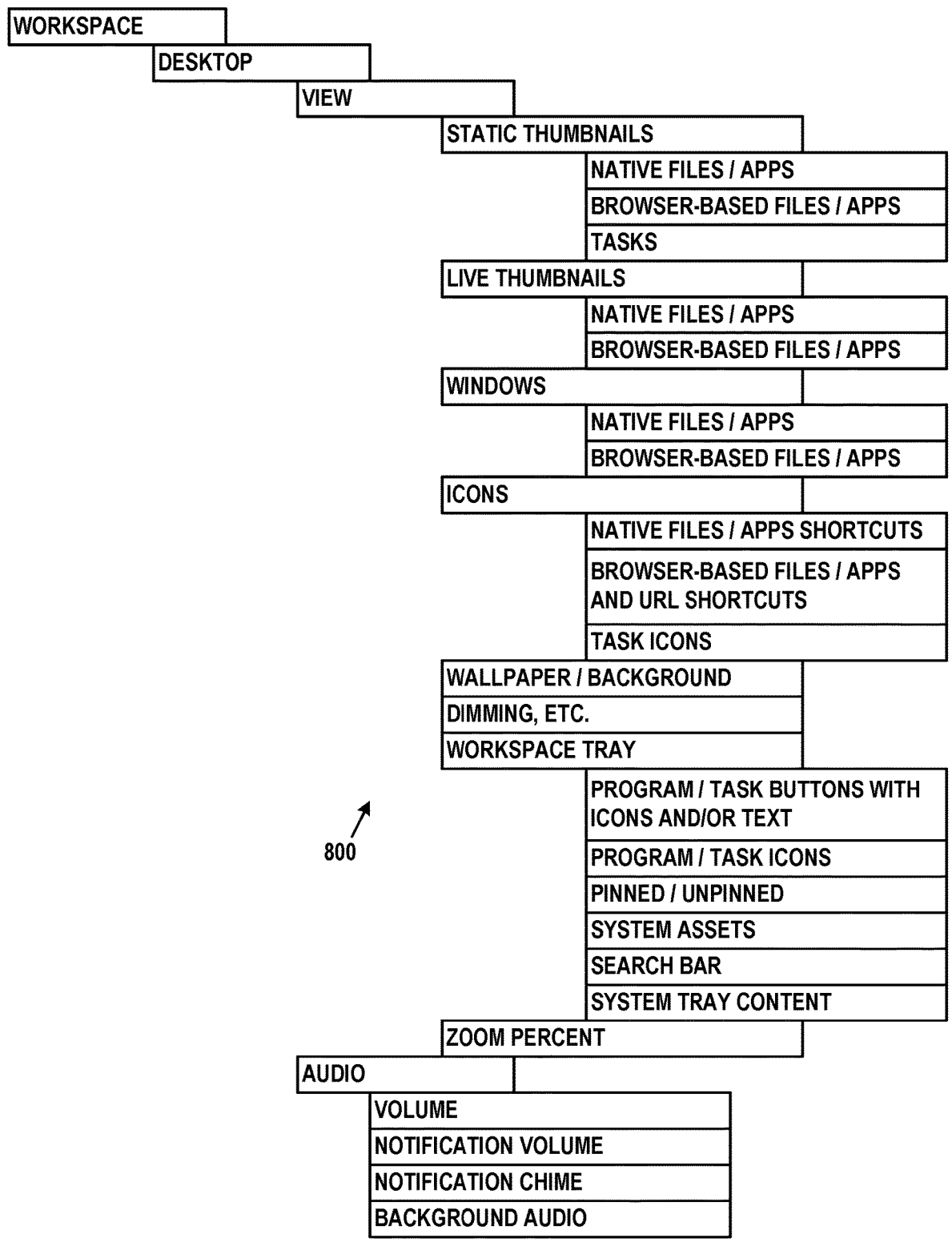
FIGS. 8A, 8B, 8C, and 8D depict a data representation, in accordance with example embodiments.

As shown on FIG. 8A, the representation of a desktop is divided into view and audio sections. The view section specifies characteristics of static and live thumbnails, windows, icons, wallpaper/background, dimming, workspace tray, and zoom percent. The audio section specifies characteristics of volume, notification volume, notification chime, and background audio.

Figure 8B:
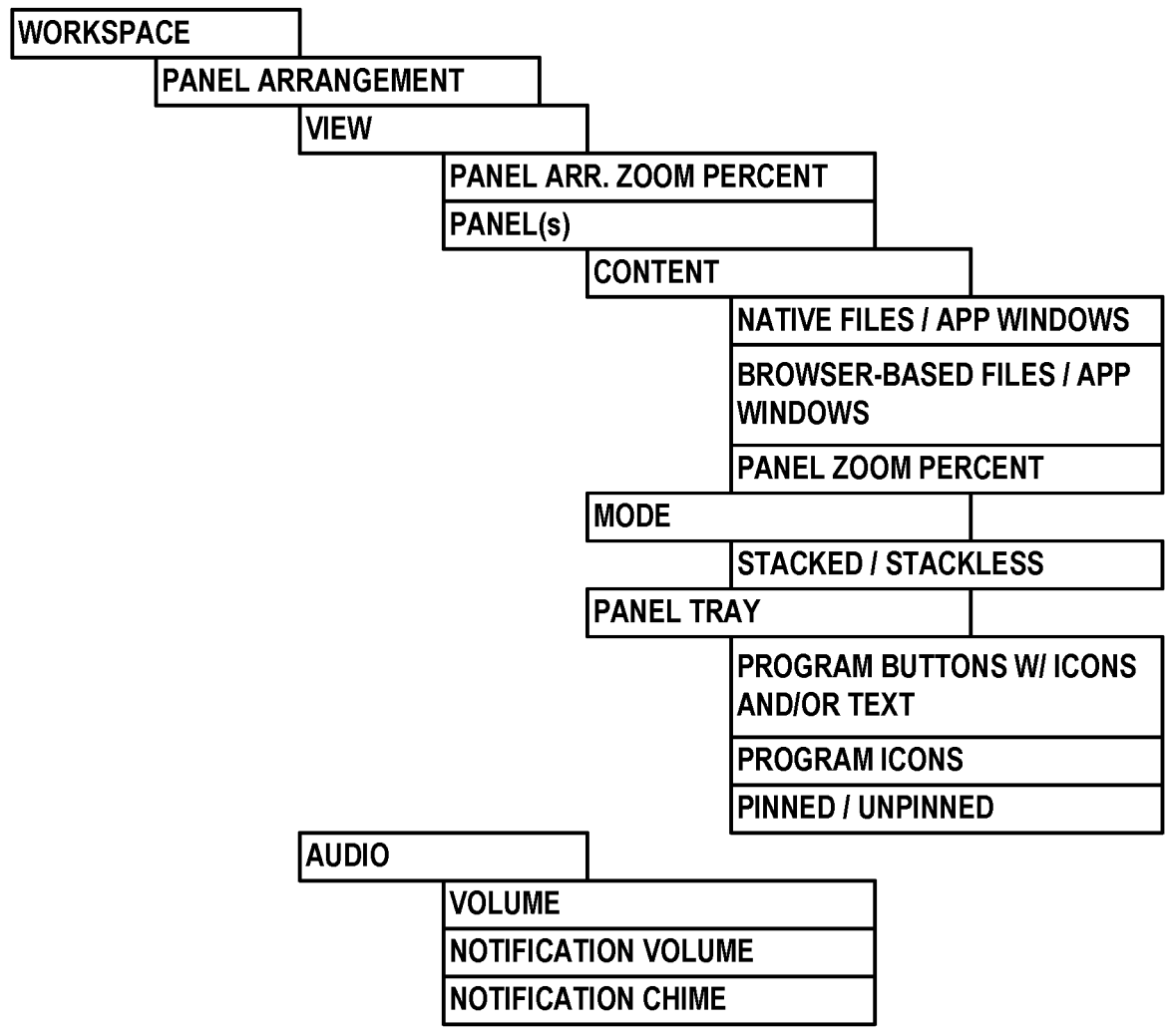

As shown in FIG. 8B, the representation of the virtual panel arrangement is also divided into view and audio sections. The view section specifies characteristics of a zoom percent and definitions of one or more virtual panels. The representation of each panel specifies characteristics of content, mode, a panel tray. The audio section specifies characteristics of volume, notification volume, and notification chime.

Figure 8C:
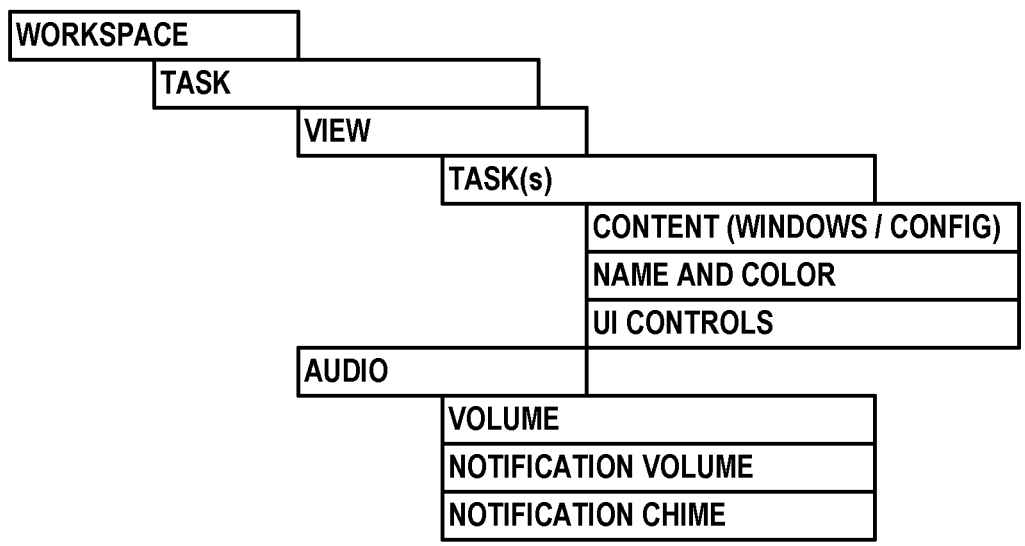

As shown in FIG. 8C, the representation of a task is also divided into view and audio sections. The view section specifies characteristics of a list of tasks, each defining content, name and color, and user interface (UI) controls. The audio section specifies characteristics of volume, notification volume, and notification chime.

Figure 8D:
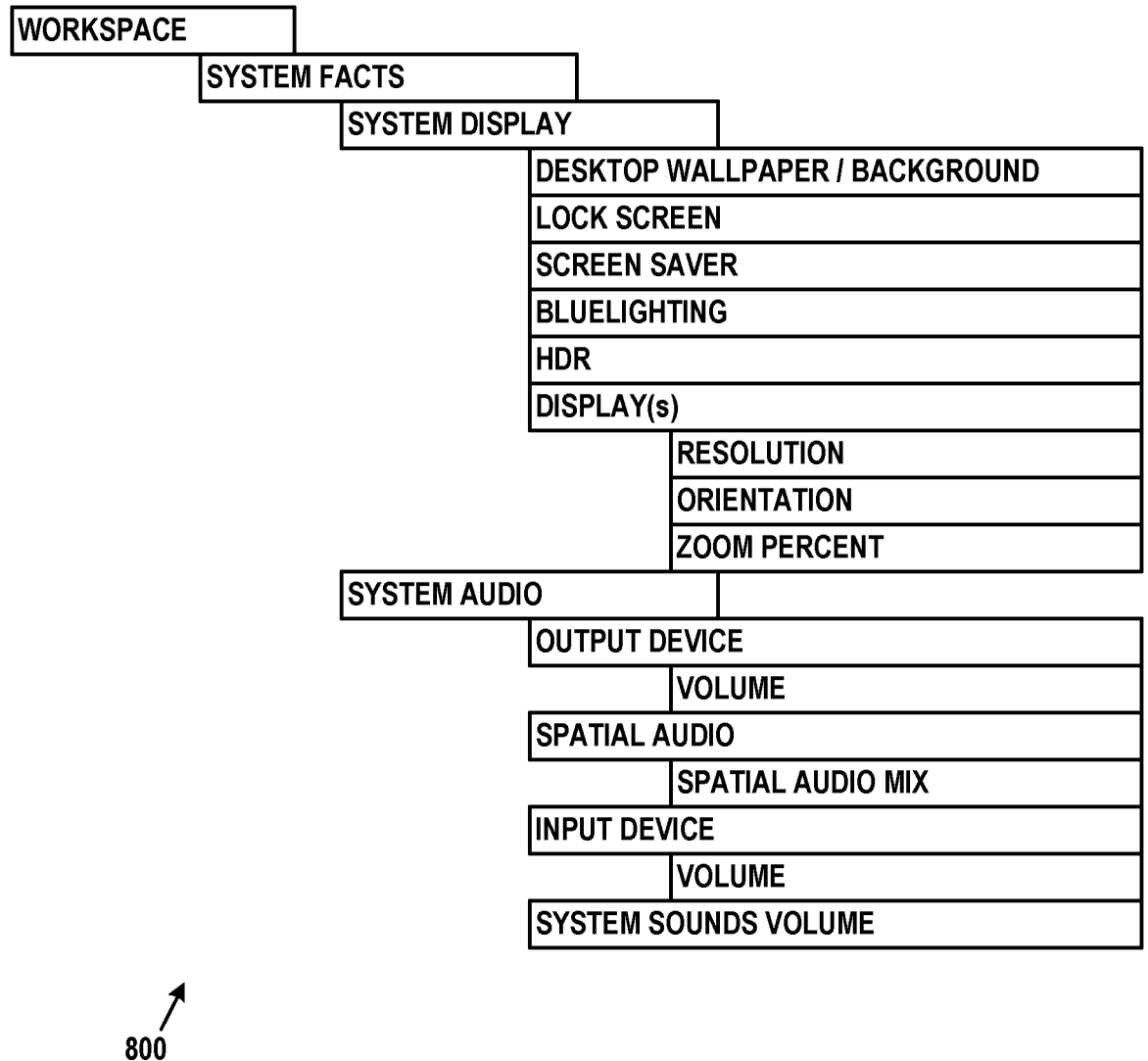

As shown in FIG. 8D, the representation of system facts is divided into system display and system audio sections. The system display section specifies characteristics of desktop wallpaper/background, lock screen, screen saver, blue lighting, HDR, and one or more display devices (i.e., screens). The system audio section specifies characteristics of an audio output device, spatial audio, audio input device, and system sounds volume.

To the extent that the hierarchy of data representation 800 differs from data architecture 700, this is due to there being multiple possible data representations for data architecture 700. This data representation 800 is just one possible example.

V. Example Software Architecture

Figure 9A:
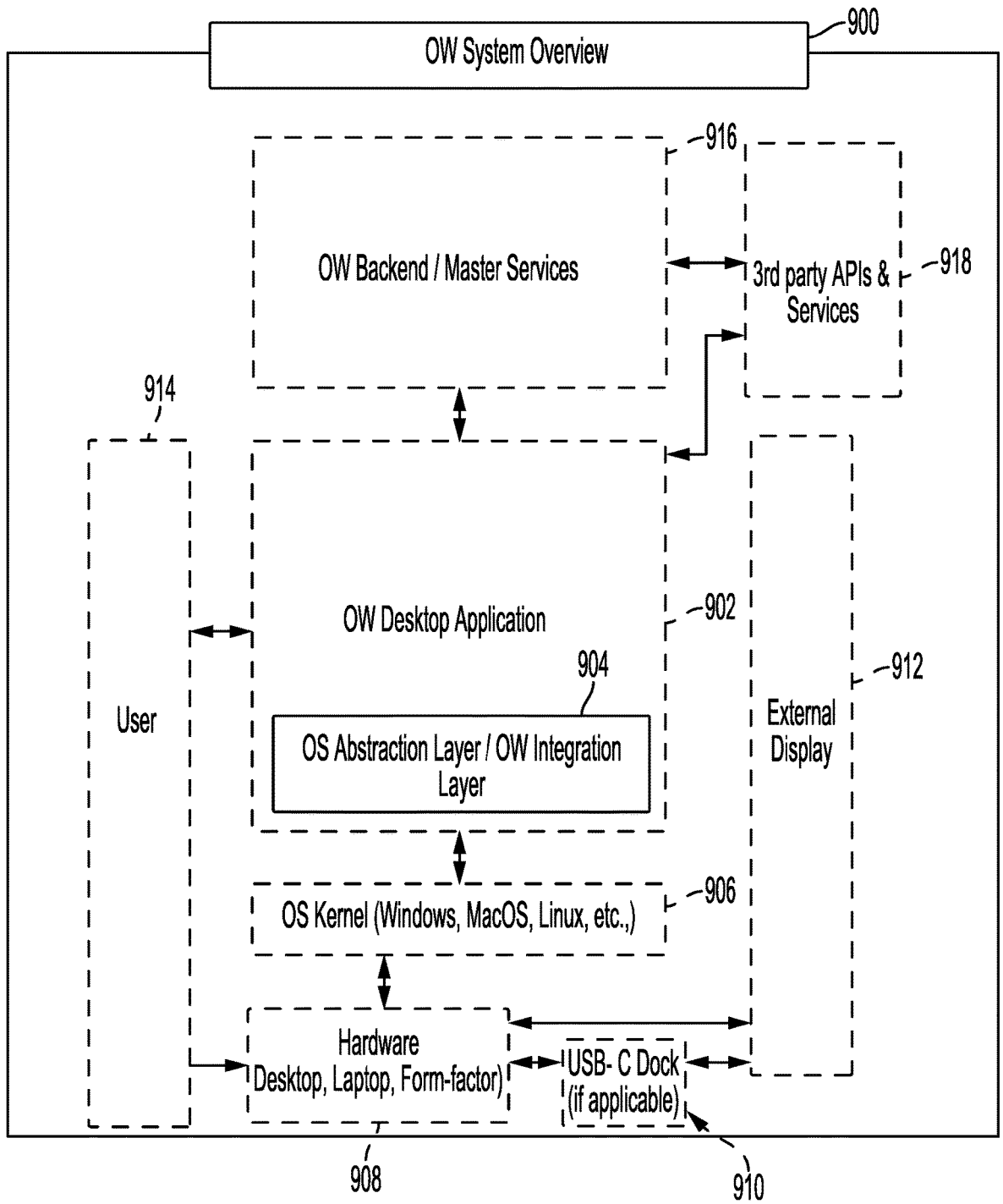
FIG. 9A depicts an overall software architecture, in accordance with example embodiments.

FIG. 9A depicts example software architecture 900 that provides, facilitates, and/or supports the embodiments herein. This architecture is sometimes referred to as the OpenWorkspace (OW) system and defines software modules thereof that provide various features and functions.

OW desktop application 902 serves as a window manager that may compliment or altogether replace window management utilities native to the user's operating system. In cases where the operating system has a default window manager that cannot fully be replaced (e.g., MICROSOFT WINDOWS®), OW desktop application 902 may execute atop or alongside the default window manager. OW desktop application 902 includes an abstraction/integration layer 904 that allows OW desktop application 902 to execute on and interact with multiple types of operating systems (e.g., MICROSOFT WINDOWS®, MACOS®, and/or LINUX®).

OS kernel 906 represents the core aspects of the operating system (e.g., MICROSOFT WINDOWS®, MACOS®, and/or LINUX®) on which OW desktop application 902 executes. Hardware 908 is the computing device on which OS kernel 906 executes, and may be a desktop computer, laptop computer, mobile device, or another form factor. In some cases, hardware 908 may be connected to a docking station 910 (e.g., a USB-C dock). Through docking station 910, one or more external display(s) 912 may be connected. Alternatively, external displays(s) 912 may be directly connected to hardware 908. This allows OW desktop application 902 to display workspaces on the screens of external display(s) 912.

All of this facilitates an improved GUI experience for user 914. This user may provide input using hardware 908 (e.g., by way of a keyboard, touchscreen, mic and/or pointing device) and view output on external display(s) 912 or on embedded displays, such as that on a laptop computer. User 914 may also configure OW desktop application 902 in accordance with their preferences.

While software architecture 900 may operate on a computing device in a standalone fashion (e.g., without needing a network connection or to communicate with other devices), it may benefit from having access to backend services 916 and/or third-party services 918. Backend services 916 are provided specifically to support desktop application 902 and include event management as well as remote storage of workspace configurations and/or sessions. Third-party services 918 may be provided by any entity and may communicate with backend services 916 and/or directly with desktop application 902. As described in more detail below, integration with backend services 916 and/or third-party services 918 allows OW desktop application 902 to save and restore workspace configurations and to receive notifications that may impact what is displayed on external display(s) 912 as well as audio played out by hardware 908.

Figure 9B:
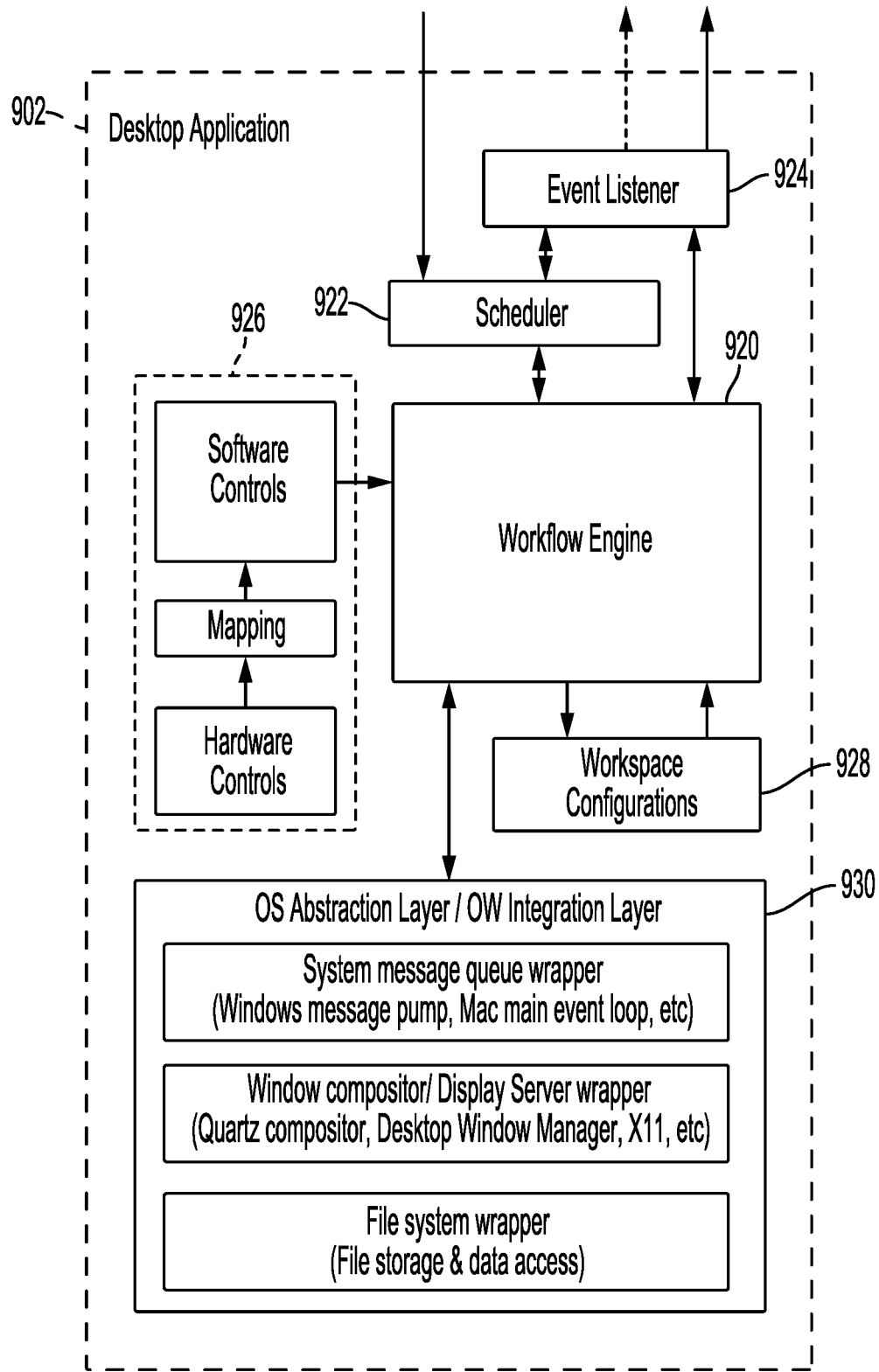
FIG. 9B depicts a desktop application software architecture, in accordance with example embodiments.

FIG. 9B depicts desktop application 902 in more detail. Particularly, desktop application 902 includes workflow engine 920, scheduler 922, event listener 924, controls 926, workspace configurations 928, and abstraction/integration layer 930.

Workflow engine 920 may consist of one or more software applications configured to carry out some or all of the workflows described herein, or at least facilitate some of these workflows. Example workflows include saving and restoring certain aspects of a workspace configuration or a workspace configuration as a whole, displaying or modifying the display of a virtual panel or task, managing events and notifications, and so on.

Herein, an event may be any occurrence within software architecture 900 (e.g., within desktop application 902, backend services 916 and/or third-party services 918) such as an application changing state, expiry of a timer, arrival of a message, and so on. Workflow engine 920 may subscribe to certain events, and then receive notifications when these events occur. Receipt of such a notification may cause desktop application 902 to change state in some fashion.

To that point, scheduler 922 may receive notifications from backend services 916, third-party services 918, or event listener 924, then determine how and in what order to deliver them to workflow engine 920. Notifications from scheduler 922 may cause workflow engine 920 to carry out one or more procedures.

Event listener 924 may register to receive notifications of events from backend services 916 and/or third-party services 918. Event listener 924 may receive these notifications when the associated events occur and pass at least some of these notifications on to scheduler 922 or directly to workflow engine 920.

Controls 926 includes a mapping from software controls to peripheral controls or those joined to hardware 908 and/or external display(s) 912. For example, configurable buttons on a keyboard or on external display(s) 912 could be mapped to specific software controls. Actuation of such a hardware control may cause workflow engine 920 to carry out a pre-defined procedure. For example, actuating a programmable hotkey on a keyboard may cause workflow engine 920 to dim the desktop and virtual panels, thus accentuating a task arrangement displayed atop the workspace. In one such embodiment described below, a hardware controller in the form of a dial might be joined to external display(s) 912 to facilitate the user to carry out these programmable, mapped functions.

Workspace configurations 928 may store data representations of one or more workspaces (e.g., in accordance with data representation 800). While workspaces, or portions thereof, may be stored locally, they may also be stored remotely (e.g., at backend services 916).

Abstraction/integration layer 930 may be an interface, such as an application programming interface (API), between workflow engine 920 and hardware 908. As such, this interface may translate between system independent aspects of desktop application 902 and system dependent commands, operations, function calls, etc. Abstraction/integration layer 930 may include support for various operating system message queues, window compositor/display servers, and/or file systems. By translating to and from system-dependent features, abstraction/integration layer 930 allows desktop application 902 to be largely system independent, and thus software architecture 902 may be ported to multiple desktop operating systems, mobile operating systems, and other platforms.

Figure 9C:
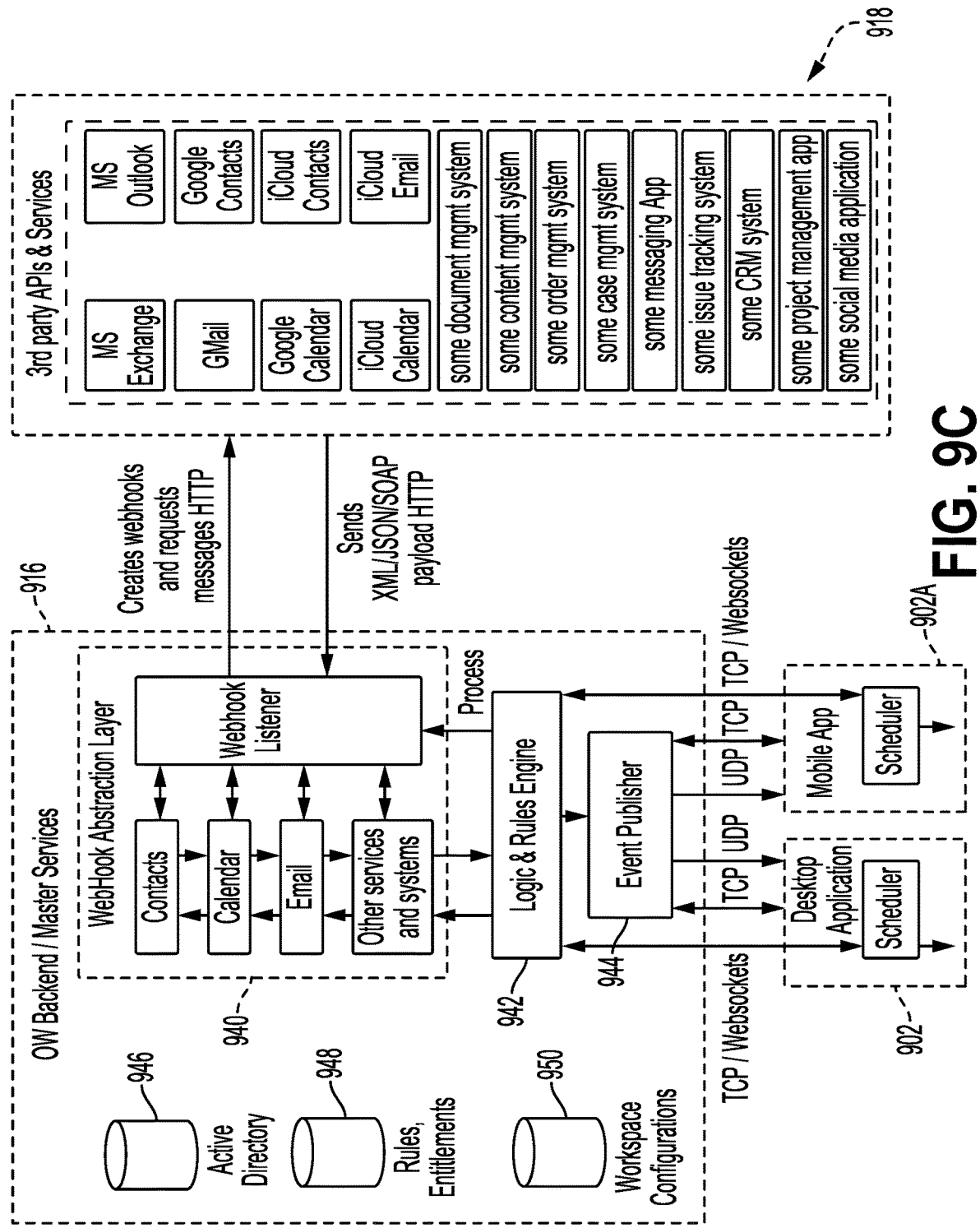
FIG. 9C depicts backend services and third-party services, in accordance with example embodiments.

FIG. 9C depicts backend services 916 and third-party services 918 in more detail. Particularly, backend services 916 includes webhook abstraction layer 940, logic and rules engine 942, event publisher 944, active directory database 946, rules and entitlements database 948, and workspace configurations database 950.

Backend services 916 can be configured to communicate with desktop application 902, as well as mobile application 902A (where mobile application 902A is executing a variation of desktop application 902 ported to a mobile device). For purposes of describing the functionality of backend services 916, desktop application 902 and mobile application 902A will be assumed to be functionally identical, even though their operations may vary.

Webhook abstraction layer 940 is a framework for sharing information asynchronously between backend services 916 and third-party services 918. Webhooks can utilize the HyperText Transfer Protocol (HTTP) between web servers to carry out such communications. For instance, the user may have configured desktop application 902 to display visual notifications like badge notifications or border highlights (e.g., in on a virtual panel, on a task, or on a thumbnail) when the user receives an email or has an upcoming meeting on their calendar. Further, the user may employ one or more third-party services 918 for email and calendar services. Thus, webhook abstraction layer 940 can be configured to be able to create webhook interfaces with third-party services 918 to asynchronously receive such notifications.

The management of webhooks and notifications may be mediated by logic and rules engine 942. For example, logic and rules engine 942 may instruct webhook abstraction layer 940 to establish one or more webhooks with third-party services 918, and then logic and rules engine 942 may receive any corresponding notifications from webhook abstraction layer 940 (these notifications would have originated at third-party services 918). Logic and rules engine 942 may apply pre-defined processing to these notifications before providing them to event publisher 944. For instance, logic and rules engine 942 may filter the notifications so that only certain notifications are provided or so that the rate of notifications is limited to a particular number per unit of time (e.g., no more than one every 15 seconds).

Event publisher 944 sends notifications of events to desktop application 902. Thus, event publisher 944 manages the queueing and transmission of these events and may communicate with either or both of scheduler 922 and event listener 924. Note that in FIG. 9C, event publisher 944 is shown communicating with both desktop application 902 and mobile application 902A, indicating that the same or different events can delivered to more than one client device.

Backend services 916 also includes three logical databases, active directory database 946, rules and entitlements database 948, and workspace configurations database 950. In some embodiments, active directory database 946, rules and entitlements database 948, and workspace configurations database 950 may be implemented in a single database. Active directory database 946 can maintain one or more user profiles, including information such as user contact information (e.g., email, phone number), security credentials (e.g., userid, hashed password), billing preferences, and other settings. Rules and entitlements database 948 may specify the features, permissions, and/or software licenses available to each user with a user profile. Workspace configurations database 950 may store a remote or backup copy of one or more workspace configurations per user profile. These saved workspace configurations may be arranged according to data representation 800, and may allow users to restore their workspace configurations as the users move between computing devices or across operating systems. Backend services 916 may be arranged so that only users who are successfully logged into a user profile can access any of these databases.

Figure 9D:
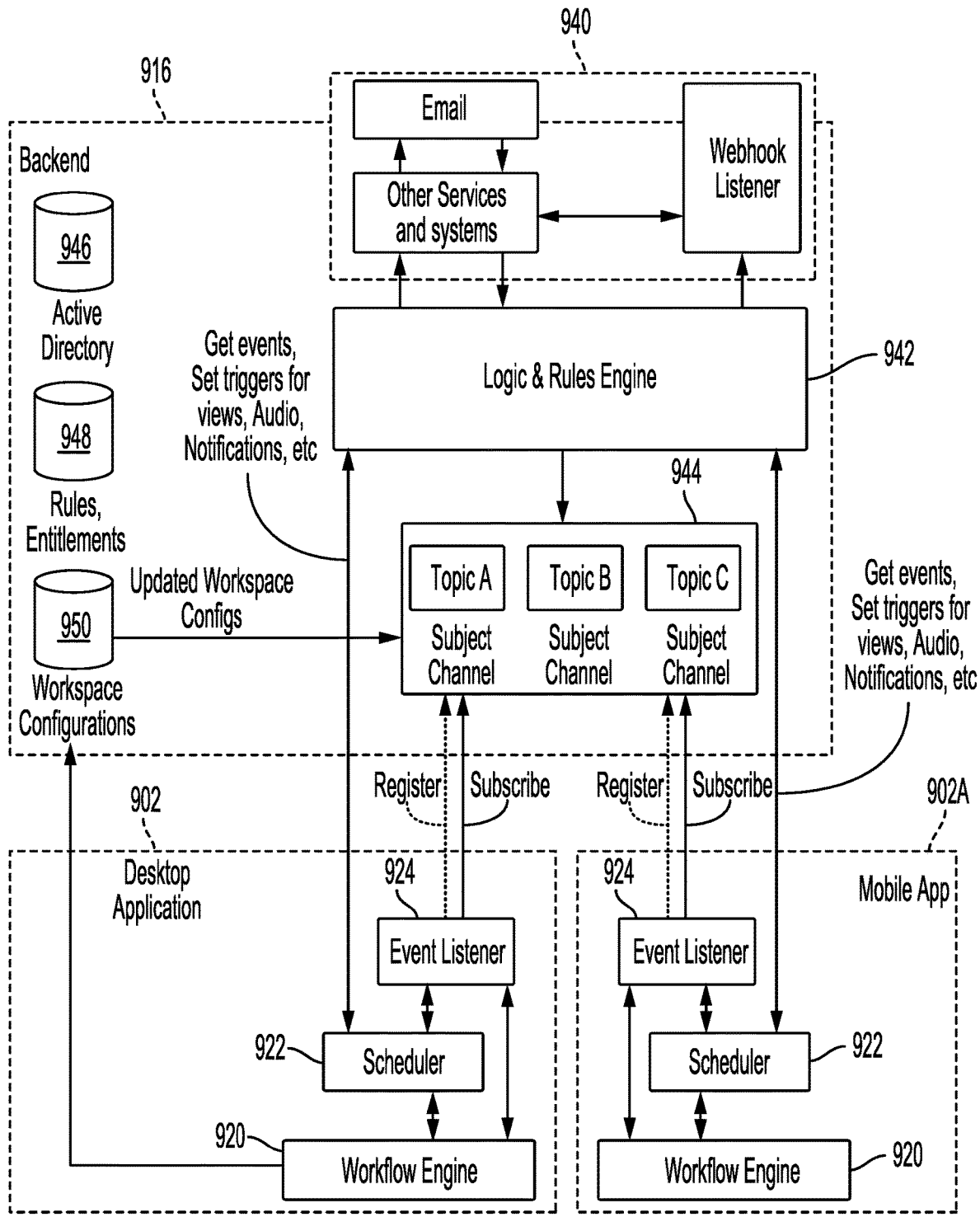
FIGS. 9D and 9E depict backend services interacting with the desktop application, in accordance with example embodiments.

FIG. 9D depicts the messaging of software architecture 900 in more detail. In particular, event listener 924 may communicate with event publisher 944 to register for and/or subscribe to certain events. Event publisher 944 may create separate logical channels for each type of event or event topic. Further, scheduler 922 may communicate with logic and rules engine 942 to set triggers for updates to views and audio for a desktop, virtual panels, and/or tasks. Moreover, workflow engine 920 may provide copies of workspace configurations (e.g., updates or new workspace configurations) to workspace configurations database 950. Event publisher 944 may retrieve some or part of such a workspace configuration from workspace configurations database 950, or other information, to determine whether and how to deliver events to desktop application 902.

Figure 9E:
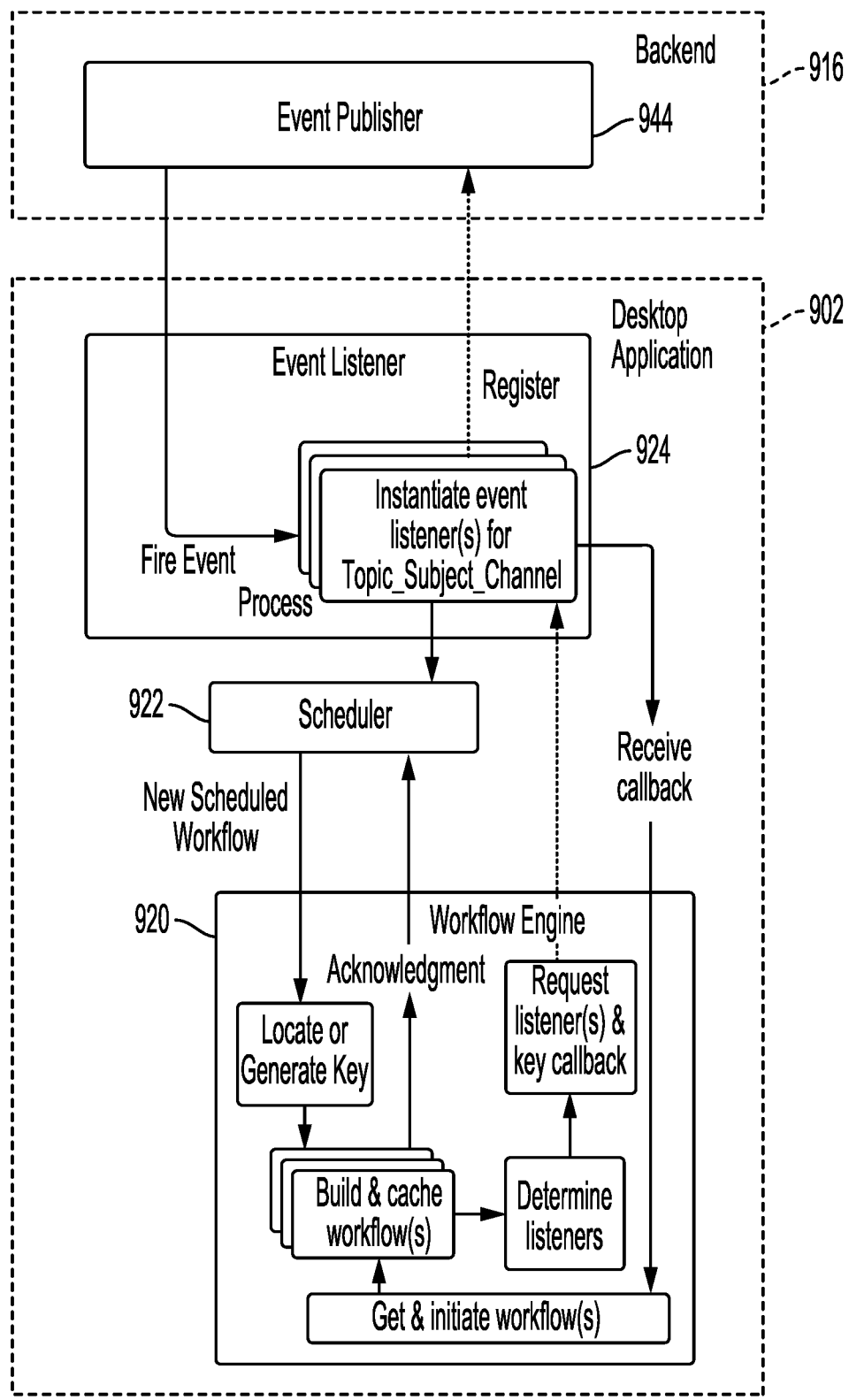

FIG. 9E depicts how event-driven workflows are scheduled. The user may define a workflow and provide it to workflow engine 920 or may select a pre-defined workflow. Workflow engine 920 may build and cache a representation of the workflow. This representation may take the form of, for example, a state machine. Workflow engine 920 may also determine the listeners for the workflow (e.g., one or more desktop icons, applications, virtual panels, and/or tasks that should receive events that trigger the workflow or are related to the workflow).

Workflow engine 920 may then request that event listener 924 invoke one or more particular callback functions for these listeners on arrival of events that trigger the workflow. Each request to event listener 924 may be associated with a unique key (e.g., a unique number or reference). Event listener 924 may then register to receive notifications of these events from event publisher 944.

When such an event occurs, event publisher 944 may transmit an associated notification (fire event) to event listener 924. Event listener 924 may provide a representation of the notification to scheduler 922 along with the key that was used during registration. Scheduler 922 may then, in accordance with its scheduling of events, instruct workflow engine 920 to execute one or more workflows associated with the event. Alternatively, event listener 924 may provide a representation of the notification (possibly with the key) directly to workflow engine 920. In either case, workflow engine 920 may then use the key or other means to look up the triggered workflow and carry it out.

These event-driven window-management and display mechanisms improve upon how users currently locate and source, surface, arrange within a view, and configure each individual resource (e.g., application windows) each time the user needs information, in that they introduce a push construct to the operationally intensive and repetitive nature of traditional window management. The embodiments herein enable the user to hook and/or associate any type of local or remote event. These events may be, for example, calendar events (e.g., the beginning of a scheduled meeting), or even conditional events. A conditional event may be defined as "if x and y then z", where x and y are conditions met through the workspace framework state or integrations with third-party systems, and where z invokes a visual or audio notification on some aspect of a workspace such as on a panel tray, desktop window, or desktop thumbnail image. Alternatively, the carrying out of z may involve rendering or modifying a workspace, virtual panel, task, or some subset thereof within a view.

Thus, the embodiments herein facilitate automated, event-driven window management in a fashion that is not supported in current window management frameworks. For example, the user may configure a task to include a video-conferencing application and a spreadsheet application. The user may further configure this task to be triggered (launched) by an event in the user's remotely hosted calendar (e.g., a meeting taking place over the video-conferencing application in which a spreadsheet will be discussed). When the time of the meeting arrives, desktop application 902 receives a notification of the event, and executes a workflow to trigger display of the task. This notification, the calendar event, and/or the configuration of the task may further cause the video-conferencing application to automatically join the scheduled meeting on behalf of the user and display a particular file in the spreadsheet application. Current frameworks do not support these features and are instead focused on restoring windows to their last known locations in a non-event-driven fashion (e.g., upon launch by a user).

VI. Example Capture and Restore Workflows

While the embodiments described herein may include numerous workflows, including those that are pre-configured and others that are user-defined, this section provides a set of examples relating to the saving and restoring of aspects of a workspace. Thus, these and/or other workflows may be supported.

Here, the term "capturing" refers to obtaining information about a workspace, one or more virtual panels, one or more desktops, one or more tasks, system facts, or other related data from memory or settings (e.g., a configuration file, a registry, etc.) and possibly saving a representation of this information locally and/or remotely. Conversely, the term "restoring" refers to reading a saved local or remote representation of information about a workspace, one or more virtual panels, one or more desktops, one or more tasks, system facts, or other related data and applying (setting) this information in the workspace or configuration thereof.

A. Workspace

Figure 10:
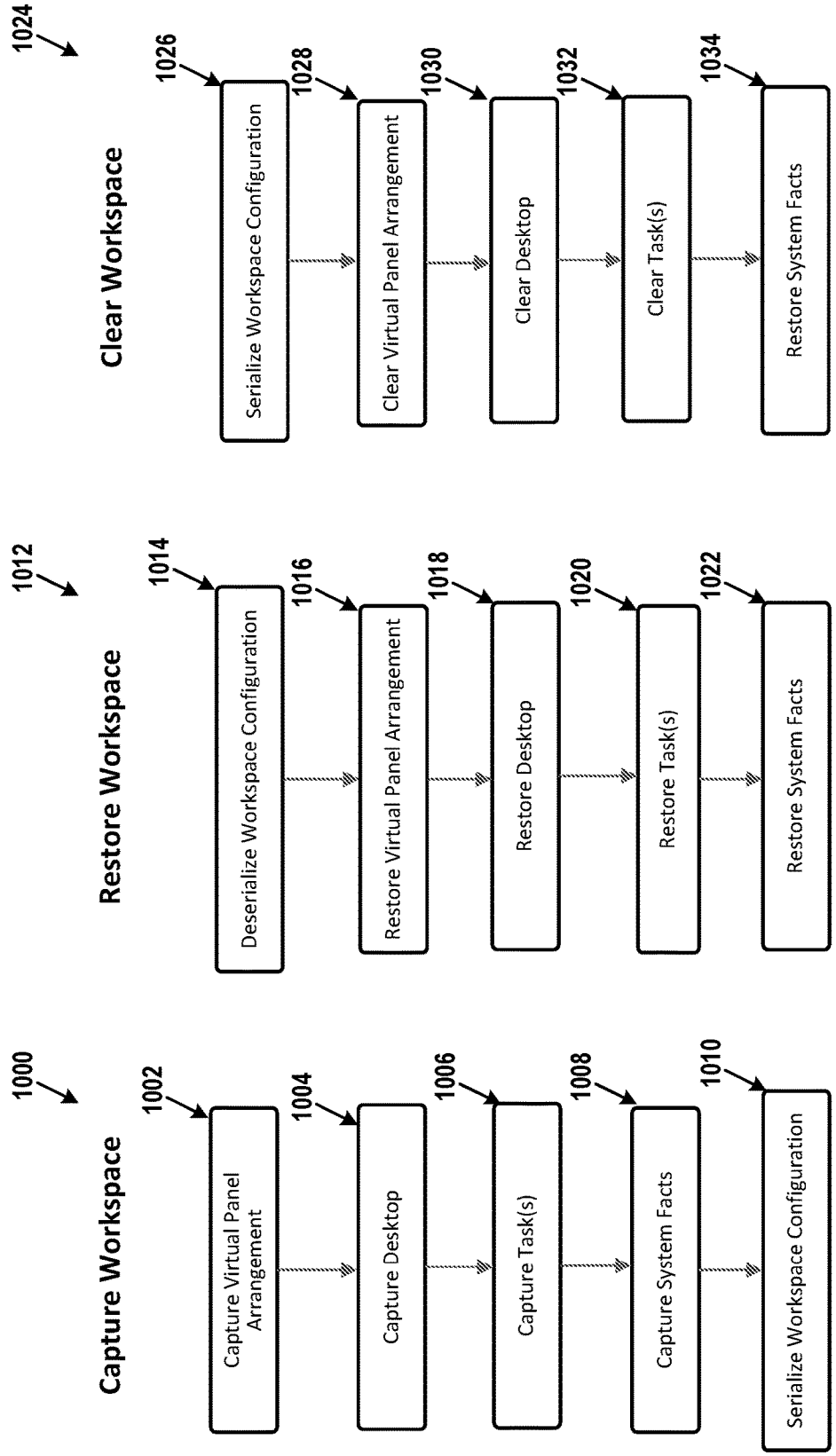
FIG. 10 depicts workspace workflows, in accordance with example embodiments.

FIG. 10 provides three workflows, for saving (capturing), opening (restoring), and clearing a workspace, respectively. Other workspace workflows may exist.

Capture workspace workflow 1000 may be triggered by user command (e.g., the user actuating a "capture" or "save" button or automatically (e.g., by way of an autosave feature). At block 1002, the virtual panel arrangement is captured (see FIG. 11 and discussion below). At block 1004, the desktop attributes are captured (see FIG. 17 and discussion below). At block 1006, the task(s) are captured (see FIG. 22 and discussion below). At block 1008, the system facts are captured (see FIG. 26 and discussion below). At block 1010, the workspace configuration as captured is serialized. The act of saving these aspects of the workspace may involve capturing information about each in some part of data representation 800. Thus, the serialized representation may be in XML, JSON, binary, or some other structured data format, and may be placed in local and/or remote storage.

Restore workspace workflow 1012 may be triggered by user command (e.g., the user actuating a "load" button) or upon other events such as system startup or triggered predefined conditions. At block 1014, the workspace is retrieved from storage and deserialized (e.g., from data representation 800 to an internal representation). At block 1016, the virtual panel arrangement is restored (see FIG. 11 and discussion below). At block 1018, the desktop is restored (see FIG. 17 and discussion below). At block 1020, the task(s) are restored (see FIG. 22 and discussion below). At block 1022, the system facts are restored (see FIG. 26 and discussion below).

Clear workspace workflow 1024 may be triggered by user command (e.g., the user actuating a "clear" button), or may be triggered automatically upon actuation of a new workspace and may consist of clearing from view the virtual panel arrangement, the background (desktop) arrangement or task(s), or some combination thereof, along with their associated audio settings. Further, it may restore system facts to a default setting. At block 1026, the workspace is serialized. At block 1028, the virtual panel arrangement is cleared. At block 1030, the desktop is cleared. At block 1032, the task(s) are cleared. At block 1034, the system facts are restored.

B. Virtual Panel

Figure 11:
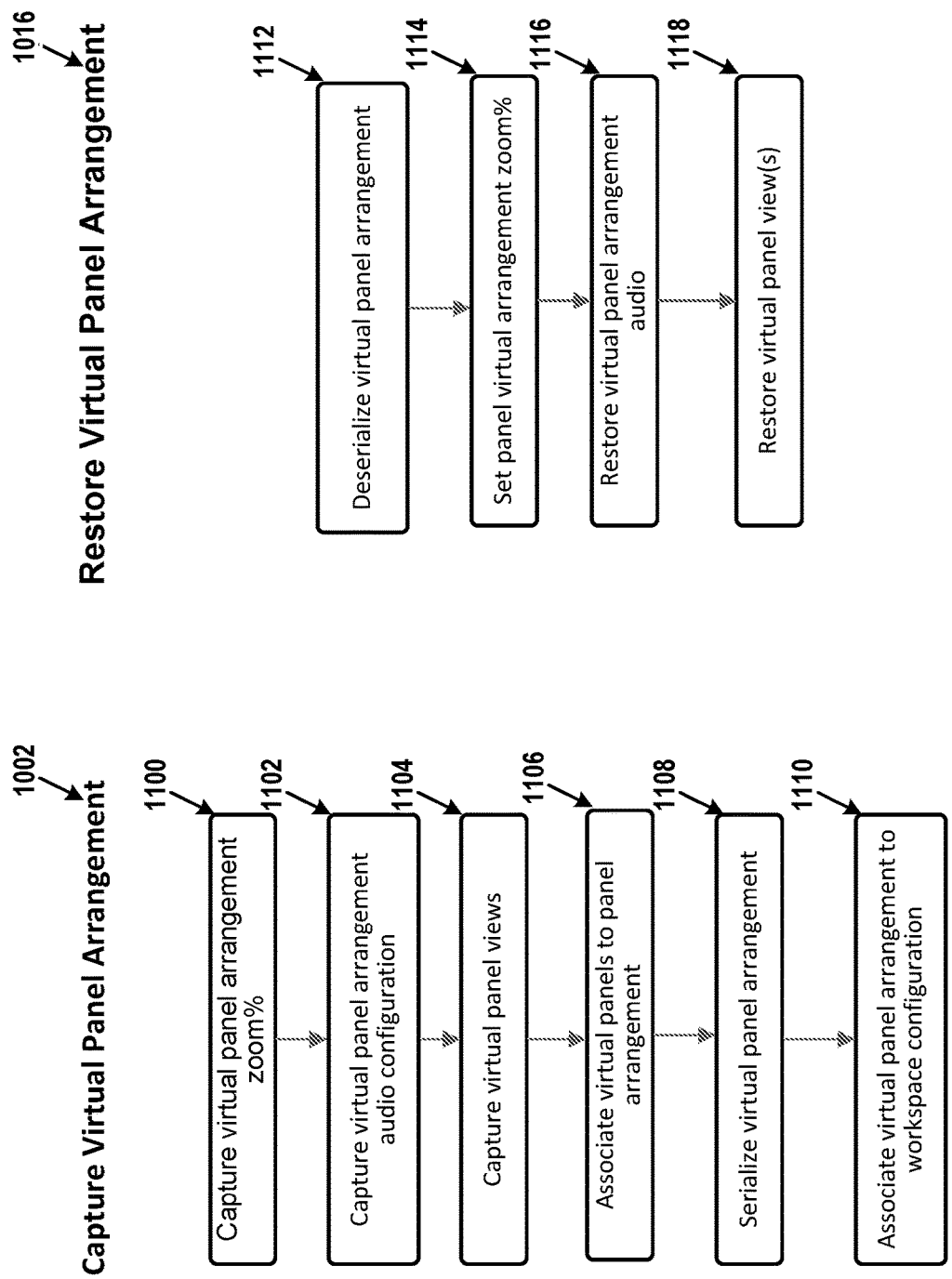
FIG. 11 depicts virtual panel workflows, in accordance with example embodiments.

FIG. 11 provides two workflows, for saving (capturing) and opening (restoring) a virtual panel, respectively. Other virtual panel workflows may exist.

Capture virtual panel workflow 1002 may be triggered independently or as part of capture workspace workflow 1000. At block 1100, the virtual panel zoom percent may be captured. At block 1102, the virtual panel audio configuration may be captured (see FIG. 15 and discussion below). At block 1104, the virtual panel views may be captured (see FIG. 12 and discussion below). At block 1106, virtual panels may be associated with the virtual panel arrangement. At block 1108, the panel arrangement may be serialized (e.g., to data representation 800). At block 1110, the panel arrangement may be associated with the workspace configuration.

Restore virtual panel workflow 1016 may be triggered independently or as part of restore workspace workflow 1012. At block 1112, the virtual panel arrangement is retrieved from storage and deserialized (e.g., from data representation 800). At block 1114, the virtual panel arrangement zoom percent may be set. At block 1116, the virtual panel arrangement audio may be restored (see FIG. 16 and discussion below). At block 1118, virtual panel views may be restored (see FIG. 12 and discussion below).

1. Virtual Panel Views

Figure 12:
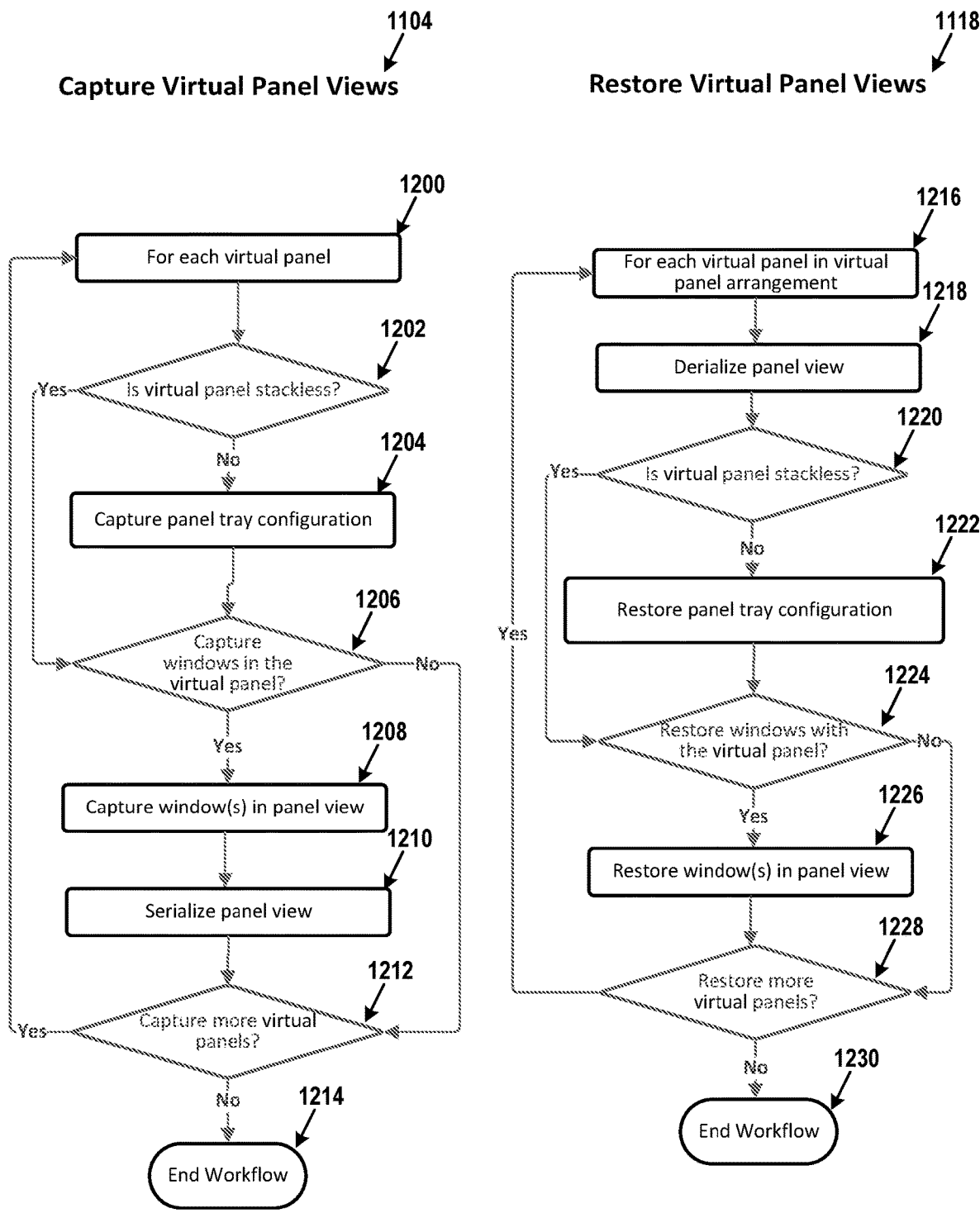
FIG. 12 depicts panel arrangement workflows, in accordance with example embodiments.

FIG. 12 provides two workflows, for saving and restoring virtual panel views, respectively. Other virtual panel view workflows may exist.

Capture virtual panel views workflow 1104 may be triggered independently or as part of capture virtual panel workflow 1002. As indicated by block 1200, capture virtual panel view workflow 1104 applies to each virtual panel configuration of the workspace. At block 1202, it is determined whether the current virtual panel is stackless. If so, control passes to block 1206. If not, then at block 1204 the panel tray configuration for this virtual panel is captured (see FIG. 13 and discussion below).

At block 1206, it is determined whether windows held in the virtual panel are to be captured. If not, then control passes to block 1212. If so, at block 1208 the windows in the virtual panel are captured (see discussion below). At block 1210 the panel view is serialized (e.g., to data representation 800). At block 1212, it is determined whether there are more virtual panels with views that are to be captured. If so, control returns to block 1200. If not, the workflow ends at block 1214.

Restore virtual panel views workflow 1118 may be triggered independently or as part of restore virtual panel arrangement workflow 1016. As indicated by block 1216, restore virtual panel views workflow 1114 applies to each virtual panel configuration of the workspace. At block 1218, the panel view of the current virtual panel is retrieved from storage and deserialized (e.g., from data representation 800). At block 1220, it is determined whether the virtual panel is stackless. If so, control passes to block 1224. If not, then at block 1222 the panel tray configuration for this virtual panel is restored (see FIG. 14 and discussion below).

At block 1224, it is determined whether to windows in the virtual panel are to be restored. If not, then control passes to block 1228. If so, at block 1226 the windows in the virtual panel are restored (see discussion below). At block 1228, it is determined whether there are more virtual panels with views that are to be restored. If so, control returns to block 1216. If not, the workflow ends at block 1230.

2. Panel Tray

Figure 13:
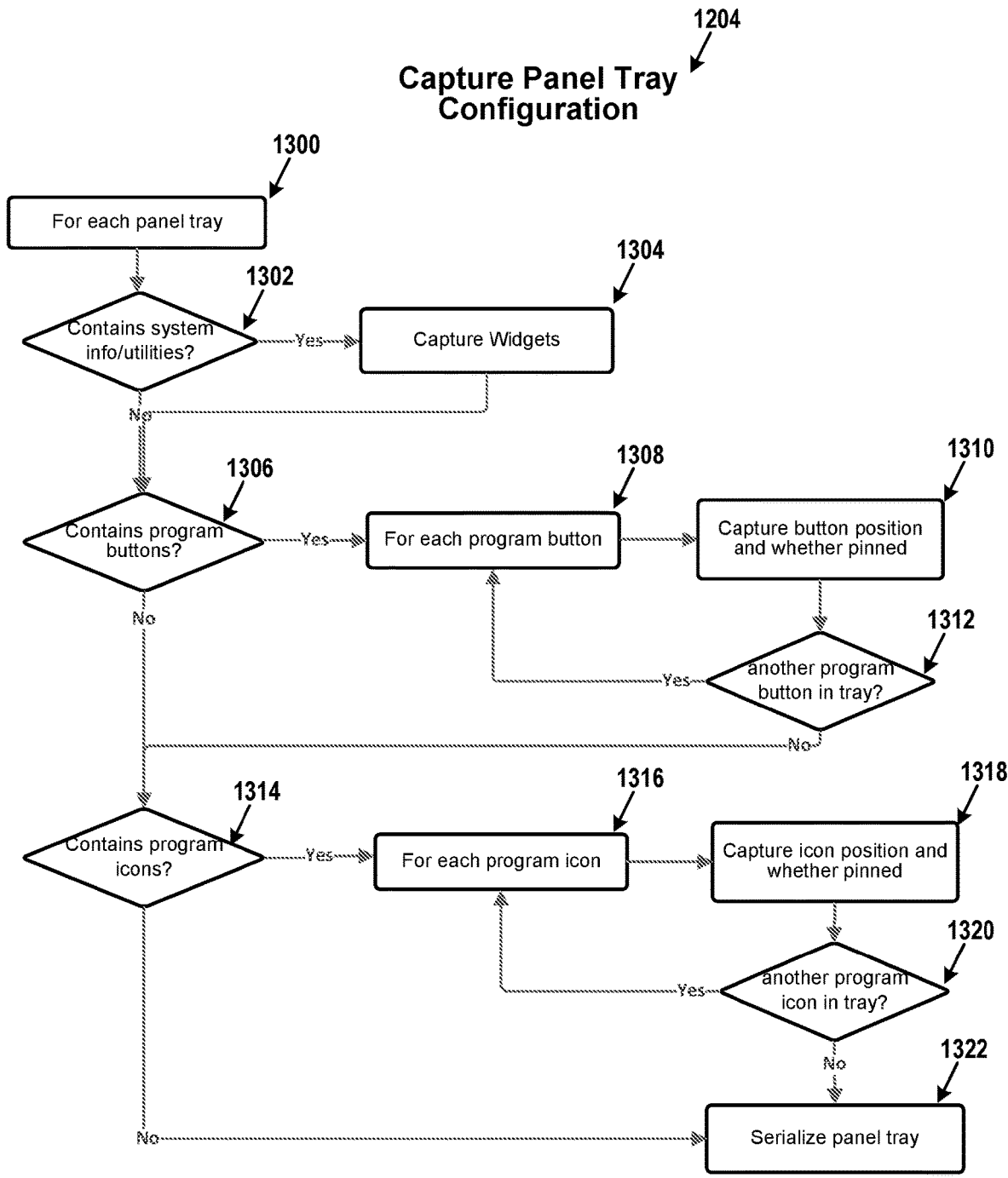
FIG. 13 depicts a capture panel tray workflow, in accordance with example embodiments.

FIG. 13 provides workflow 1204 for capturing a panel tray configuration. The configuration may be captured as part of this workflow or as part of capture virtual panel views workflow 1104, for example. Alternative workflows that address this goal or similar goals may exist.

Capture panel tray configuration workflow 1204 may be triggered independently or as part of capture virtual panel views workflow 1104. As indicated by block 1300, capture panel tray configuration workflow 1204 applies to each virtual panel's panel tray.

At block 1302, it is determined whether the panel tray contains system information and/or utilities. If so, the widget(s) representing these resources are captured at block 1304. Otherwise, control passes to block 1306.

At block 1306, it is determined whether the panel tray contains program buttons. If so, then blocks 1308, 1310, and 1312 iterate through these program buttons, capturing their positions and whether they are pinned. If not, control passes to block 1314.

At block 1314, it is determined whether the panel tray contains program icons. If so, then blocks 1316, 1318, and 1320 iterate through these program icons, capturing their positions and whether they are pinned. If not, control passes to block 1322.

At block 1322, the information about the panel tray is serialized (e.g., to data representation 800).

Figure 14:
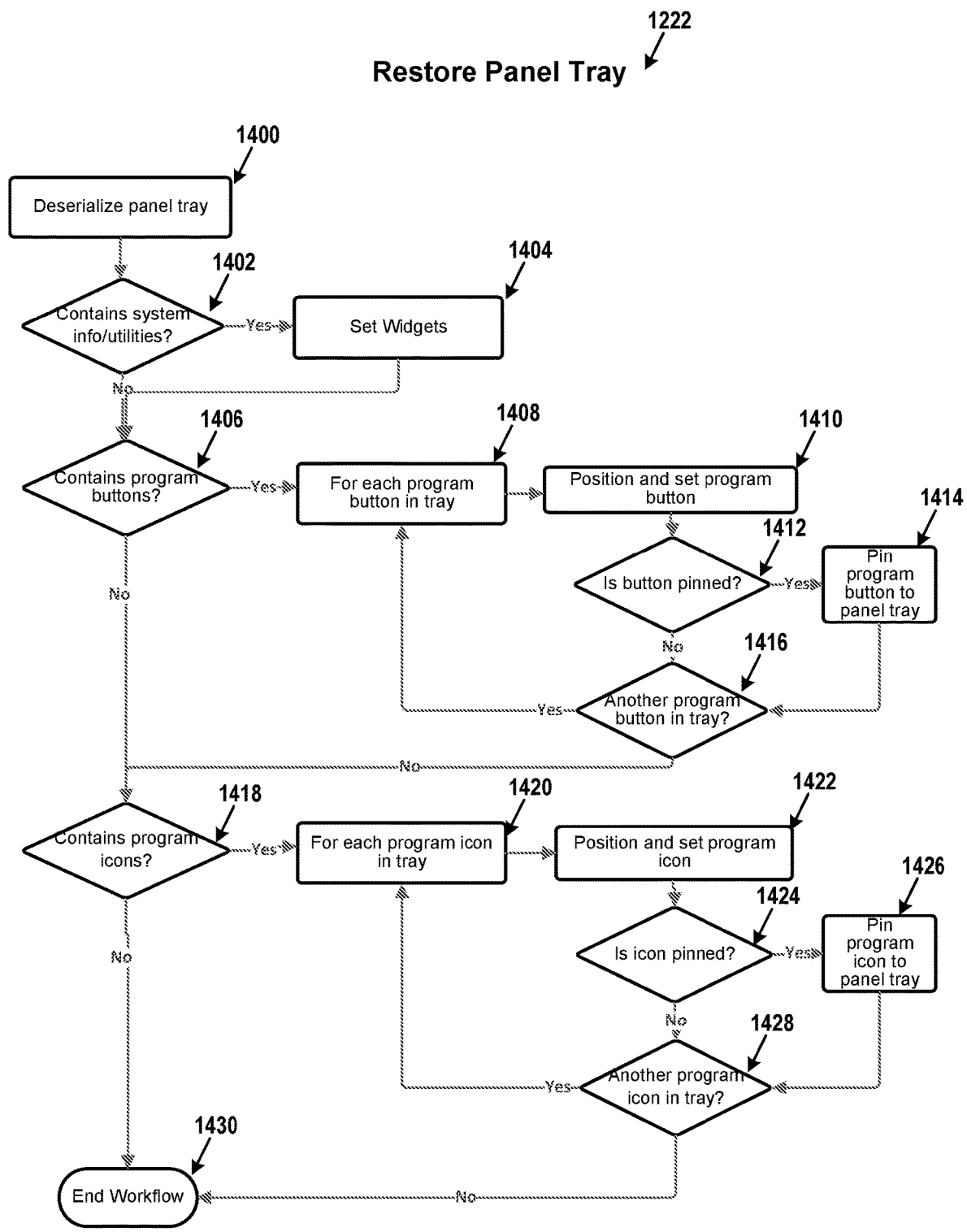
FIG. 14 depicts a restore panel tray workflow, in accordance with example embodiments.

FIG. 14 provides workflow 1222 for restoring a panel tray configuration. The configuration may be retrieved from storage as part of this workflow or as part of restore virtual panel views workflow 1118, for example. Alternative workflows that address this goal or similar goals may exist.

At block 1400, information about the panel tray is deserialized (e.g., from data representation 800).

At block 1402, it is determined whether the information about the panel tray contains system information and/or utilities. If so, the widget(s) representing these resources are set in the panel tray at block 1404. If not, control passes to block 1406.

At block 1406, it is determined whether the information about the panel tray contains program buttons. If so, then blocks 1408, 1410, 1412, 1414, and 1416 iterate through these program buttons, setting their positions and whether they are pinned in the panel tray. If not, control passes to block 1418.

At block 1418, it is determined whether the information about the panel tray contains program icons. If so, then blocks 1420, 1422, 1424, 1426, and 1428 iterate through these program icons, setting their positions and whether they are pinned in the panel tray. If not, control passes to block 1430 which ends the workflow.

3. Virtual Panel Audio

Figure 15:
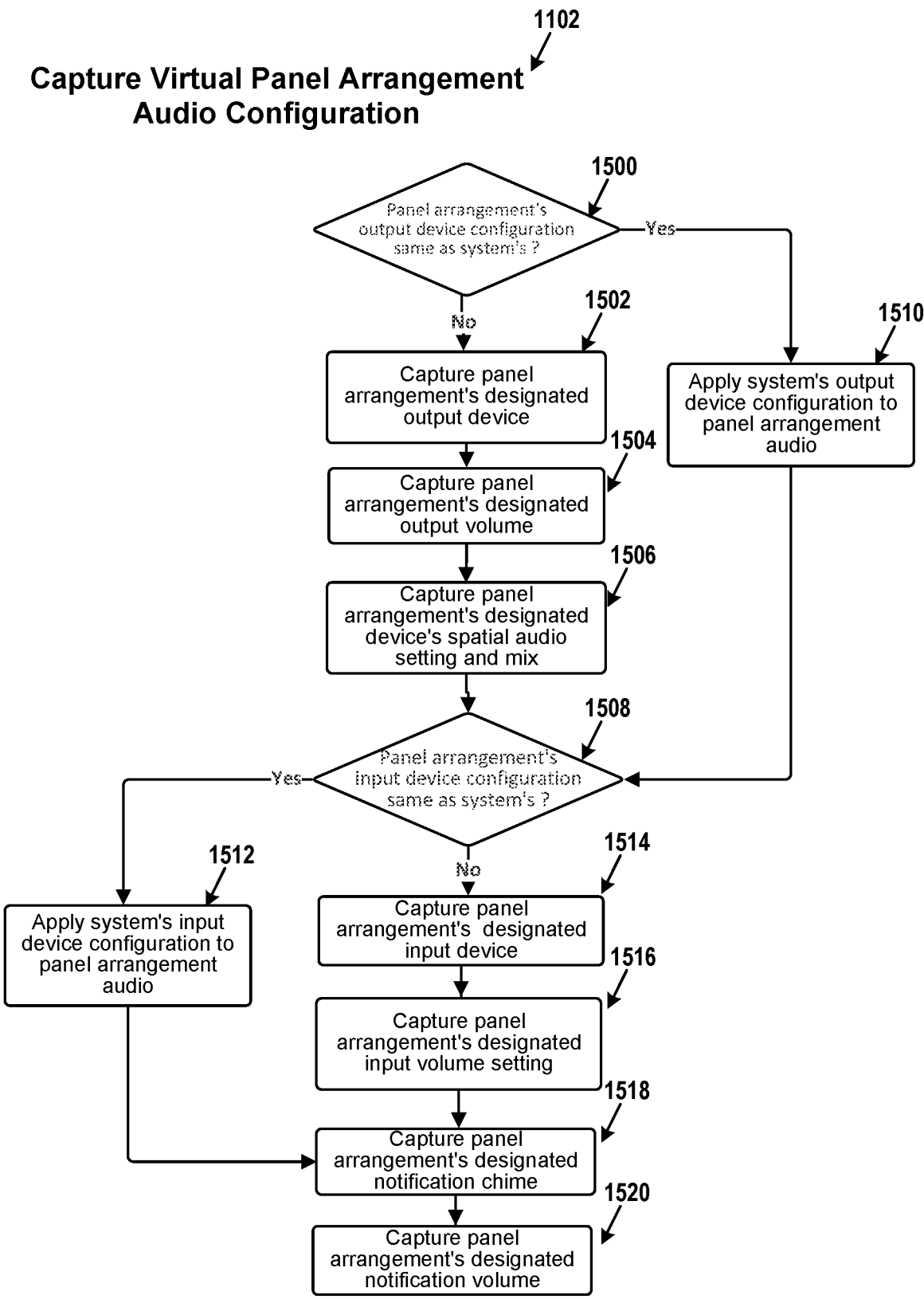
FIG. 15 depicts a capture virtual panel arrangement audio configuration workflow, in accordance with example embodiments.

FIG. 15 provides workflow 1102 for capturing the audio configuration of a virtual panel arrangement. The audio configuration may be serialized and captured as part of this workflow or as part of capture virtual panel arrangement workflow 1002, for example. Alternative workflows that address this goal or similar goals may exist.

At block 1500, it is determined whether the audio output configuration of the virtual panel arrangement is the same as that of the system (i.e., the computing device on which the workspace is being displayed). If so, then at block 1510, the system's output device configuration is applied to the audio configuration of the virtual panel arrangement and control passes to block 1508. Otherwise, blocks 1502, 1504, and 1506 involve capturing the virtual panel arrangement's designated audio output device, volume, and any spatial audio settings or mixes, respectively.

At block 1508, it is determined whether the audio input configuration of the virtual panel arrangement is the same as that of the system. If so, then at block 1512, the system's input device configuration is applied to the audio configuration of the virtual panel arrangement and control passes to block 1518. Otherwise, blocks 1514 and 1516 involve capturing the virtual panel arrangement's designated input device and input volume.

At block 1518, the virtual panel arrangement's designated notification chime is captured. At block 1520, the virtual panel arrangement's designated notification volume is captured.

Figure 16:
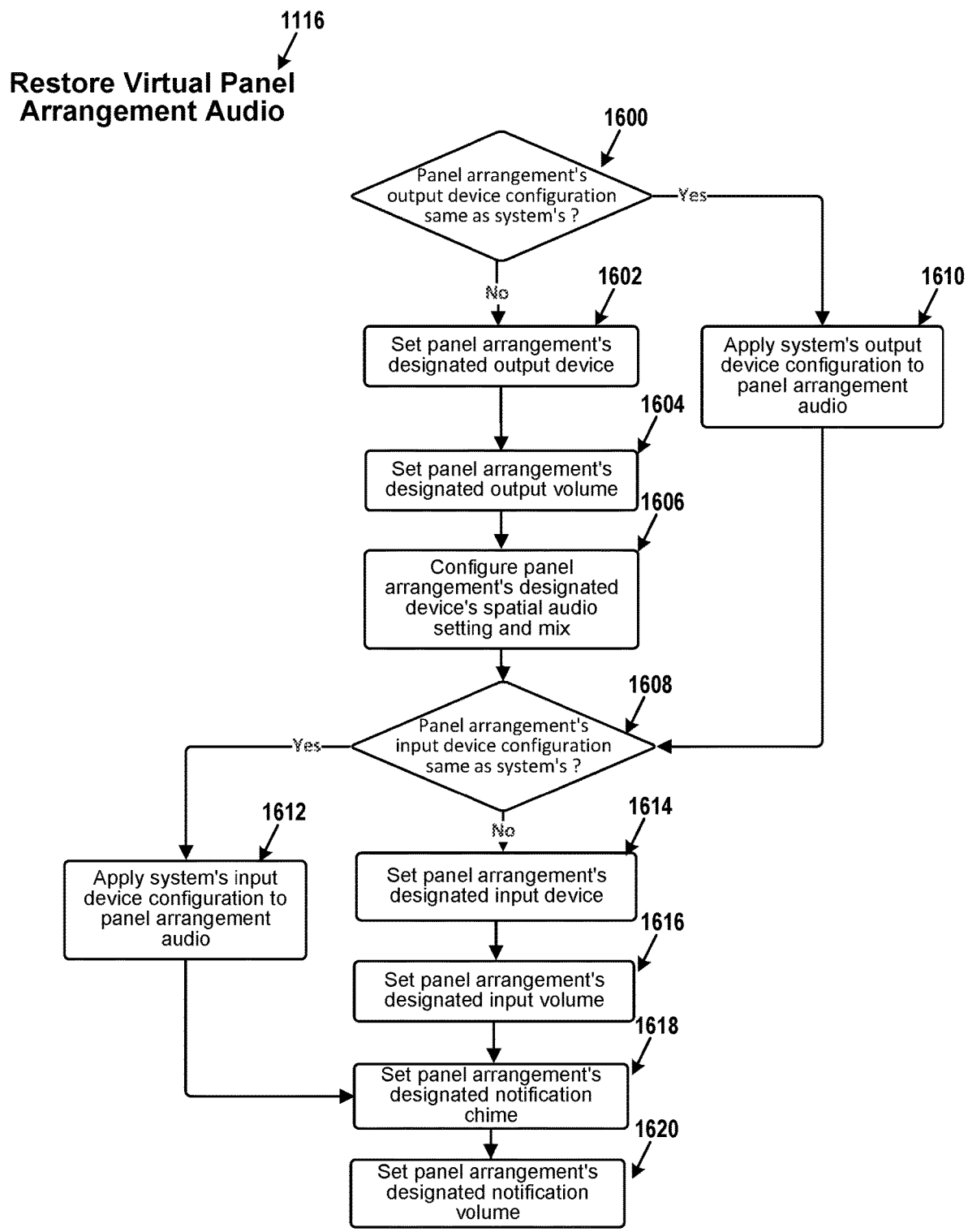
FIG. 16 depicts a restore virtual panel arrangement audio configuration workflow, in accordance with example embodiments.

FIG. 16 provides workflow 1116 for restoring the audio configuration of a virtual panel arrangement. The audio configuration may be retrieved from storage and deserialized as part of this workflow or it may be restored as part of virtual panel arrangement workflow 1116, for example. Alternative workflows that address this goal or similar goals may exist.

At block 1600, it is determined whether the audio output configuration of the virtual panel arrangement is the same as that of the system (i.e., the computing device on which the workspace is being displayed). If so, then at block 1610, the system's output device configuration is applied to the audio configuration of the virtual panel arrangement and control passes to block 1608. Otherwise, blocks 1602, 1604, and 1606 involve setting the virtual panel arrangement's designated audio output device, volume, and any spatial audio settings or mixes, respectively.

At block 1608, it is determined whether the audio input configuration of the virtual panel arrangement is the same as that of the system. If so, then at block 1612, the system's input device configuration is applied to the audio configuration of the virtual panel arrangement and control passes to block 1618. Otherwise, blocks 1614 and 1616 involve setting the virtual panel arrangement's designated input device and input volume.

At block 1618, the virtual panel arrangement's designated notification chime is set. At block 1620, the virtual panel arrangement's designated notification volume is set.

C. Desktop

Figure 17:
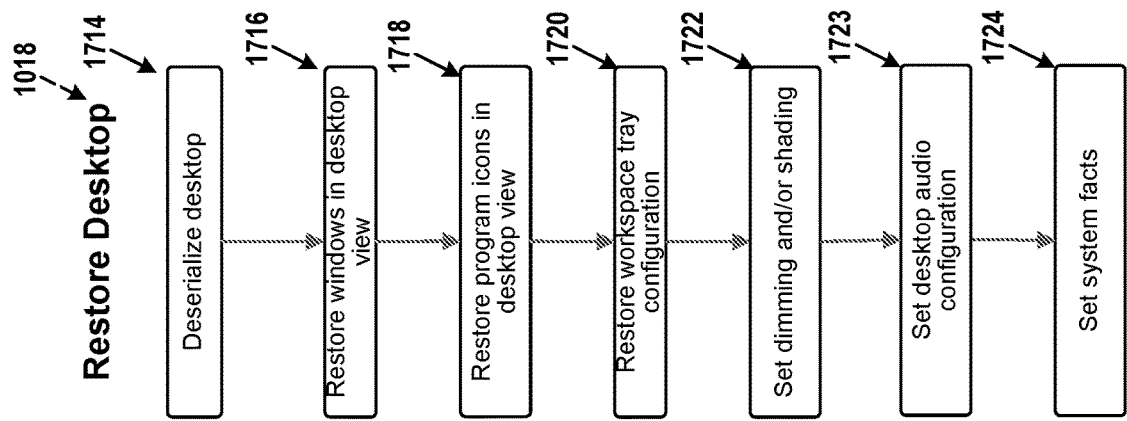
FIG. 17 depicts desktop workflows, in accordance with example embodiments.
Figure 17:
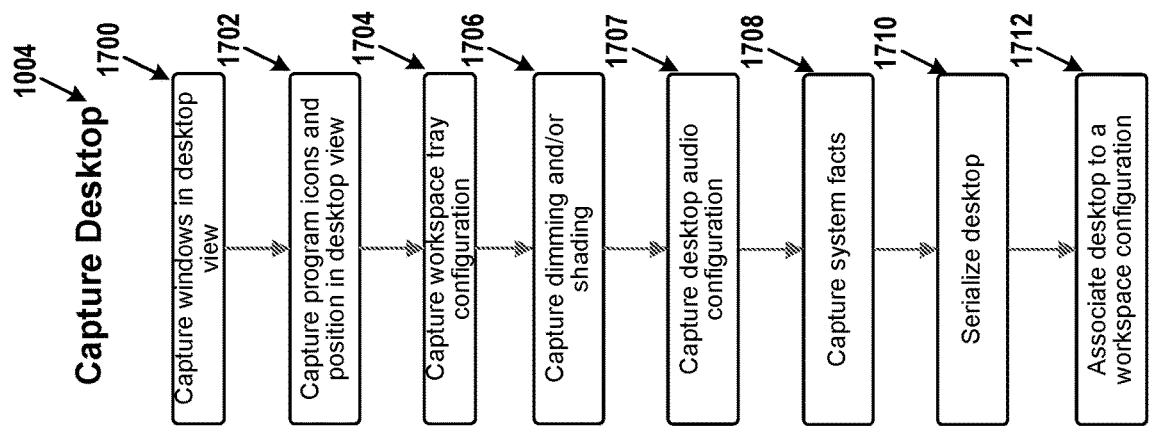

FIG. 17 provides two workflows, for capturing and restoring a desktop, respectively. Other desktop workflows may exist.

Capture desktop workflow 1004 may be triggered independently or as part of capture workspace workflow 1000. At block 1700, the windows in the desktop view are captured. At block 1702, the program icons in the desktop view and their positions are captured. At block 1704, the workspace tray configuration is captured. At block 1706, the workspace dimming, blurring, shading, or other types of defocusing are captured. At block 1707, the desktop audio configuration is captured. At block 1708, the system facts are captured. At block 1710, the captured information about the desktop is serialized (e.g., to data representation 800). At block 1712, the desktop is associated with a workspace configuration.

Restore desktop workflow 1016 may be triggered independently or as part of restore workspace workflow 1012. At block 1714, the desktop information is deserialized (e.g., from data representation 800). At block 1716, windows in the desktop view are restored. At block 1718, program icons in the desktop view are restored. At block 1720, the workspace tray configuration is restored. At block 1722, the workspace dimming, blurring, shading, or other types of defocusing are restored and set. At block 1723, the desktop audio configuration is restored and set. At block 1724, the system facts are restored and set.

1. Workspace Tray

Figure 18A:
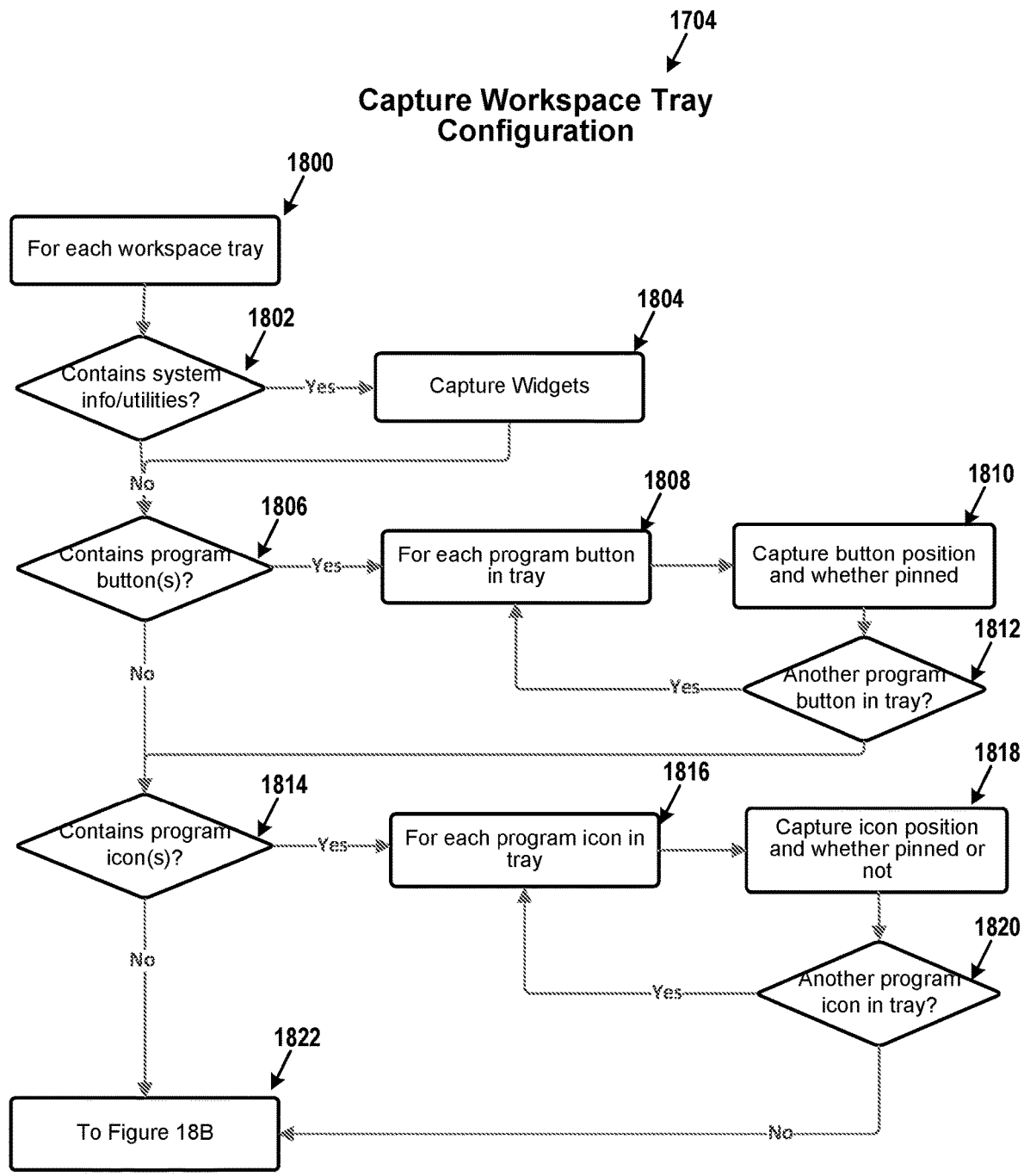
FIGS. 18A and 18B depict a capture workspace tray workflow, in accordance with example embodiments.

FIG. 18A provides workflow 1704 for capturing a workspace tray configuration. The configuration may be captured as part of this workflow or as part of capture desktop workflow 1004, for example. Alternative workflows that address this goal or similar goals may exist.

Capture workspace tray configuration workflow 1704 may be triggered independently or as part of capture desktop workflow 1004. As indicated by block 1800, capture workspace tray configuration workflow 1704 applies to each workspace's workspace tray.

At block 1802, it is determined whether the current workspace tray contains system information and/or utilities. If so, then this information is captured at block 1804. Otherwise, control passes to block 1806.

At block 1806, it is determined whether the workspace tray contains one or more program buttons. If so, then blocks 1808, 1810, and 1812 capture the position of each program button and whether the program button is pinned. Otherwise, control passes to block 1814.

At block 1814, it is determined whether the workspace tray contains one or more program icons. If so, blocks 1816, 1818, and 1820 capture the position of each program icon and whether the program icon is pinned. Otherwise, control may pass to block 1822.

Figure 18B:
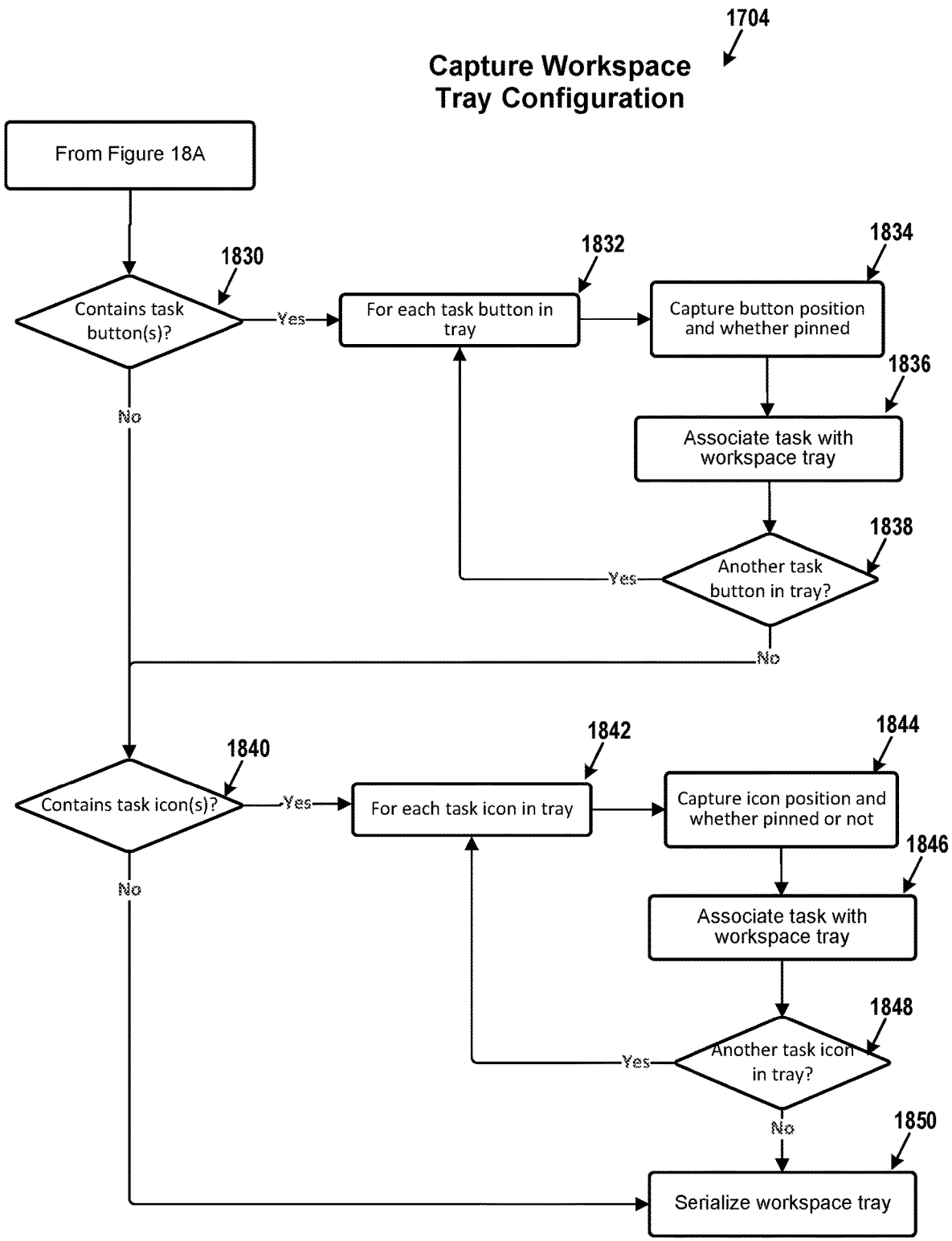

Block 1822 invokes a further part of capture workspace tray configuration workflow 1704 represented in FIG. 18B. This part of the workflow involves capturing task information (if applicable).

At block 1830, it is determined whether the workspace tray contains one or more task buttons. If so, blocks 1832, 1834, 1836, and 1838 capture each task button's position and whether it is pinned, and then associates the task with the workspace tray. Otherwise, control passes to block 1840.

At block 1840, it is determined whether the workspace tray contains one or more task icons. If so, blocks 1842, 1844, 1846, and 1848 capture each task icon's position and whether it is pinned, and then associates the task with the workspace tray. Otherwise, control passes to block 1850.

Block 1850 involves serializing the information representing the workspace tray (e.g., to data representation 800).

Figure 19A:
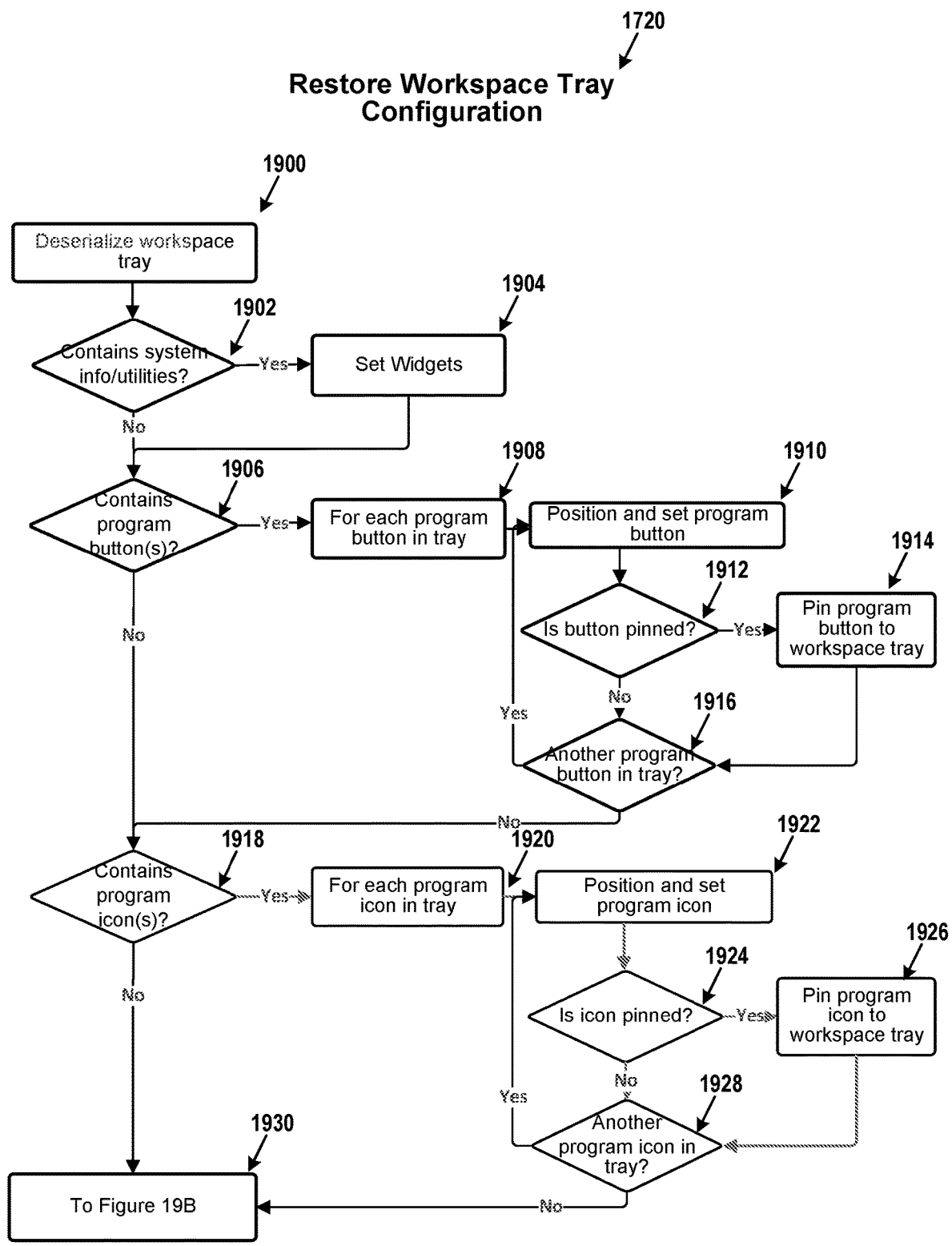
FIGS. 19A and 19B depict a restore workspace tray workflow, in accordance with example embodiments.

FIG. 19 provides workflow 1720 for restoring a workspace tray configuration. The configuration may be restored as part of this workflow or as part of restore desktop workflow 1018, for example. Alternative workflows that address this goal or similar goals may exist.

Restore workspace tray configuration workflow 1720 may be triggered independently or as part of restore desktop workflow 1018. Restore desktop workflow 1018 applies to each workspace tray of a workspace.

Block 1900 involves deserializing the information representing the workspace tray (e.g., from data representation 800).

At block 1902, it is determined whether the configuration contains system information and/or utilities. If so, then this information is set in the workspace tray as widgets at block 1904. Otherwise, control passes to block 1906.

At block 1906, it is determined whether the configuration contains one or more program buttons. If so, then blocks 1908, 1910, 1912, 1914, and 1916 restore the position of each program button and pin the program button to the workspace tray, where applicable. Otherwise, control passes to block 1918.

At block 1918, it is determined whether the configuration contains one or more program icons. If so, then blocks 1920, 1922, 1924, 1926, and 1928 restore the position of each program icon and pin the program icon to the workspace tray, where applicable. Otherwise, control may pass to block 1930.

Figure 19B:
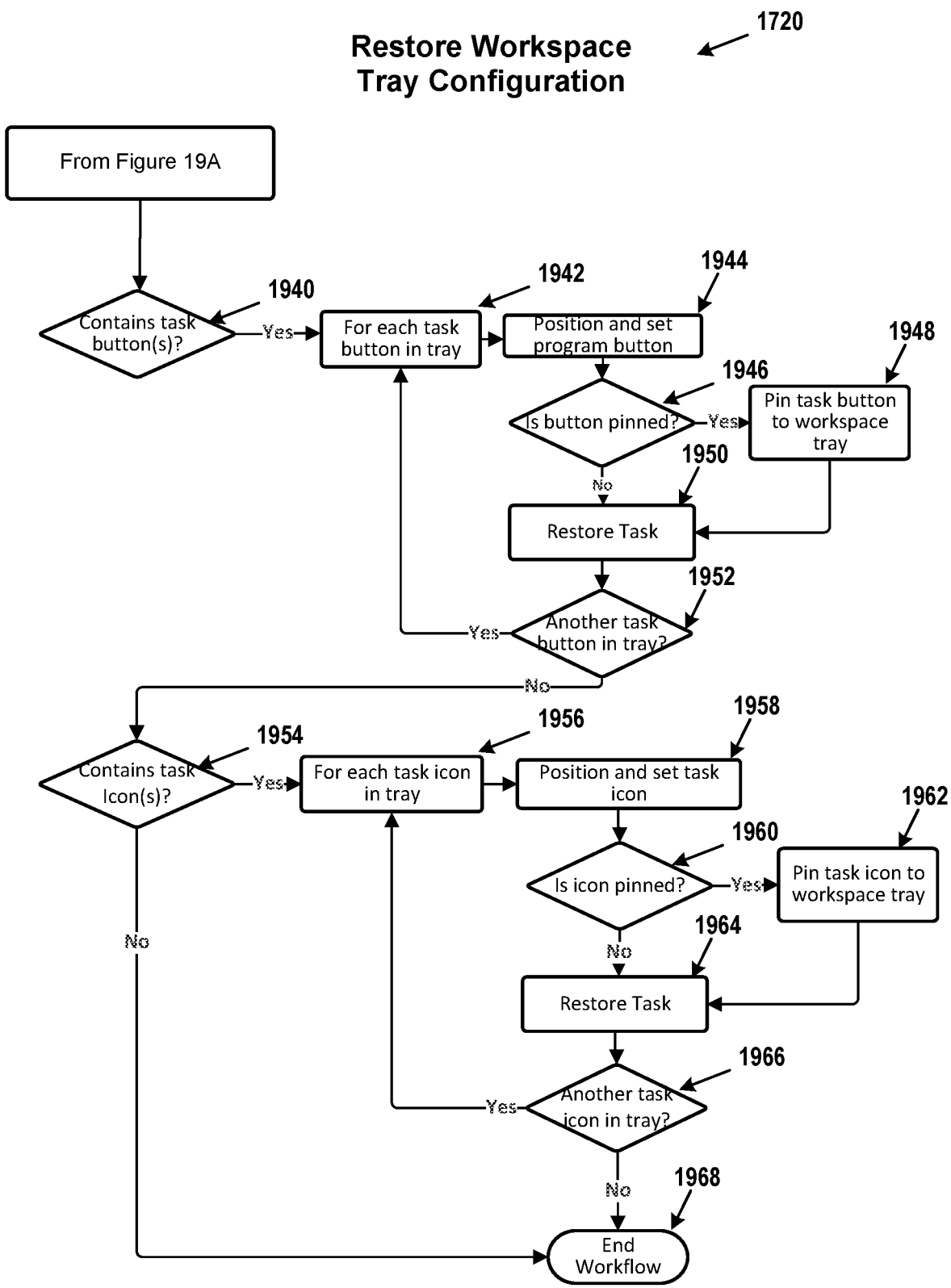

Block 1930 invokes a further part of restore workspace tray configuration workflow 1720 represented in FIG. 19B. This part of the workflow involves restoring task information (if applicable).

At block 1940, it is determined whether the configuration includes one or more task buttons. If so, blocks 1942, 1944, 1946, 1948, 1950, and 1952 restore the position of each task button and pin it to the workspace tray, where applicable. Otherwise, control passes to block 1954.

At block 1954, it is determined whether the configuration contains one or more task icons. If so, blocks 1956, 1958, 1960, 1962, 1964, and 1966 restore each task icon's position and pin it to the workspace tray, where applicable. Otherwise, control passes to block 1968.

2. Desktop Audio

Figure 20:
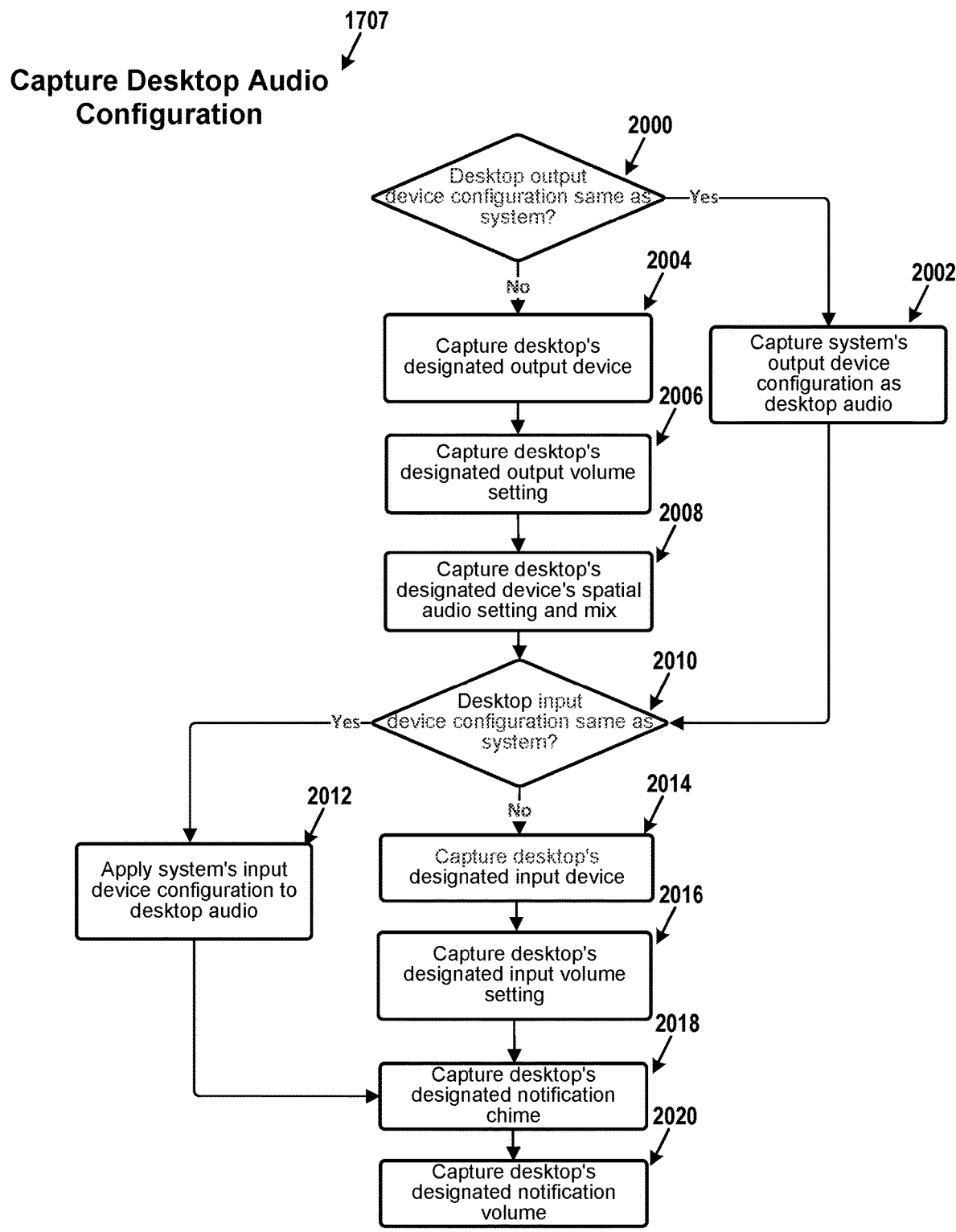
FIG. 20 depicts a capture desktop audio workflow, in accordance with example embodiments.

FIG. 20 provides workflow 1707 for capturing the audio configuration of a desktop. The configuration may be captured as part of this workflow or as part of capture desktop workflow 1004, for example. Alternative workflows that address this goal or similar goals may exist. Capture desktop audio configuration workflow 1707 may be triggered independently or as part of capture desktop workflow 1004.

At block 2000, it is determined whether the desktop audio output device configuration is the same as that of the system (i.e., the computing device on which the workspace is being displayed). If so, then at block 2002 the system's audio output device configuration is captured as the desktop audio output and control passes to block 2010. If not, then at blocks 2004, 2006, and 2008, the desktop's designated output device, its output volume setting, and its spatial audio settings are mixed and captured, respectively.

At block 2010, it is determined whether the desktop audio input device configuration is the same as that of the system If so, then at block 2012 the system's audio input device configuration is captured as the desktop audio input and control passes to block 2018. If not, then at blocks 2014 and 2016, the desktop's designated audio input device and its input volume setting are captured, respectively.

At block 2018, the desktop's designated notification chime is captured. At block 2020, the desktop's designated notification volume is captured. All the captured information may be serialized (e.g., to data representation 800).

Figure 21:
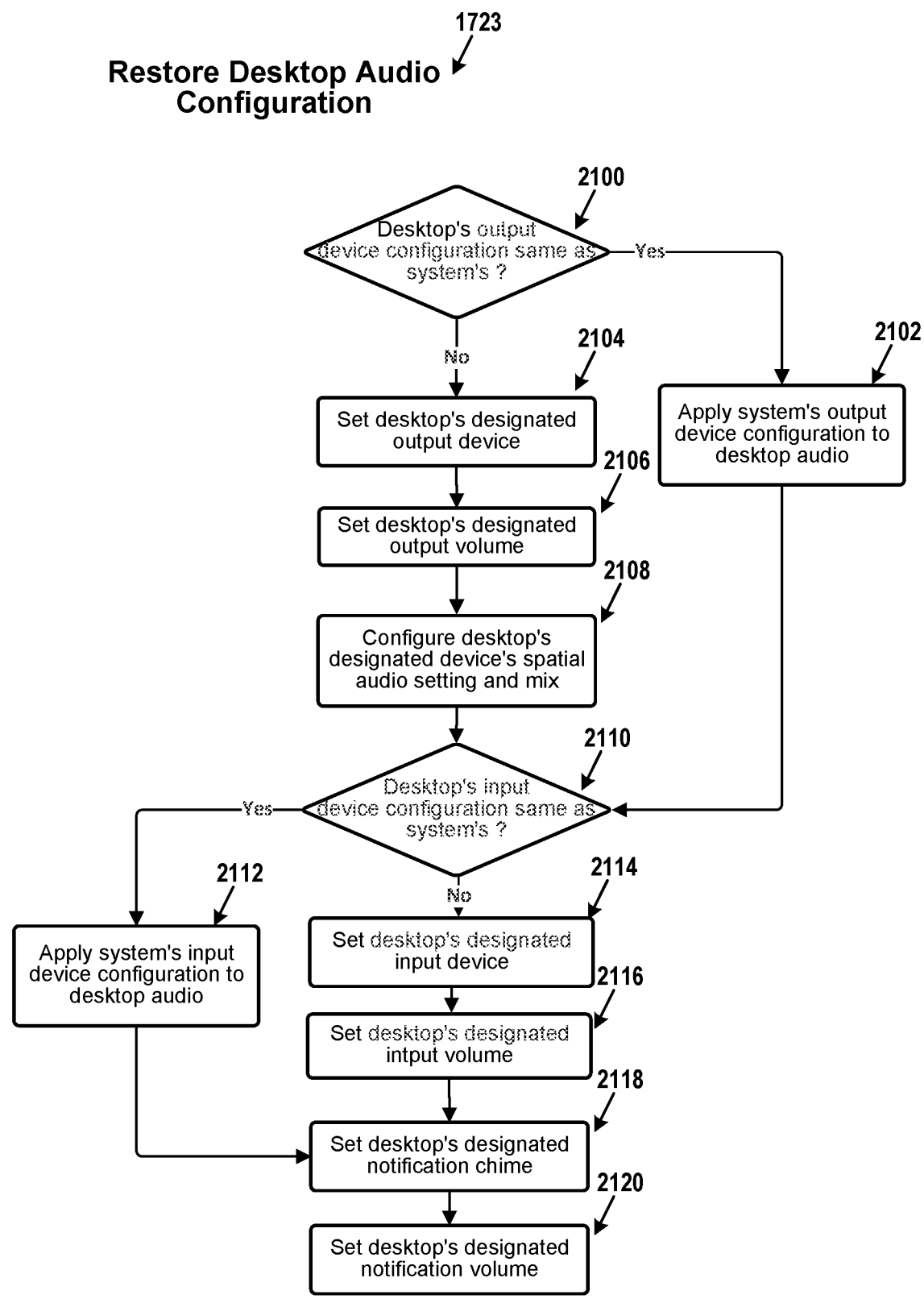
FIG. 21 depicts a restore desktop audio workflow, in accordance with example embodiments.

FIG. 21 provides workflow 1723 for restoring the audio configuration of a desktop. The configuration may be restored as part of this workflow or as part of restore desktop workflow 1018, for example. Alternative workflows that address this goal or similar goals may exist. Restore desktop audio configuration workflow 1723 may be triggered independently or as part of restore desktop workflow 1018. All of the restored information may be deserialized (e.g., from data representation 800).

At block 2100, it is determined whether the desktop audio output device configuration is the same as that of the system (i.e., the computing device on which the workspace is being displayed). If so, then at block 2102 the system's audio output device configuration is restored to the desktop audio output and control passes to block 2110. If not, then at blocks 2104, 2106, and 2108, the desktop's designated output device, its output volume setting, and its spatial audio settings are mixed and restored, respectively.

At block 2110, it is determined whether the desktop audio input device configuration is the same as that of the system. If so, then at block 2112 the system's audio input device configuration is restored to the desktop audio input and control passes to block 2118. If not, then at blocks 2114 and 2116, the desktop's designated audio input device and its input volume setting are restored, respectively.

At block 2118, the desktop's designated notification chime is restored. At block 2120, the desktop's designated notification volume is restored.

D. Tasks

Figure 22:
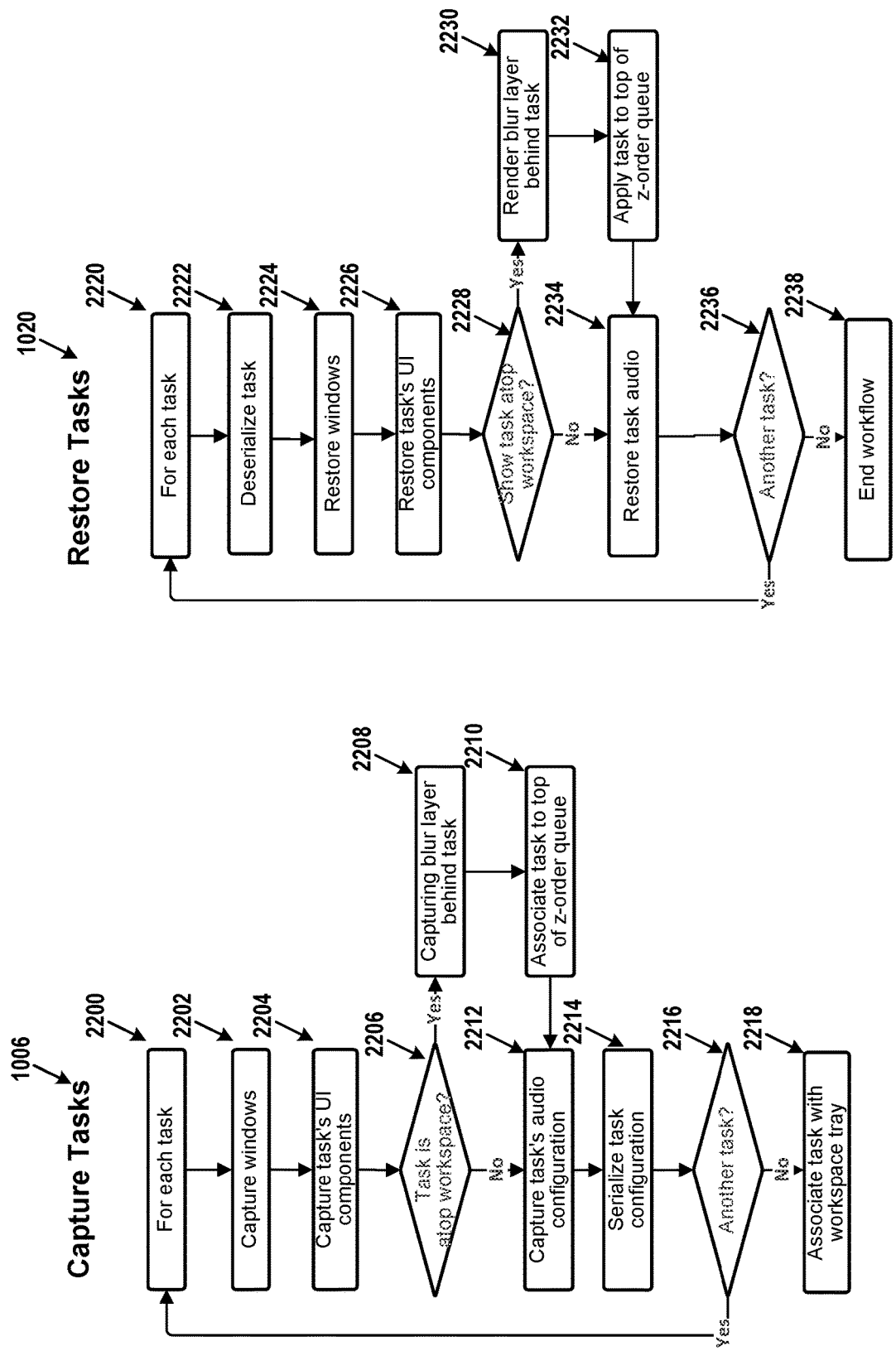
FIG. 22 depicts capture tasks and restore tasks workflows, in accordance with example embodiments.

FIG. 22 provides two workflows, for saving and restoring tasks, respectively. Other task workflows may exist.

Capture tasks workflow 1006 may be triggered independently or as part of capture workspace workflow 1000. As indicated by block 2200 and block 2216, the steps of this workflow may be carried out for each task. At block 2202, information relating to the window(s) of a task is captured. At block 2204, the task's user interface (UI) components are captured (see FIG. 25 and discussion below).

At block 2206, it is determined whether the task is shown atop a workspace. If so, block 2208 involves capturing the configuration of the blurred (or otherwise defocused) layer on which the task exists, and block 2210 involves associating the task with the top of a z-dimension queue of workspace layers (where the z-dimension is in and out of the display in a direction that is perpendicular to the display's screen). Otherwise, control passes to block 2212.

At block 2212, the task's audio configuration is captured (see FIG. 23 and discussion below). At block 2214, the task's configuration is serialized (e.g., to data representation 800). At block 2218, the task is associated with the workspace tray from which it was captured.

Restore tasks workflow 1020 may be triggered independently or as part of restore workspace workflow 1012. As indicated by block 2220 and block 2236, the steps of this workflow may be carried out for each task. At block 2222, the task's configuration is deserialized (e.g., from data representation 800). At block 2224, the task's windows are restored. At block 2226, the task's UI components are restored (see FIG. 25 and discussion below).

At block 2228, it is determined whether the task is to be shown atop a workspace. If so, block 2230 involves rendering the blur layer (e.g., a workspace) behind the task, and block 2232 involves associating the task with the top of a z-dimension queue of workspace layers. Otherwise, control passes to block 2234.

Task 2234 involves restoring the task's audio (see FIG. 24 and discussion below). Block 2238 ends the workflow.

1. Task Audio

Figure 23:
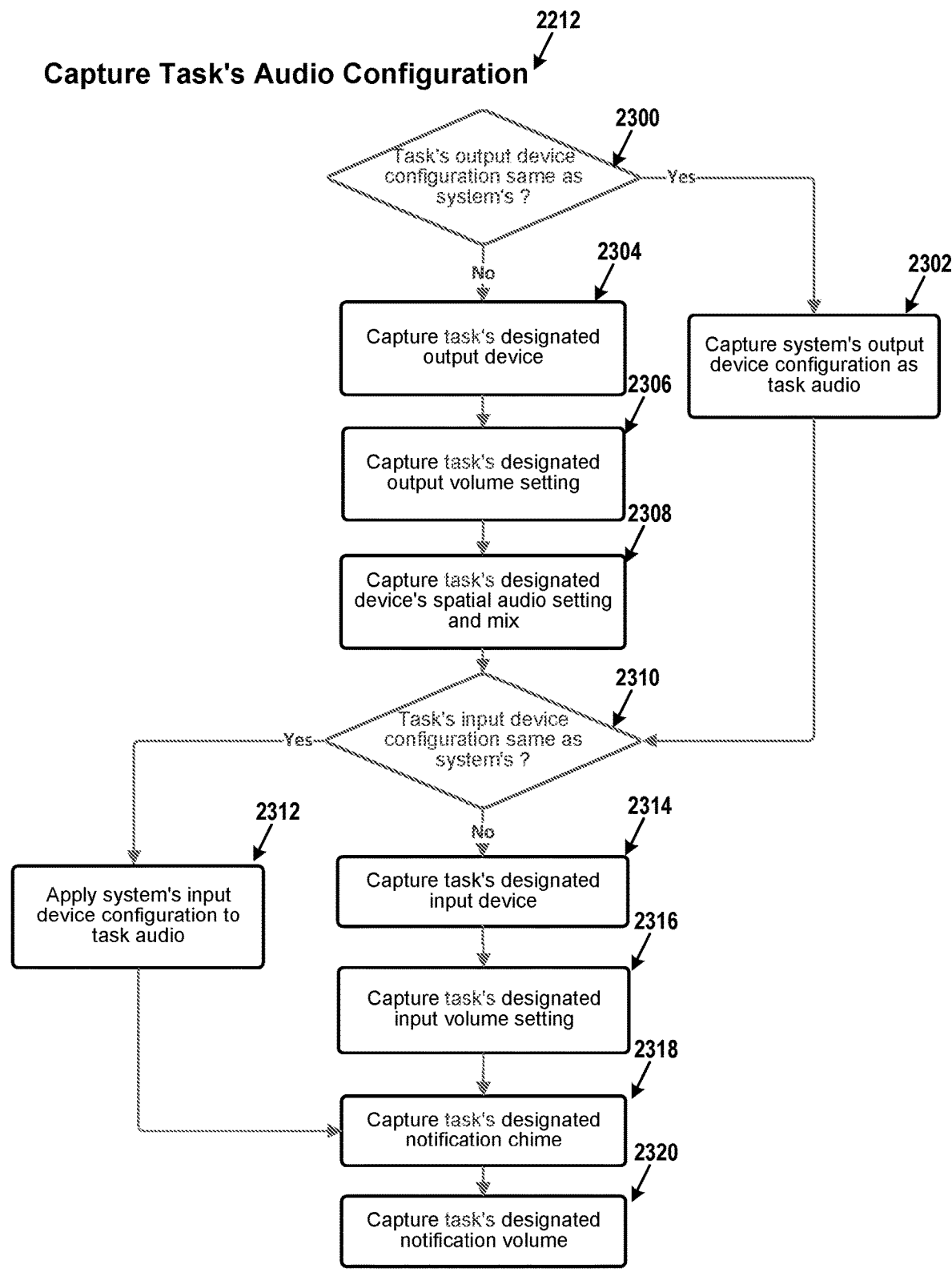
FIG. 23 depicts a capture task audio workflow, in accordance with example embodiments.

FIG. 23 provides workflow 2212 for capturing the audio configuration of a task. The configuration may be captured as part of this workflow or as part of capture tasks workflow 1006, for example. Alternative workflows that address this goal or similar goals may exist. Capture desktop audio workflow 2212 may be triggered independently or as part of capture tasks workflow 1006.

At block 2300, it is determined whether the task's audio output device configuration is the same as that of the system (i.e., the computing device on which the workspace is being displayed). If so, block 2302 involves capturing the system's audio output device configuration and applying it to the task's audio output configuration, and then control passes to block 2310. Otherwise, control passes to block 2304.

At block 2304, the task's designated audio output device is captured. At block 2306, the task's designated audio output volume setting is captured. At block 2308, the task's designated spatial audio settings and mix are captured.

At block 2310, it is determined whether the task's audio input device configuration is the same as that of the system. If so, block 2312 involves capturing the system's audio input device configuration and applying it to the task's audio input configuration and control passes to block 2318. Otherwise, control passes to block 2314.

At block 2314, the task's designated audio input device is captured. At block 2316, the task's designated audio input volume setting is captured.

At block 2318, the task's designated notification chime is captured. At block 2320, the task's designated notification volume is captured.

This captured task audio information may be serialized (e.g., to data representation 800), and stored locally and/or remotely.

Figure 24:
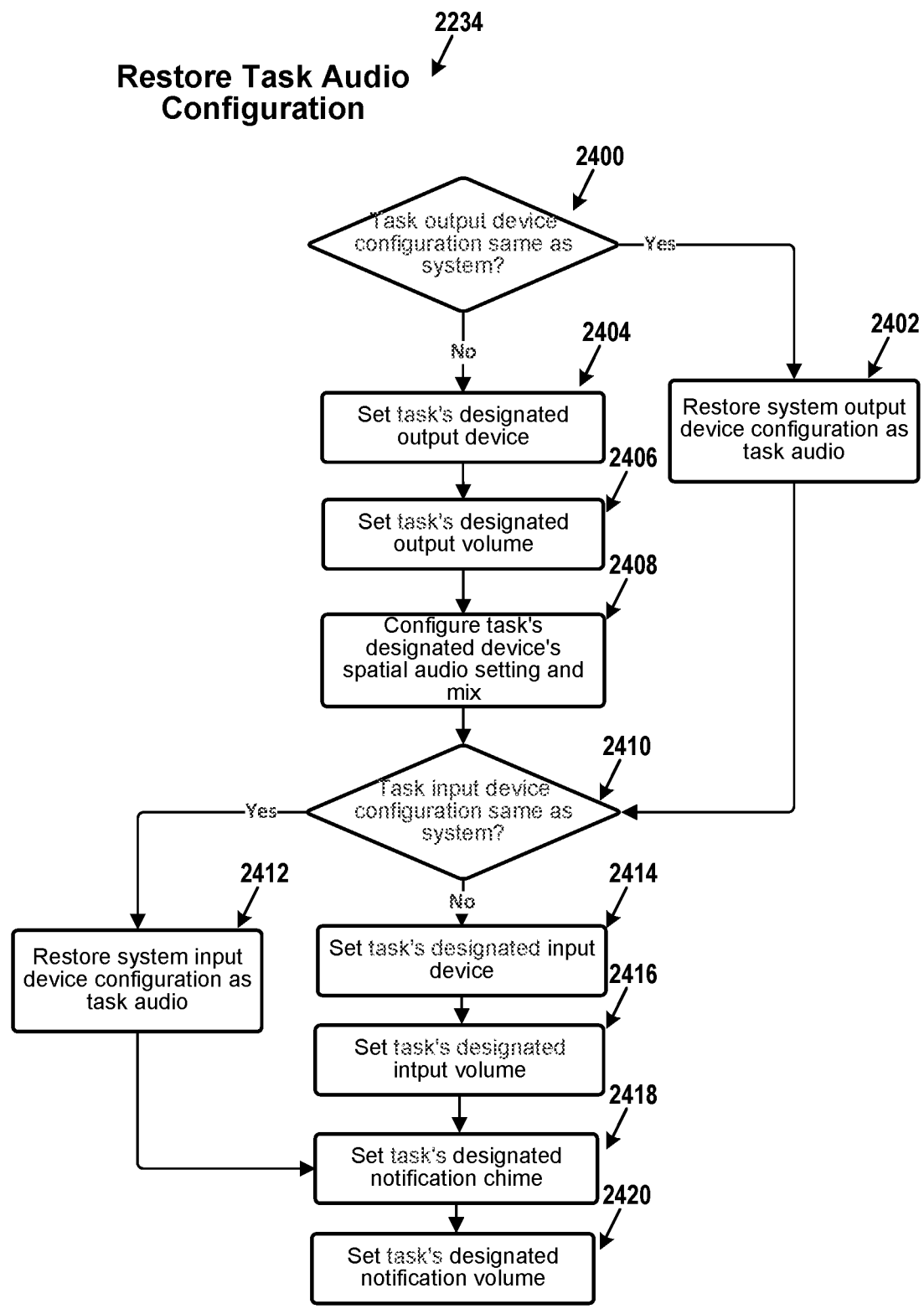
FIG. 24 depicts a restore task audio workflow, in accordance with example embodiments.

FIG. 24 provides workflow 2234 for restoring the audio configuration of a task. The configuration may be restored as part of this workflow or as part of restore tasks workflow 1020, for example. Alternative workflows that address this goal or similar goals may exist. Restore task audio workflow 2234 may be triggered independently or as part of capture tasks workflow 1006.

At block 2400, it is determined whether the task's audio output device configuration is the same as that of the system (i.e., the computing device on which the workspace is being displayed). If so, block 2402 involves restoring the system's audio output device configuration and applying it to the task's audio output configuration and control passes to block 2410. Otherwise, control passes to block 2404.

At block 2404, the task's designated audio output device is restored. At block 2406, the task's designated audio output volume setting is restored. At block 2408, the task's designated spatial audio settings and mix are restored.

At block 2410, it is determined whether the task's audio input device configuration is the same as that of the system. If so, block 2412 involves restoring the system's audio input device configuration as the task's audio input configuration, and then control passes to block 2418. Otherwise, control passes to block 2414.

At block 2414, the task's designated audio input device is restored. At block 2416, the task's designated audio input volume setting is restored.

At block 2418, the task's designated notification chime is restored. At block 2420, the task's designated notification volume is restored.

2. Task UI Components

Figure 25:
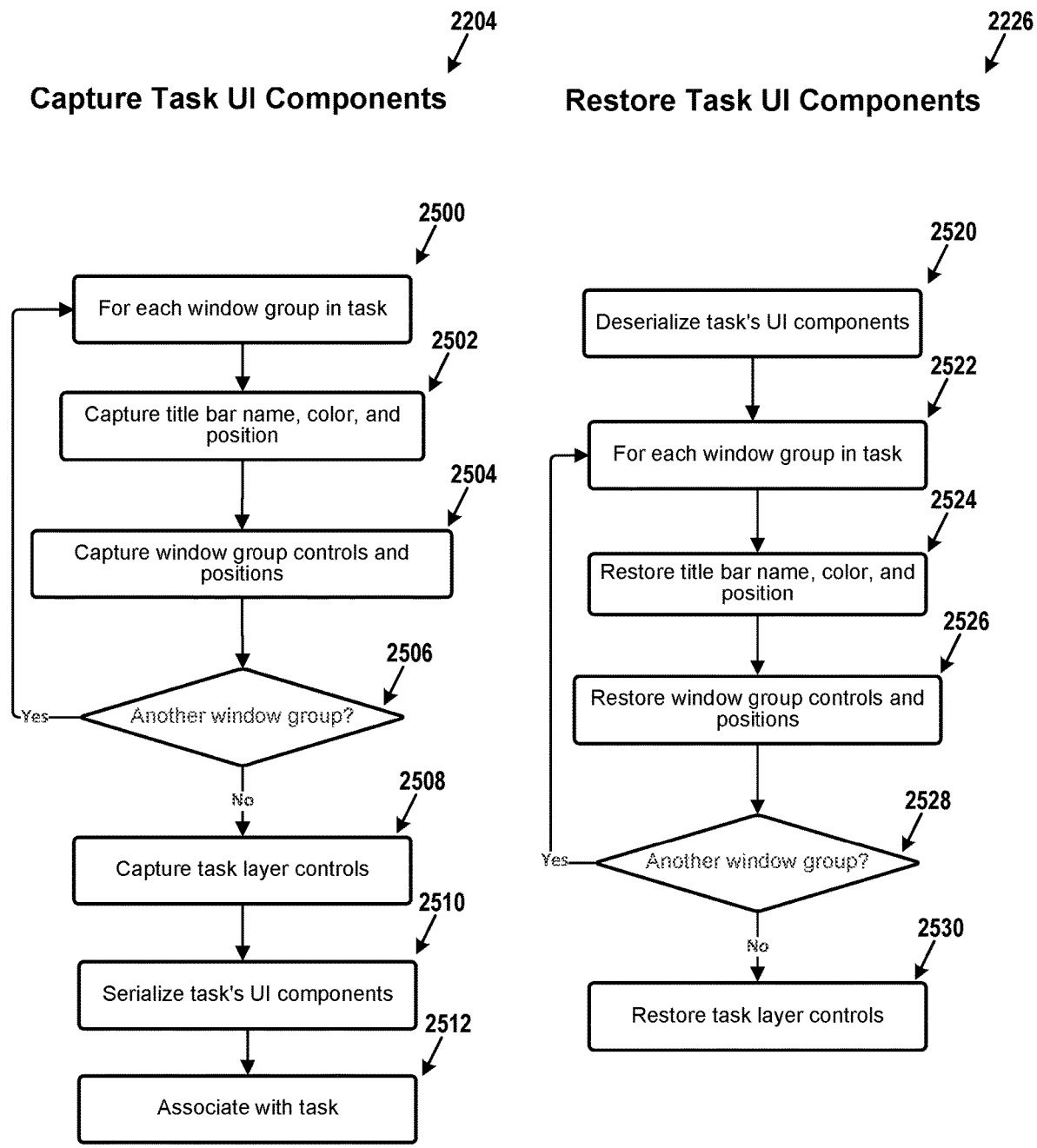
FIG. 25 depicts capture task UI components and restore task UI components workflows, in accordance with example embodiments.

FIG. 25 provides two workflows, for capturing the UI components of a task and for restoring the UI components of a task, respectively. Other workflows related to task UI components may exist.

Capture task UI components workflow 2204 may be triggered independently or as part of capture tasks workflow 1006. As indicated by blocks 2500 and 2506, blocks 2502 and 2504 are carried out for each window group in a task, where applicable. Particularly, block 2502 involves capturing the title bar name, color and position of the window group, and block 2504 involves capturing the window group's controls and position. Block 2508 involves capturing task layer controls, block 2510 involves serializing the captured UI components (e.g., to data representation 800), and block 2512 involves associating these captured UI components with the task.

Restore task UI components workflow 2226 may be triggered independently or as part of restore tasks workflow 1020. Block 2520 involves deserializing the task's UI components (e.g., from data representation 800). As indicated by blocks 2522 and 2528, blocks 2524 and 2526 are carried out for each window group in a task. Particularly, block 2524 involves restoring the title bar name, color, and position of the window group, and block 2526 involves restoring the window group's controls and position. Block 2530 involves restoring task layer controls.

E. System Facts

Figure 26:
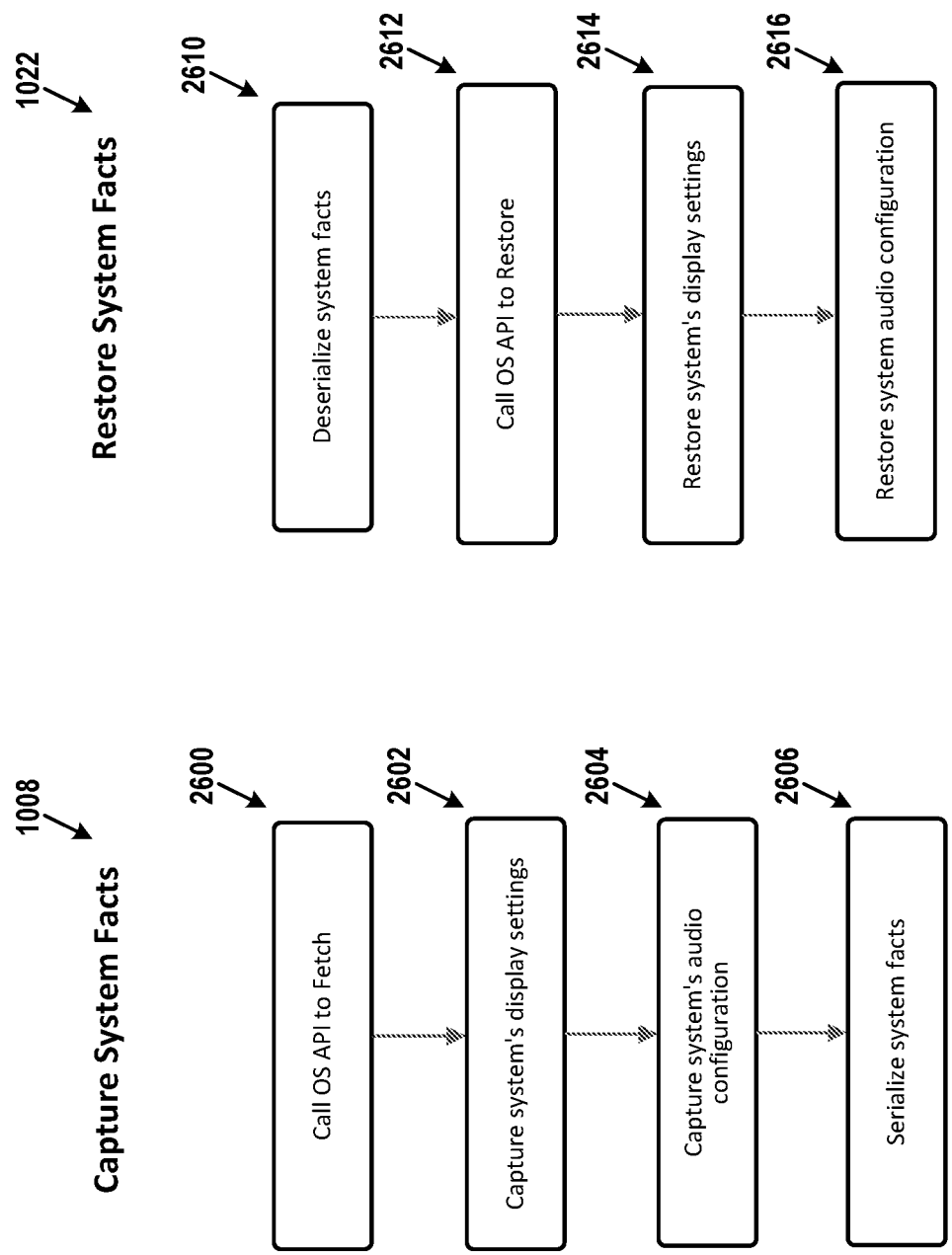
FIG. 26 depicts capture system facts and restore system facts workflows, in accordance with example embodiments.

FIG. 26 provides two workflows, for saving and restoring system facts, respectively. Other system facts workflows may exist.

Capture system facts workflow 1008 may be triggered independently or as part of capture workspace workflow 1000. At block 2600, a call to an API of the underlying operating system is made to access the system facts. This may be a system call supported by a code library, for example. At block 2602, the system's active display settings are captured (see FIG. 27 and discussion below). At block 2604, the system's active audio configuration is captured (see FIG. 29 and discussion below). At block 2606, these system facts are serialized (e.g., to data representation 800). This information as serialized may be saved locally and/or remotely.

Restore system facts workflow 1022 may be triggered independently or as part of restore workspace workflow 1012. At block 2610, stored system facts are deserialized (e.g., from data representation 800). The system facts may be stored locally or remotely. At block 2612, a call to an API of the underlying operating system is made to set the system facts. This may be a system call supported by a code library, for example. At block 2614, the system's active display settings are set (see FIG. 28 and discussion below). At block 2616, the system's active audio configuration is set (see FIG. 29 and discussion below).

1. Display

Figure 27:
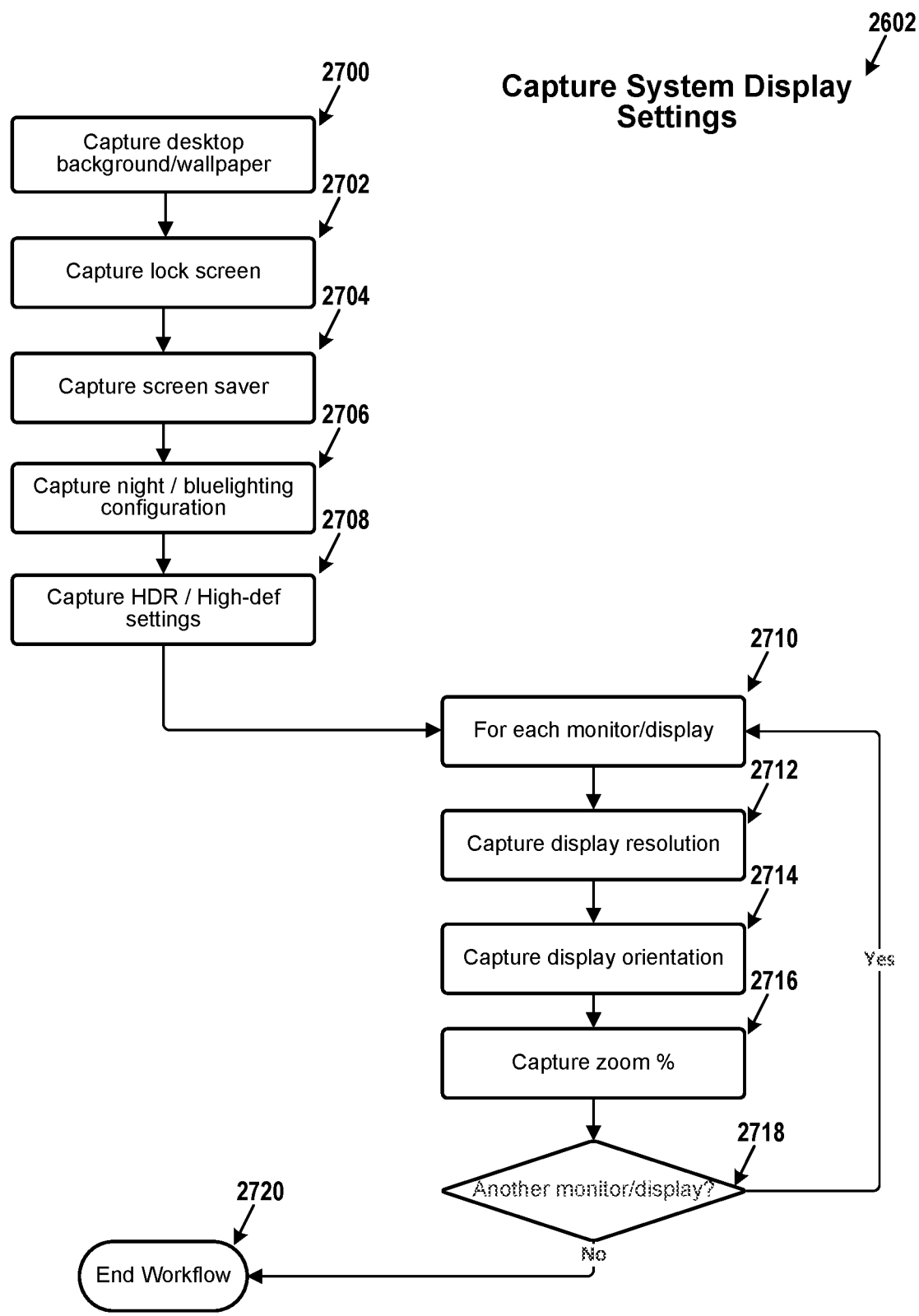
FIG. 27 depicts a capture system display settings workflow, in accordance with example embodiments.

FIG. 27 provides workflow 2602 for capturing system display settings. These settings may be captured as part of this workflow or as part of capture system facts workflow 1008, for example. Alternative workflows that address this goal or similar goals may exist. Capture system display settings workflow 2602 may be triggered independently or as part of capture system facts workflow 1008.

At block 2700, the desktop background/wallpaper is captured. At block 2702, the lock screen settings are captured. At block 2704, the screen saver configuration is captured. At block 2706, the night/blue lighting configuration is captured. At block 2708, the HDR settings are captured. Blocks 2710 and 2718 iterate through each display configured on and/or attached to the system. At blocks 2712, 2714, and 2716, the display resolution, display orientation, and zoom percent are captured. The workflow ends at block 2720.

Figure 28:
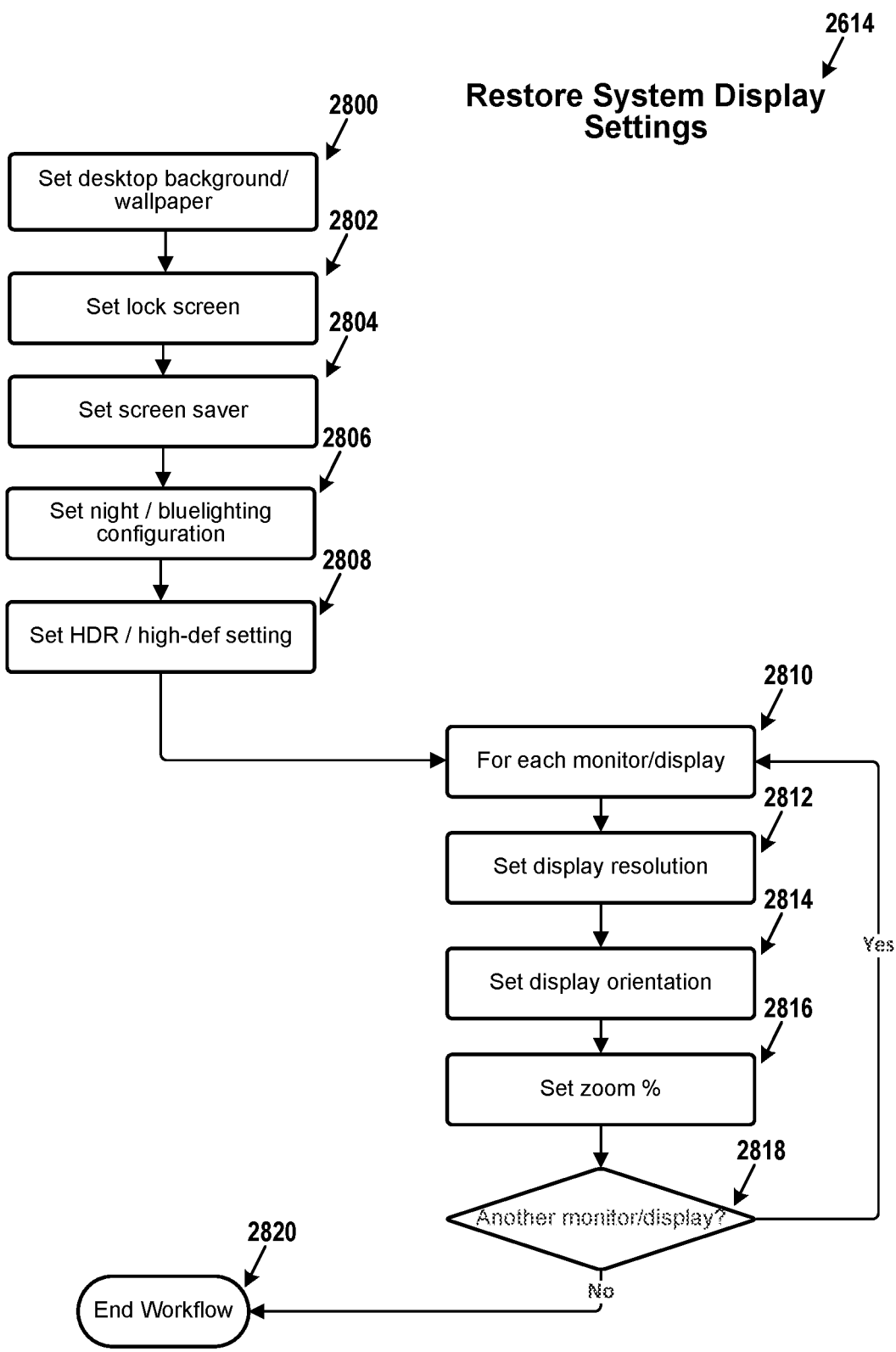
FIG. 28 depicts a restore system display settings workflow, in accordance with example embodiments.

FIG. 28 provides workflow 2614 for restoring system display settings. These settings may be restored as part of this workflow or as part of restore system facts workflow 1008, for example. Alternative workflows that address this goal or similar goals may exist. Restore system display settings workflow 2614 may be triggered independently or as part of restore system facts workflow 1008.

At block 2800, the desktop background/wallpaper is restored. At block 2802, the lock screen settings are restored. At block 2804, the screen saver configuration is restored. At block 2806, the night/blue lighting configuration is restored. At block 2808, the HDR settings are restored. Blocks 2810 and 2818 iterate through each display configured on and/or attached to the system. At blocks 2812, 2814, and 2816, the display resolution, display orientation, and zoom percent are restored. The workflow ends at block 2820.

2. Audio

Figure 29:
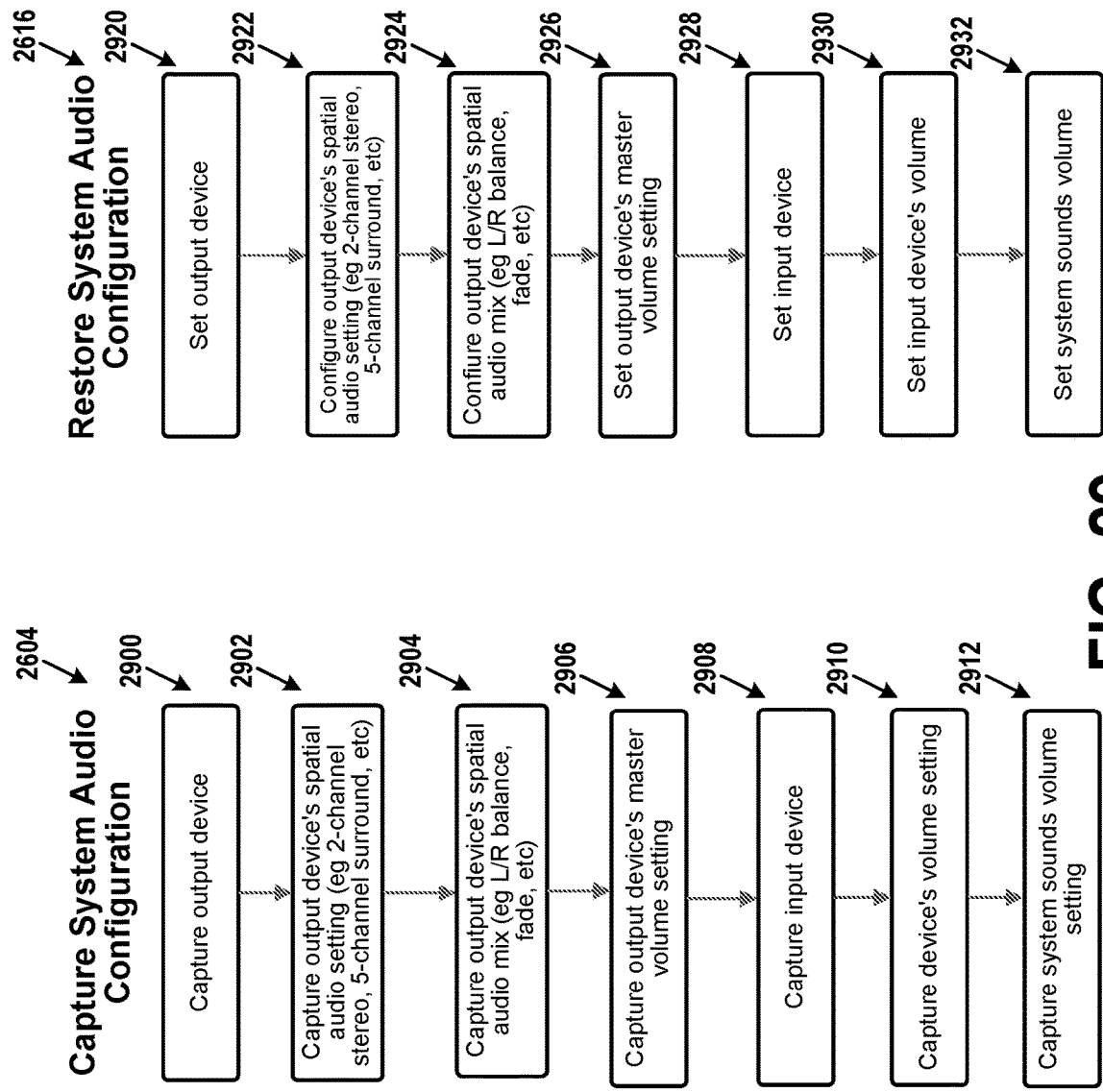
FIG. 29 depicts capture system audio configuration and restore system audio configuration workflows, in accordance with example embodiments.

FIG. 29 provides two workflows, for saving and restoring system facts, respectively. Other system facts workflows may exist.

Capture system audio configuration workflow 2604 may be triggered independently or as part of capture system facts workflow 1008. At block 2900 the audio output device configuration is captured. At block 2902, the audio output device's spatial audio settings are captured. At block 2904, the audio output device's spatial audio mix is captured. At block 2906, the audio output device's master volume setting is captured. At block 2908, the audio input device is captured. At block 2910, the audio input device's volume setting is captured. At block 2912, the system sounds volume settings are captured.

Restore system audio configuration workflow 2616 may be triggered independently or as part of restore system facts workflow 1022. At block 2920 the audio output device is restored. At block 2922, the audio output device's spatial audio settings are restored. At block 2924, the audio output device's spatial audio mix is restored. At block 2926, the audio output device's master volume setting is restored. At block 2928, the audio input device is restored. At block 2930, the audio input device's volume setting is restored. At block 2932, the system sounds volume settings are restored.

F. Windows

Any of the workflows depicted in FIGS. 10-29, or any other workflow or procedure discussed herein, may involve capturing and storing information about windows (either on a desktop, in a virtual panel, as part of a task, or in some other capacity). Further, such workflows and/or procedures may also involve retrieving and restoring these windows.

For example, capturing windows may involve determining whether each window is native (e.g., showing a non-browser application) or whether it is part of a particular browser session. Information may be captured differently for these types of windows, and then serialized for local or remote storage (e.g., to data representation 800). Conversely, restoring windows may involve deserializing information relating to the windows (e.g., from data representation 800), and restoring native windows and windows containing browser sessions in different manners.

1. Capturing Native Windows

Capturing a native window may involve calling the underlying operating system's API from OS abstraction layer 904 to get information related to the contents, position or current state of a window yet-to-be-managed by OW desktop application 902, or may involve capturing information about a managed window (or one docked to a specific pane managed by OW desktop application 902), then capturing the size and position of the pane (and possibly other information related to the pane), then determining the part of the workspace where the pane is located (e.g., in a virtual panel, in the desktop/background view, on the task layer), and then following an appropriate procedure. As mentioned, in order to manage windows and have some degree of independent control over them (e.g., from the native operating system's window manager), panes may be created using a programming language or libraries compatible with the native operating system (e.g., C#, WPF, XAML, for example). Said panes may contain borders that are either visible or invisible, and to which colors or highlights may be dynamically applied by operations carried out by workflow engine 920 and that may be triggered by some received notification on some subscribed-to event. As discussed above, said panes on which windows may be docked, may be dynamically repositioned, cleared from view, resized, or otherwise rearranged within the workspace (either manually by user input, or automatically by way of an event triggering a workflow to be carried out by workflow engine 920).

For a native window that is determined to be part of the desktop, it may first be determined whether the window is represented by a thumbnail. If so, the thumbnail size and position may be captured. If not, it may then be determined whether the window is shown. If so, the window size and position may be captured along with information pertaining to its representative button or icon held in the workspace tray. If not, the program button or icon representing the window in the workspace tray may captured along with other information about the window (such as, for example, the window's size and position when shown). The above information or other information relating to the above may be captured by OS abstraction layer 904 or elsewhere within OW desktop application 902 (e.g., by accessing information about a pane on which a window or thumbnail image is docked). In any of these cases, if the window represents a file, the file's location in the filesystem and other metadata related to the file may be captured. If not, process information and other metadata related to the application represented by the window may be captured.

For a native window that is determined to be part of a virtual panel, it may first be determined whether the window is shown. If so, the window size and position may be captured, along with information pertaining to its representative button or icon held in the panel tray (e.g., its position in the tray, for example). If not, the program button or icon representing the window in the panel tray may be captured along with the window's shown size and position. In either of these cases, if the window represents a file, the file's location in the filesystem and other metadata related to the file may be captured. If not, process information and other metadata related to the application represented by the window may be captured.

For a native window that is determined to be part of a task, the window size and position may captured. If the window represents a file, the file's location in the filesystem and other metadata related to the file may be captured. If not, process information and other metadata related to the application represented by the window may be captured.

2. Restoring Native Windows

Restoring a native window may involve accessing information about the window or the pane on which it was docked when captured (possibly via OS abstraction layer 904 or some other process within OW desktop application 902), then setting the size and position of the pane (and possibly other information related to the pane), then determining the part of the workspace where the pane is located (e.g., in a virtual panel, in the desktop/background view, on the task layer), then referencing information about the pane the window was docked to when it was captured, then restoring and setting the pane accordingly, and then docking the window to it. In some cases, restoring a native window may involve calling the underlying operating system's API from OS abstraction layer 904 to get information about the window or to launch the application window indirectly by way of the native operating system's window manager, and then subsequently managing it directly via OW desktop application 902. Further procedures may be followed from here.

Restoring a window within the desktop region may first involve determining whether the window represents a file. If so, the window may be restored based on information related to the file from the filesystem and an associated application (e.g., a file viewer) may be launched. If not, the application type (e.g., WIN32, UWP, MAC catalyst, etc.) may be determined. In the event of the application not executing, it may launched. Then it may be determined whether the window is a thumbnail. If so, the thumbnail may be restored on the desktop and a shortcut may be created. If not, it may be determined whether the window is shown. If so, the window may be restored on the desktop and a program button or icon representing it may be set on the workspace tray. If not, a program button or icon may be set on the workspace tray containing a shortcut to a representation of the window to be shown on the desktop the next time the program button or icon is invoked.

Restoring a window within a virtual panel may first involve determining whether the window represents a file. If so, the window may be restored based on information related to the file from the filesystem and an associated application (e.g., a file viewer) may be launched. If not, the application type (e.g., WIN32, UWP, MAC catalyst, etc.) may be determined. In cases where the application is not executing, it may launched. Then it may be determined whether the window is shown. If so, a live representation of the window may be restored in the virtual panel and a program button or icon representing it may be set on the panel tray. If not, a program button or icon may be set on the panel tray containing a shortcut to a representation of the window to be shown in the virtual panel the next time the program button or icon is invoked.

Restoring a window on the task layer may first involve determining whether the window represents a file. If so, the window may be restored based on information related to the file from the filesystem and an associated application (e.g., a file viewer) is launched. If not, the application type (e.g., WIN32, UWP, MAC catalyst, etc.) may be determined. If the application is not executing, it may be launched and set on the task layer. Then it may be determined whether the task is shown. If so, the window may be set on the task layer as part of the shown task. If not, a shortcut may be created containing information about the window and encompassed in a program button or program icon object representing the specific task on which the browser window was captured.

3. Capturing Browser Windows

Capturing browser windows may first involve identifying the region of the workspace where the window resides (e.g., in the desktop region, in a virtual panel, or on the task layer), then retrieving the browser session info containing information about the position, size, and state of the window and the tab(s) contained therein, by invoking a browser extension (e.g., via a web socket connection), and fetching the window and tab information as JSON (or another form of structured data). It may further involve deconstructing the captured browser session that contained the captured browser window into subsets representing the parts of a workspace (virtual panel, desktop, task) where the browser window was located when captured, so that independent browser windows can be decoupled from independent browser sessions, in order to make subsequent calls to the browser client that are specific to restoring individual windows, rather than restoring the browser window's entire session, where necessary.

Once a browser window is determined to be on the desktop, it may then be determined whether the browser window is represented by a thumbnail. If so, the thumbnail size and position may be captured. Further, the window may be tagged as a thumbnail and the associated metadata may be captured. If not, it may be determined whether the window is shown. If so, the window size and position may be captured along with its window contents (for example, its tabs and its URLs) and information pertaining to its representative button or icon held in the workspace tray. Further, the window may be tagged as a desktop window and other information about the window may be captured as metadata. If not, information about its program button or icon (e.g., its position in the workspace tray) may be captured, along with other information about the window (for example, its size and position when shown). Further, the window may be tagged as a minimized desktop window and other information about the window may be captured as metadata.

For a browser window that is determined to be in a virtual panel, it may first be determined whether the window is shown. If so, the window size and position may be captured along with its contents (for example, its tabs and its URLs) and information pertaining to its representative button or icon held in the panel tray. Further, the window may be tagged as a virtual panel window and other information about the window may be captured as metadata. If not, information about its program button or icon (e.g., its position in the panel tray) may be captured, along with other information about the window (for example, its size and position when shown). Further, the window may be tagged as a minimized virtual panel window and other information about the window may be captured as metadata.

For a browser window that determined to be part of a task, the window size and position may be captured along with its contents (for example, its tabs and its URLs). Further, the window may be tagged as a task window and the associated metadata may be captured.

4. Restoring Browser Windows

Restoring browser windows may first involve deserializing information about the browser window (such as the position, size, and state of the window and tab(s) contained therein upon being captured), possibly as part of a workflow that is restoring a region of a workspace (e.g., a virtual panel arrangement or a background/desktop view). Then a browser extension (client) may be invoked via a locally-hosted web socket server in order to pass JSON (or another form of structured data) to the browser client so that the browser client can carry out its own window management within the construct of workspaces, virtual panels, desktops, and tasks, and restore the browser windows to its captured state.

For a browser window that is on the desktop, it may first be determined whether the window is a thumbnail. If so, the thumbnail size and position may be restored on the desktop. If not, it may be determined whether the window is shown. If so, the window size and position may be restored on the desktop as a live window. If not, a program button or icon representing the window may be set on the workspace tray and a shortcut may be created.

For a browser window that is part of a virtual panel, it may first be determined whether the window is shown. If so, the window size and position may be restored in the virtual panel (e.g., as a top window in the virtual panel) and its representative program button or icon may be set on the panel tray. If not, a program button or icon representing the window may be set on the panel tray and a shortcut may be created.

For a browser window that is determined to be part of a task, restoring the window on the task layer may first involve determining whether the task was shown upon the browser window being captured. If so, the window may be set on the task layer as part of the shown task. If not, a shortcut may be created containing information about the window and encompassed in a program button or program icon object representing the specific task on which the browser window was captured.

VII. Example Augmented Reality/Virtual Reality Implementation

The embodiments herein may also be used as overlays or otherwise integrated into augmented reality (AR) and virtual reality (VR) displays. AR is an enhanced version of the physical world that is modified by (e.g., overlaid with) digital visual elements, sound, or other sensory stimuli delivered. VR, in contrast, is a simulated environment that might resemble the physical world to some degree or might not.

The concepts of a workspace, a desktop (or background) view, a virtual panel arrangement, and a task layer translate directly into AR and VR experiences. Through controls in the physical world or within the AR/VR experience, the user may invoke various combinations of workspaces, virtual panel arrangements, background views, and task layers, in accordance with any of the embodiments herein.

Figure 30A:
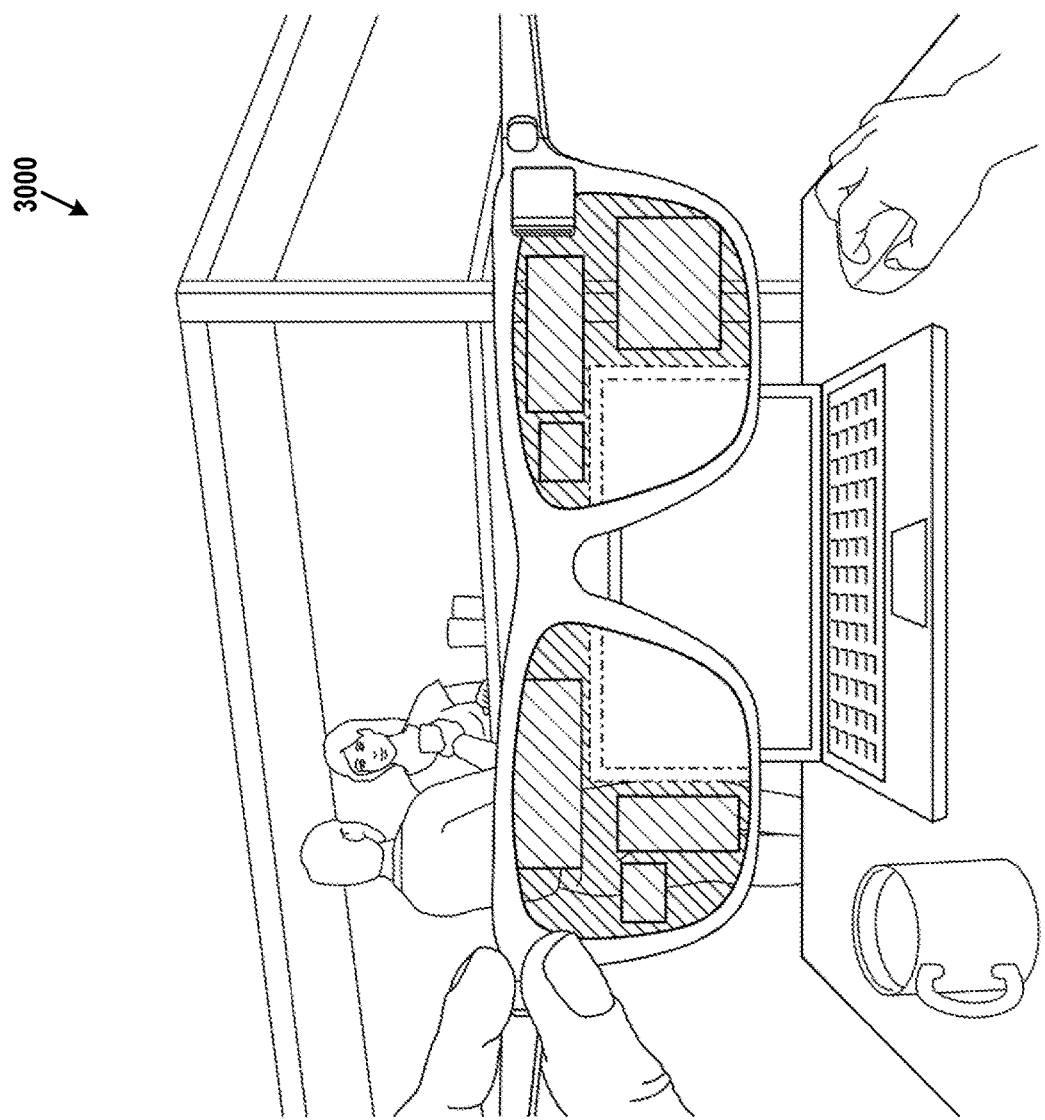
FIG. 30A depicts an augmented reality interface, in accordance with example embodiments.
Figure 30B:
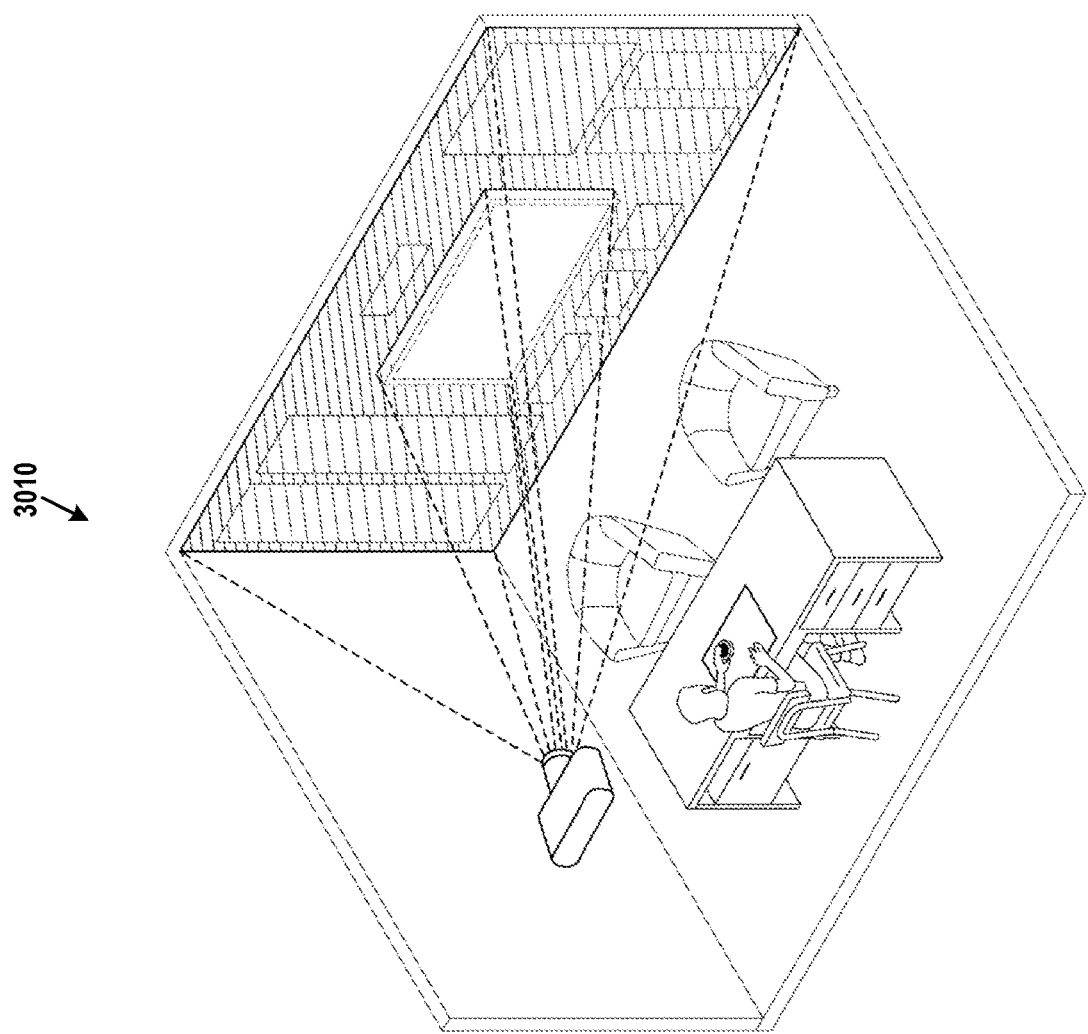
FIG. 30B depicts another augmented reality interface, in accordance with example embodiments.
Figure 30C:
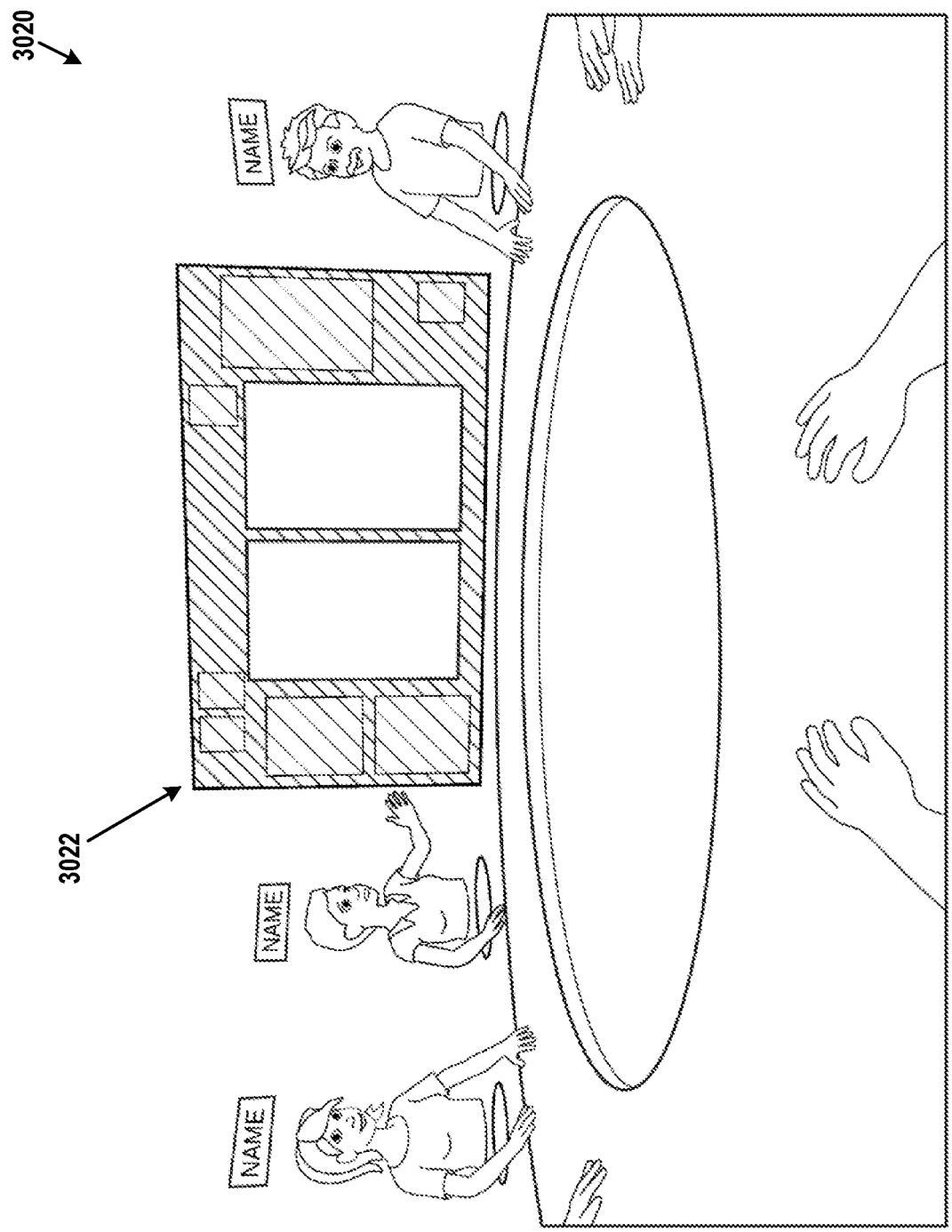
FIG. 30C depicts a virtual reality interface, in accordance with example embodiments.

FIGS. 30A, 30B, and 30C provide examples. In FIG. 30A, augmented reality glasses (sometimes referred to as "smart glasses") are being used to super-impose a background view on the user's peripheral view of a coffee shop where work is being carried out. The glasses may afford the user more space to display windows and thumbnail images needed for the work being carried out, enabling use of the TAP-centric GUI in a public space, where working on a large physical display is impractical. Further, this may enable the user to pick up from where they left off on their larger home-or work display, but in a coffee shop setting, and maintain the same familiar contextual view afforded by the larger home-or work display. The physical laptop screen depicted represents the virtual panel view that might consist of one or two panels occupying the full laptop screen). Applying the TAP-centric GUI in this manner may effectively free the user from having to work in a single stack of windows that would otherwise be confined to the laptop screen's limited display area. Accordingly, windows relevant to the focal task being performed within the virtual panel view (laptop monitor) may be docked and floating in the peripheral field of view surrounding the laptop screen, enabling the user to have an expansive view of non-overlapping windows and to pull windows into the focal area as needed. Superimposition of the background view onto the user's field of view might be accomplished through an optical head-mounted display (OHMD) or embedded wireless glasses with a transparent heads-up display (HUD) or augmented reality (AR) overlay. The glasses might connect to the user's laptop computer via Bluetooth to receive input (instructions) on what to render in the background view and that related to the user's pointer actions on resources displayed in the background view. User actions on resources contained in the background view may be driven by an optical mouse (or a dial controller) and transmitted to the laptop by Bluetooth or another protocol and subsequently integrated with OW desktop application 902 by way of a software driver. Other implementations may be possible.

In FIG. 30B, AR display 3010 is projected onto a wall, and includes multiple windows and a workspace tray. Again, this arrangement of windows may be part of a virtual panel arrangement, for example. Here a background region consisting of windows and thumbnail images is projected around a physical wall-mounted display, whereby the physical display represents the panel region. The dimensions of the background region may be determined by a user-defined parameter specifying the wall dimensions in order to establish bounds for the for the background view. The dimensions of the source-connected physical display may be captured from the source's system facts. Other implementations may be possible.

In FIG. 30C, VR display 3020 is shown with a workspace 3022 shown within the VR environment. Here, a virtual scene is depicted from the user's first-person point of view, whereby a virtual/hologram of a display is shown as the focal subject matter for a virtual meeting taking place between avatars meant to represent actual users remotely participating in the virtual meeting. Other implementations may be possible.

VIII. Example Mobile Workspaces and Workspace Resizing

While the examples above focus on desktop computing displays, which can often be quite large (e.g., screens in excess of 30 inches on the diagonal), the embodiments herein may be employed on mobile devices as well. Such devices have smaller displays (e.g., screens 5-12 inches on the diagonal) and therefore some aspects of these embodiments (e.g., trays) may be absent from workspaces shown on smaller screens. To the contrary, some aspects of these embodiments may be more present on workspaces shown on smaller screens, on account of being more practical (such as, for example the use of a stackless virtual panel).

Nonetheless, the overall concept is the same for mobile workspaces. Thumbnail images of windows may represent resources and may be tiled out and in a singular view that can be saved and restored. From within such a representation, the user may select such thumbnail images to expand the resource to occupy the full screen of the mobile device. These thumbnails can represent mobile applications or views within them, or files stored on, or accessible by, the mobile device.

Like desktop GUIs, mobile user interfaces impose the same constraints on the user. For example, application-centric mobile operating systems cause the user to continuously go back to the home screen as a central point of navigation, zooming in and out of individual applications that commonly occupy the full screen space on miniscule displays. As with the desktop systems, mobile systems also lack the ability to organize multiple complementary views of applications within the same workspace, or more generally stated, within a singular view or glance.

Further, the resizing that may be needed to display a workspace on a mobile device can also be used to display workspaces on various size screens. For example, a workspace may be defined and customized for a 40-inch monitor, and then automatically adapted to the screen real estate of a 34-inch monitor or a 12-inch tablet, for example.

FIGS. 31A, 31B, 31C, and 31D are flow charts that depict such an adaptation process during deserialization of virtual panels, desktops, and tasks. Notably, other procedures and options may be possible, and operations depicted in these figures may be combined with those of any other figure.

Figure 31A:
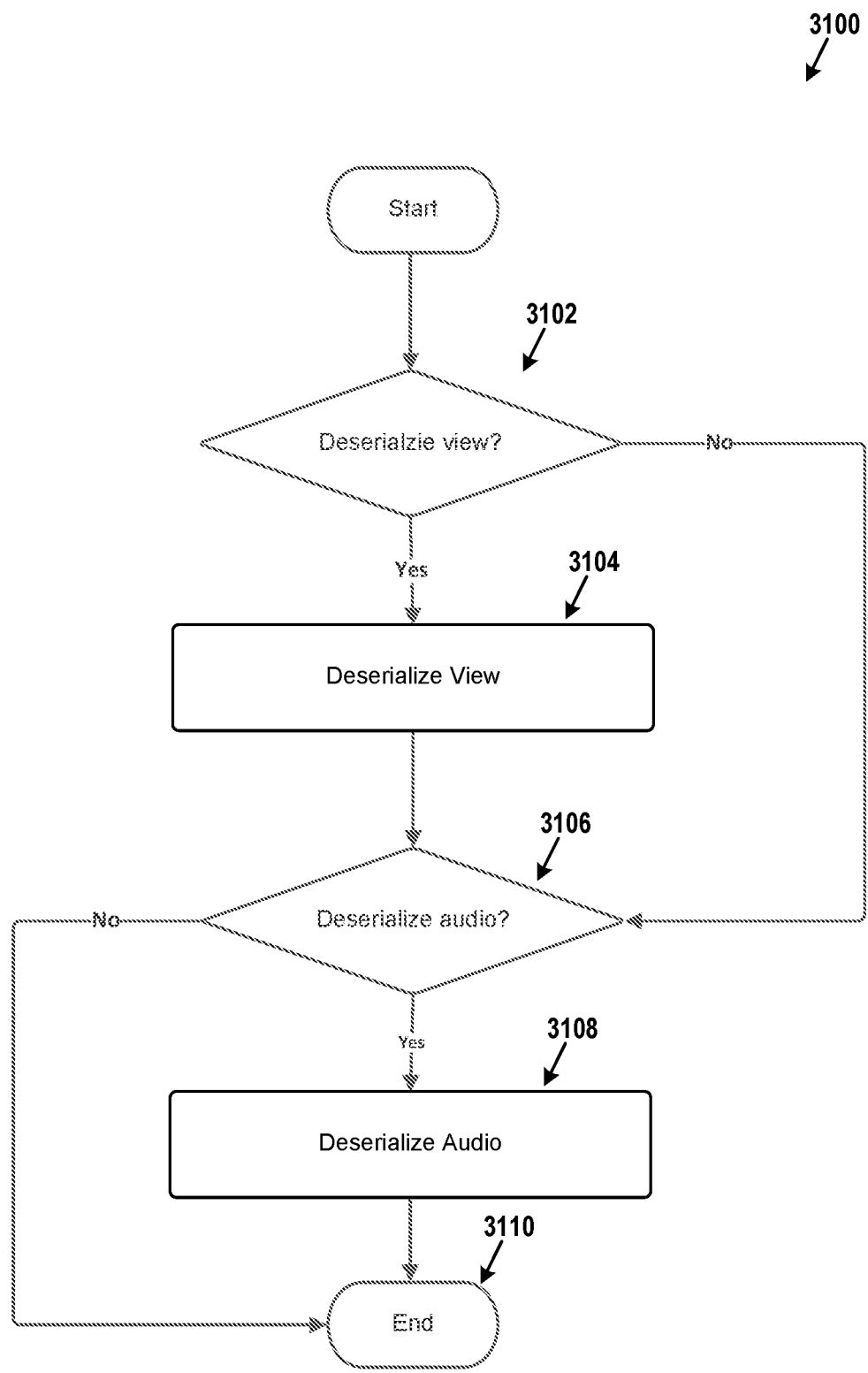
FIG. 31A depicts a deserialize workflow, in accordance with example embodiments.

FIG. 31A provides a high-level overview, in the form of flow chart 3100. At block 3102, it is determined whether a view is to be deserialized. If so, control passes to block 3104. If not, control passes to block 3106.

At block 3104, a view is deserialized. This includes the deserialization and adaptation of a virtual panel view, a desktop view, and one or more task views as shown in FIGS. 31B, 31C, and 31D, respectively.

At block 3106, it is determined whether audio settings are to be deserialized. If so, control passes to block 3108. If not, control passes to block 3110.

At block 3108, audio settings are deserialized. These operations are discussed elsewhere in this specification and thus not reiterated at this point. Block 3110 ends the adaptation process.

Figure 31B:
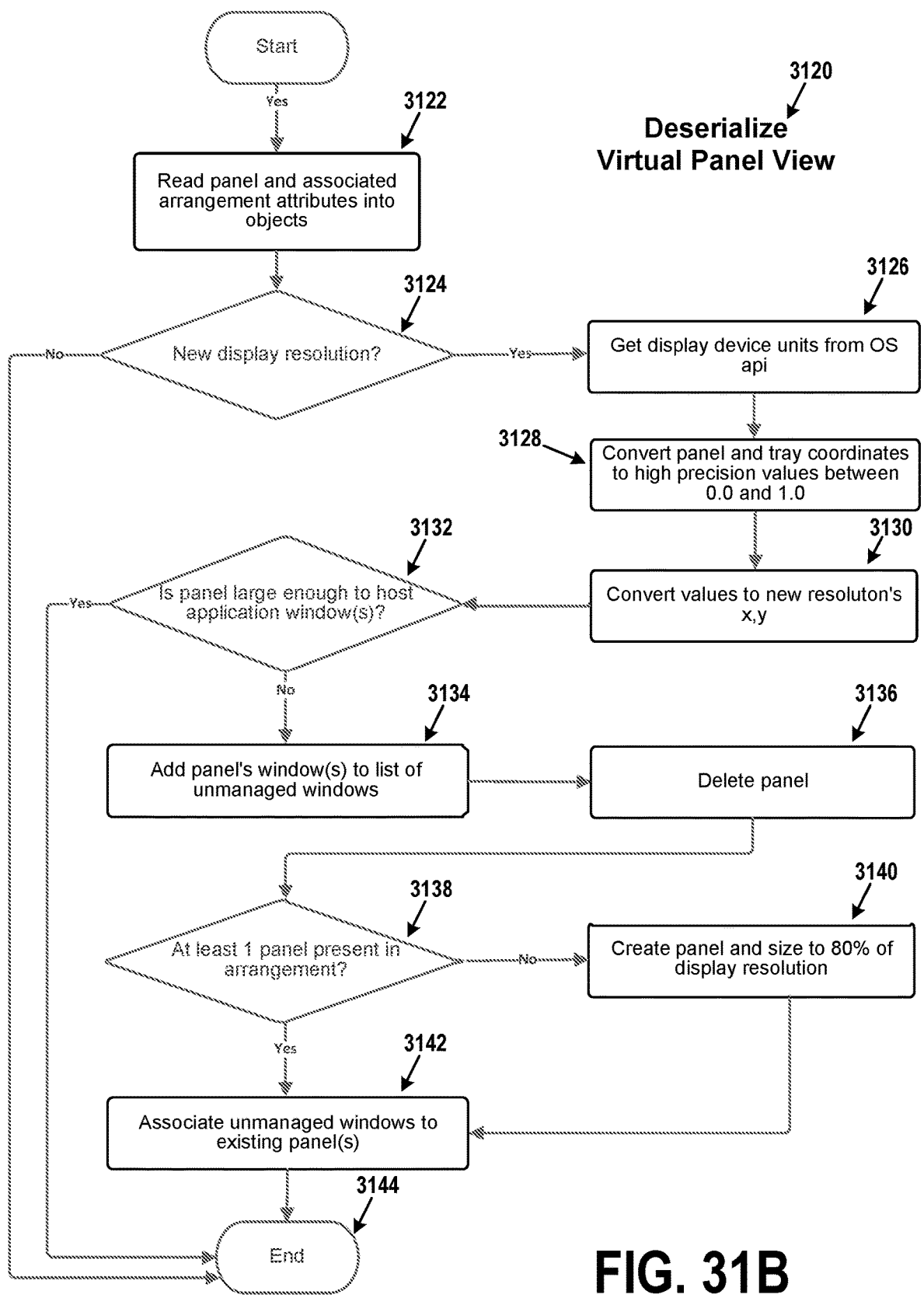
FIG. 31B depicts a deserialize virtual panel view workflow, in accordance with example embodiments.
Figure 31C:
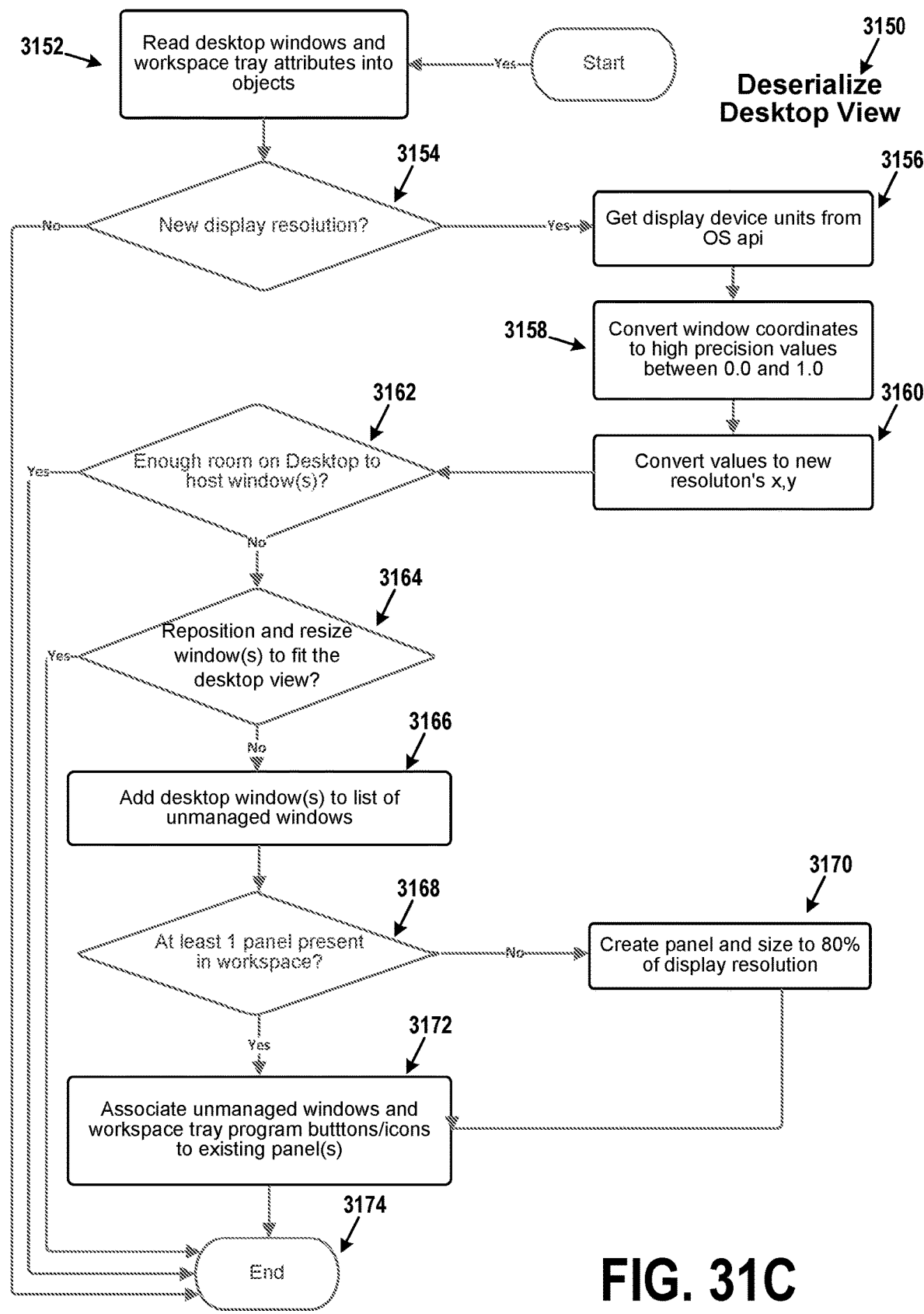
FIG. 31C depicts a deserialize desktop view workflow, in accordance with example embodiments.
Figure 31D:
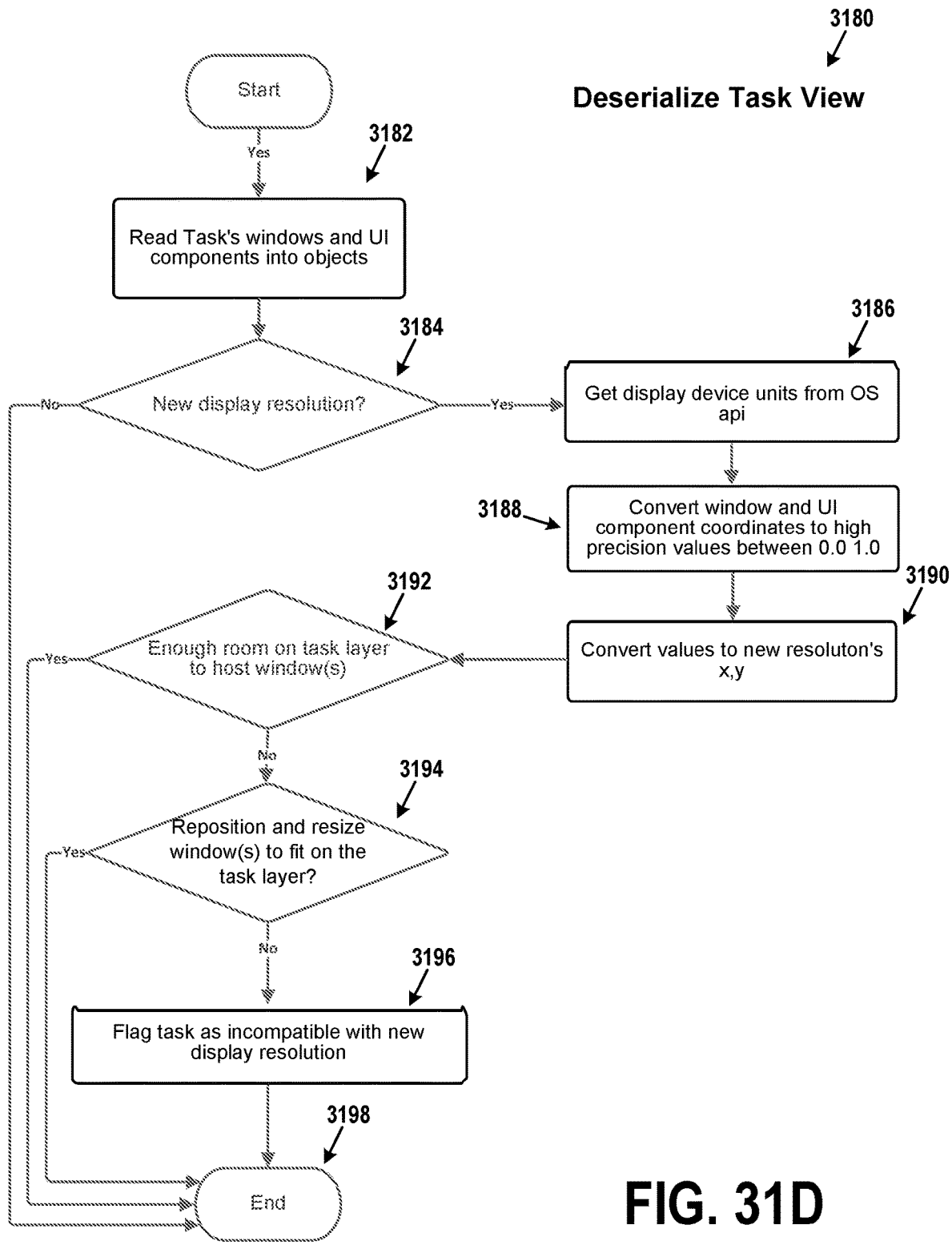
FIG. 31D depicts a deserialize task view workflow, in accordance with example embodiments.

FIG. 31B provides operations for deserializing a virtual panel view, in the form of flow chart 3120. This process takes place for each virtual panel of a virtual panel arrangement.

At block 3122, the virtual panel representation and its associated arrangement attributes are read into objects. At block 3124, it is determined whether the virtual panel representation is to be adapted to a new display resolution. If so, control passes to block 3126. If not, control passes to block 3144.

At block 3126, the display device units (e.g., pixel size, dimensions, resolution) are retrieved from the operating system of the computing device that is hosting the display device. This may be achieved by querying one or more APIs of the operating system.

At block 3128, the virtual panel and panel tray coordinates (e.g., location and dimensions) are converted to high-precision values between 0.0 and 1.0. This normalization facilitates conversion to the new display resolution.

At block 3130, the coordinates are converted to x and y coordinates in the new display's resolution by multiplying the high-precision values by the new display's pixel width and height.

At block 3132, it is determined whether the virtual panel of the new display is large enough to host the application windows to be placed the virtual panel. If so, control passes to block 3144. If not, control passes to block 3134.

At block 3134, the virtual panel's windows are added to a list of unmanaged windows. At block 3136, the virtual panel is removed from the virtual panel arrangement.

At block 3138, it is determined whether there is at least one virtual panel left in the virtual panel arrangement. If so, control passes to block 3140. If not, control passes to block 3142.

At block 3140, the virtual panel is placed in the virtual panel arrangement and sized to 80% of the new display resolution (other sizes, such as any in the range of 50%-95% may be used). At block 3142, any unmanaged windows are associated with existing virtual panels.

In this fashion, the number of virtual panels supporting windows may be decreased, perhaps down to just one. But the windows contained in these virtual panels are assigned to those that remain in the virtual panel arrangement.

FIG. 31C provides operations for deserializing a desktop, in the form of flow chart 3150. At block 3152, the desktop windows and workspace tray attributes are read into objects. At block 3154, it is determined whether the virtual panel representation is to be adapted to a new display resolution. If so, control passes to block 3156. If not, control passes to block 3174.

At block 3156, the display device units (e.g., pixel size, dimensions, resolution) are retrieved from the operating system of the computing device that is hosting the display device. This may be achieved by querying one or more APIs of the operating system.

At block 3158, the window coordinates (e.g., location and dimensions) are converted to high-precision values between 0.0 and 1.0 by dividing the x and y coordinates of each of the window's 4 corners (e.g., top left, top right, bottom left, bottom right) by width, height of the display's total pixel resolution (e.g., 3840×2160), respectively. This normalization facilitates conversion to the new display resolution.

At block 3160, the coordinates are converted to x and y coordinates in the new display's resolution by multiplying the high-precision values by the new display's pixel width and height (e.g., 2560×1080).

At block 3162, it is determined whether there is enough room on the desktop to host the windows. If so, control passes to block 3174. If not, control passes to block 3164.

At block 3164, it is determined whether to reposition and resize the windows to fit on the desktop view, by (i) getting the display's total screen resolution then (ii) subtracting the total pixel area of the rectangle(s) that represent the virtual panel(s) from the total screen resolution to determine the pixel area of the desktop view, then, (iii) for each desktop window, in succession, determining if there is enough desktop area to accommodate the window's minimum size (e.g., 400px for a Chrome/browser window). If so, control passes to block 3174. If not, control passes to block 3166.

At block 3166, the desktop windows are added to a list of unmanaged windows. At block 3168, it is determined whether there is at least one virtual panel left in the virtual panel arrangement. If so, control passes to block 3172. If not, control passes to block 3170.

At block 3170, a virtual panel is placed in the virtual panel arrangement and sized to 80% of the new display resolution (other sizes, such as any in the range of 50%-95% may be used). At block 3172, any unmanaged windows and their associated workspace tray buttons/icons are associated with existing virtual panels.

In this fashion, windows that cannot be placed on the desktop are assigned to one or more virtual panels. In some cases, this might involve creating a new virtual panel just to store windows from the desktop.

FIG. 31D provides operations for deserializing a task, in the form of flow chart 3180. At block 3182, the task's windows and UI components are read into objects. At block 3184, it is determined whether the task is to be adapted to a new display resolution. If so, control passes to block 3186. If not, control passes to block 3198.

At block 3186, the display device units (e.g., pixel size, dimensions, resolution) are retrieved from the operating system of the computing device that is hosting the display device. This may be achieved by querying one or more APIs of the operating system.

At block 3188, the task's window and UI component coordinates (e.g., location and dimensions) are converted to high-precision values between 0.0 and 1.0. This normalization facilitates conversion to the new display resolution.

At block 3190, the coordinates are converted to x and y coordinates in the new display's resolution by multiplying the high-precision values by the new display's pixel width and height At block 3192, it is determined whether there is enough room on the task layer to host the windows and/or UI components. If so, control passes to block 3198. If not, control passes to block 3194.

At block 3194, it is determined whether to reposition and resize the windows and/or UI components to fit on the task layer. If so, the high-precision values representing the source window/UI component coordinates are multiplied by the new display's pixel width and height to set the windows/UI components in the relative position on the task layer, and the control passes to block 3198. If not, control passes to block 3196.

At block 3196, the task is flagged as being incompatible with the new display resolution. In this case, the task cannot be displayed on the associated display device.

IX. Example Wireless Controller

The embodiments above may be further enhanced through use of an optional wireless controller. This controller may be of a small form factor (e.g., capable of being held in one's hand) and may include a wireless (e.g., Bluetooth and/or Wifi) interface that can control both a display (e.g., computer monitor, television, or other screen) and any connected sources (assuming these sources are wireless-enabled or network-connected). In some embodiments, the controller may be a mobile phone.

Nonetheless, described herein is a specification for a wireless controller that might be embodied in the form of a dial, and that might dock to televisions or computer monitors for charging purposes, among other things. Herein, the terms "controller" and "dial" may be used somewhat interchangeably, with a dial being an embodiment of a controller.

The dial may serve as a single solution for common user problems in navigating and operating content on displays—both in the home office/work environment (referred to herein as the desktop environment), where a user's laptop might be driving computer monitor(s), as well as in the living room/streaming entertainment environment (referred to herein as the living room environment), where a streaming device might be driving content shown on a television).

Within both the desktop and living room environment, the dial might serve the following purposes (among others) in order to solve user experience-related problems common to both environments.

A. Purposes

Maintain the state of a television or computer monitor (in terms of its recent/last-known content displayed) using a navigation state machine, in order to display on its face's LCD indicator display (henceforth referred to its LCD face) a visual representation (e.g., a representative icon or logo) of the last-accessed content on the display. By displaying these icons/logos symbolizing the display's most recent content or activity, the dial might enable the user to rapidly recall the last activity, work task, or television channel engaged with on that display, and either jump right back into the activity, or resume the content browsing experience directly from the channel or activity's place in a menu displayed on the dial's LCD face.

Provide a simplified, tactile experience for searching/browsing/switching between content (whether between window layouts shown on computer monitors or between television channels, content, or layouts of content shown on a television).

Streamline the start-up (or set-up) related operations that typically precede both work activity in the desktop environment and streaming activity in the living room environment. Common problems across both environments include the need to independently power on/off or sleep/awaken both the display and its connected source, so that they can work together to deliver the intended desktop or living room experience. Additionally, once the display and its source are powered on or awoken, it is sometimes necessary for the user to select the appropriate display input or configure audio for the task at hand (output device, volume, audio mix, etc.). The dial might enable its user to carry out with a single command, a series of independent startup- or configuration-related commands that might ordinarily take the user 5 or 6 steps—or in the worst cases, 2 or 3 minutes—to complete.

B. Onboard Software Functionality

The following describes what might be considered core functionality of proprietary software contained on the dial's system-on-a-chip (SoC).

Discovers sources and then serves as a middleware layer that aggregates content discoverable within and across the sources in order to build a master list (e.g., a global list of discovered channels and content). The term "source" is used to describe both those devices external to the display (e.g., a streaming device or a laptop/desktop/form-factor computer connected directly to the controlled display or to the same network as the controlled display) and software embedded in the display that might contain consumable content (e.g., a smart television's onboard Android operating system).

Figure 32:
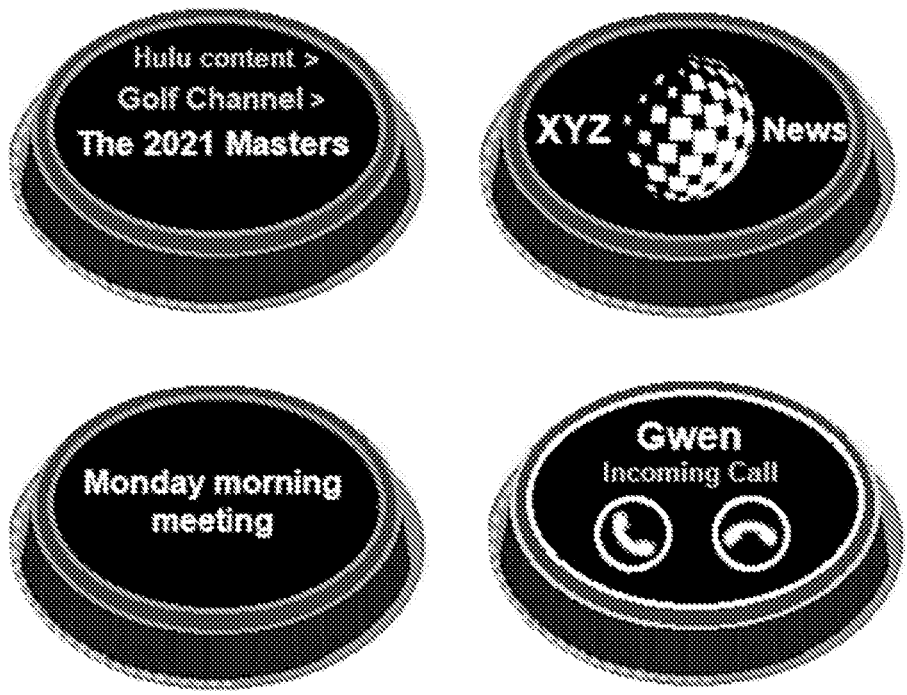
FIG. 32 depicts various information displayed on the face of a controller, in accordance with example embodiments.

Keeps track of a given user's current/last-known location within a menu that might be displayed on its LCD face. The dial might accomplish this by deploying a state machine-based navigation log for each of its user profiles, and by later accessing that navigation log in order to bring the user back to the last-accessed location within the menu, or stated differently, to the last known location in the channel or content browsing experience. The dial's LCD face might further display a breadcrumb showing a trail of the user's recent history during the current or previous content-browsing experience on a particular display or while in a particular mode. Whether a user's last known engagement with a particular display or display mode was two hours ago, two days ago, or two weeks ago, this might enable a user to quickly jump right back into the previous activity/content, or alternatively, to continue from a familiar navigation point within the dial controller's menu experience displayed on its face. As examples, FIG. 32 depicts four possible dial controller menus for various usage patterns.

Dynamically constructs a menu (shown on the dial's LCD face) or dynamically populates a menu, with prioritized content or channels specific to or most relevant to the paired display's intended environment (e.g., desktop, living room, etc.). To facilitate this, users might intentionally assign each paired/dial-controllable display to a designated mode (e.g., Work, Play, Mobile, Car) based on the intended or common use for the paired display. The dial might, in turn, automatically set its mode based on proximity to the nearest display, enabling it to adapt its utility to different environments as the user carries it from one room or computing environment to the next.

Figure 33:
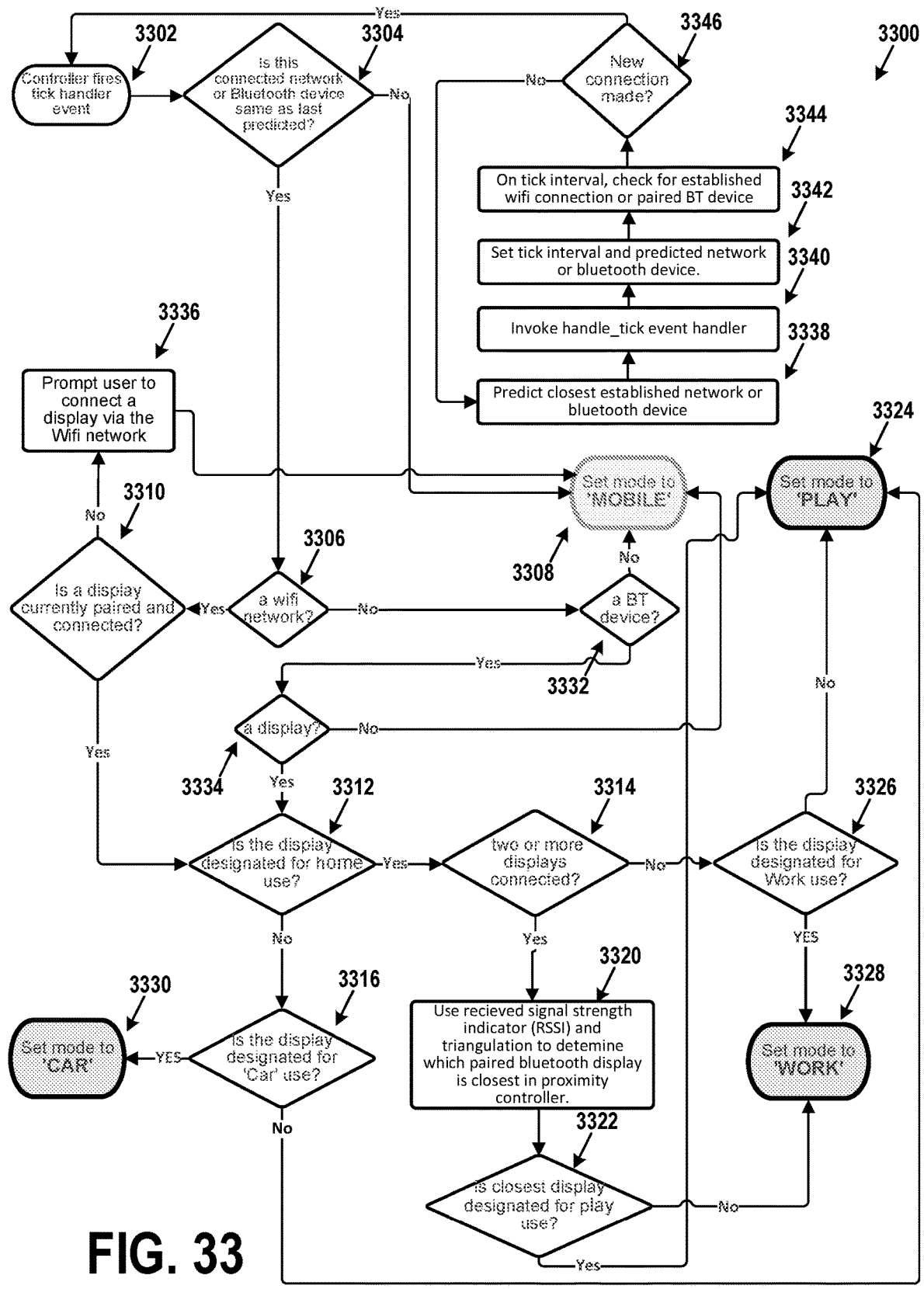
FIG. 33 depicts a controller configuration workflow, in accordance with example embodiments.

FIG. 33 depicts a flow chart 3300 that a controller might use to automatically set its mode. Nonetheless, other possibilities exist.

At block 3302, the controller's clock or timer fires a tick handler event. Possibly in response, at block 3304, it is determined whether the controller is connected to a network or Bluetooth device that it was most recently connected. If so, control passes to block 3306. If not, control passes to block 3308.

At block 3306, it is determined whether the controller is connected to a Wifi network. If so, control passes to block 3310. If not, control passes to block 3332. At block 3310 it is determined whether a display is paired and connected via Wifi. If so, control passes to block 3312. If not, control passes to block 3336. At block 3336, the user is prompted to connect a display to the controller via the Wifi network.

At block 3332, it is determined whether the controller is connected to a Bluetooth device. If so, control passes to block 3334. If not, control passes to block 3308. At block 3334, it is determined whether this Bluetooth device is a display. If so, control passes to block 3312. If not, control passes to block 3308.

At block 3312, it is determined whether the display connected to the controller is designated for home use. If so, control passes to block 3314. If not, control passes to block 3316. At block 3316, it is determined whether the display is designated for car use. If so, control passes to block 3330. If not, control passes to block 3324.

At block 3314, it is determined whether two or more displays are connected to the controller. If so, control passes to block 3320. If not, control passes to block 3326. At block 3320 the wireless (Wifi or Bluetooth) received signal strength (RSSI) and/or triangulation can be used to determine which display is closest to the controller. The controller may connect with this display (e.g., begin using it as a display).

At block 3322, it is determined whether this closest display is designated for play use. If so, control passes to block 3324. If not, control passes to block 3328. At block 3326, it is determined whether this a single display is designated for work use. If so, control passes to block 3328. If not, control passes to block 3324.

Although it is not shown in FIG. 33 for purposes of simplicity, once the mode is set to one of Car (in block 3330), Work (in block 3328), Mobile (in block 3308), or Play (in block 3324), control passes to block 3338. The controller then enters a loop to detect when any new connection is made.

Thus, at block 3338, the controller predicts the closest established network or Bluetooth device. At block 3340, the controller invokes a tick event handler. At block 3342, the controller sets the tick interval and the predicted network or Bluetooth device. At block 3344, on a tick interval, the controller checks for an established Wifi connection or a paired Bluetooth device. At block 3346, it is determined whether a new connection has been made. If so, control passes to block 3302. If not, control passes to block 3338.

C. Initialization

Once the controller establishes a connection with a network, it might identify both network-connected source devices and network-connected displays so that it can pair and connect to these connected devices over Bluetooth. Then, once a connection and handshake is established between the dial's software and that hosted on the source device or display, the dial's onboard software might extract metadata on content accessible from the connected source. This process is shown in FIGS. 34A, 34B, 34C, and 34D.

Figure 34A:
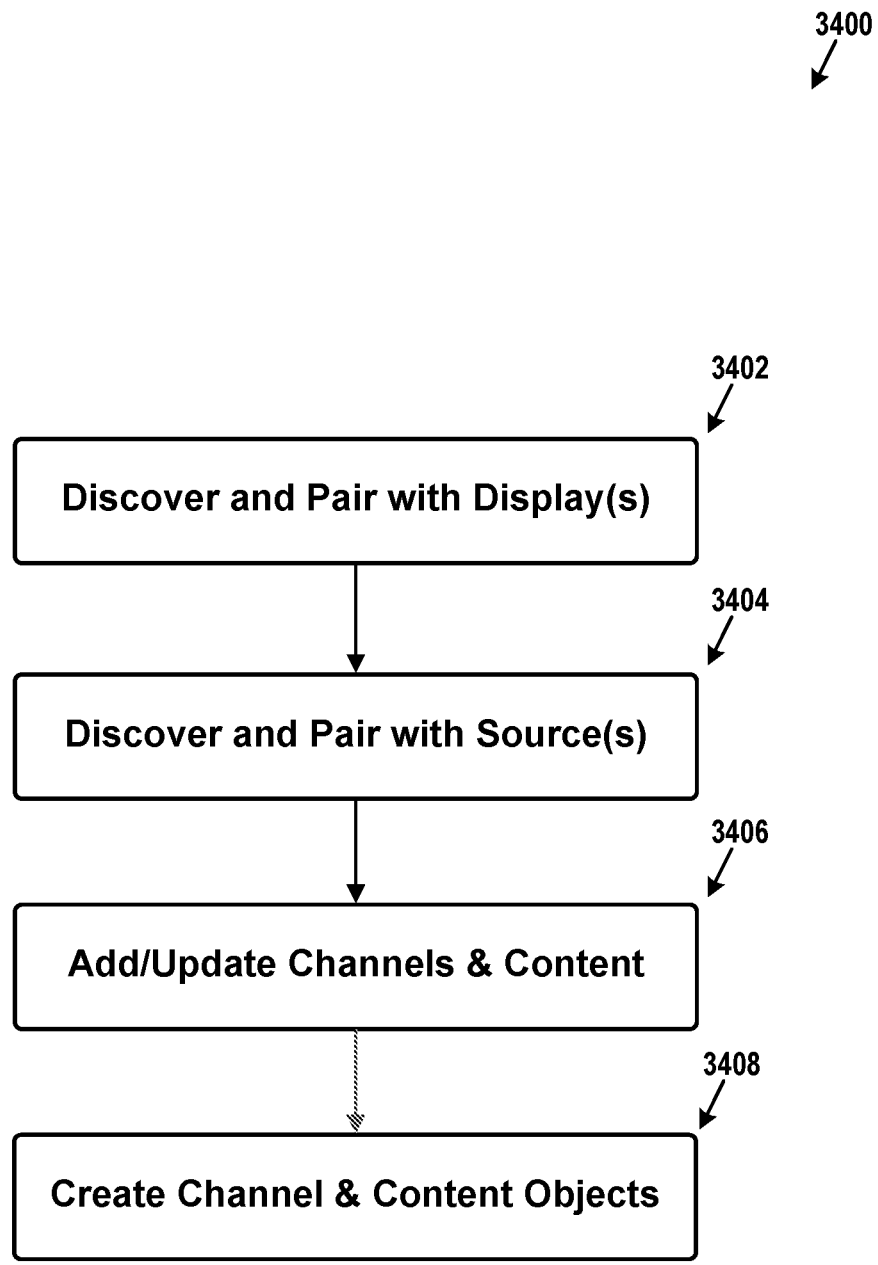
FIG. 34A depicts a controller setup workflow, in accordance with example embodiments.

FIG. 34A involves controller initialization process 3400. At block 3402, the controller discovers and pairs with one or more displays (described in more detail in the context of FIG. 34B). At block 3404, the controller discovers and pairs with one or more sources (described in more detail in the context of FIG. 34C). At block 3406, the controller adds and/or updates channels and content (described in more detail in the context of FIG. 34D). At block 3408, the controller creates channel and content objects.

Figure 34B:
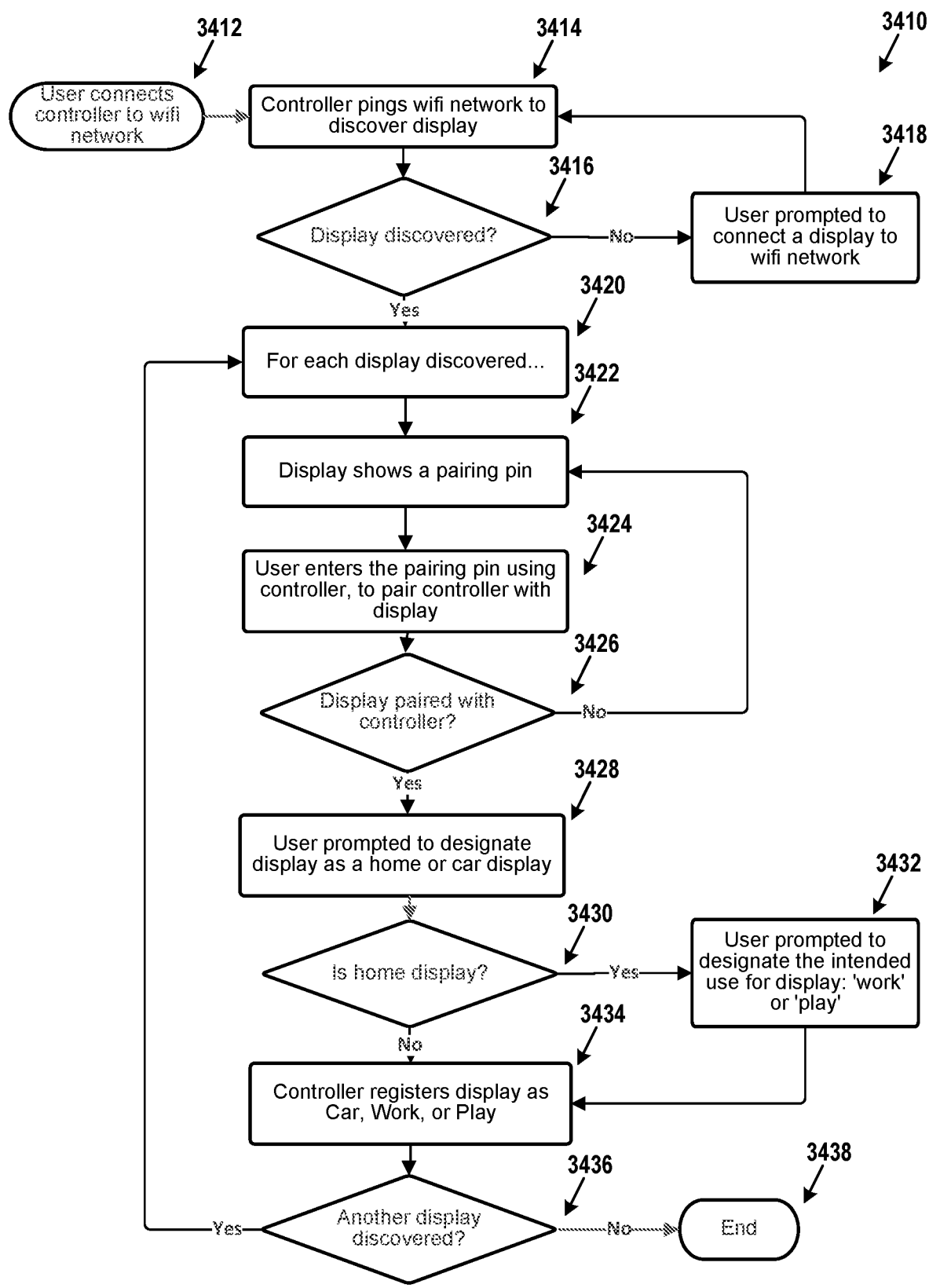
FIG. 34B depicts a display discovery workflow, in accordance with example embodiments.

FIG. 34B depicts a display discovery and pairing process 3410. At block 3412, the user connects the controller to a Wifi network. At block 3414, the controller pings the Wifi network to discovery a display. This may involve using any one of various types of device discovery protocols.

At block 3416, it is determined whether the display was discovered. If so, control passes to block 3420. If not, control passes to block 3418. At block 3418, the user is prompted to connect the display to the Wifi network, and control passes to block 3414.

As indicated by block 3420 and block 3436, blocks 3420-3436 represent a loop of actions that the controller carries out for each display discovered. At block 3422, the user is shown a pairing pin (e.g., an alphanumeric code) on the display. At block 3424, the user enters the pairing pin on the controller to pair the controller and the display.

At block 3426, it is determined whether the display is paired with the controller. If so, control passes to block 3428. If not, control passes to block 3422.

At block 3428, the user is prompted to designate the display as either a home or a car display. At block 3430, it is determined whether the user has designated a home display. If so, control passes to block 3432. If not, control passes to block 3434.

At block 3432, the user is prompted to further designate the display as either a work display or a play display. At block 3434, the controller registered the display as designated.

At block 3436, it is determined whether another display has been discovered. If so, control passes to block 3420. If not, control passes to block 3438.

Figure 34C:
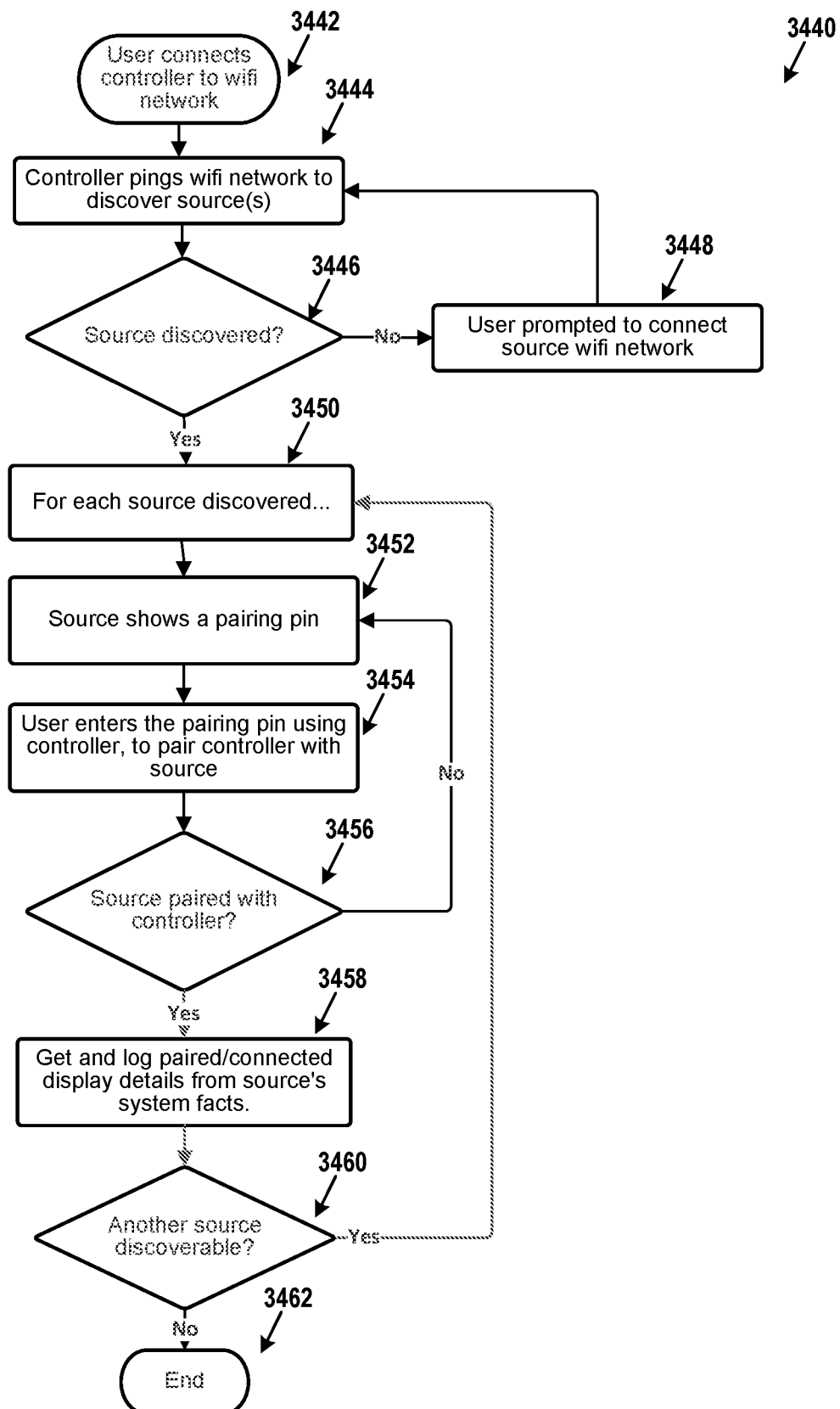
FIG. 34C depicts a source discovery workflow, in accordance with example embodiments.

FIG. 34C depicts a source discovery and pairing process 3440. A source may be any type of computing device that can use a display or a component of the display itself.

At block 3442, the user connects the controller to a Wifi network. At block 3444, the controller pings the Wifi network to discover one or more sources. This may involve using any one of various types of device discovery protocols.

At block 3446, it is determined whether a source has been discovered. If so, control passes to block 3450. If not, control passes to block 3448. At block 3448, the user is prompted to connect a source to the Wifi network and control passes to block 3444.

As indicated by block 3450 and block 3460, blocks 3450-3460 represent a loop of actions that the controller carries out for each source discovered. At block 3452, the source shows a pairing pin (e.g., an alphanumeric code). At block 3454, the user enters the pairing pin using the controller, thus pairing the controller and the source.

At block 3456, it is determined whether the source is paired with the controller. If so, control passes to block 3458. If not, control passes to block 3452. At block 3458, the controller retrieves and logs paired/connected display details from the source's system facts.

At block 3460, it is determined whether another source is discoverable. If so, control passes to block 3450. If not, control passes to block 3462.

Figure 34D:
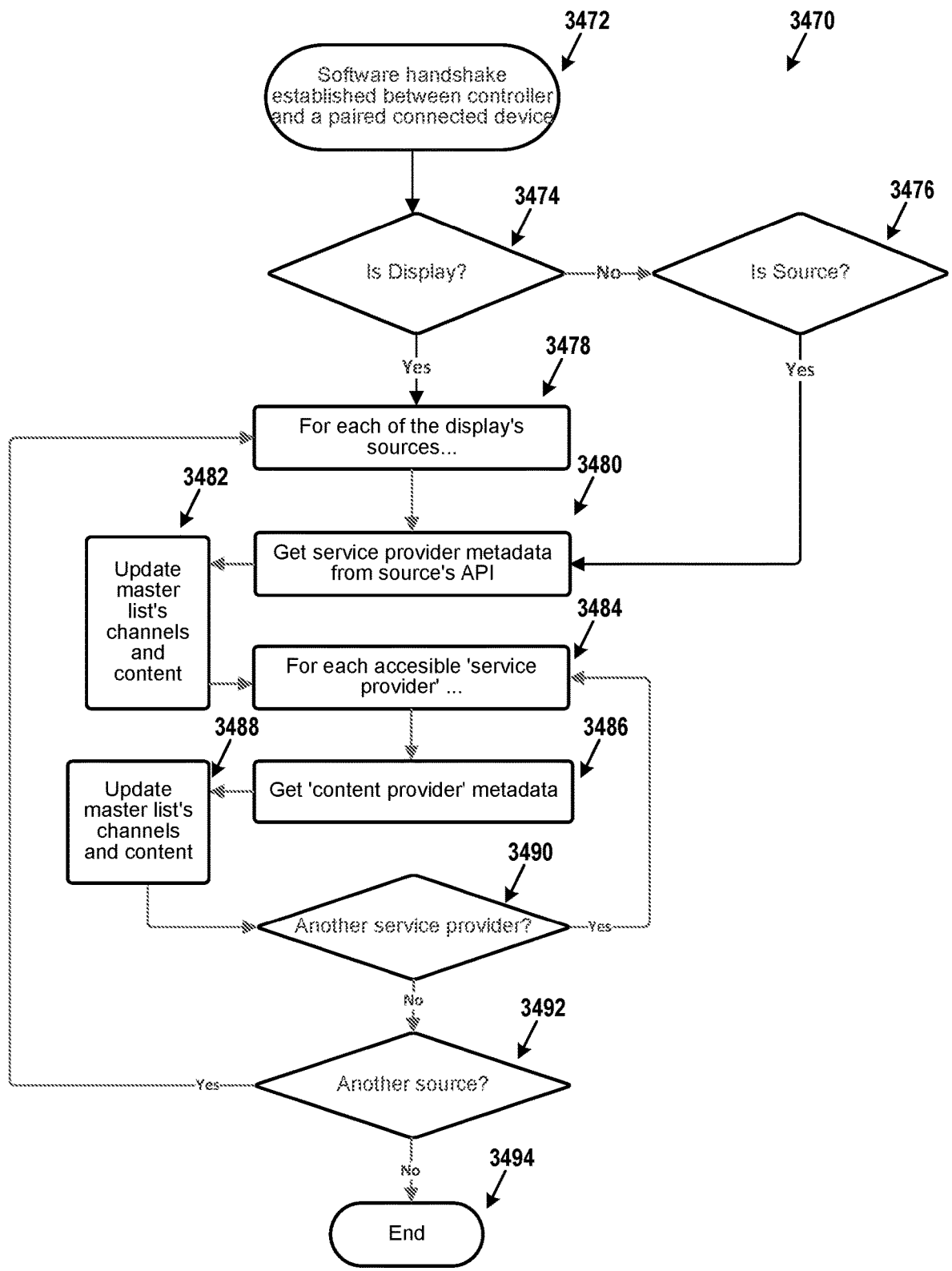
FIG. 34D depicts a channel and content discovery workflow, in accordance with example embodiments.

FIG. 34D depicts a channel and content discovery process 3470. At block 3472, a software handshake occurs between the controller and a paired and connected device. At block 3474, it is determined whether this device is a display. If so, control passes to block 3478. If not, control passes to block 3476.

As indicated by block 3478 and block 3492, blocks 3478-3492 represent a loop of actions that the controller carries out for each of the display's sources. At block 3480, the controller retrieves service provider metadata (e.g., relating to channels and content available by way of the service provider) from the source's APIs. At block 3482, the controller updates its master list of channels and content.

As indicated by block 3484 and block 3490, blocks 3484-3490 represent a loop of actions that the controller carries out for each service provider. At block 3486, the controller retrieves content provider metadata. At block 3488, the controller again updates its master list of channels and content.

At block 3490, it is determined whether there is another service provider to consider. If so, control passes to block 3484. If not, control passes to block 3492.

At block 3492, it is determined whether there is another source to consider. If so, control passes to block 3478. If not, control passes to block 3494.

The dial's master list might consist of content sourced from a single service provider (e.g., a proprietary application hosted on a single source device), or conjunctively, from any connected third-party service providers containing an accessible application programmable interface from which content metadata can be extracted or from which the source can be operated.

D. LCD Indicator Display

The dial may contain an LCD indicator display (either a color TFT or OLED LCD), referred to herein as its LCD face, that displays desired icons, logos, text, or images, and that may be used as a touchscreen for user interface interactions. On this LCD display, channel and content objects may be represented by icons or logos symbolic of the channel or content. These icons/logos might be presented via GUI controls/menus like carousels, which might enable the user to easily browse for channels and content. These menus may also be displayed on the controlled display's LCD screen and may be remotely traversable and operable by using the dial controller (see FIG. 32).

Users might search or browse for content by invoking voice searches via the dial's mic input, or by accessing the dial's touchscreen menu, all while the paired/controlled display is powered off or in sleep mode.

Once an activity carried out on the controlled display is concluded, the dial might power off (or sleep) the controlled display, while continuing to display on its indicator display, the icon/logo representing the last channel or content consumed during that activity. With this, the user, upon returning to the dial sometime later, may be enabled to quickly recall the previous activity and either jump right into it, or continue the browsing experience from a familiar place in the menu.

Figure 35:
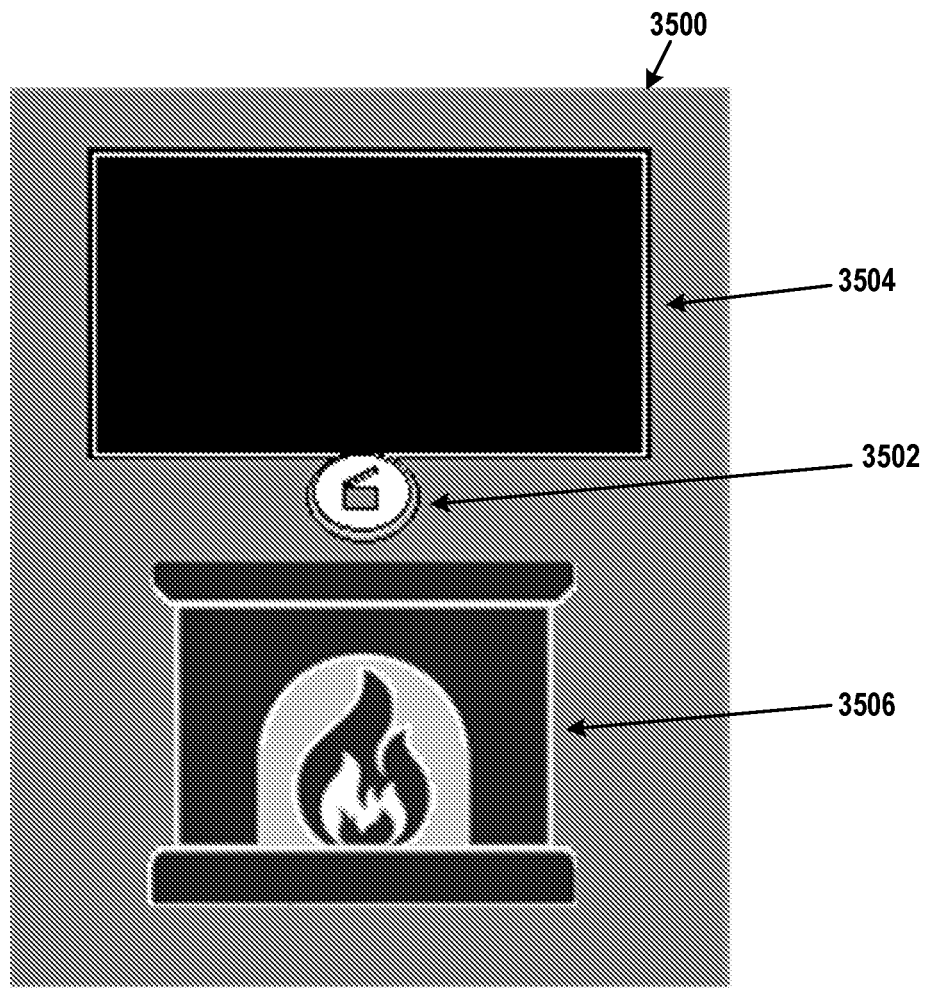
FIG. 35 depicts controller positioning, in accordance with example embodiments.

Such an arrangement 3500 is shown in FIG. 35. In arrangement 3500, which may be a user's living room for example, controller 3502 is mounted between television 3504 and fireplace 3506. Television 3504 is off, and controller 3502 may still display an indication of the most recent activity in which the television was engaged (e.g., a displaying a movie). Controller 3502 may be off or in a low-power mode with its screen still displaying the indication.

E. Use in the Desktop Environment

Among other advantages, the dial intends to solve the following pervasive problem (among others) existing in the desktop environment: mobile phones as a distraction and detractor of focus in the work environment.

The mobile (smart) phone is particularly problematic in the working environment, where knowledge workers and creative professionals must avoid distractions and minimize context switching in order to maintain productivity and focus on the task at hand. Modern phones are designed to use red badge notifications to call our attention into application ecosystems. Because of this, simply picking up the phone to accept an incoming call or to send a quick text message while at one's desk can result in an engagement with content designed to deliver quick jolts of dopamine, such as social media or games.

Modern workers face a predicament in attempting to distance themselves from their phones while in work mode, as workers must be accessible by call or text in order to maintain a critical line of communication with family and loved ones. Thus, keeping the phone at a distance from the desk is impractical, and in the worst cases may even pose a safety risk for workers or those attempting to reach them with urgent issues.

One possible solution is to use the dial to surface the phone's most critical functions. By pairing with a user's phone, the dial may enable the user to obscure the smart phone (or at least to further distance it) from the desktop environment. The dial may accomplish this by pairing with the phone in order to surface unique or critical functions of the phone, into the dial's LCD face. Thus, when the dial is mounted to a desktop display being used for work, critical phone functions like receiving calls or texts, or making outbound calls, may be accessible at arm's reach, enabling the user to keep their phone at a distance, whether in the user's pocket, in a bag, or in a more remote location from the desk (see FIG. 32).

Other ways the dial might enhance the OW experience, and the desktop computing experience, in general include the following.

By offering an alternative to the mouse and keyboard for switching between window views and layouts typically tiled across multiple monitors or high(er) resolution monitors. The construct of OW workspaces and tasks may enable the dial to be used to remotely switch between expansive views of window layouts (workspaces) or to defocus certain regions or elements of what's in view (e.g., dimming the desktop).

By powering or waking the desktop display and its connected device and subsequently navigating directly to the last known task or activity (OW workspace, task, session), allowing the user to pick up right where they left off with no need to set up or configure content represented in the form of workspaces, tasks, or even individual application windows occupying a virtual panel view or occupying the display's full screen.

F. Use in the Entertainment Environment

Additionally, the dial serve as a solution for one such pervasive problem characteristic of the streaming entertainment experience in the living room environment: the convoluted process of browsing and searching for content.

Today's streaming entertainment experience is rife with friction, possibly in part due to the excess of content, the disparity of it, or some combination thereof. As the concept of the smart television evolved, the connected streaming device was born, enabling any television with an HDMI input to be driven by any streaming service provider device. The number of services providers then grew, as popular streaming service providers like FireTV, AppleTV, AndroidTV, Roku, Tizen, et al., introduced alternatives to traditional service providers like Comcast, AT&T, and DirectTV.

Many television owners often (and sometimes unintentionally) engage with at least two streaming service providers (e.g., via a connected FireTV, AppleTV, Roku or Xfinity streaming device and via the television's onboard AndroidTV or Tizen OS). Because these various systems/service providers commonly provide access to the same content providers, searching for a content provider like Netflix or Hulu using the television's Android-embedded search function can return multiple instances of Netflix or Hulu (i.e., it may return the Smart television's android instance of Netflix and also the HDMI-connected FireTV's instance of Netflix).

Thus, in order to access the content provider experience where the desired content can be selected, the user must first evaluate both of the television's Netflix instances in order to determine to which instance the user is authenticated into or subscribed. For those users with access to more than one service provider, the process of searching and browsing for content can be jarring as the user is forced to navigate across/between disparate ecosystems of content, each presenting content differently (in terms of both where the content is located within the service provider's menu and in terms of what that menu experience looks and feels like). This same process is likely to be repeated each time the user keyword-searches for content at the system-level.

A problem of the same nature exists within each ecosystem's search and browse experience and affects all users (both those with access to multiple service providers and those using only a single service provider). Once inside a service provider's experience (e.g., the FireTV or Roku experience) users must evaluate and arbitrate between multiple instances of the same content provider or channel, because, while content tends to be exclusive to particular channels, channels tend to be common across content providers. Searching for content can thus return duplicate instances of channels or content providers, while browsing for content can require evaluating various instances of these channels or content providers to determine which instance the user is authenticated to or which they've subscribed to or paid for.

An existing solution to this problem is to use a global search at the service provider level (e.g., voice-searching for content across a service like FireTV). This enables users to keyword search for specific content across multiple content providers (Netflix, Hulu, HBOnow, Disney+, etc.) contained within the service provider experience. However, if the searched-for content is available from numerous content providers within the service provider's ecosystem, the search will return duplicate instances of that content. To illustrate this, a user might search for a Disney movie like Cinderella), and the search may return a list showing 3 instances of Cinderella: one for each content provider offering it (e.g., Disney+, Netflix, and Hulu). From here, the user is likely to go through a trial-and-error process to determine which instance of Cinderella the user can access for free (whether through a currently active subscription to the content provider or from a prior a-la-carte purchase of Cinderella).

Thus, even within a single contained service provider experience like FireTV, the process of searching or browsing for content requires a fair amount of trial and error that's likely to expose the user to brief accidental engagements with various unpaid-for or unsubscribed-to content. One possible solution is to distill the service/content provider experience into a simplistic presentation of channels and content. This might involve representing duplicate instances of channels and content with single objects.

In cases where content and channels are sourced from numerous third-party providers (as opposed to from a single proprietary application serving all content), the master list might inconveniently contain duplicate instances of content or channels the dial discovers across various service providers and content providers. The problem of a search returning duplicate instances of channels or content can be explained as a function of certain channels (Disney+, ESPN+, YouTube, etc.) being commonly accessible across numerous content providers (Netflix, Hulu, Comcast, etc.), and (at a higher level) certain content providers being commonly accessible across numerous service providers (FireTV, Roku, GoogleTV, AppleTV, Tizen, etc.). In such cases, the dial's onboard software logic might aggregate the master list's duplicate instances of content or channels into single content or channel objects intended to represent those duplicate instances of content or channels.

These objects may contain metadata that specifies the particular instance of a duplicate channel or content to which the user is subscribed or authenticated. The dial software may in turn use this metadata to arbitrate between these duplicate instances on behalf of the user and drive this single representative object by the subscribed-to or authenticated instance of the channel or content that the object represents. This might in turn eliminate the need for the dial user to manually determine which duplicate instance of a channel or content is the subscribed-to or authenticated instance. This metadata may further be used to prioritize within the menu, the user's paid for content, or subscribed channels, while deprioritizing (or altogether hiding) irrelevant channel or content instances from the searching or browsing experience.

Figure 36A:
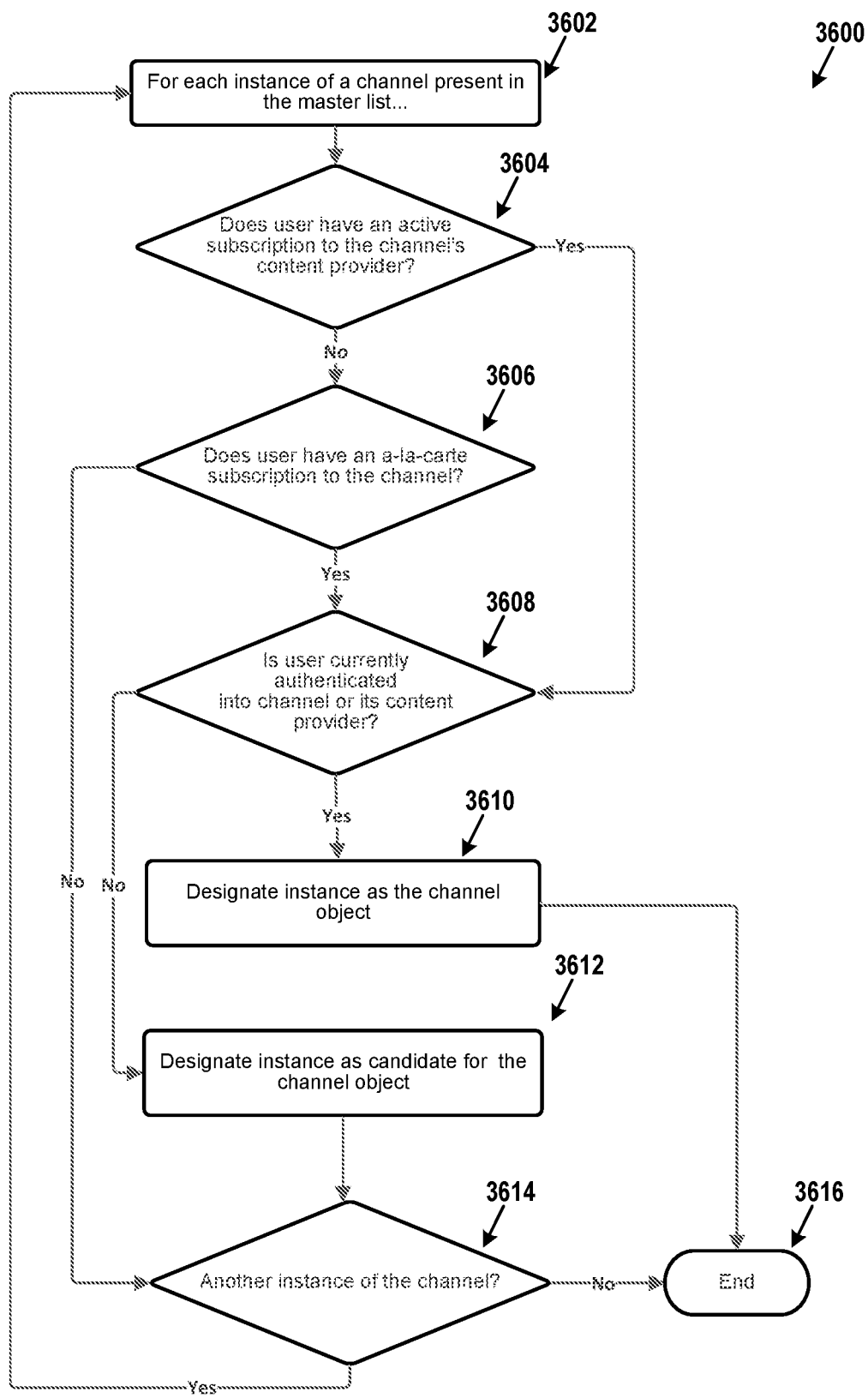
FIG. 36A depicts a channel object creation workflow, in accordance with example embodiments.

FIG. 36A depicts a channel discovery process 3600. As indicated by block 3602 and block 3614, blocks 3602-3614 represent a loop of actions that the controller carries out for each channel in the master list.

At block 3604, it is determined whether the user has an active subscription to the channel's content provider. If so, control passes to block 3608. If not, control passes to block 3606.

At block 3606, it is determined whether the user has an a-la carte subscription to the channel. If so, control passes to block 3608. If not, control passes to block 3614.

At block 3608, it is determined whether the user is currently authenticated into the channel or its content provider. If so, control passes to block 3610. If not, control passes to block 3612. At block 3610, the controller designates a channel object for the channel. At block 3612, the controller designates the channel as a candidate for a channel object.

At block 3614, it is determined whether there is another instance of the channel. If so, control passes to block 3602. If not, control passes to block 3616.

Figure 36B:
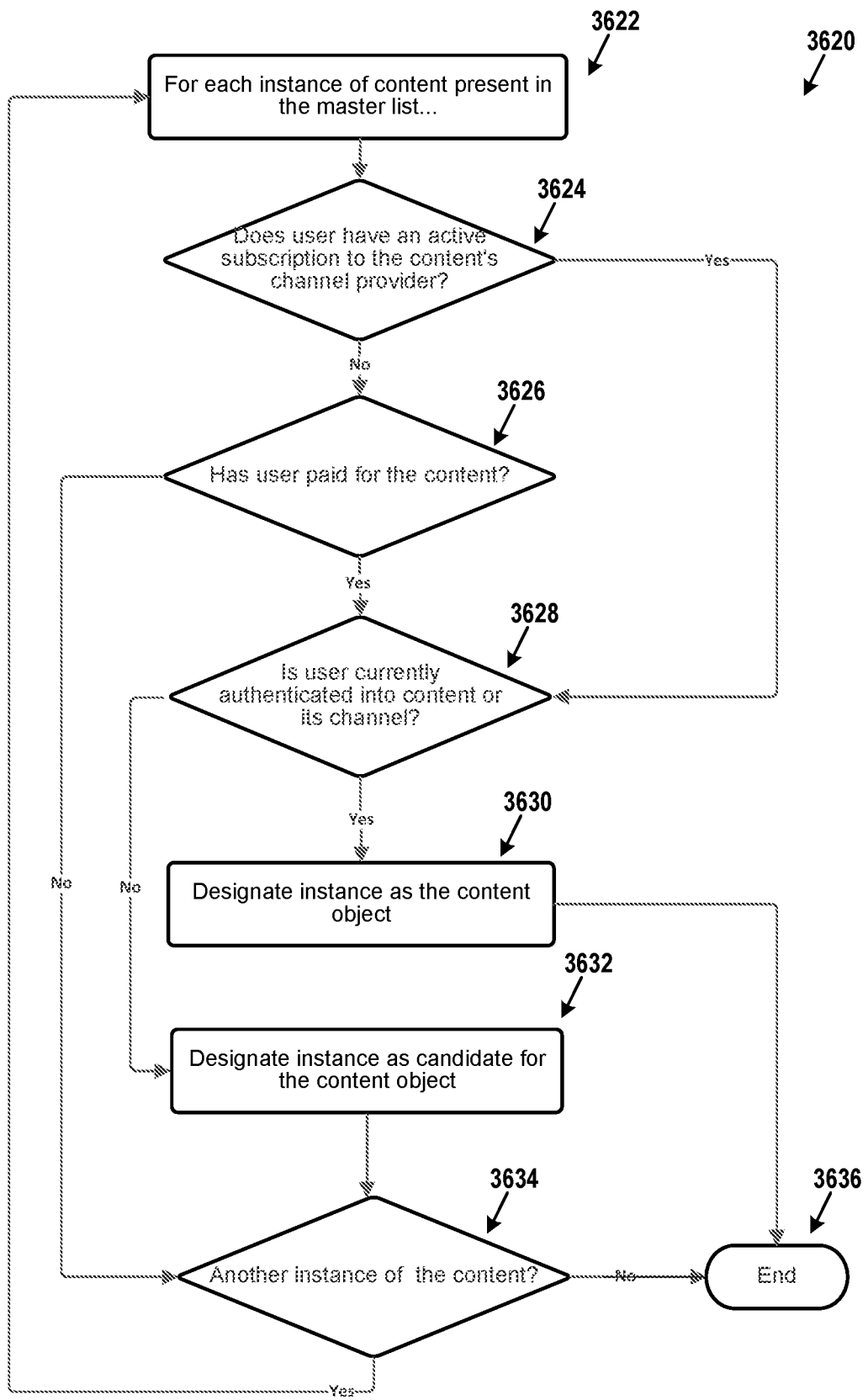
FIG. 36B depicts a content object creation workflow, in accordance with example embodiments.

FIG. 36B depicts a content discovery process 3620. As indicated by block 3622 and block 3634, blocks 3622-3634 represent a loop of actions that the controller carries out for each instance of content in the master list.

At block 3624, it is determined whether the user has an active subscription to the provider of the content. If so, control passes to block 3628. If not, control passes to block 3626.

At block 3626, it is determined whether the user has paid for the content. If so, control passes to block 3628. If not, control passes to block 3634.

At block 3628, it is determined whether the user is currently authenticated into the content or the content provider. If so, control passes to block 3630. If not, control passes to block 3632. At block 3630, the controller designates a content object for the content. At block 3632, the controller designates the content as a candidate for a content object.

At block 3634, it is determined whether there is another instance of the content. If so, control passes to block 3622. If not, control passes to block 3636.

With this construct, the service providers and content providers may be de-emphasized in the dial's menu or completely obscured from it, and thus from the general experience of searching or browsing for content. By enabling the dial's user to search and browse between channels or content while being completely unaware of which service provider or content provider the channel or content originated from, the user might be relieved from having to associate particular channels to particular content providers (where users tend to make weak associations), enabling the user to instead center the searching/browsing experience around associating particular channels with particular content (where users tend to make strong associations). To illustrate this point it, it might be said that users tend to strongly associate certain content (e.g., Frozen) with channels (e.g., Disney), but weakly associate channels (e.g., Disney or ESPN) with content providers (e.g., Hulu or Netflix).

Provided the user has associated modes to particular displays, channels and content available across display-connected source(s) might be further hierarchized and categorized by mode (e.g., work, play, etc.), and in turn, each mode's user experience (in terms of how the dial's menu prioritizes or presents browseable content), might be dynamically adjusted to custom-fit the mode.

Other ways the dial might enhance the streaming entertainment experience include the following.

By offering an alternative to the typical embodiment of a remote control—likely to be frequently misplaced and certain to require occasional battery replacement. The dial might be docked to a holster incorporated into the controlled display's housing or mounted to the controlled display's stand. This holster might contain an NFC charger intended to serve as a charging pad and to serve as a home base for the dial.

By enabling the user to browse or search for content while content is playing or occupying the television's full screen. With existing streaming providers, it is common for the current program being played to need to be suspended or paused whenever a user engages a new search or browse, as the controlled display typically needs to be used to display a menu that may facilitate the search. By virtue of the dial containing its own LCD display that may expose a browseable/searchable menu, the user may actively browse or search for new content to engage with, even while a program/show/movie continues to play and occupy the full screen of the controlled display.

By functioning as a universal remote that can simultaneously operate a television and its connected sources, eliminating the need to maintain and operate numerous remote-control devices specific to particular source devices or display devices.

G. Dial Operation across Environments

In addition to solving problems within the desktop and living room environments, the dial may standardize the user experience across these environments, and more generally, across work and play use of technology. By serving as a single point of contact and control for various types of source devices and display types (namely televisions and computer monitors), the dial might standardize the traditionally distinctive user experiences characteristic of each environment. In practice, the living room environment and the desktop environment may be driven by the same commands, the same rules, the same menu construct expressed in the simplistic form of channels and content.

Users may access the docked dial controller in order to control the display that it is docked to or to control an experience on some other nearby display. For example, User A might walk into the living room (where the dial controller might be docked to a television), access the dial controller to remotely select content to watch on the TV, and then re-dock the dial controller to the display once television watching is concluded. Sometime later, User A or User B (another configured user) might pick up the dial from the television's holster and carry it into the home office, where the dial might automatically adjust its mode from Play to Work (and might switch its user profile from User A to User B, by interpreting fingerprint input via its LCD face's capacitive touch screen). Once seated at the desktop, the user might then dock the dial to a holster on the desktop display in order to jump right into a recent work activity or task, or to search across workspaces or tasks represented in the familiar construct of channels and content.

H. Controller Components

The hardware controller may specifically include the following general functionality such as accepting touch input from the user (in the form of taps, presses, and turns), accepting voice input, playing audio, discovering content on behalf of the user, controlling devices (displays and sources) over Wifi and Bluetooth, or providing visual indications of content currently or recently engaged with on the controlled display (such as illuminated icons or logos). The componentry described below may facilitate this general functionality.

Figure 37:
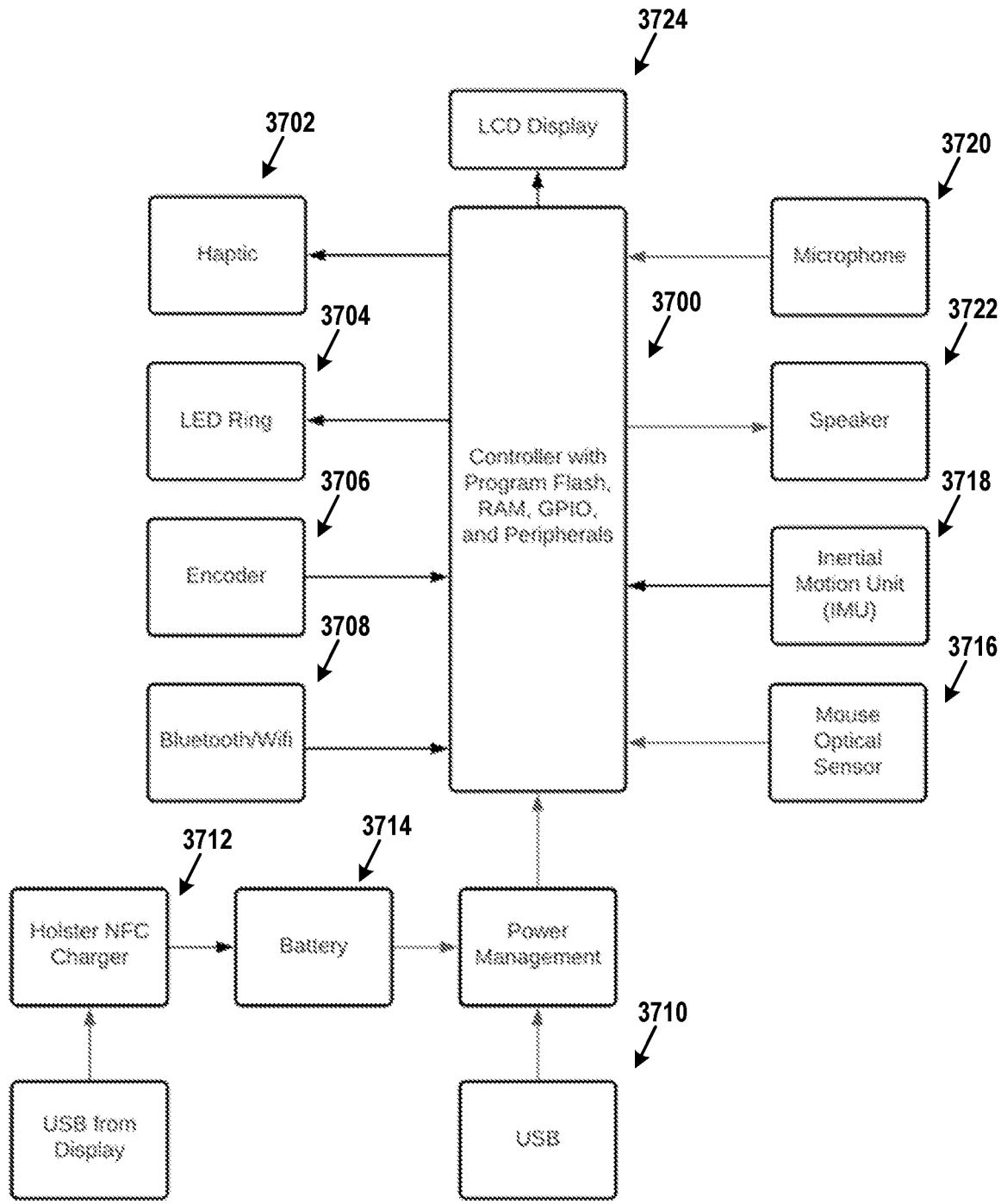
FIG. 37 depicts controller internals, in accordance with example embodiments.

An example block diagram of the controller 3700 is shown in FIG. 37. The components of controller 3700 include program flash, RAM, general-purpose input/output (GPIO), one or more processors, and support for peripherals. Other possible components are described below.

Haptic module 3702 provides touch feedback using a vibration motor. The vibration motor may be either an elliptical rotating mass or a linear resonant actuator. The design of the enclosure may determine on which axis the vibration will occur and where the vibration will be felt on the dial.

LED Ring module 3704 may be a circular strip of LEDs around the base that may be lit in individual segment or a combination of segments. The use of the LEDs to show active switch positions for the rotating knob may be necessary feedback for the user. Different colors of LEDs (RGBW) may signify different modes of operation or connectivity. The number of LEDs in the diameter may in some cases be determined by the user interface and use cases.

Encoder module 3706 may be an optical circular sensor that senses rotary position. The encoder may provide accurate rotational position information for the dial to be used by the user interface.

Bluetooth/Wifi module 3708 may include a Bluetooth 5.0 module that supports Bluetooth Low Energy (BLE) and/or a Wifi module. BLE adds the ability to enhance battery life and to provide beacon information for connection purposes. Wifi provides whole house connectivity through the active network.

USB module 3710 allows connection to the display through a rigid connection or cable and might be used for development only.

Holster NFC charger module 3712 may use a 5V USB supply from the controlled display to recharge its onboard lithium battery.

Battery module 3714 may use an onboard lithium battery that allows for remote operation. The battery size may be determined by the expected battery life and the power consumption of the dial's electronic components.

Mouse optical sensor module 3716 may use a high-resolution sensor to detect mouse movement. The optical sensor may use a LED (infrared and/or red) to illuminate the surface that the dial is traversing. The reflections may be detected by an optical sensor and processed to determine the velocity and direction of the dial motion on the surface.

Inertial Motion Unit (IMU) module 3718 may use a 9DOF sensor to detect motion and acceleration in three planes. The nine degrees of freedom may be obtained using the accelerometer, magnetometer, and gyroscope. The data from the IMU may be processed using an onboard fusion algorithm to determine the position, velocity, and acceleration of the dial in 3D space. This data may in turn be used to recognize dial motion on the surface as well as motion in the air. Gestures may also be recognized using the IMU data. Another feature of the accelerometer may be its ability to recognize vibration or taps. A tap on the device may be interpreted as a switch actuation.

Microphone module 3720 provides an omnidirectional microphone that may be used to recognize voice commands. The dial's user interface may be activated using voice commands. The microphone may also be used for hands-free voice or phone operation.

Speaker module 3722 provides a speaker that may be used for audio prompts and hands-free voice or phone audio.

LCD display module 3724 may be either a color TFT or OLED LCD and may display icons, logos, text, or images. The display size may be approximately 1-5 inches in diameter and with at least 480×480 pixels of resolution in order to display the desired text and images such that they are recognizable or legible from more than a few feet away. The LCD may use a touchscreen for user interface interactions. The indicator display may be designed to be always on when docked to a display device, and may show an icon, logo, or text when in always on state in order to indicate the active or most recently shown user, source, channel, or specific content engaged on the controlled display.

Accordingly, various embodiments may include a hardware controller comprising: a wireless network interface; a chargeable battery; a display interface configured to dock to an external display and charge the chargeable battery; an LCD screen configured to show information relating to the external display; a rotatable dial configured to receive manual input; a processor; and memory containing program instructions executable by the processor, wherein the program instructions: (i) cause the manual input received from the rotatable dial or a rotary position of the rotatable dial to control the external display, and (ii) cause data received from the wireless network interface or information received from the external display to be displayed on the LCD screen.

Some embodiments may further involve a microphone configured to receive audio input, wherein the program instructions translate the audio input into commands that control the external display or the LCD screen.

Some embodiments may further involve a vibration motor configured to generate haptic touch feedback in response to data received by way of the wireless network interface, the display interface, microphone input, optical sensor input, or the rotatable dial.

Some embodiments may further involve an IMU with nine degrees of freedom, wherein the program instructions calculate position velocity, and acceleration of the hardware controller, and wherein further manual input received from the IMU further controls the external display or the LCD screen.

In some embodiments, the LCD screen may be 1-5 inches in diameter with at least 640×640 pixels of resolution.

In some embodiments, docking to the external display comprises docking to a housing or stand of the external display, wherein charging the chargeable battery occurs by way of the housing or the stand.

In some embodiments, docking to the external display comprises automatically pairing the hardware controller with the external display or a source device associated with the external display.

In some embodiments, the program instructions also cause the external display to enter a low-power mode by way of actuation or voice command.

In some embodiments, the program instructions also cause the LCD screen to display incoming calls or messages from a paired mobile communication device.

In some embodiments, the program instructions also cause the hardware controller to query the external display or a source device associated with the external display for supported media channels or digital content, and store the supported media channels or digital content in respective objects.

In some embodiments, storing the supported media channels or digital content in the respective objects comprises detecting and removing duplicates from the respective objects.

In some embodiments, the LCD screen is configured to display further information related to a last-used object of the respective objects.

In some embodiments, the LCD screen is configured to display the further information even when the external display or another associated device is in a low-power mode or powered off.

In some embodiments, the further information is an icon or logo that visually represents the last-used object.

In some embodiments, the respective objects are browseable and selectable by way of the rotatable dial.

Some embodiments may further involve an encoder configured to represent the rotary position of the rotatable dial.

In some embodiments, the hardware controller can be in an environmental mode, wherein the hardware controller sets the environmental mode based on one or more of: whether the wireless network interface is connected to a wireless network, a type of wireless network to which the wireless network interface is connected, or a designated mode of the external display.

Further embodiments may involve a hardware controller comprising: a wireless network interface; a LCD screen configured to show icons or logos representing viewable content accessible by the controlled display device or its sources; a chargeable battery; a display interface configured to dock to an external display and charge the chargeable battery; and a processor configured to receive manual input and execute program instructions.

Additional embodiments may involve a hardware controller, attachable to a display device, comprising: a rotatable dial offering tactile feedback and configured to receive manual input; and a LCD screen configured to show icons or logos representing viewable content accessible by the attached display.

Any of these embodiments may be enhanced by any of the features described in this section or other sections herein.

X. Example Operations

Figure 38:
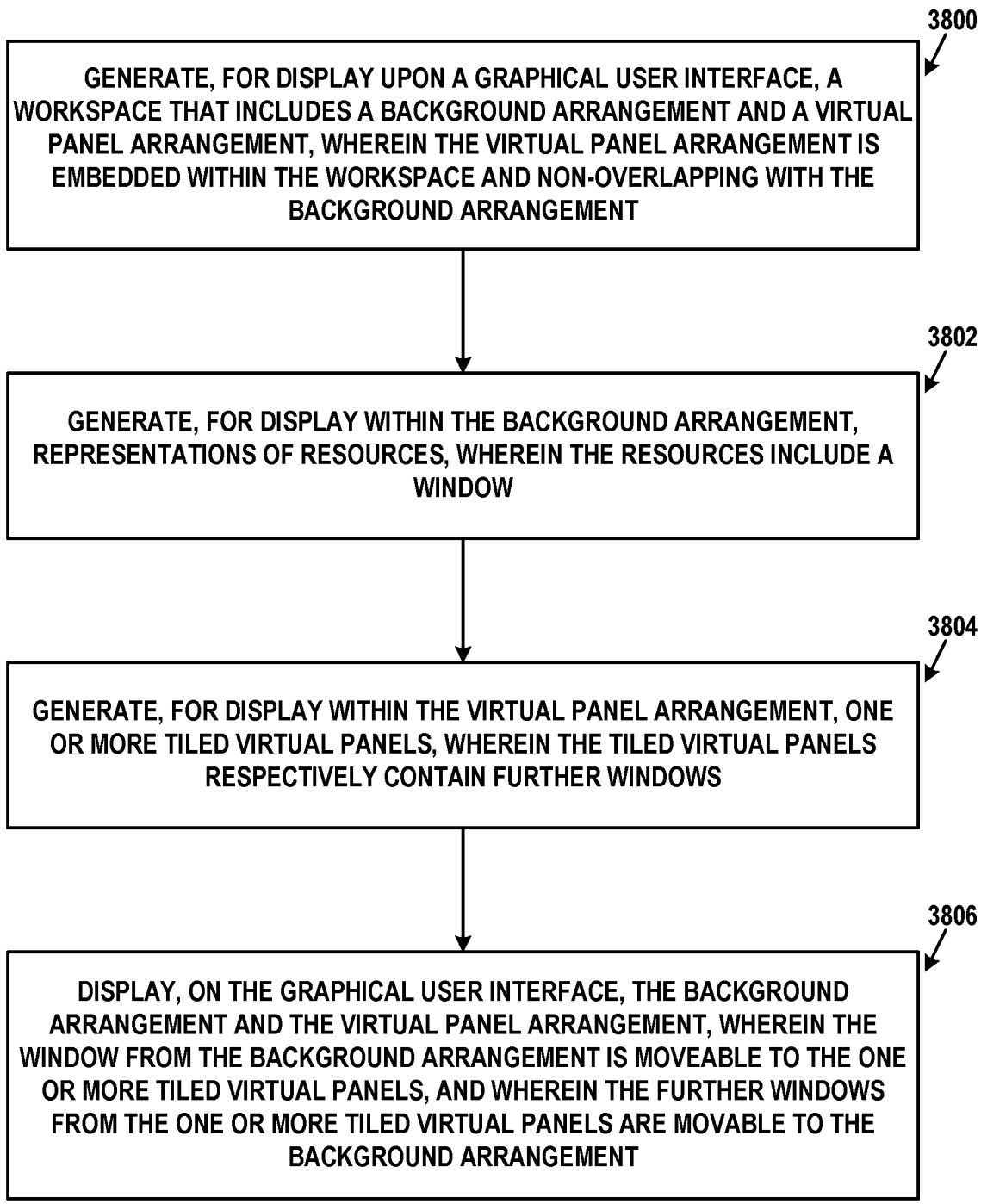
FIG. 38 is a flow chart, in accordance with example embodiments.

FIG. 38 is a flow chart illustrating an example embodiment. The process illustrated by FIG. 38 may be carried out by a computing device, such as computing device 100, and/or a cluster of computing devices, such as server cluster 200. However, the process can be carried out by other types of devices or device subsystems.

The embodiments of FIG. 38 may be simplified by the removal of any one or more of the features shown therein. Further, these embodiments may be combined with features, aspects, and/or implementations of any of the previous figures or otherwise described herein.

Block 3800 may involve generating, for display upon a graphical user interface, a workspace that includes a background arrangement and a virtual panel arrangement, wherein the virtual panel arrangement is embedded within the workspace and non-overlapping with the background arrangement. Herein, the term "background" may be used in place of the term "desktop" where appropriate, unless context suggests otherwise.

Block 3802 may involve generating, for display within the background arrangement, representations of resources, wherein the resources include a window.

Block 3804 may involve generating, for display within the virtual panel arrangement, one or more tiled virtual panels, wherein the tiled virtual panels respectively contain further windows.

Block 3806 may involve displaying, on the graphical user interface, the background arrangement and the virtual panel arrangement, wherein the window from the background arrangement is moveable to the one or more tiled virtual panels, and wherein the further windows from the one or more tiled virtual panels are movable to the background arrangement.

In some embodiments, the resources also include a thumbnail image, a button, or an icon relating to an application, file, or other resource such as a URL.

In some embodiments, the resources include a workspace tray, wherein the workspace tray includes a button or icon representing a minimized window, wherein actuation of the button or icon causes the minimized window to be displayed on the background arrangement in a non-minimized manner, and wherein actuation of a minimization control on the window causes the window to be minimized to the workspace tray.

In some embodiments, the background arrangement includes a defocusing setting that, when activated, causes the background arrangement to be defocused while the virtual panel arrangement remains in focus.

In some embodiments, causing the background arrangement to be defocused comprises causing the background arrangement to be blurred, dimmed, or shaded.

In some embodiments, a panel tray of a particular virtual panel of the tiled virtual panels includes a button representing a minimized window, wherein actuation of the button causes the minimized window to be displayed on the particular virtual panel in a non-minimized manner, and wherein actuation of a minimization control on a particular further window of the particular virtual panel causes the particular further window to be minimized to the panel tray.

In some embodiments, causing the minimized window to be displayed on the particular virtual panel in the non-minimized manner comprises expanding the minimized window to fully occupy the particular virtual panel.

In some embodiments, the background arrangement and the virtual panel arrangement each have independently controllable audio settings, wherein the background arrangement and the virtual panel arrangement each have independently controllable zoom settings.

Some embodiments may further involve generating, for display upon the graphical user interface, a task arrangement that includes at least one application set on a task layer; and displaying, on the graphical user interface, the task arrangement visually above the background arrangement and the virtual panel arrangement.

In some embodiments, the task arrangement includes two or more separate and distinct applications combined on the task layer.

In some embodiments, a defocusing setting, when activated, causes the background arrangement to be defocused when it is visually below the task layer, while the task layer remains in focus. Thus, the task layer underlying the window(s) set atop of it, may be defocused and thus may partially or entirely obscure the view of the virtual background arrangement, desktop, or entire workspace underlying it, while the window(s) set on the task layer remain in focus.

In some embodiments, a defocusing setting, when activated, causes the background arrangement and the virtual panel arrangement to be defocused when they are visually below the task layer.

In some embodiments, the background arrangement, the virtual panel arrangement, and the task layer each have independently controllable audio settings.

In some embodiments, the task layer can be minimized to a button or icon in a workspace tray.

In some embodiments, when the task layer is minimized to the workspace tray, the button or icon displays notifications related to the at least one application hosted on the task layer.

Some embodiments may further involve: serializing the background arrangement and the virtual panel arrangement to structured data conforming to a structured data format; and writing the structured data to volatile or non-volatile storage.

In some embodiments, the background arrangement is represented in the structured data as a first set of elements including: thumbnail images, windows, and icons for the resources, a wallpaper or background specification, a zoom percent and desktop audio settings, wherein the virtual panel arrangement is represented in the structured data as a second set of elements including: the further windows for each of the tiled virtual panels and virtual panel audio settings.

In some embodiments, system facts for each physical display on which the graphical user interface appears is represented in the structured data as a third set of elements including: lock screen and screen saver settings, display resolution, orientation, zoom percent, and system audio settings.

In some embodiments, moving a resource from the background arrangement to the virtual panel arrangement causes the resource to be dynamically resized to fit within borders of one or the tiled virtual panels. This might be accomplished by (i) capturing the mouse-up or touch-end event upon the completion of a window drag, (ii) determining if the pointer's coordinates are within a virtual panel's bounds, (iii) clearing from view the dragged representation of the resource (in some cases a thumbnail image and in some cases an actual-size image of a window), (iv) positioning or resizing an executing application window (or launching a non-executing application then capturing the top-level event to intercept its window in order to position and/or resize the window) to fit the bounds of the virtual panel in which the mouse-up or touch-end event occurred.

In some embodiments, movement of a particular window of the further windows out of a tiled virtual panel to the background arrangement causes the particular window to be represented as a thumbnail image on the background arrangement; and wherein movement of the thumbnail image from the background arrangement to the tiled virtual panel causes the thumbnail image to be converted back into a window representation.

Figure 39A:
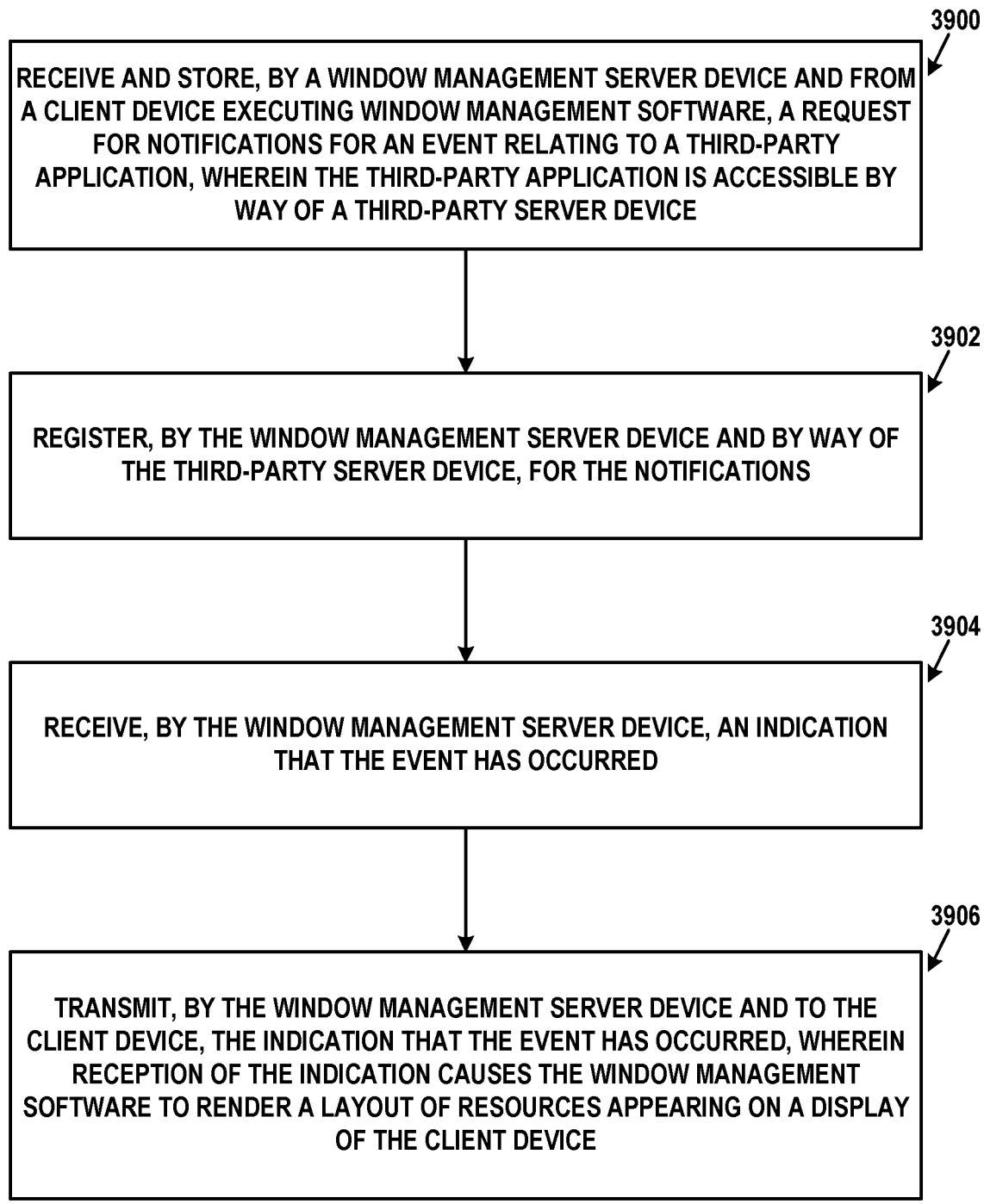
FIG. 39A is a flow chart, in accordance with example embodiments.

FIG. 39A is a flow chart illustrating an example embodiment. The process illustrated by FIG. 39A may be carried out by a computing device, such as computing device 100, and/or a cluster of computing devices, such as server cluster 200. However, the process can be carried out by other types of devices or device subsystems.

The embodiments of FIG. 39A may be simplified by the removal of any one or more of the features shown therein. Further, these embodiments may be combined with features, aspects, and/or implementations of any of the previous figures or otherwise described herein.

Block 3900 may involve receiving and storing, by a window management server device and from a client device executing window management software, a request for notifications for an event relating to a third-party application, wherein the third-party application is accessible by way of a third-party server device.

Block 3902 may involve registering, by the window management server device and by way of the third-party server device, for the notifications.

Block 3904 may involve receiving, by the window management server device, an indication that the event has occurred.

Block 3906 may involve transmitting, by the window management server device and to the client device, the indication that the event has occurred, wherein reception of the indication causes the window management software to render or modify a layout of resources appearing on a display of the client device. These resources can be a task arrangement and/or any combination of windows, icons, buttons, and so on.

In some embodiments, rendering the layout of resources appearing on the display of the client device comprises: generating a task arrangement that includes one or more applications, relating to the third-party application or the event, combined on a common task layer; and displaying the task arrangement visually above other information being displayed on a graphical user interface of the client device.

In some embodiments, the other information comprises a workspace that includes a background arrangement and a virtual panel arrangement, wherein the virtual panel arrangement is embedded within and non-overlapping with the background arrangement.

In some embodiments, the background arrangement includes representations of resources including a window, wherein the virtual panel arrangement includes one or more tiled virtual panels, and wherein the tiled virtual panels respectively contain further windows.

In some embodiments, displaying the task arrangement comprises defocusing the other information when the common task layer is displayed.

In some embodiments, the third-party application is a calendar service, wherein the event is related to an entry in the calendar service, and wherein the one or more applications combined on the common task layer include other applications executing on the client device that are related to the event.

In some embodiments, the third-party application is an email service, wherein the event is related to the email service, and wherein the one or more applications combined on the common task layer include an email application executing on the client device or other applications that are related to the event.

In some embodiments, the event is an update from the third-party application, wherein at least one of the one or more applications combined on the common task layer are updated based on the event.

Some embodiments may further involve: receiving and storing, by the window management server device and from the client device, a further request for further notifications for a further event relating to a further third-party application, wherein the further third-party application is accessible by way of a further third-party server device; registering, by the window management server device and by way of the further third-party server device, for the further notifications; receiving, by the window management server device, a further indication that the further event has occurred; and transmitting, to the client device, the further indication that the further event has occurred, wherein reception of the further indication causes the window management software to modify the layout of resources appearing on the display of the client device.

Figure 39B:
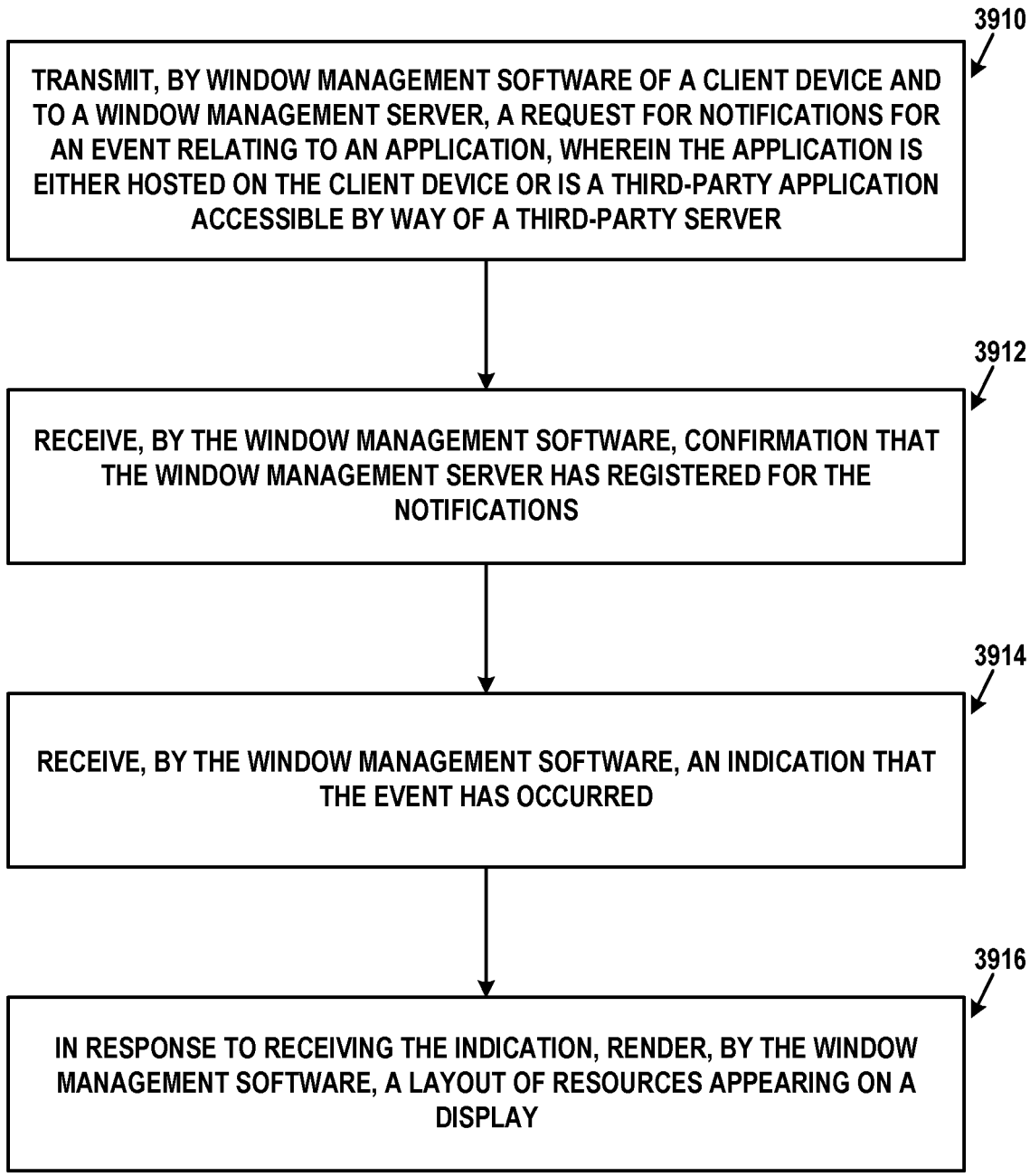
FIG. 39B is a flow chart, in accordance with example embodiments.

FIG. 39B is a flow chart illustrating an example embodiment. The process illustrated by FIG. 39B may be carried out by a computing device, such as computing device 100, and/or a cluster of computing devices, such as server cluster 200. However, the process can be carried out by other types of devices or device subsystems.

The embodiments of FIG. 39B may be simplified by the removal of any one or more of the features shown therein. Further, these embodiments may be combined with features, aspects, and/or implementations of any of the previous figures or otherwise described herein.

Block 3910 may involve transmitting, by window management software of a client device and to a window management server, a request for notifications for an event relating to an application, wherein the application is either hosted on the client device or is a third-party application accessible by way of a third-party server.

Block 3912 may involve receiving, by the window management software, confirmation that the window management server has registered for the notifications.

Block 3914 may involve receiving, by the window management software, an indication that the event has occurred.

Block 3916 may involve, possibly in response to receiving the indication, rendering, by the window management software, a layout of resources appearing on a display.

In some embodiments, rendering the layout of resources appearing on the display comprises: generating a task arrangement that includes one or more applications, relating to the application or the event, combined on a common task layer; and displaying the task arrangement visually above other information being displayed on a graphical user interface.

In some embodiments, the other information comprises a workspace that includes a background arrangement and a virtual panel arrangement, wherein the virtual panel arrangement is embedded within and non-overlapping with the background arrangement.

In some embodiments, the background arrangement includes representations of resources including a window and a workspace tray, wherein the virtual panel arrangement includes one or more tiled virtual panels, wherein the tiled virtual panels respectively contain further windows and panel trays.

In some embodiments, displaying the task arrangement visually above the other information being displayed on the graphical user interface comprises defocusing the other information when the common task layer is displayed.

In some embodiments, the application is a calendar service, wherein the event is related to an entry in the calendar service, and wherein the one or more applications combined on the common task layer include other applications that are related to the event.

In some embodiments, the application is an email service, wherein the event is related to the email service, and wherein the one or more applications combined on the common task layer include an email application or other applications that are related to the event.

XI. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:
   generating, for display upon a graphical user interface, a workspace that includes a background arrangement and a virtual panel arrangement, wherein the virtual panel arrangement is embedded within the workspace and non-overlapping with the background arrangement;
   generating, for display within the background arrangement, representations of resources, wherein the resources include a window;

generating, for display within the virtual panel arrangement, one or more tiled virtual panels, wherein the tiled virtual panels respectively contain further windows; and displaying, on the graphical user interface, the background arrangement and the virtual panel arrangement, wherein the window from the background arrangement is moveable to the one or more tiled virtual panels, wherein the further windows from the one or more tiled virtual panels are movable to the background arrangement, and wherein a defocusing setting, when activated, causes the background arrangement to be defocused while the virtual panel arrangement remains in focus.

2. The computer-implemented method of claim 1, wherein the resources also include a thumbnail image, a button, or an icon relating to an application, file, or other resource.

3. The computer-implemented method of claim 1, wherein the resources include a workspace tray, wherein the workspace tray includes a button or icon representing a minimized window, wherein actuation of the button or icon causes the minimized window to be displayed on the background arrangement in a non-minimized manner, and wherein actuation of a minimization control on the window causes the window to be minimized to the workspace tray.

4. The computer-implemented method of claim 1, wherein causing the background arrangement to be defocused comprises causing the background arrangement to be blurred, dimmed, or shaded.

5. The computer-implemented method of claim 1, wherein a panel tray of a particular virtual panel of the tiled virtual panels includes a button representing a minimized window, wherein actuation of the button causes the minimized window to be displayed on the particular virtual panel in a non-minimized manner, and wherein actuation of a minimization control on a particular further window of the particular virtual panel causes the particular further window to be minimized to the panel tray.

6. The computer-implemented method of claim 5, wherein causing the minimized window to be displayed on the particular virtual panel in the non-minimized manner comprises expanding the minimized window to fully occupy the particular virtual panel.

7. The computer-implemented method of claim 1, wherein the background arrangement and the virtual panel arrangement each have independently controllable audio settings, and wherein the background arrangement and the virtual panel arrangement each have independently controllable zoom settings.

8. The computer-implemented method of claim 1, further comprising:
generating, for display upon the graphical user interface, a task arrangement that includes at least one application window set atop a task layer; and
displaying, on the graphical user interface, the task arrangement visually above the background arrangement and the virtual panel arrangement.

9. The computer-implemented method of claim 8, wherein the task arrangement includes two or more separate and distinct applications combined on the task layer.

10. The computer-implemented method of claim 8, wherein a defocusing setting, when activated, causes the background arrangement and the virtual panel arrangement to be defocused when they are visually below the task layer.

11. The computer-implemented method of claim 8, wherein the background arrangement, the virtual panel arrangement, and the task layer each have independently controllable audio settings.

12. The computer-implemented method of claim 8, wherein the task layer can be minimized to a button or icon in a workspace tray.

13. The computer-implemented method of claim 12, when the task layer is minimized to the workspace tray, the button or icon displays notifications related to the at least one application hosted on the task layer.

14. The computer-implemented method of claim 1, further comprising:
serializing the background arrangement and the virtual panel arrangement to structured data conforming to a structured data format; and
writing the structured data to volatile or non-volatile storage.

15. The computer-implemented method of claim 14, wherein the background arrangement is represented in the structured data as a first set of elements including: thumbnail images, windows, and icons for the resources, a wallpaper or background specification, a zoom percent and desktop audio settings, wherein the virtual panel arrangement is represented in the structured data as a second set of elements including: the further windows for each of the tiled virtual panels and virtual panel audio settings.

16. The computer-implemented method of claim 1, wherein movement of a particular window of the further windows out of a tiled virtual panel to the background arrangement causes the particular window to be represented as a thumbnail image on the background arrangement; and wherein movement of the thumbnail image from the background arrangement to the tiled virtual panel causes the thumbnail image to be converted back into a window representation.

17. The computer-implemented method of claim 1, wherein moving a resource from the background arrangement to the virtual panel arrangement causes the resource to be dynamically resized to fit within borders of one or the tiled virtual panels.

18. The computer-implemented method of claim 1, wherein the virtual panel arrangement includes two or more non-overlapping tiled virtual panels.

19. A non-transitory computer-readable medium containing program instructions that, when executed by one or more processors, cause a computing device to perform operations comprising:
generating, for display upon a graphical user interface, a workspace that includes a background arrangement and a virtual panel arrangement, wherein the virtual panel arrangement is embedded within and non-overlapping with the background arrangement;
generating, for display within the background arrangement, representations of resources, wherein the resources include a window;
generating, for display within the virtual panel arrangement, one or more tiled virtual panels, wherein the tiled virtual panels respectively contain further windows; and
displaying, on the graphical user interface, background arrangement and the virtual panel arrangement, wherein the window from the background arrangement is moveable to the one or more tiled virtual panels, wherein the further windows from the one or more tiled virtual panels are movable to the background arrangement, and wherein a defocusing setting, when activated, causes the background arrangement to be defocused while the virtual panel arrangement remains in focus.

20. A computing device comprising:
- memory;
- one or more processors; and
- program instructions stored in the memory that, when executed by one or more processors, cause the computing device to perform operations comprising:
  - generating, for display upon a graphical user interface, a workspace that includes a background arrangement and a virtual panel arrangement, wherein the virtual panel arrangement is embedded within and non-overlapping with the background arrangement;
  - generating, for display within the background arrangement, representations of resources, wherein the resources include a window;
  - generating, for display within the virtual panel arrangement, one or more tiled virtual panels, wherein the tiled virtual panels respectively contain further windows; and
  - displaying, on the graphical user interface, the background arrangement and the virtual panel arrangement, wherein the window from the background arrangement is moveable to the one or more tiled virtual panels, wherein the further windows from the one or more tiled virtual panels are movable to the background arrangement, and wherein a defocusing setting, when activated, causes the background arrangement to be defocused while the virtual panel arrangement remains in focus.

* * * * *